(12) United States Patent  (10) Patent No.: US 8,203,520 B2
Shimoshikiryoh  (45) Date of Patent: *Jun. 19, 2012

(54) LIQUID CRYSTAL DISPLAY

(75) Inventor: Fumikazu Shimoshikiryoh, Matsusaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 986 days.

This patent is subject to a terminal disclaimer.

(21) Appl. No.: 12/216,974

(22) Filed: Jul. 14, 2008

(65) Prior Publication Data

US 2009/0046048 A1  Feb. 19, 2009

Related U.S. Application Data

(63) Continuation of application No. 11/002,424, filed on Dec. 3, 2004, now Pat. No. 7,429,981.

(30) Foreign Application Priority Data

Dec. 5, 2003  (JP) .................. 2003-408046
Aug. 30, 2004  (JP) .................. 2004-250982

(51) Int. Cl.
*G09G 3/36* (2006.01)
(52) U.S. Cl. .............. 345/99; 345/87; 345/100
(58) Field of Classification Search ............ 345/87–100, 345/204, 211–213
See application file for complete search history.

(56) References Cited

U.S. PATENT DOCUMENTS 4,345,249 A   8/1982  Togashi
5,576,863 A   11/1996 Aoki et al.
5,923,310 A   7/1999  Kim
7,429,981 B2 * 9/2008 Shimoshikiryoh ........... 345/204
2001/0006410 A1  7/2001 Yamada et al.
2001/0024257 A1  9/2001 Kubo et al.
2002/0047822 A1  4/2002 Senda et al.
2002/0097362 A1  7/2002 Yamada et al.
2002/0118153 A1  8/2002 Kimura
2002/0149552 A1  10/2002 Fish et al.
2002/0154076 A1  10/2002 Greene et al.
2002/0167477 A1  11/2002 Tsutsui et al.

(Continued)

FOREIGN PATENT DOCUMENTS

EP  1113312   7/2001
JP  6-14154   2/1994
JP  63-21907  11/1994

(Continued)

OTHER PUBLICATIONS

European Search Report for corresponding European Patent Application dated Sep. 12, 2007.

*Primary Examiner* — Kimnhung Nguyen
(74) *Attorney, Agent, or Firm* — Harness, Dickey & Pierce, P.L.C.

(57) ABSTRACT

A liquid crystal display includes a plurality of pixels each of which has a liquid crystal layer and a plurality of electrodes for applying a voltage to the liquid crystal layer and which are arranged in a matrix of rows and columns. Each of the plurality of pixels has a first sub-pixel and a second sub-pixel which can apply mutually different voltages to the liquid crystal layer, where the first sub-pixel has a higher brightness than the second sub-pixel in certain gradations.

26 Claims, 115 Drawing Sheets

U.S. PATENT DOCUMENTS

| | | |
|---|---|---|
| 2003/0016202 A1 | 1/2003 | Edwards et al. |
| 2003/0146893 A1 | 8/2003 | Sawabe |
| 2003/0179172 A1 | 9/2003 | Miyachi |
| 2003/0179323 A1 | 9/2003 | Abileah et al. |
| 2003/0227429 A1 | 12/2003 | Shimoshikiryo |
| 2004/0008172 A1 | 1/2004 | Nakamura et al. |
| 2004/0012551 A1 | 1/2004 | Ishii |
| 2004/0183767 A1 | 9/2004 | Koo et al. |

FOREIGN PATENT DOCUMENTS

| | | |
|---|---|---|
| JP | 6-332009 | 12/1994 |
| JP | 10-186330 | 7/1998 |
| JP | 10-268349 | 10/1998 |
| JP | 10-274783 | 10/1998 |
| JP | 11-242225 | 9/1999 |
| JP | 2002-55343 | 2/2002 |

* cited by examiner

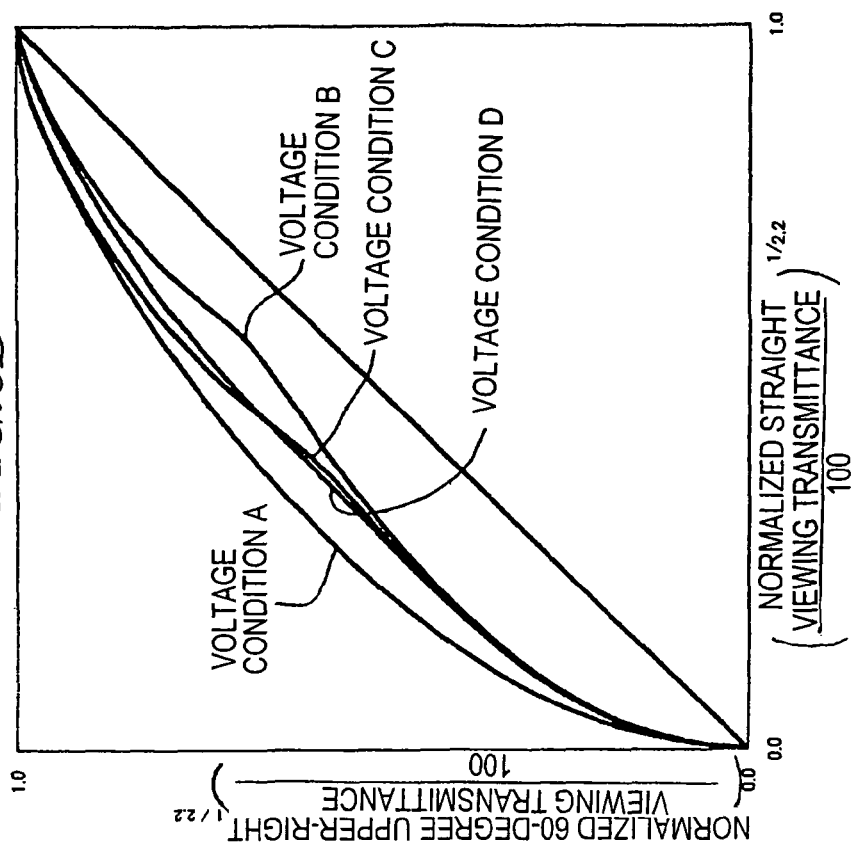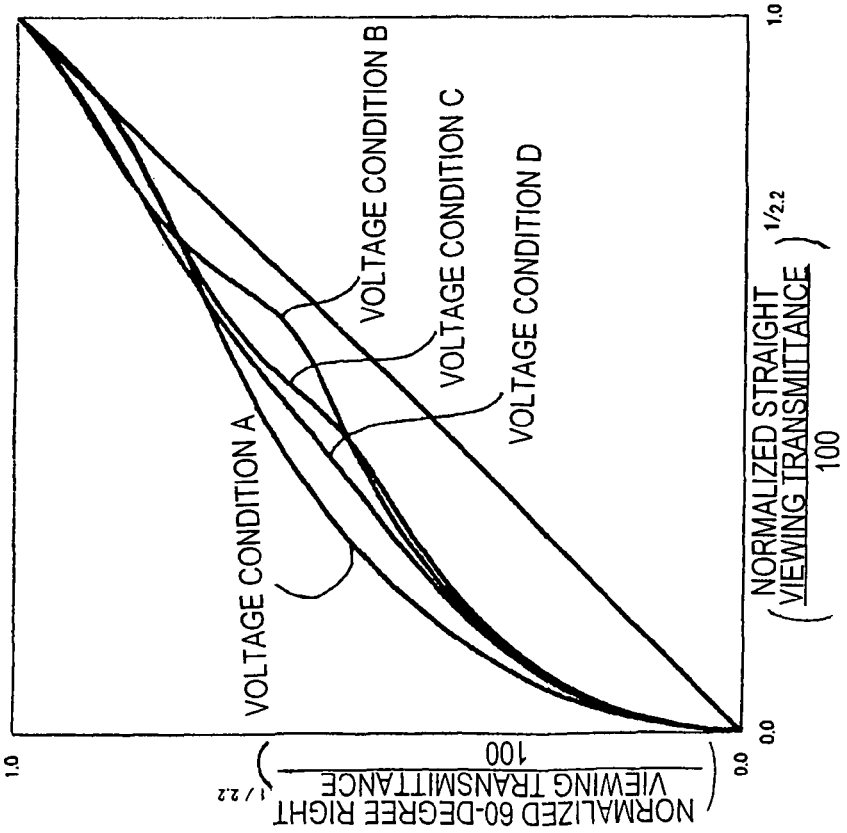

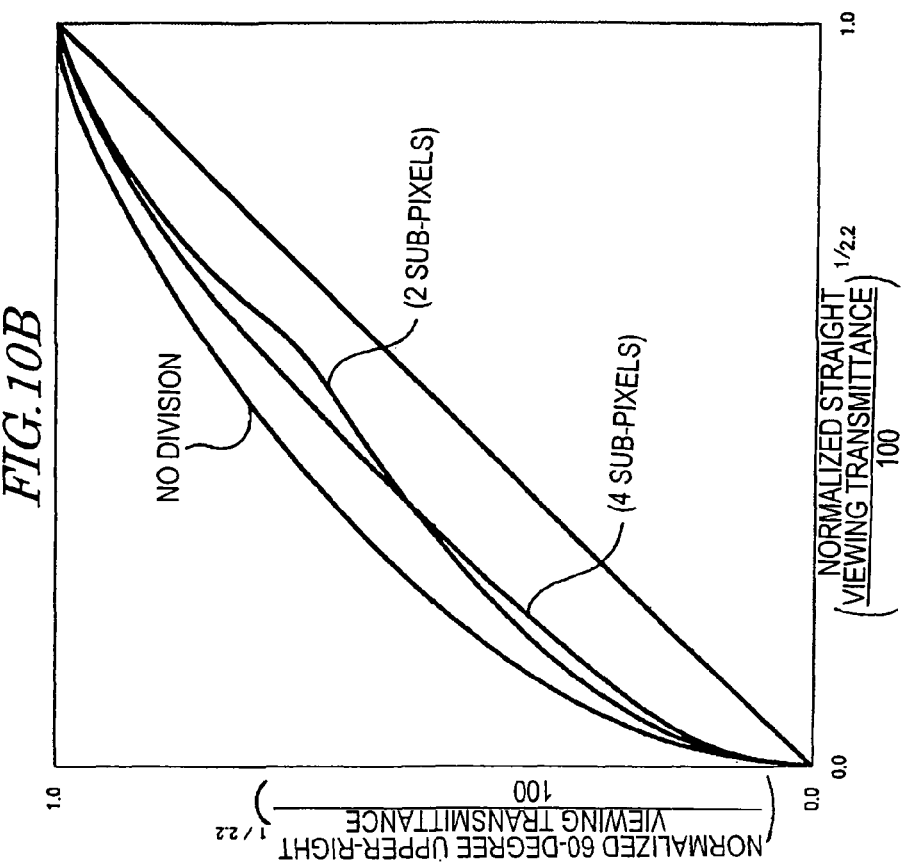
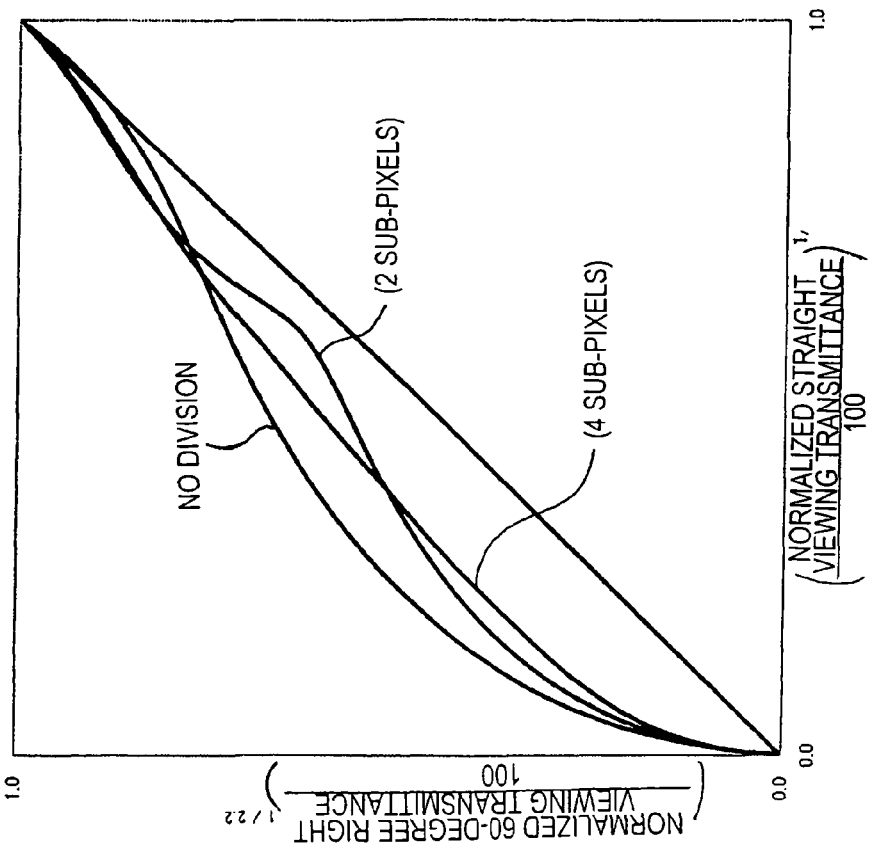

FIG.17 q = 1~cq
p = 1~rp

| | | 1st COLUMN | 2nd COLUMN | 3rd COLUMN | 4th COLUMN | 5th COLUMN | 6th COLUMN |
|---|---|---|---|---|---|---|---|
| | | S-C1 | S-C2 | S-C3 | S-C4 | S-C5 | S-C6 |
| | CS-A | A+H | A−L | A+H | A−L | A+H | A−L — SPa(1,6) |
| 1st ROW | G-L1 | L+B | H−B | L+B | H−B | L+B | H−B — SPb(1,6) |  P(1,6)
| | CS-B | B−H | B+L | B−H | B+L | B−H | B+L |
| 2nd ROW | G-L2 | L−A | H+A | L−A | H+A | L−A | H+A |
| | CS-A | A+H | A−L | A+H | A−L | A+H | A−L |
| 3rd ROW | G-L3 | L+B | H−B | L+B | H−B | L+B | H−B — SPa(p,q) |  P(p,q)
| | CS-B | B−H | B+L | B−H | B+L | B−H | B+L — SPb(p,q) |
| 4th ROW | G-L4 | L−A | H+A | L−A | H+A | L−A | H+A |
| | CS-A | A+H | A−L | A+H | A−L | A+H | A−L |
| 5th ROW | G-L5 | L+B | H−B | L+B | H−B | L+B | H−B |
| | CS-B | B−H | B+L | B−H | B+L | B−H | B+L |
| 6th ROW | G-L6 | L−A | H+A | L−A | H+A | L−A | H+A |
| | CS-A | A+H | A−L | A+H | A−L | A+H | A−L |
| 7th ROW | G-L7 | L+B | H−B | L+B | H−B | L+B | H−B |
| | CS-B | B−H | B+L | B−H | B+L | B−H | B+L |
| 8th ROW | G-L8 | L−A | H+A | L−A | H+A | L−A | H+A |
| | CS-A | | | | | | |

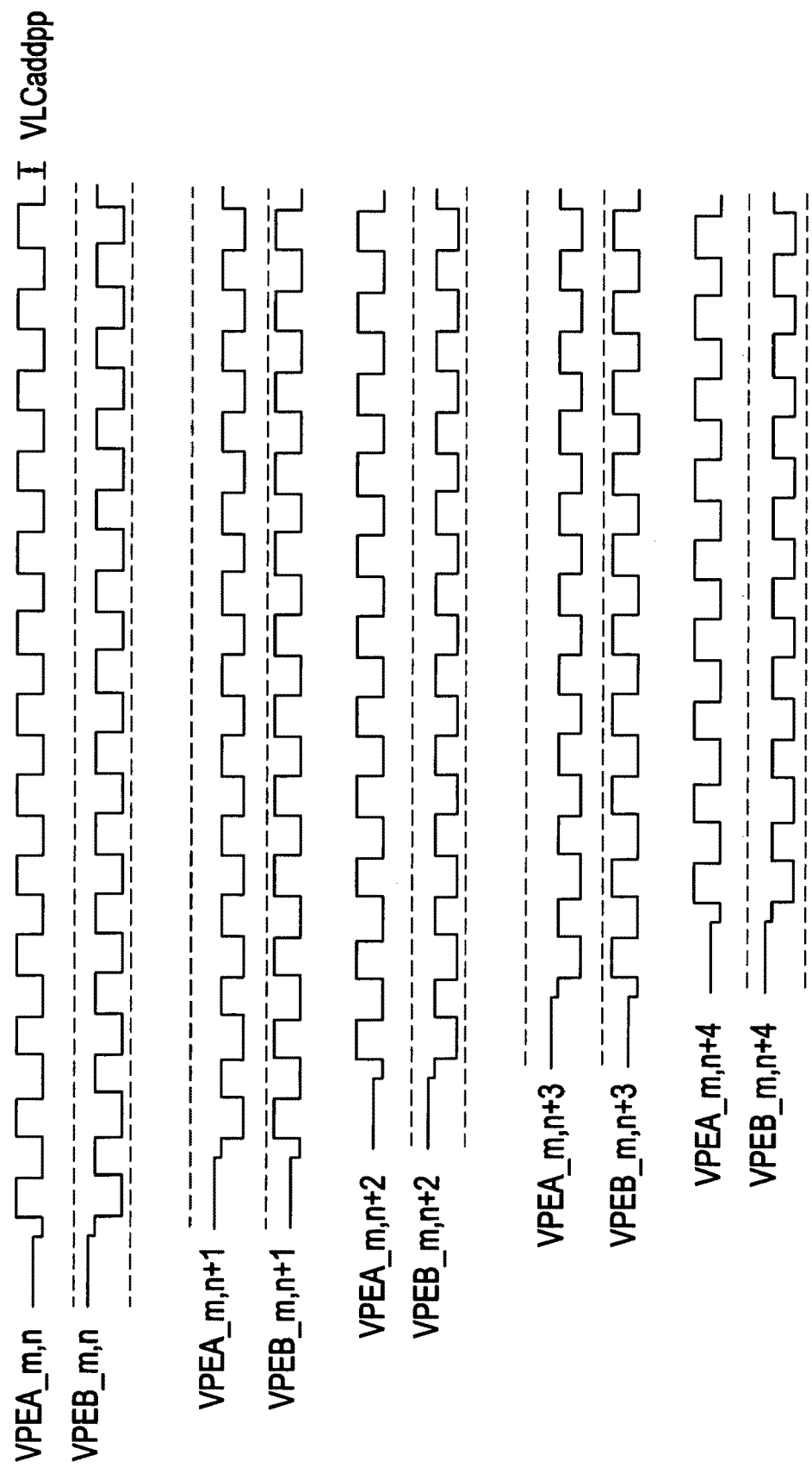

b: Bright
d: Dark

FIRST APPROXIMATION CIRCUIT OF
CS BUSLINE LOAD IMPEDANCE: CR LOW PASS FILTER

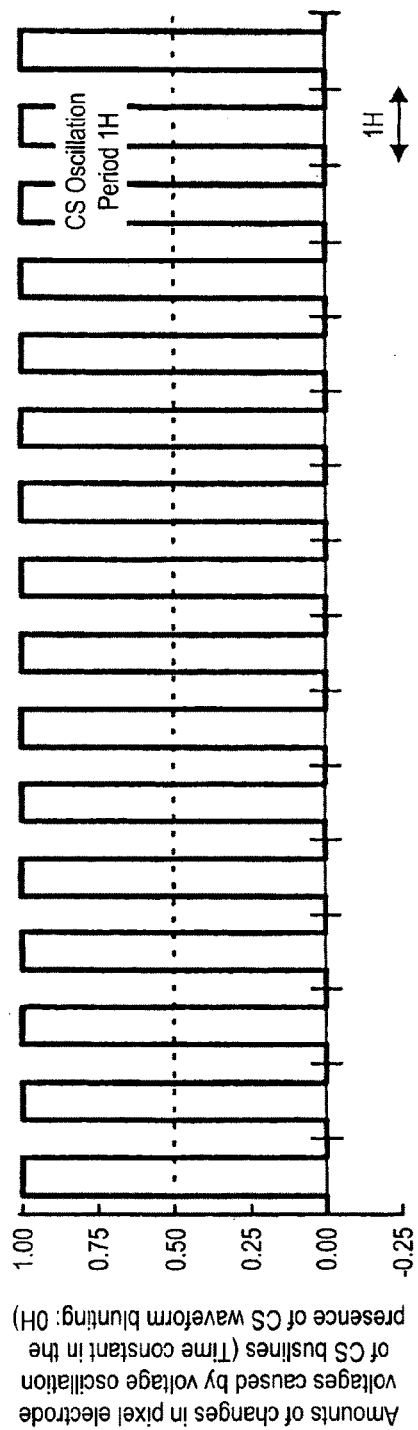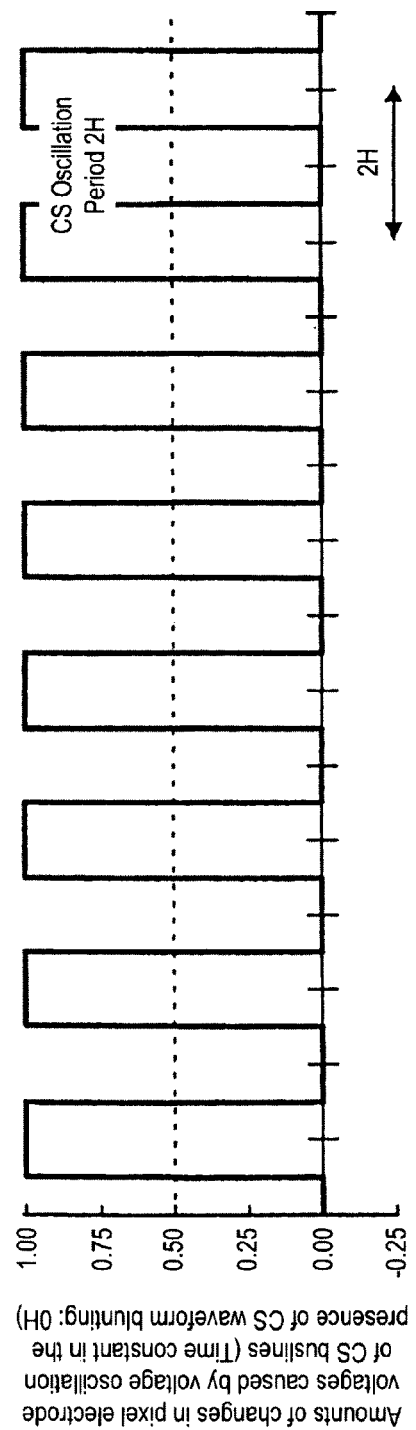

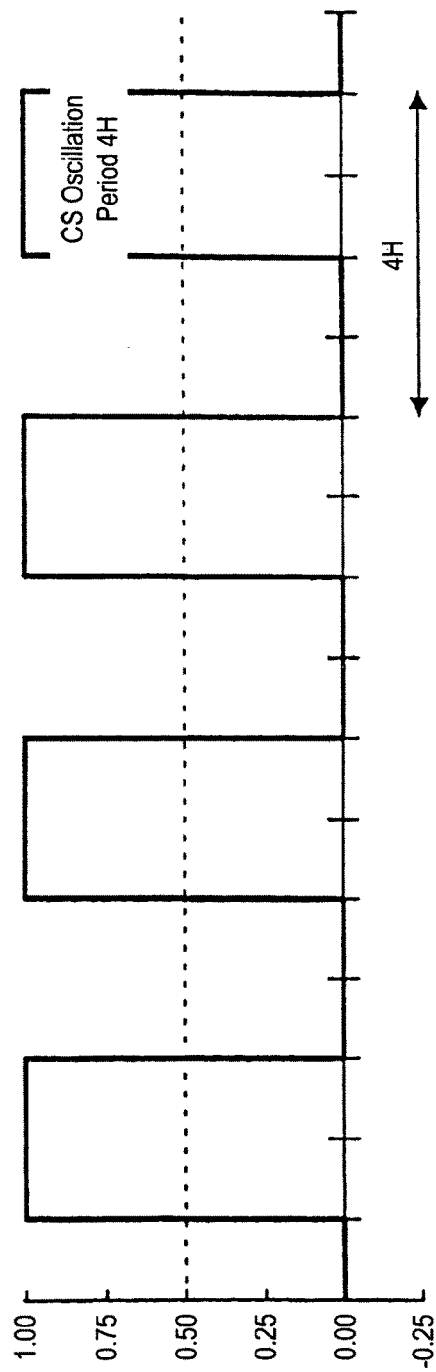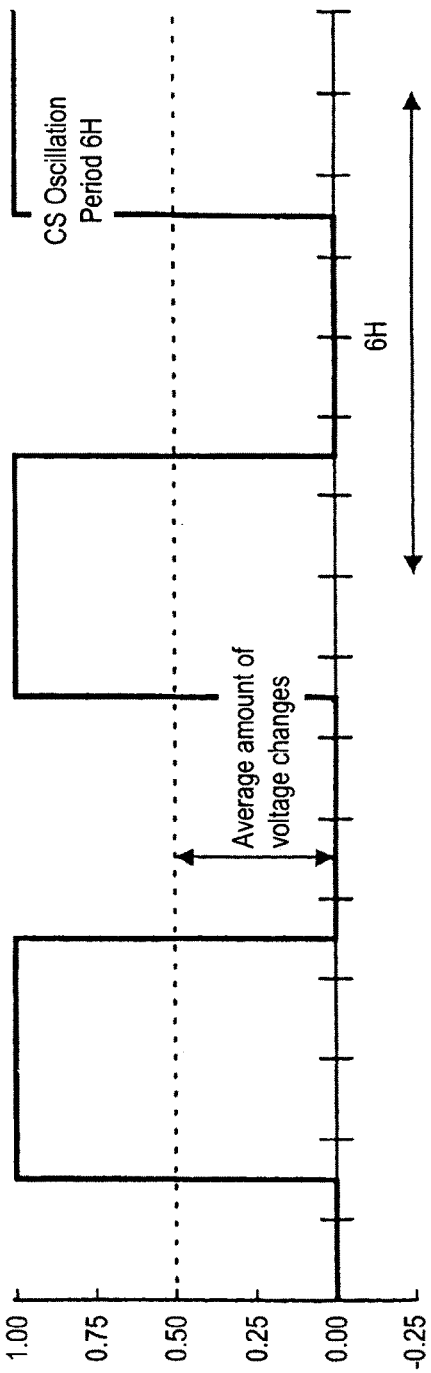

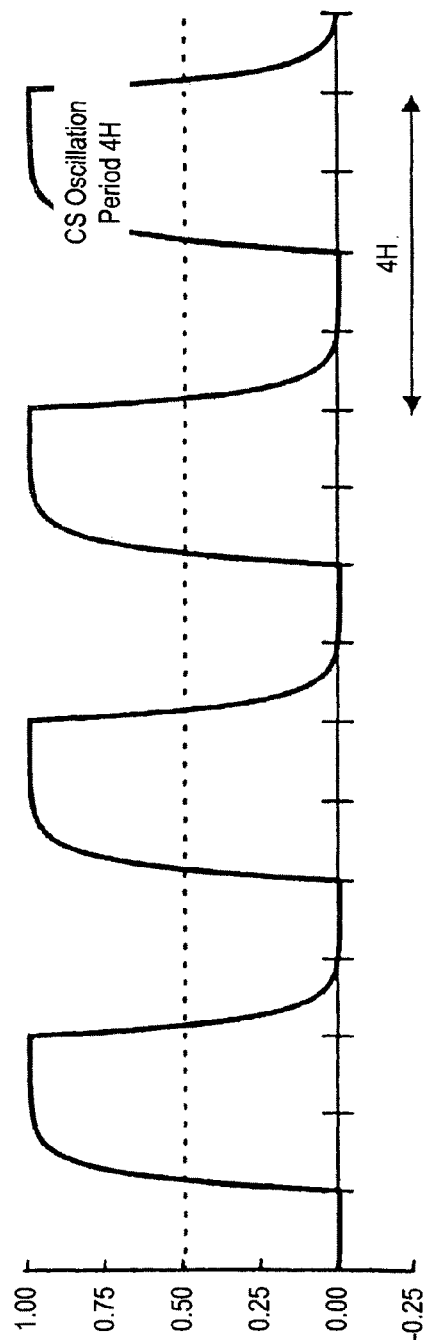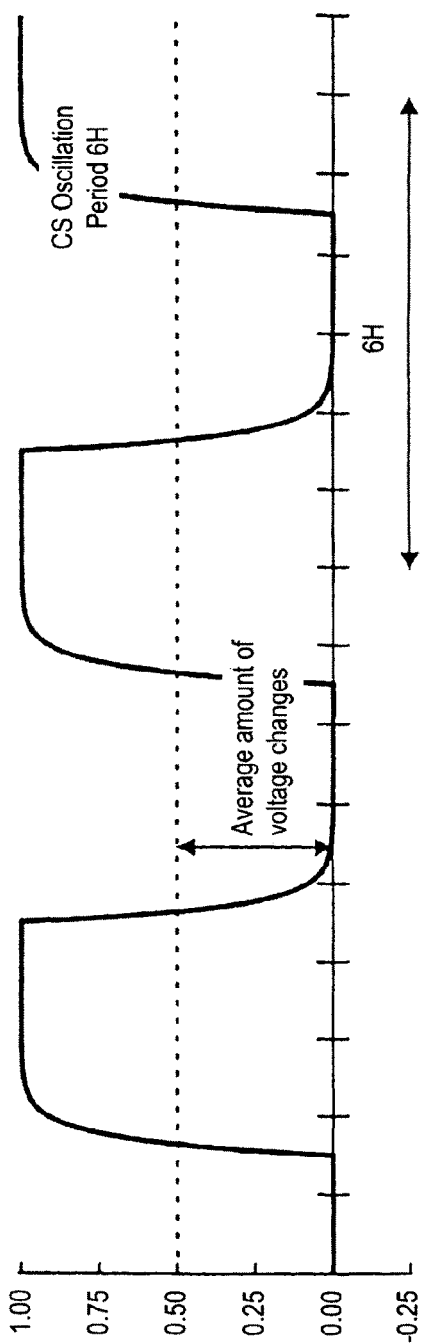

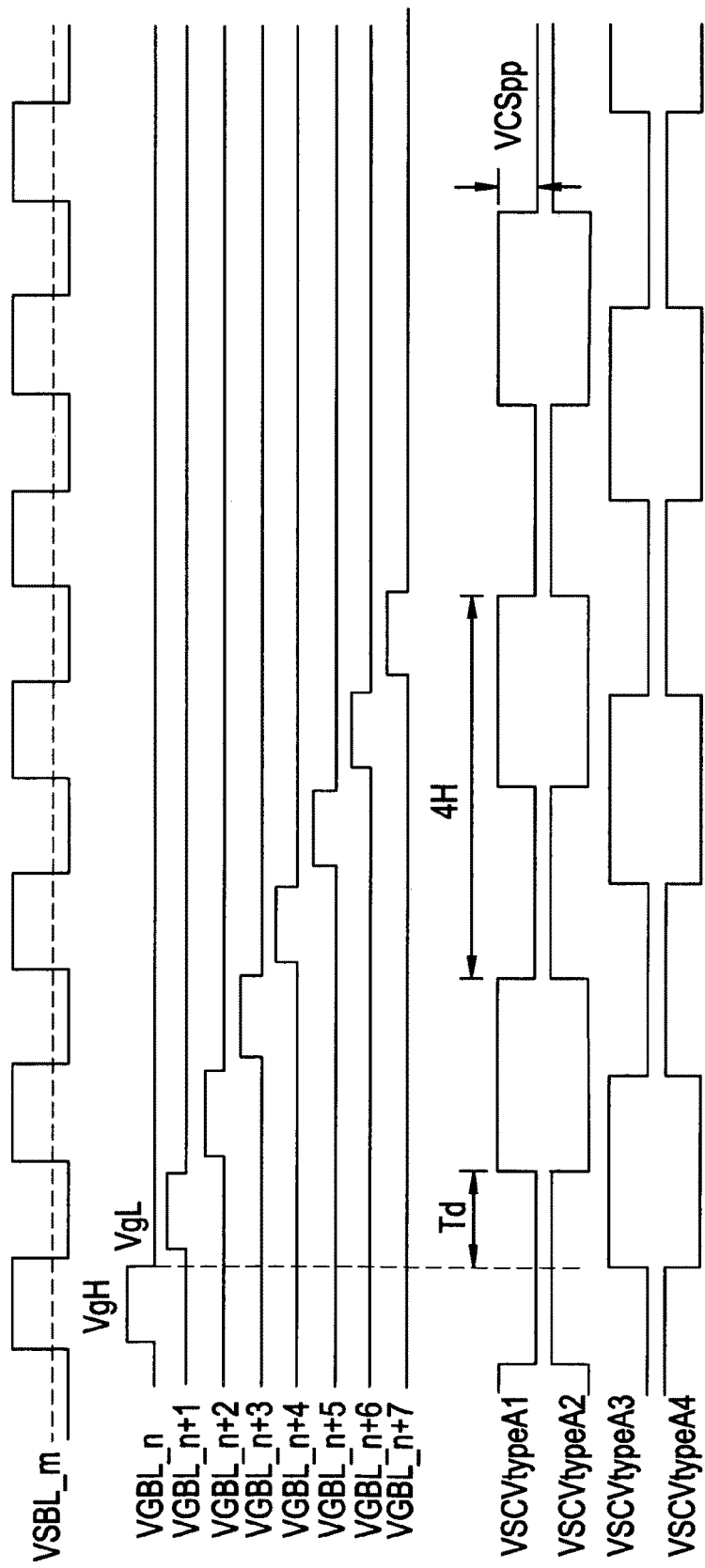

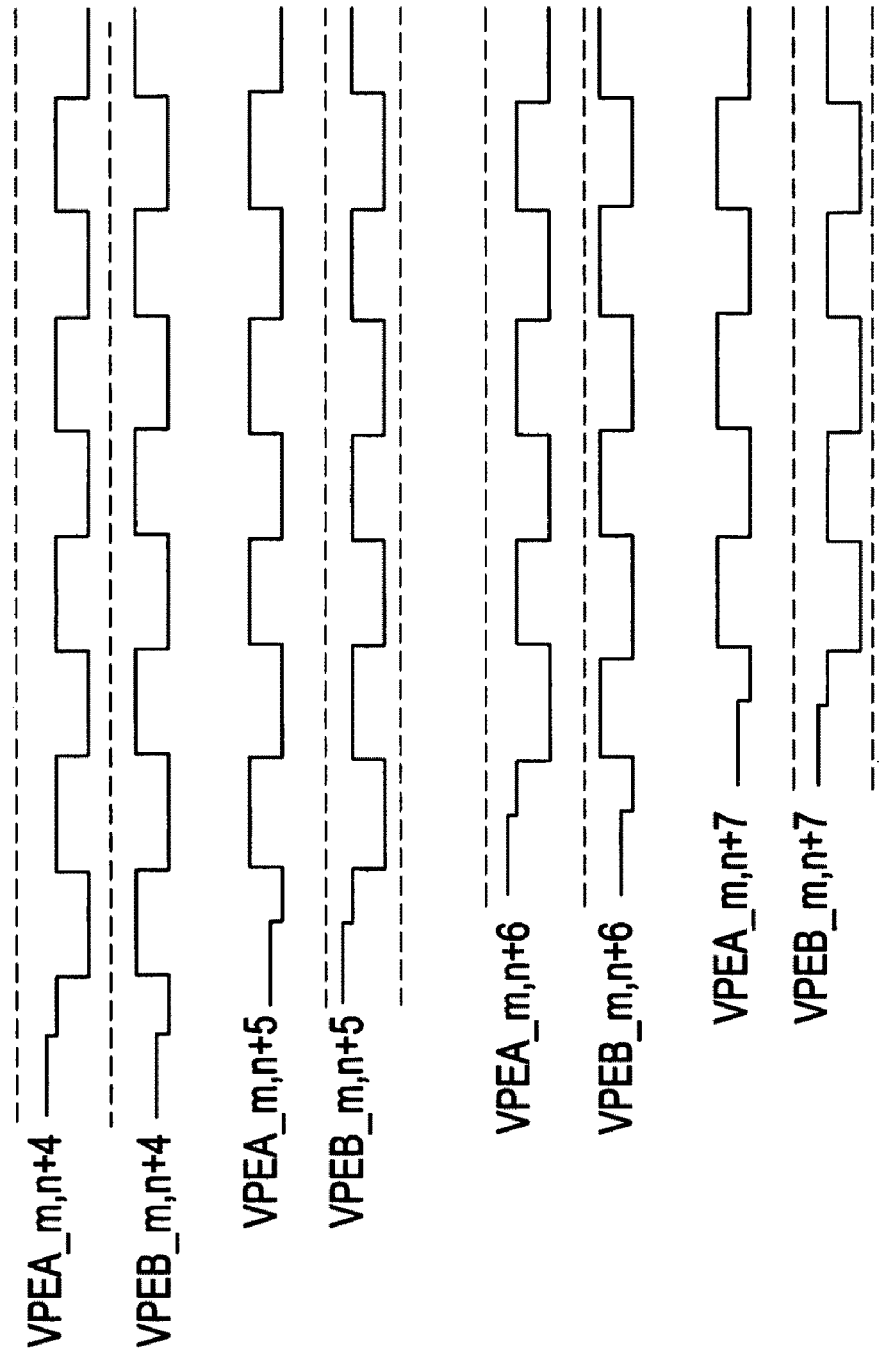

b: Bright
d: Dark b: Bright
d: Dark b: Bright
d: Dark

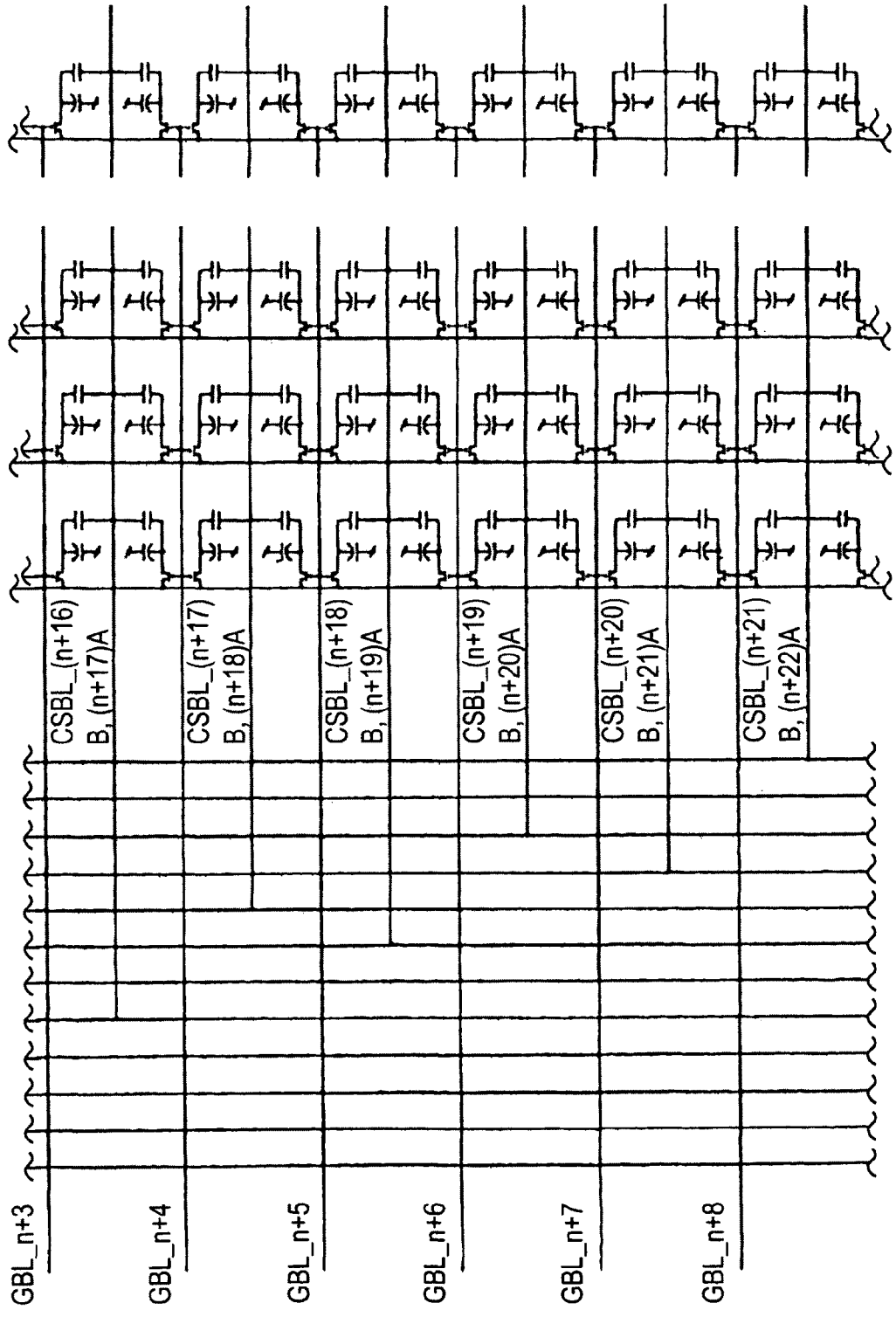

LIQUID CRYSTAL DISPLAY

PRIORITY STATEMENT

This application is a continuation of application Ser. No. 11/002,424 filed on Dec. 3, 2004 now U.S. Pat. No. 7,429,981, and from which priority is claimed under 35 U.S.C. §120. This application also claims priority from Japanese Patent Application Nos. 2003-408046 filed on Dec. 5, 2003 and 2004-250982 filed on Aug. 30, 2004, in the Japan Intellectual Property Office under U.S.C. §119. The entire contents of each of the above-identified applications are incorporated herein by reference.

BACKGROUND OF THE INVENTION

1. Field of the Invention

The present invention relates to a structure and/or drive method which can reduce viewing angle dependence of ry characteristics in a liquid crystal display.

2. Description of the Related Art

Liquid crystal displays are flat-panel displays which have excellent features including high resolution, small thickness, light weight, and low power consumption. Their market size has expanded recently with improvements in display performance and production capacity as well as improvements in price competitiveness against other types of display device.

Twisted nematic (TN) liquid crystal displays which have conventionally been in common use have liquid crystal molecules with positive dielectric anisotropy placed between upper and lower substrates in such a way that their long axis are oriented approximately parallel to substrate surfaces and twisted 90 degrees along the thickness of a liquid crystal layer. When a voltage is applied to the liquid crystal layer, the liquid crystal molecules rise parallel to the electric field, releasing the twisted alignment. The TN liquid crystal display controls transmitted light quantity using changes in rotary polarization resulting from the orientation changes of the liquid crystal molecules caused by voltage.

The TN liquid crystal display allows wide manufacturing margins and high productivity. On the other hand, it has problems with display performance, especially with viewing angle characteristics. Specifically, when the display surface of the TN liquid crystal display is viewed obliquely, the display contrast ratio lowers considerably. Consequently, even if an image clearly presents a plurality of grayscales from black to white when viewed from the front, brightness differences between grayscales appear very unclear when the image is viewed obliquely. Besides, the phenomenon (so-called grayscale reversal) that a portion which appears dark when viewed from the front appears brighter when viewed obliquely also presents a problem.

To improve the viewing angle characteristics of the TN liquid crystal display, some liquid crystal displays have been developed recently, including an in-plane switching (IPS) liquid crystal display described in Japanese Patent Publication No. 63-21907, a multi-domain vertically aligned (MVA) liquid crystal display described in Japanese Laid-Open Patent Publication No. 11-242225, an Axial Symmetric Micro-cell (ASM) display described in Japanese Laid-Open Patent Publication No. 10-186330, and a liquid crystal display described in Japanese Laid-Open Patent Publication No. 2002-55343.

Liquid crystal displays employing any of the novel modes described above (wide viewing angle modes) solve the concrete problems with viewing angle characteristics. Specifically they are free of the problems that the display contrast ratio lowers considerably or display grayscales are reversed when the display surface of the TN liquid crystal display is viewed obliquely.

Under circumstances, where display quality of liquid crystal displays continues to be improved, a new problem with viewing angle characteristics have surfaced, namely, viewing angle dependence of γ characteristics, meaning that γ characteristics differ between when the display is viewed from the front and when the display is viewed obliquely. This presents a problem, especially when displaying images such as photographs or displaying television broadcasts and the like.

The viewing angle dependence of γ characteristics is more prominent in MVA mode and ASM mode than in IPS mode. On the other hand, it is more difficult to produce IPS panels which provide a high contrast ratio when viewed from the front with high productivity than MVA or ASM panels. Thus, it is desired to reduce the viewing angle dependence of γ characteristics in MVA mode or ASM mode.

The present invention has been made in view of the above points. Its main object is to provide a liquid crystal display with reduced viewing angle dependence of γ characteristics.

SUMMARY OF THE INVENTION

To achieve the above object, a first aspect of the present invention provides a liquid crystal display used in normally black mode, comprising a plurality of pixels each of which has a liquid crystal layer and a plurality of electrodes for applying voltage to the liquid crystal layer, wherein: each of the plurality of pixels comprises a first sub-pixel and a second sub-pixel which can apply mutually different voltages to their respective liquid crystal layers; and when each of the plurality of pixels displays a grayscale gk which satisfies $0 \leq gk \leq gn$, where gk and gn are integers not less than zero and a larger value of gk corresponds to higher brightness, relationships $\Delta V12 (gk) > 0$ volts and $\Delta V12 (gk) \geq \Delta V12 (gk+1)$ are satisfied at least in a range $0 < gk \leq n-1$ if it is assumed that $\Delta V12 (gk) = V1 (gk) - V2 (gk)$, where $V1 (gk)$ and $V2 (gk)$ are root-mean-square voltages applied to the liquid crystal layers of the first sub-pixel and the second sub-pixel, respectively. Incidentally, the "pixel" herein represents the minimum unit of display on the liquid crystal display and in the case of color display, it corresponds to "a picture element (or dot)" which displays an individual color (typically, R, G or B).

The liquid crystal display may be configured such that: each of the plurality of pixels comprises a third sub-pixel which can apply a voltage different from those of the first sub-pixel and the second sub-pixel to its liquid crystal layer; and when each of the plurality of pixels displays a grayscale gk and $\Delta V13 (gk) = V1 (gk) - V3 (gk)$, a relationship $0$ volts $< \Delta V13 (gk) < \Delta V12 (gk)$ is satisfied if the root-mean-square voltage applied to the liquid crystal layer of the third sub-pixel is $V3 (gk)$.

Preferably, the root-mean-square voltages applied to the liquid crystal layers satisfy a relationship $\Delta V12 (gk) \geq \Delta V12 (gk+1)$ at least in a range $0 < gk \leq n-1$.

Preferably, relationships $\Delta V12 (gk) \geq \Delta V12 (gk+1)$ and $\Delta V13 (gk) \geq \Delta V13 (gk+1)$ are satisfied at least in a range $0 < gk \leq n-1$ when each pixel has a third sub-pixel.

In a preferred embodiment, the first sub-pixel and the second sub-pixel each comprise: a liquid crystal capacitor formed by a counter electrode and a sub-pixel electrode opposing the counter electrode via the liquid crystal layer, and a storage capacitor formed by a storage capacitor electrode connected electrically to the sub-pixel electrode, an insulating layer, and a storage capacitor counter electrode opposing the storage capacitor electrode via the insulating layer; and the counter electrode is a single electrode shared by the first sub-pixel and the second sub-pixel, and the storage capacitor counter electrodes of the first sub-pixel and the second sub-pixel are electrically independent of each other. Typically, the counter electrode is provided on a counter substrate (sometimes referred to as a "common electrode"), but in IPS mode, it is provided on the same substrate as the sub-pixel electrode. Incidentally, "the counter electrode opposing a sub-pixel electrode via the liquid crystal layer" need not necessarily oppose the sub-pixel electrode across the thickness of the liquid crystal layer. In an IPS liquid crystal display, it is placed within the liquid crystal layer in opposing relation to the sub-pixel electrode across the liquid crystal layer.

In a preferred embodiment, the liquid crystal display comprises two switching elements provided for the first sub-pixel and the second sub-pixel, respectively, wherein the two switching elements are turned on and off by scan line signal voltages supplied to a common scan line; display signal voltages are applied to the respective sub-pixel electrodes and storage capacitor electrodes of the first sub-pixel and the second sub-pixel from a common signal line when the two switching elements are on; voltages of the respective storage capacitor counter electrodes of the first sub-pixel and the second sub-pixel change after the two switching elements are turned off; and the amounts of change defined by the direction and magnitude of the change differ between the first sub-pixel and the second sub-pixel. The amounts of change in the storage capacitor counter electrodes are defined here not only in terms of magnitude (absolute value), but also in terms of direction. For example, the amounts of change in the voltages of the storage capacitor counter electrodes of the first sub-pixel and the second sub-pixel may be equal in absolute value and differ in sign. In short, if voltage rises in one of the storage capacitor counter electrodes and falls in the other storage capacitor counter electrode after the switching element is turned off, the absolute values of the changes may be equal.

Preferably, the liquid crystal layer is a vertically aligned liquid crystal layer and contains nematic liquid crystal material with negative dielectric anisotropy.

Preferably, the liquid crystal layers of the first sub-pixel and the second sub-pixel each contain four domains which are approximately 90 degrees apart in azimuth direction in which their liquid crystal molecules incline when a voltage is applied.

Preferably, the first sub-pixel and the second sub-pixel are placed on opposite sides of the common signal line; the first sub-pixel and the second sub-pixel each have, on the counter electrode side, a plurality of ribs protruding towards the liquid crystal layer and the plurality of ribs include a first rib extending in a first direction and a second rib extending in a second direction approximately orthogonal to the first direction; and the first rib and the second rib are placed symmetrically with respect to a center line parallel to the common scan line in each of the first sub-pixel and the second sub-pixel and the arrangement of the first rib and the second rib in one of the first and second sub-pixels is symmetrical with respect to the arrangement of the first rib and the second rib in the other sub-pixel.

Preferably, the center line parallel to the common scan line in each of the first sub-pixel and the second sub-pixel is placed at an interval equal to approximately one half of an array pitch of the scan lines in both the first sub-pixel and the second sub-pixel.

Preferably, the area of the first sub-pixel is equal to or smaller than the area of the second sub-pixel. When each of the plurality of pixels has three or more sub-pixels, preferably the area of the sub-pixel to which the highest root-mean-square voltage is applied is not larger than the areas of the other sub-pixels.

In a liquid crystal display according to another aspect of the present invention: direction of the electric field applied to the liquid crystal layers in the plurality of pixels is reversed every vertical scanning period; and when displaying an intermediate grayscale, the direction of the electric field is reversed periodically in the row direction in the case of pixels in an arbitrary row and it is reversed every pixel in the column direction in the case of pixels in an arbitrary column.

According to one embodiment, the direction of the electric field is reversed every pixel in the row direction in the case of pixels in an arbitrary row.

According to one embodiment, the direction of the electric field is reversed every two pixels in the row direction in the case of pixels in an arbitrary row.

A liquid crystal display according to one embodiment, operates in normally black mode; wherein the at least two sub-pixels include two sub-pixels SPa (p, q) and SPb (p, q); and when each of the plurality of pixels displays a grayscale gk which satisfies $0 \leq gk \leq gn$, where gk and gn are integers not less than zero and a larger value of gk corresponds to higher brightness, relationships $\Delta V12$ (gk)>0 volts and $\Delta V12$ (gk)$\geq \Delta V12$ (gk+1) are satisfied at least in a range $0 < gk \leq n-1$ if it is assumed that $\Delta V12$ (gk)=V1 (gk)−V2 (gk), where V1 (gk) and V2 (gk) are root-mean-square voltages applied to the liquid crystal layers of the first sub-pixel and the second sub-pixel, respectively.

According to one embodiment, a relationship $\Delta V12$ (gk)$\geq \Delta V12$ (gk+1) is satisfied at least in a range $0 < gk \leq n-1$.

According to one embodiment, SPa (p, q) and SPb (p, q) each comprise: a liquid crystal capacitor formed by a counter electrode and a sub-pixel electrode opposing the counter electrode via the liquid crystal layer, and a storage capacitor formed by a storage capacitor electrode connected electrically to the sub-pixel electrode, an insulating layer, and a storage capacitor counter electrode opposing the storage capacitor electrode via the insulating layer; and the counter electrode is a single electrode shared by SPa (p, q) and SPb (p, q), and the storage capacitor counter electrodes of SPa (p, q) and SPb (p, q) are electrically independent of each other.

According to one embodiment, the liquid crystal display comprises two switching elements provided for SPa (p, q) and SPb (p, q), respectively, wherein the two switching elements are turned on and off by scan line signal voltages supplied to a common scan line; display signal voltages are applied to the respective sub-pixel electrodes and storage capacitor electrodes of SPa (p, q) and SPb (p, q) from a common signal line when the two switching elements are on; voltages of the respective storage capacitor counter electrodes of SPa (p, q) and SPb (p, q) change after the two switching elements are turned off; and the amounts of change defined by the direction and magnitude of the change differ between SPa (p, q) and SPb (p, q). Specifically, when the two switching elements are on, voltages are applied to the respective storage capacitor counter electrodes of VSpa (on) and VSpb (on) such that when the two switching elements are turned off, potentials of the respective storage capacitor counter electrodes will change, for example, from VSpa (on) and VSpb (on) to VSpa (off) and VSpb (off), respectively, and that the respective amounts of change "VSpa (off)−VSpa (on)" and "VSpb (off)−VSpb (on)" will be mutually different.

According to one embodiment, the changes in the voltages of the storage capacitor counter electrodes of SPa (p, q) and SPb (p, q), are equal in amount and opposite in direction.

According to one embodiment, the voltages of the storage capacitor counter electrodes of SPa (p, q) and SPb (p, q) are oscillating voltages 180 degrees out of phase with each other. The oscillating voltages may be rectangular waves, sine waves, or triangular waves.

According to one embodiment, the oscillating voltages of the storage capacitor counter electrodes of SPa (p, q) and SPb (p, q) each have a period approximately equal to one horizontal scanning period.

According to one embodiment, the oscillating voltages of the storage capacitor counter electrodes of SPa (p, q) and SPb (p, q) each have a period shorter than one horizontal scanning period.

According to one embodiment, the oscillating voltages of the storage capacitor counter electrodes of SPa (p, q) and SPb (p, q) are approximately equal within any horizontal scanning period if averaged over the period.

According to one embodiment, the period of the oscillation is one-half of one horizontal scanning period.

According to one embodiment, the oscillating voltages are rectangular waves with a duty ratio of 1:1.

According to one embodiment, SPa (p, q) and SPb (p, q) have different areas, of which the smaller area belongs to SPa (p, q) or SPb (p, q) whichever has a larger root-mean-square voltage applied to its liquid crystal layer.

According to one embodiment, the area of SPa (p, q) and area of SPb (p, q) are practically equal.

A third aspect of the present invention provides a liquid crystal display, comprising a plurality of pixels each of which has a liquid crystal layer and a plurality of electrodes for applying a voltage to the liquid crystal layer and which are arranged in a matrix of rows and columns, wherein: each of the plurality of pixels has a first sub-pixel and a second sub-pixel which can apply mutually different voltages to the liquid crystal layer, where the first sub-pixel has a higher brightness than the second sub-pixel in certain gradations; the first sub-pixel and the second sub-pixel each comprise: a liquid crystal capacitor formed by a counter electrode and a sub-pixel electrode opposing the counter electrode via the liquid crystal layer, and a storage capacitor formed by a storage capacitor electrode connected electrically to the sub-pixel electrode, an insulating layer, and a storage capacitor counter electrode opposing the storage capacitor electrode via the insulating layer; the counter electrode is a single electrode shared by the first sub-pixel and the second sub-pixel, and the storage capacitor counter electrodes of the first sub-pixel and the second sub-pixel are electrically independent of each other; and the storage capacitor counter electrode of the first sub-pixel in any of the plurality of pixels and the storage capacitor counter electrode of the second sub-pixel of a pixel adjacent to any of the pixels in the column direction are electrically independent of each other.

According to one embodiment, the first sub-pixel in the any of the pixels is arranged in such a way as to be adjacent to the second sub-pixel of the pixel adjacent to the any of the pixels in the column direction.

According to one embodiment, in each of the plurality of pixels, the first sub-pixel is arranged in such a way as to be adjacent to the second sub-pixel in the column direction.

According to one embodiment, the liquid crystal display comprises a plurality of storage capacitor trunks electrically independent of each other, wherein each of the storage capacitor trunks is electrically connected to any of the storage capacitor counter electrodes of the first sub-pixel and the second sub-pixel in the plurality of pixels via a storage capacitor line.

According to one embodiment, the number of the storage capacitor trunks electrically independent of each other among a plurality of the storage capacitor trunks is L, storage capacitor counter voltage supplied by each of the storage capacitor trunks is oscillating voltage, and the period of oscillation is L times a horizontal scanning period.

According to one embodiment, the plurality of storage capacitor trunks electrically independent of each other are an even number of storage capacitor trunks grouped into pairs of storage capacitor trunks which supply storage capacitor counter voltages whose oscillations are 180 degrees out of phase with each other.

According to one embodiment, the number of storage capacitor trunks electrically independent of each other is larger than 8 times the quotient obtained by dividing one horizontal scanning period by a CR time constant which approximates maximum load impedance of the storage capacitor line.

According to one embodiment, the number of storage capacitor trunks electrically independent of each other is larger than 8 times the quotient obtained by dividing one horizontal scanning period by a CR time constant which approximates maximum load impedance of the storage capacitor line and is an even number.

According to one embodiment, the plurality of storage capacitor trunks include a first storage capacitor trunk and a second storage capacitor trunk electrically independent of each other; and if the storage capacitor line connected to the storage capacitor counter electrode of the first sub-pixel of the pixel located at the intersection of an arbitrary column and a given row n among rows formed by the plurality of pixels is designated as CSBL_A_n, if the storage capacitor line connected to the storage capacitor counter electrode of the second sub-pixel is designated as CSBL_B_n, and if k a natural number (including 0): CSBL_A_n+k is connected to the first storage capacitor trunk, and CSBL_B_n+k is connected to the second storage capacitor trunk.

According to one embodiment, the periods of oscillation of first and second storage capacitor counter voltages supplied, respectively, by the first and second storage capacitor trunks are both twice the horizontal scanning period.

According to one embodiment, the second storage capacitor counter voltage lags the first storage capacitor counter voltage by a phase difference of one horizontal scanning period.

According to one embodiment, the liquid crystal display comprises two switching elements provided for the first sub-pixel and the second sub-pixel, respectively, wherein the two switching elements are turned on and off by scan line signal voltages supplied to a common scan line, display signal voltages are applied to the respective sub-pixel electrodes and storage capacitor electrodes of the first sub-pixel and the second sub-pixel from a common signal line when the two switching elements are on, and voltages of the respective storage capacitor counter electrodes of the first sub-pixel and the second sub-pixel change after the two switching elements are turned off; and if Td denotes the time required for the first storage capacitor counter voltage to change for the first time after the two switching elements are turned off, Td is larger than 0 horizontal scanning period and smaller than one horizontal scanning period.

According to one embodiment, the Td is approximately equal to 0.5 times the horizontal scanning period.

According to one embodiment, the plurality of storage capacitor trunks include a first storage capacitor trunk, second storage capacitor trunk, third storage capacitor trunk, and fourth storage capacitor trunk electrically independent of each other; and if the storage capacitor line connected to the storage capacitor counter electrode of the first sub-pixel of the pixel located at the intersection of an arbitrary column and a given row n among rows formed by the plurality of pixels is designated as CSBL_A_n, if the storage capacitor line connected to the storage capacitor counter electrode of the second sub-pixel is designated as CSBL_B_n, and if k is a natural number (including 0): CSBL_A_n+4*k and CSBL_B_n+2+4*k are connected to the first storage capacitor trunk, CSBL_B_n+4*k and CSBL_A_n+2+4*k are connected to the second storage capacitor trunk, CSBL_A_n+1+4*k and CSBL_B_n+3+4*k are connected to the third storage capacitor trunk, and CSBL_B_n+1+4*k and CSBL_A_n+3+4*k are connected to the fourth storage capacitor trunk.

According to one embodiment, the periods of oscillation of first to fourth storage capacitor counter voltages supplied, respectively, by the first to fourth storage capacitor trunks are all 4 times the horizontal scanning period.

According to one embodiment, the second storage capacitor counter voltage lags the first storage capacitor counter voltage by a phase difference of two horizontal scanning periods, the third storage capacitor counter voltage lags the first storage capacitor counter voltage by a phase difference of three horizontal scanning periods, and the fourth storage capacitor counter voltage lags the first storage capacitor counter voltage by a phase difference of one horizontal scanning period.

According to one embodiment, the liquid crystal display comprises two switching elements provided for the first sub-pixel and the second sub-pixel, respectively, wherein the two switching elements are turned on and off by scan line signal voltages supplied to a common scan line, display signal voltages are applied to the respective sub-pixel electrodes and storage capacitor electrodes of the first sub-pixel and the second sub-pixel from a common signal line when the two switching elements are on, and voltages of the respective storage capacitor counter electrodes of the first sub-pixel and the second sub-pixel change after the two switching elements are turned off; and if Td denotes the time required for the first storage capacitor counter voltage to change for the first time after the two switching elements are turned off, Td is larger than 0 horizontal scanning period and smaller than two horizontal scanning periods.

According to one embodiment, the Td is approximately equal to one horizontal scanning period.

According to one embodiment, the plurality of storage capacitor trunks include a first storage capacitor trunk, second storage capacitor trunk, third storage capacitor trunk, fourth storage capacitor trunk, fifth storage capacitor trunk, and sixth storage capacitor trunk electrically independent of each other; and if the storage capacitor line connected to the storage capacitor counter electrode of the first sub-pixel of the pixel located at the intersection of an arbitrary column and a given row n among rows formed by the plurality of pixels arranged in a row-and-column matrix is designated as CSBL_A_n, if the storage capacitor line connected to the storage capacitor counter electrode of the second sub-pixel is designated as CSBL_B_n, and if k is a natural number (including 0): CSBL_A_n+3*k is connected to the first storage capacitor trunk, CSBL_B_n+3*k is connected to the second storage capacitor trunk, CSBL_A_n+1+3*k is connected to the third storage capacitor trunk, CSBL_B_n+1+3*k is connected to the fourth storage capacitor trunk, CSBL_A_n+2+3*k is connected to the fifth storage capacitor trunk, and CSBL_B_n+2+3*k is connected to the sixth storage capacitor trunk.

According to one embodiment, the periods of oscillation of first to sixth storage capacitor counter voltages supplied, respectively, by the first to sixth storage capacitor trunks are all 6 times the horizontal scanning period.

According to one embodiment, the plurality of storage capacitor trunks include a first storage capacitor trunk, second storage capacitor trunk, third storage capacitor trunk, fourth storage capacitor trunk, fifth storage capacitor trunk, sixth storage capacitor trunk, . . . , (L−3)-th storage capacitor trunk, (L−2)-th storage capacitor trunk, (L−1)-th storage capacitor trunk, and L-th storage capacitor trunk for a total of L storage capacitor trunks electrically independent of each other; and when ½ of the number L of the electrically independent storage capacitor trunks is an odd number, i.e., when L=2, 6, 10, . . . , or the like, if the storage capacitor line connected to the storage capacitor counter electrode of the first sub-pixel of the pixel located at the intersection of an arbitrary column and a given row n among rows formed by the plurality of pixels is designated as CSBL_A_n, if the storage capacitor line connected to the storage capacitor counter electrode of the second sub-pixel is designated as CSBL_B_n, and if k is a natural number (including 0): CSBL_A_n+(L/2)*k is connected to the first storage capacitor trunk, CSBL_B_n+(L/2)*k is connected to the second storage capacitor trunk, CSBL_A_n+1+(L/2)*k is connected to the third storage capacitor trunk, CSBL_B_n+1+(L/2)*k is connected to the fourth storage capacitor trunk, CSBL_A_n+2+(L/2)*k is connected to the fifth storage capacitor trunk, CSBL_B_n+2+(L/2)*k is connected to the sixth storage capacitor trunk, CSBL_A_n+(L/2)−2+(L/2)*k is connected to the (L−3)-th storage capacitor trunk, CSBL_B_n+(L/2)−2+(L/2)*k is connected to the (L−2)-th storage capacitor trunk, CSBL_A_n+(L/2)−1+(L/2)*k is connected to the (L−1)-th storage capacitor trunk, and CSBL_B_n+(L/2)−1+(L/2)*k is connected to the L-th storage capacitor trunk.

According to one embodiment, the periods of oscillation of first to L-th storage capacitor counter voltages supplied, respectively, by the first to L-th storage capacitor trunks are all L times the horizontal scanning period.

According to one embodiment, the plurality of storage capacitor trunks include a first storage capacitor trunk, second storage capacitor trunk, third storage capacitor trunk, fourth storage capacitor trunk, fifth storage capacitor trunk, sixth storage capacitor trunk, seventh storage capacitor trunk, and eighth storage capacitor trunk electrically independent of each other; and if the storage capacitor line connected to the storage capacitor counter electrode of the first sub-pixel of the pixel located at the intersection of an arbitrary column and a given row n among rows formed by the plurality of pixels is designated as CSBL_A_n, if the storage capacitor line connected to the storage capacitor counter electrode of the second sub-pixel is designated as CSBL_B_n, and if k is a natural number (including 0): CSBL_A_n+8*k and CSBL_B_n+4+8*k are connected to the first storage capacitor trunk, CSBL_B_n+8*k and CSBL_A_n+4+8*k are connected to the second storage capacitor trunk, CSBL_A_n+1+8*k and CSBL_B_n+5+8*k are connected to the third storage capacitor trunk, CSBL_B_n+1+8*k and CSBL_A_n+5+8*k are connected to the fourth storage capacitor trunk, CSBL_A_n+2+8*k and CSBL_B_n+6+8*k are connected to the fifth storage capacitor trunk, CSBL_B_n+2+8*k and CSBL_A_n+6+8*k are connected to the sixth storage capacitor trunk, CSBL_A_n+3+8*k and CSBL_B_n+7+8*k are connected to the seventh storage capacitor trunk, and CSBL_B_n+3+8*k and CSBL_A_n+7+8*k are connected to the eighth storage capacitor trunk.

According to one embodiment, the periods of oscillation of first to eighth storage capacitor counter voltages supplied, respectively, by the first to eighth storage capacitor trunks are all 8 times the horizontal scanning period.

According to one embodiment, the plurality of storage capacitor trunks include a first storage capacitor trunk, second storage capacitor trunk, third storage capacitor trunk, fourth storage capacitor trunk, fifth storage capacitor trunk, sixth storage capacitor trunk, seventh storage capacitor trunk, eighth storage capacitor trunk . . . , (L−3)-th storage capacitor trunk, (L−2)-th storage capacitor trunk, (L−1)-th storage capacitor trunk, and L-th storage capacitor trunk for a total of L storage capacitor trunks electrically independent of each other; and when ½ of the number L of the electrically independent storage capacitor trunks is an even number, i.e., when L=4, 8, 12, . . . , or the like, if the storage capacitor line connected to the storage capacitor counter electrode of the first sub-pixel of the pixel located at the intersection of an arbitrary column and a given row n among rows formed by the plurality of pixels arranged in a row-and-column matrix is designated as CSBL_A_n, if the storage capacitor line connected to the storage capacitor counter electrode of the second sub-pixel is designated as CSBL_B_n, and if k is a natural number (including 0): CSBL_A_n+L*k and CSBL_B_n+(L/2)+L*k are connected to the first storage capacitor trunk, CSBL_B_n+L*k and CSBL_A_n+(L/2)+L*k are connected to the second storage capacitor trunk, CSBL_A_n+1+L*k and CSBL_B_n+(L/2)+1+L*k are connected to the third storage capacitor trunk, CSBL_B_n+1+L*k and CSBL_A_n+(L/2)+1+L*k are connected to the fourth storage capacitor trunk, CSBL_A_n+2+L*k and CSBL_B_n+(L/2)+2+L*k are connected to the fifth storage capacitor trunk, CSBL_B_n+2+L*k and CSBL_A_n+(L/2)+2+L*k are connected to the sixth storage capacitor trunk, CSBL_A_n+3+L*k and CSBL_B_n+(L/2)+3+L*k are connected to the seventh storage capacitor trunk, CSBL_B_n+3+L*k and CSBL_A_n+(L/2)+3+L*k are connected to the eighth storage capacitor trunk, CSBL_A_n+(L/2)−2+L*k and CSBL_B_n+L−2+L*k are connected to the (L−3)-th storage capacitor trunk; CSBL_B_n+(L/2)−2+L*k and CSBL_A_n+L−2+L*k are connected to the (L−2)-th storage capacitor trunk, CSBL_A_n+(L/2)−1+L*k and CSBL_B_n+L−1+L*k are connected to the (L−1)-th storage capacitor trunk, and CSBL_B_n+(L/2)−1+L*k and CSBL_A_n+L−1+L k are connected to the L-th storage capacitor trunk.

According to one embodiment, the periods of oscillation of first to L-th storage capacitor counter voltages supplied, respectively, by the first to L-th storage capacitor trunks are all L times the horizontal scanning period.

A fourth aspect of the present invention provides a liquid crystal display, comprising a plurality of pixels each of which has a liquid crystal layer and a plurality of electrodes for applying a voltage to the liquid crystal layer and which are arranged in a matrix of rows and columns, wherein: each of the plurality of pixels has a first sub-pixel and a second sub-pixel which can apply mutually different voltages to the liquid crystal layer, where the first sub-pixel has a higher brightness than the second sub-pixel in certain gradations; the first sub-pixel and the second sub-pixel each comprise: a liquid crystal capacitor formed by a counter electrode and a sub-pixel electrode opposing the counter electrode via the liquid crystal layer, and a storage capacitor formed by a storage capacitor electrode connected electrically to the sub-pixel electrode, an insulating layer, and a storage capacitor counter electrode opposing the storage capacitor electrode via the insulating layer; the counter electrode is a single electrode shared by the first sub-pixel and the second sub-pixel, and the storage capacitor counter electrodes of the first sub-pixel and the second sub-pixel are electrically independent of each other; the liquid crystal display further comprises a plurality of storage capacitor trunks electrically independent of each other, each of storage capacitor trunks being electrically connected to any of the storage capacitor counter electrodes of the first sub-pixel and the second sub-pixel in the plurality of pixels via a storage capacitor line, the storage capacitor counter electrode of the first sub-pixel of one of two adjacent pixels in the column direction is connected to a storage capacitor line electrically equivalent to the storage capacitor counter electrode of the second sub-pixel of the other; and the number of the storage capacitor trunks electrically independent of each other among a plurality of storage capacitor trunks is L or more (L is an even number), storage capacitor counter voltage supplied by each of the storage capacitor trunks is oscillating voltage, and the period of oscillation is 2*K*L (K is a positive integer) times a horizontal scanning period.

According to one embodiment, if the storage capacitor line connected to the storage capacitor counter electrode of the first sub-pixel of the pixel located at the intersection of an arbitrary column and a given row n among rows formed by the plurality of pixels arranged in a row-and-column matrix is designated as CSBL_(n) A and the storage capacitor line connected to the storage capacitor counter electrode of the second sub-pixel is designated as CSBL_(n)B, CS buslines connected to the L electrically independent storage capacitor trunks satisfy relationships:

$CSBL\_(p+2*(1-1))B, (p+2*(1-1)+1)A,$ $CSBL\_(p+2*(2-1))B, (p+2*(2-1)+1)A,$ $CSBL\_(p+2*(3-1))B, (p+2*(3-1)+1)A,$

. . .

$CSBL\_(p+2*(K-1))B, (p+2*(K-1))+1)A$ and $CSBL\_(p+2*(1-1)+K*L+1)B, (p+2*(1-1))+K*L+2)A,$ $CSBL\_(p+2*(2-1)+K*L+1)B, (p+2*(2-1))+K*L+2)A,$ $CSBL\_(p+2*(3-1)+K*L+1)B, (p+2*(3-1))+K*L+2)A,$

. . .

$CSBL\_(p+2*(K-1)+K*L+1)B, (p+2*(3-1)+L+2)A;$ or $CSBL\_(p+2*(1-1)+1)B, (p+2*(1-1)+2)A,$ $CSBL\_(p+2*(2-1)+1)B, (p+2*(2-1)+2)A,$ $CSBL\_(p+2*(3-1)+1)B, (p+2*(3-1)+2)A,$

. . .

$CSBL\_(p+2*(K-1)+1)B, (p+2*(K-1)+2)A$ and $CSBL\_(p+2*(1-1)+K*L)B, (p+2*(1-1)+K*L+1)A,$ $CSBL\_(p+2*(2-1)+K*L)B, (p+2*(2-1)+K*L+1)A,$ $CSBL\_(p+2*(3-1)+K*L)B, (p+2*(3-1)+K*L+1)A,$

. . .

$CSBL\_(p+2*(K-1)+K*L)B, (p+2*(K-1)+K*L+1)A,$ where p=1, 3, 5, or the like, or p=0, 2, 4, or the like.

According to one embodiment, K is 1 or 2, and L is any of 6, 10, and 12.

According to one embodiment, preferably the storage capacitor line is placed between two adjacent pixels in the column direction.

According to one embodiment, the liquid crystal display comprises: two switching elements provided for the first sub-pixel and the second sub-pixel, respectively; and a scan line commonly connected to the two switching elements, wherein the common scan line is placed between the first sub-pixel and the second sub-pixel.

According to one embodiment, the plurality of storage capacitor trunks are an even number of storage capacitor trunks grouped into pairs of storage capacitor trunks which supply storage capacitor counter voltages whose oscillations are 180 degrees out of phase with each other.

According to one embodiment, in any two adjacent pixels in the column direction, the storage capacitor counter electrode of the first sub-pixel of one pixel and the storage capacitor counter electrode of the second sub-pixel of the other pixel are connected to a common storage capacitor line.

According to one embodiment, duty ratios of the storage capacitor counter voltages are all 1:1.

According to one embodiment, the first sub-pixel in the any of the pixels is arranged in such a way as to be adjacent to the second sub-pixel of the pixel adjacent to the any of the pixels in the column direction and in each of the plurality of pixels, the first sub-pixel is arranged in such a way as to be adjacent to the second sub-pixel in the column direction.

According to one embodiment, the first sub-pixel and the second sub-pixel are approximately equal in area.

According to one embodiment, the second sub-pixel is larger in area than the first sub-pixel.

The first aspect of the present invention can reduce the viewing angle dependence of γ characteristics in a liquid crystal display. In particular, it can achieve extremely high display quality by improving γ characteristics of liquid crystal displays with a wide viewing angle such as MAV or ASV liquid crystal displays.

The second aspect of the present invention can reduce flickering on a liquid crystal display driven by alternating current. By combining the first and second aspects of the present invention, it is possible to provide a liquid crystal display with reduced flickering, improved viewing angle characteristics of γ characteristics, and high quality display.

The third aspect of the present invention can increase the periods of oscillation of the voltages (oscillating voltages) applied to the storage capacitor counter electrodes in the liquid crystal display according to the second aspect. Thus, it is possible to provide a liquid crystal display which is suitable for improving viewing angle characteristics of a large or high-resolution liquid crystal display by dividing one pixel into two or more sub-pixels and illuminating the sub-pixels at different brightness levels.

The fourth aspect of the present invention can supply oscillating voltages to the sub-pixels of adjacent pixels in the column direction using common storage capacitor lines (CS buslines) in addition to being able to increase the periods of oscillation of the voltages (oscillating voltages) applied to the storage capacitor counter electrodes as is the case with the third aspect. Consequently, the storage capacitor lines can also serve as black matrices (BM) if placed between pixels adjacent to each other in the column direction. Thus, the fourth aspect, which can omit the black matrices that need to be provided separately in the case of the liquid crystal display according to the third aspect as well as reduce the number of CS buslines compared to the third aspect, has the advantage of being able to increase the aperture ratio of pixels.

BRIEF DESCRIPTION OF THE DRAWINGS

FIG. 4A is a graph showing dependence of transmittance on applied voltage, FIG. 4B is a diagram showing transmittances in FIG. 4A after being normalized with respect to transmittance in white mode, and FIG. 4C is a diagram showing γ characteristics.

FIGS. 6A to 6B are graphs showing γ characteristics obtained under voltage conditions A to D, shown in FIG. 5, where FIG. 6A shows right side 60-degree viewing γ characteristics and FIG. 6B shows upper-right side 60-degree viewing γ characteristics.

FIG. 8A shows right side 60-degree viewing γ characteristics and FIG. 6B shows upper-right side 60-degree viewing γ characteristics.

FIGS. 10A to 10B are diagrams illustrating effects of sub-pixel counts on γ characteristics under voltage condition B according to the embodiment of the present invention, where FIG. 10A shows right side 60-degree viewing γ characteristics and FIG. 10B shows upper-right side 60-degree viewing γ characteristics.

FIG. 16A shows right side 60-degree viewing γ characteristics and FIG. 16B shows upper-right side 60-degree viewing γ characteristics.

FIG. 17 is a diagram schematically showing a pixel arrangement of a liquid crystal display according to a second aspect of the present invention.

FIG. 19 is a diagram schematically showing a pixel arrangement of a liquid crystal display according to another embodiment of the present invention.

FIG. 21A is a diagram schematically showing a pixel arrangement of a liquid crystal display according to another embodiment of the present invention and FIG. 21B is a diagram schematically showing an arrangement of its storage capacitor lines and storage capacitor electrodes.

FIGS. 22-1 to 22-2 are an equivalent circuit diagram of a certain area of a liquid crystal display according to a second aspect of the present invention.

FIGS. 23A-1 to 23A-3 are a diagram showing periods and phases of oscillation of oscillating voltages supplied to CS buslines in terms of voltage waveforms of gate buslines as well as showing voltages of sub-pixel electrodes in the liquid crystal display shown in FIG. 22.

FIGS. 23B-1 to 23B-3 are a diagram showing periods and phases of oscillation of oscillating voltages supplied to the CS buslines in terms of voltage waveforms of gate buslines as well as showing voltages of sub-pixel electrodes in the liquid crystal display shown in FIG. 22 (voltages applied to liquid crystal layers have polarity opposite to that in FIG. 23A).

FIGS. 24A-1 to 24A-2 are a schematic diagram showing driving states of the liquid crystal display shown in FIG. 22 (where the voltages in FIG. 23A are used).

FIGS. 24B-1 and 24B-2 are a schematic diagram showing driving states of the liquid crystal display shown in FIG. 22 (where the voltages in FIG. 23B are used).

FIGS. 26A-26D are a diagram schematically showing oscillating voltage waveforms (a) to (e) of sub-pixel electrodes without CS voltage waveform blunting.

FIGS. 27A to 27E are a diagram schematically showing oscillating voltage waveforms (a) to (e) of sub-pixel electrodes with waveform blunting corresponding to a CR time constant of "0.2H".

FIGS. 29-1 to 29-2 are a diagram schematically showing an equivalent circuit of a liquid crystal display according to an embodiment of a third aspect of the present invention.

FIGS. 30A-1 to 30A-3 are a diagram showing periods and phases of oscillation of oscillating voltage supplied to the CS buslines in terms of voltage waveforms of gate buslines as well as showing voltages of sub-pixel electrodes in the liquid crystal display shown in FIG. 29.

FIGS. 30B-1 to 30B-3 are a diagram showing periods and phases of oscillation of oscillating voltage supplied to the CS buslines in terms of voltage waveforms of the gate buslines as well as showing voltages of sub-pixel electrodes in the liquid crystal display shown in FIG. 29 (voltages applied to liquid crystal layers have polarity opposite to that in FIG. 30A).

FIGS. 31A-1 to 31A-2 are a diagram showing driving states of the liquid crystal display shown in FIG. 29 (where the voltages in FIG. 30A are used).

FIGS. 31B-1 to 31B-2 are a diagram showing driving states of the liquid crystal display shown in FIG. 29 (where the voltages in FIG. 30B are used).

FIGS. 32-1 to 32-2 are a diagram schematically showing an equivalent circuit of a liquid crystal display according to another embodiment of the third aspect of the present invention.

FIGS. 33A-1 to 33A-3 are a diagram showing periods and phases of oscillation of oscillating voltage supplied to the CS buslines in terms of voltage waveforms of gate buslines as well as showing voltages of sub-pixel electrodes in the liquid crystal display shown in FIG. 32.

FIGS. 33B-1 to 33B-3 are a diagram showing periods and phases of oscillation of oscillating voltage supplied to the CS buslines in terms of voltage waveforms of the gate buslines as well as showing voltages of sub-pixel electrodes in the liquid crystal display shown in FIG. 32 (voltages applied to liquid crystal layers have polarity opposite to that in FIG. 33A).

FIGS. 34A-1 to 34A-2 are a diagram showing driving states of the liquid crystal display shown in FIG. 32 (where the voltages in FIG. 33A are used).

FIGS. 34B-1 to 34B-2 are a diagram showing driving states of the liquid crystal display shown in FIG. 32 (where the voltages in FIG. 33B are used).

FIGS. 36A-1 to 36A-2 are a diagram showing driving states of the liquid crystal display according to the embodiment of the fourth aspect of the present invention.

FIGS. 36B-1 to 36B-2 are a diagram showing driving states of the liquid crystal display according to the embodiment of the fourth aspect of the present invention, where electric fields applied to the liquid crystal layers are opposite in direction to those in the driving states in FIG. 33A.

FIGS. 37-1 to 37-3 are a schematic diagram showing a matrix configuration (connection patterns of CS buslines) of the liquid crystal display according to the embodiment of the fourth aspect of the present invention.

FIGS. 38-1 to 38-3 are a schematic diagram showing drive signal waveforms of the liquid crystal display shown in FIG. 37.

FIGS. 39-1 to 39-3 are a schematic diagram showing a matrix configuration (connection patterns of CS buslines) of a liquid crystal display according to another embodiment of the fourth aspect of the present invention.

FIGS. 40-1 to 40-3 are a schematic diagram showing drive signal waveforms of the liquid crystal display shown in FIG. 39.

FIGS. 41-1 to 41-5 are a schematic diagram showing a matrix configuration (connection patterns of CS buslines) of a liquid crystal display according to still another embodiment of the fourth aspect of the present invention.

FIGS. 42-1 to 42-3 are a schematic diagram showing drive signal waveforms of the liquid crystal display shown in FIG. 41.

FIGS. 43-1 to 43-5 are a schematic diagram showing a matrix configuration (connection patterns of CS buslines) of a liquid crystal display according to still another embodiment of the fourth aspect of the present invention.

FIGS. 44-1 to 44-3 are a schematic diagram showing drive signal waveforms of the liquid crystal display shown in FIG. 43.

FIGS. 45-1 to 45-5 are a schematic diagram showing a matrix configuration (connection patterns of CS buslines) of a liquid crystal display according to still another embodiment of the fourth aspect of the present invention.

FIGS. 46-1 to 46-3 are a schematic diagram showing drive signal waveforms of the liquid crystal display shown in FIG. 45.

FIGS. 47-1 to 47-3 are a schematic diagram showing a matrix configuration (connection patterns of CS buslines) of a liquid crystal display according to still another embodiment of the fourth aspect of the present invention.

FIGS. 48-1 to 48-3 are a schematic diagram showing drive signal waveforms of the liquid crystal display shown in FIG. 47.

FIGS. 49-1 to 49-3 are a schematic diagram showing a matrix configuration (connection patterns of CS buslines) of a liquid crystal display according to still another embodiment of the fourth aspect of the present invention.

FIGS. 50-1 to 50-3 are a schematic diagram showing drive signal waveforms of the liquid crystal display shown in FIG. 49.

DETAILED DESCRIPTION OF THE PREFERRED EMBODIMENTS

Configuration and operation of liquid crystal displays according to embodiments in a first aspect of the present invention will be described below with reference to drawings.

Figure 1:
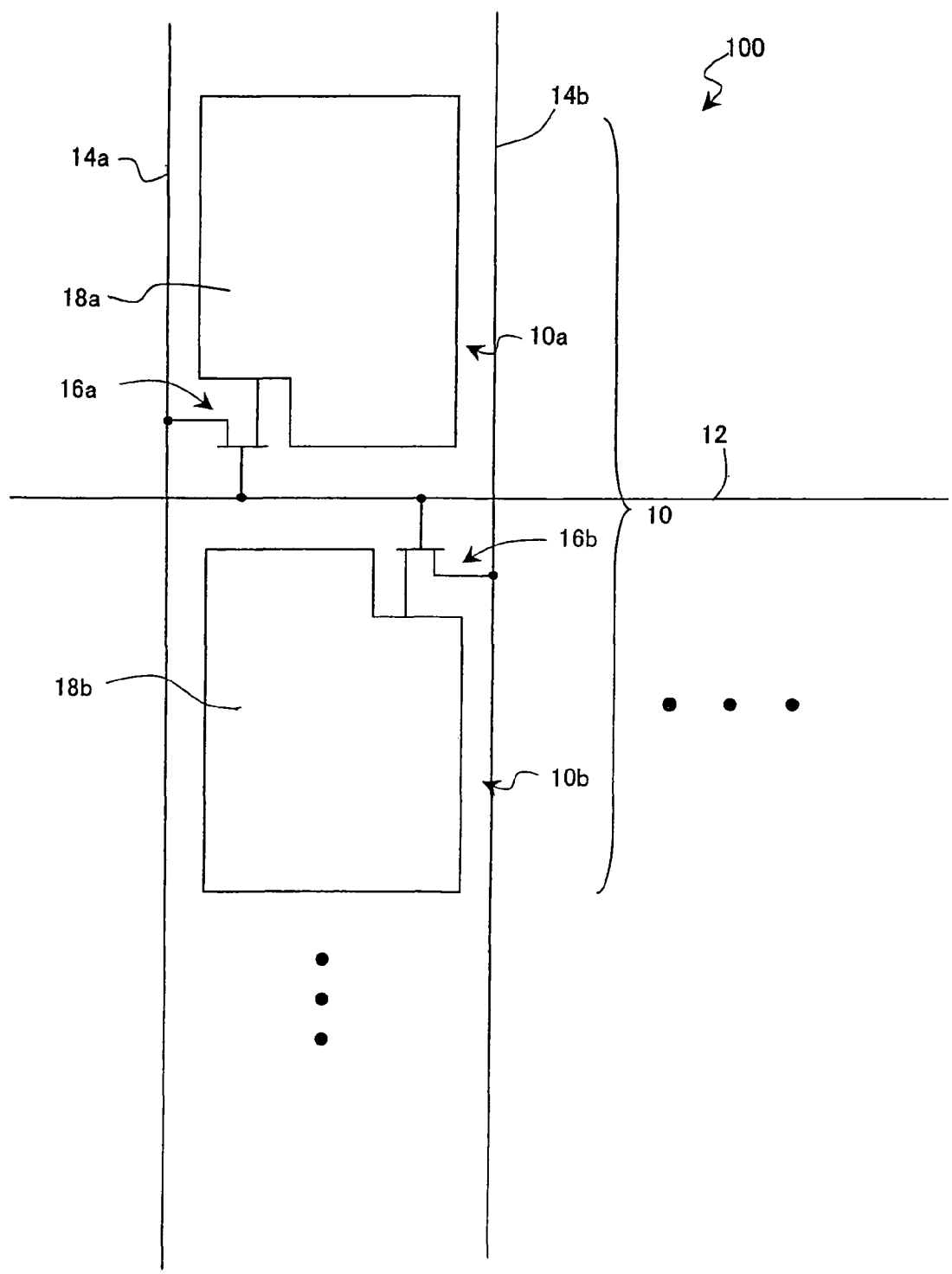
FIG. 1 is a diagram schematically showing a pixel configuration of a liquid crystal display 100 according to an embodiment in a first aspect of the present invention.
Figure 2A:
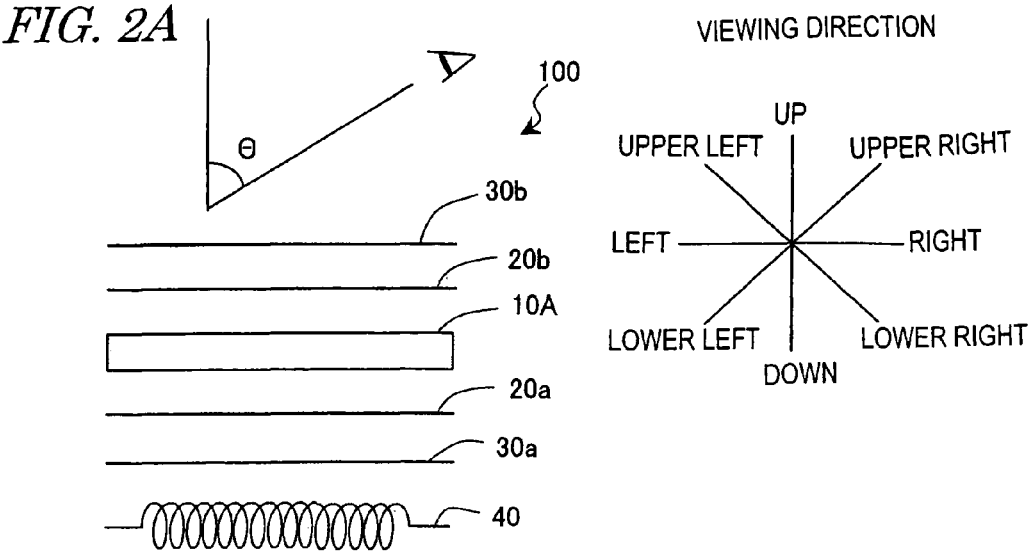
FIGS. 2A to 2C are schematic diagrams showing a structure of a liquid crystal display according to the embodiment of the present invention.
Figure 2B:
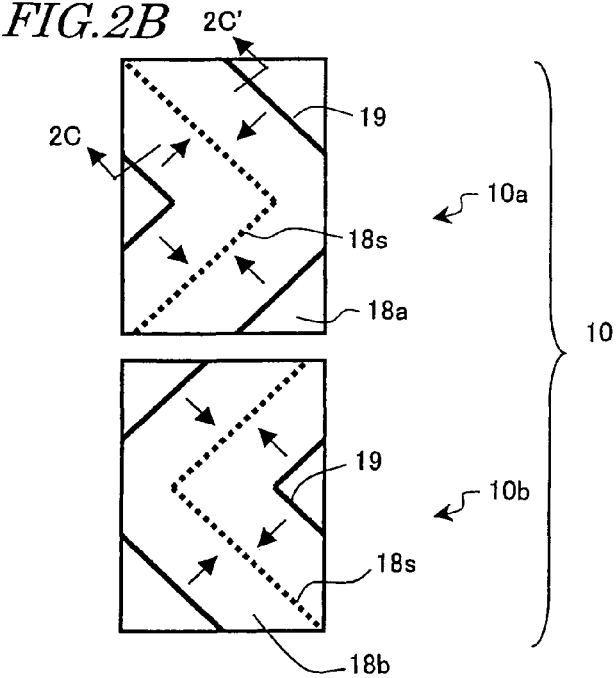
Figure 2C:
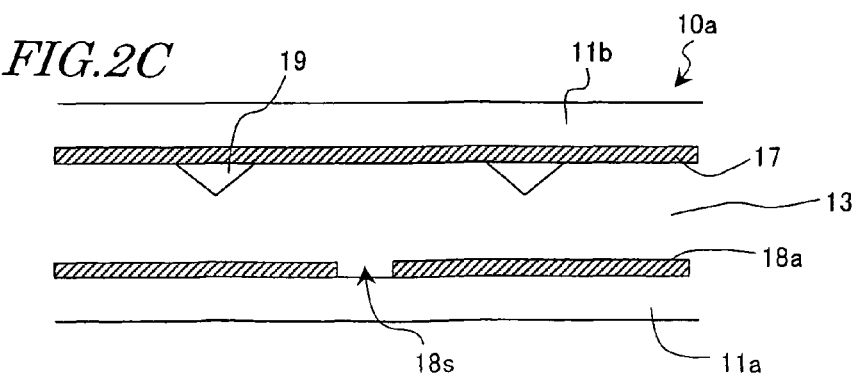
Figure 3A:
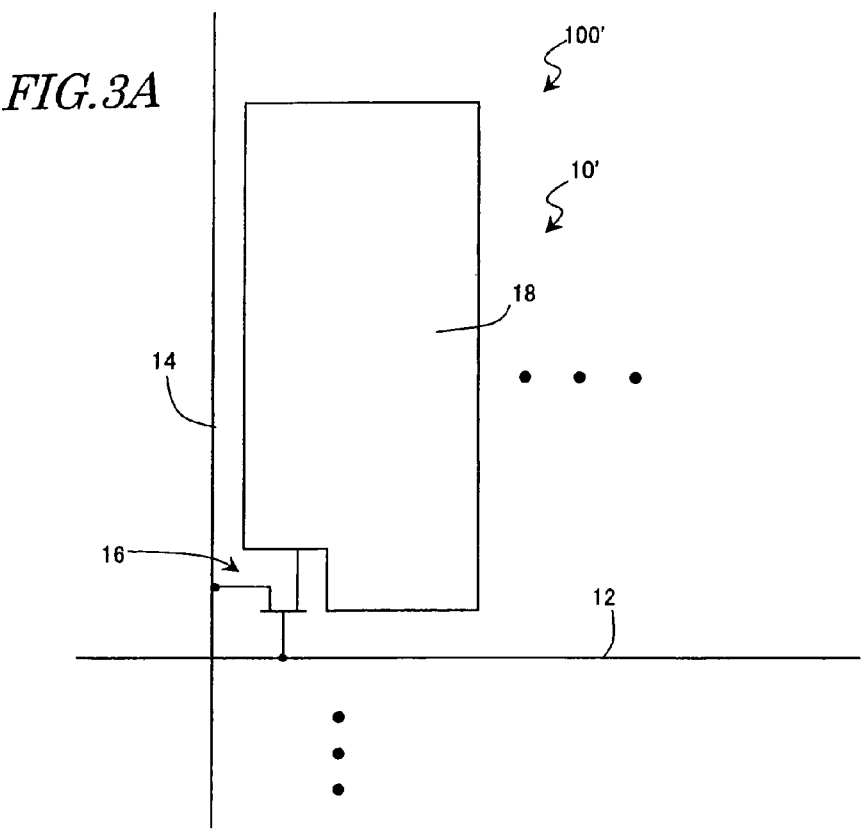
FIGS. 3A to 3C are diagrams schematically showing a structure of a conventional liquid crystal display 100'.
Figure 3B:
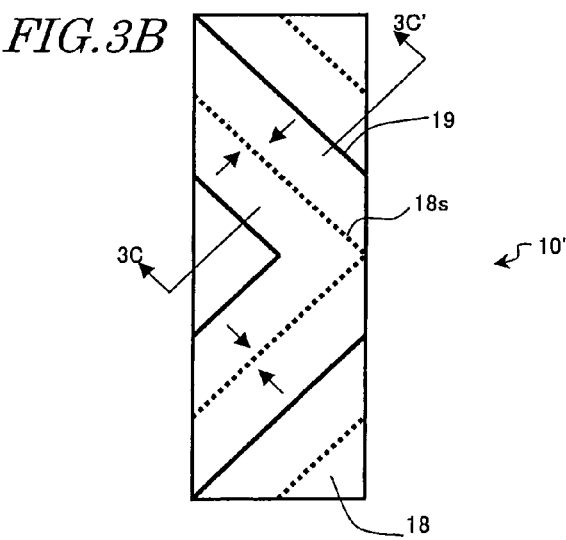
Figure 3C:
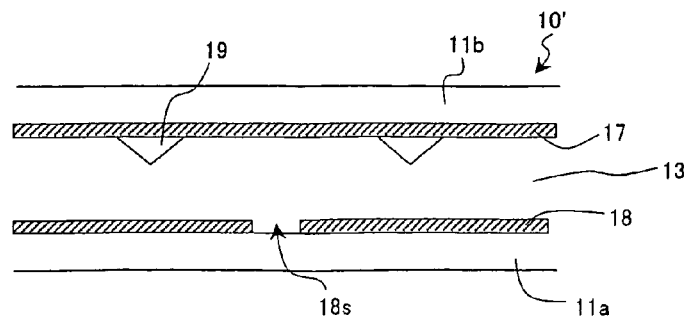

First, refer to FIGS. 1, 2A, 2B, and 2C: FIG. 1 is a diagram schematically showing an electrode arrangement in a pixel of a liquid crystal display 100 according to an embodiment of the present invention. FIG. 2A is a diagram schematically showing an overall configuration of the liquid crystal display 100, FIG. 2B is a diagram schematically showing an electrode structure in a pixel, FIG. 2C is a sectional view taken along a line 2C-2C' in FIG. 2B. For the purpose of reference, an electrode arrangement in a pixel of a conventional liquid crystal display 100', its electrode structure, and a sectional view taken along a line 3C-3C' are shown schematically in FIGS. 3A, 3B, and 3C, respectively.

The liquid crystal display 100 according to this embodiment operates in normally black mode and comprises a plurality of pixels each of which has a liquid crystal layer and a plurality of electrodes for applying voltage to the liquid crystal layer. Although a TFT liquid crystal display is taken as an example here, other switching elements (e.g., MIM elements) may be used instead.

The liquid crystal display 100 has a plurality of pixels 10 arranged in a matrix. Each of the plurality of pixels 10 has a liquid crystal layer 13. Also, the pixels have their own pixel electrode 18 and a counter electrode 17 to apply voltage to the liquid crystal layer 13. Typically, the counter electrode 17 is a single electrode common to all the pixels 10.

In the liquid-crystal display 100 according to this embodiment, each of the plurality of pixels 10 has a first sub-pixel 10$a$ and second sub-pixel 10$b$ which can apply mutually different voltages, as shown in FIG. 1.

When displaying a grayscale gk which satisfies $0 \leq gk \leq gn$ (where gk and gn are integers not less than zero and a larger value of gk corresponds to higher brightness), each of the plurality of pixels is driven in such a way as to satisfy relationships $\Delta V12(gk) > 0$ volts and $\Delta V12(gk) \geq \Delta V12(gk+1)$ at least in a range $0 < gk \leq n-1$, where $\Delta V12(gk) = V1(gk) - V2(gk)$ is the difference between root-mean-square voltage V1 (gk) applied to the liquid crystal layer of the first sub-pixel 10$a$ and root-mean-square voltage V2 (gk) applied to the liquid crystal layer of the second sub-pixel 10$b$.

The number of sub-pixels (sometimes referred to as the number of pixel divisions) possessed by each pixel 10 it not limited to two. Each pixel 10 may further have a third sub-pixel (not shown) to which a voltage different from those applied to the first sub-pixel 10$a$ and second sub-pixel 10$b$ may be applied. In that case, the pixel is configured such that a relationship 0 volts$<\Delta V13(gk)<\Delta V12(gk)$ is satisfied if it is assumed $\Delta V13(gk)=V1(gk)-V3(gk)$, where V3 (gk) is an root-mean-square voltage applied to the liquid crystal layer of the third sub-pixel and $\Delta V13(gk)$ is the difference between the root-mean-square voltage applied to the liquid crystal layer of the first sub-pixel and the root-mean-square voltage applied to the liquid crystal layer of the third sub-pixel. Of course, each pixel 10 may have four or more sub-pixels.

Preferably, the root-mean-square voltages applied to the liquid crystal layers of the sub-pixels satisfy a relationship $\Delta V12(gk) > \Delta V12(gk+1)$ at least in a range $0 < gk \leq n-1$. Thus, it is preferable that as the grayscale level gets higher, the difference between the root-mean-square voltages applied to the liquid crystal layers of the first sub-pixel 10$a$ and second sub-pixel 10$b$ becomes smaller. In other words, it is preferable that as the grayscale level gets lower (closer to black), the difference between the root-mean-square voltages applied to the liquid crystal layers of the first sub-pixel 10$a$ and second sub-pixel 10$b$ becomes larger. Also, preferably relationships $\Delta V12(gk) > \Delta V12(gk+1)$ and $\Delta V13(gk) > \Delta V13(gk+1)$ are satisfied at least in a range $0 < gk \leq n-1$ if each pixel has a third sub-pixel.

Preferably, the area of the first sub-pixel 10$a$ is equal to or smaller than the area of the second sub-pixel 10$b$. If each of the plurality of pixels has three or more sub-pixels, preferably the area of the sub-pixel (the first sub-pixel in this case) to which the highest root-mean-square voltage is applied is not larger than the area of the sub-pixel (the second sub-pixel in this case) to which the lowest root-mean-square voltage is applied. Specifically, if each pixel 10 has a plurality of sub-pixels SP1, SP2, . . . , and SPn and the root-mean-square voltages applied to the liquid crystal layers are V1 (gk), V2 (gk), . . . , and Vn (gk), preferably a relationship V1 (gk)>V2 (gk)> . . . >Vn (gk) is satisfied. Also, if the areas of the sub-pixels are SSP1, SSP2, . . . , and SSPn, preferably a relationship SSP1$\leq$SSP2$\leq$ . . . $\leq$SSPn is satisfied.

Effects of the present invention can be achieved, at least if the relationship V1 (gk)>V2 (gk)> . . . >Vn (gk) is satisfied for all grayscales except the highest and lowest grayscales (i.e., in the range $0 < gk \leq n-1$). However, it is also possible to implement a configuration in which the relationship is satisfied for all the grayscales (i.e., in the range $0 \leq gk \leq n$).

In this way, if each pixel is divided into a plurality of sub-pixels and different voltages are applied to the liquid crystal layers of the sub-pixels, a mixture of different γ characteristics are observed and, thus, the viewing angle dependence of γ characteristics is reduced. Furthermore, since the difference between root-mean-square voltages are set larger at lower grayscales, the viewing angle dependence of γ characteristics is reduced greatly on the black side (at low brightness levels) in normally black mode. This is highly effective in improving display quality.

Various configurations are available to apply root-mean-square voltages to the liquid crystal layers of the sub-pixels 10$a$ and 10$b$ in such a way as to satisfy the above relationships.

For example, the liquid crystal display 100 can be configured as shown in FIG. 1. Specifically, whereas in the conventional liquid crystal display 100', a pixel 10 has only one pixel electrode 18 that is connected to a signal line 14 via a TFT 16, the liquid crystal display 100 has two sub-pixel electrodes 18a and 18b which are connected to different signal lines 14a and 14b via respective TFTs 16a and 16b.

Since the sub-pixels 10a and 10b compose one pixel 10, gates of the TFTs 16a and 16b are connected to a common scan line (gate busline) 12 and turned on and off by a common scan signal. Signal voltages (grayscale voltages) which satisfy the above relationship are supplied to signal lines (source busline) 14a and 14b. Preferably, the gates of the TFTs 16a and 16b are configured as a common gate.

Alternatively, in a configuration (described later) in which the first sub-pixel and second sub-pixel each comprise storage capacitor which is formed by a storage capacitor electrode connected electrically to a sub-pixel electrode, an insulating layer, and a storage capacitor counter electrode opposing the storage capacitor electrode via the insulating layer, it is preferable to provide the storage capacitor counter electrodes of the first sub-pixel and second sub-pixel being electrically independent of each other, and vary the root-mean-square voltage applied to the liquid crystal layer of the first sub-pixel and root-mean-square voltage applied to the liquid crystal layer of second sub-pixel using capacitance division by varying voltages (referred to as storage capacitor counter electrode voltages) supplied to the storage capacitor counter electrodes. By regulating the value of the storage capacitor and magnitude of the voltages supplied to the storage capacitor counter electrodes, it is possible to control the magnitudes of the root-mean-square voltages applied to the liquid crystal layers of the sub-pixels.

In this configuration, since there is no need to apply different signal voltages to sub-pixel electrodes 18a and 18b, the TFTs 16a and 16b can be connected to a common signal line and the same signal voltage can be supplied to them. Therefore, the number of signal lines is the same as in the case of the conventional liquid crystal display 100' shown in FIG. 3 and it is possible to use a signal line drive circuit with the same configuration as the conventional liquid crystal display 100'. Of course, since the TFTs 16a and 16b are connected to the same scan line, preferably they share a common gate as in the case of the above example.

Preferably, the present invention is applied to liquid crystal displays which use a vertically aligned liquid crystal layer containing nematic liquid crystal material with negative dielectric anisotropy. In particular, it is preferable that the liquid crystal layer of each sub-pixel contains four domains which are approximately 90 degrees apart in azimuth direction in which their liquid crystal molecules incline when a voltage is applied (MVA). Alternatively, the liquid crystal layer of each sub-pixel may maintain an axially symmetrical alignment at least when voltage is applied (ASM).

The embodiment of the present invention will be described in more detail below in relation to an MVA liquid crystal display 100 in which the liquid crystal layer of each sub-pixel contains four domains which are approximately 90 degrees apart in azimuth direction in which their liquid crystal molecules incline when a voltage is applied.

As shown schematically in FIG. 2A, the MVA liquid crystal display 100 comprises a liquid crystal panel 10A, phase difference compensating elements (typically, phase difference compensating plates) 20a and 20b mounted on both sides of the liquid crystal panel 10A, polarizing plates 30a and 30b which sandwich them, and a backlight 40. The transmission axes (also known as polarization axes) of the polarizing plates 30a and 30b are orthogonal to each other (crossed-Nicols arrangement) so that black is displayed when no voltage is applied to the liquid crystal layer (not shown) of the liquid crystal panel 10A (in a state of vertical alignment). The phase difference compensating elements 20a and 20b are provided to improve viewing angle characteristics of the liquid crystal display and are designed optimally using known technologies. Specifically, they have been optimized (gk=0) to minimize brightness (black level) differences between when a black screen is viewed from the front and when it is viewed obliquely from any azimuth direction. When the phase difference compensating elements 20a and 20b are optimized in this way, the present invention can produce more marked effects.

As a matter of course, the common scan line 12, signal lines 14a and 14b, and TFTs 16a and 16b (see FIG. 1) are formed on a substrate 11a to apply predetermined signal voltages to the sub-pixel electrodes 18a and 18b respectively at predetermined times. Also, to drive these components, circuits and the like are formed, as required. Besides, color filters and the like are provided on another substrate 11b, as required.

Structure of a pixel in the MVA liquid crystal display 100 will be described with reference to FIGS. 2A and 2C. Basic configuration and operation of an MVA liquid crystal display is described, for example, in Japanese Laid-Open Patent Publication No. 11-242225.

As described with reference to FIG. 1, the pixel 10 in the MVA liquid crystal display 100 has two sub-pixels 10a and 10b, of which the sub-pixel 10a has the sub-pixel electrode 18a and the sub-pixel 10b has the sub-pixel electrode 18b. As shown schematically in FIG. 2C, the sub-pixel electrode 18a (and the sub-pixel electrode 18b (not shown)) formed on the glass substrate 11a has a slit 18s and forms a tilted electric field in conjunction with the counter electrode 17 which is placed in opposing relation to the sub-pixel electrode 18a across a liquid crystal layer 13. Also, ribs 19 protruding towards the liquid crystal layer 13 are provided on a surface of the glass substrate 11b on which the counter electrode 17 is mounted. The liquid crystal layer 13 is made of nematic liquid crystal material with negative dielectric anisotropy. When no voltage is applied, it is aligned nearly vertically by a vertical alignment film (not shown) which covers the counter electrode 17, ribs 19, and sub-pixel electrodes 18a and 18b. The liquid crystal molecules aligned vertically can be laid down safely in a predetermined direction by rib 19 surfaces (inclined faces) and the tilted electric field.

As shown in FIG. 2C, the rib 19 is inclined toward its center in such a way as to form an angle. The liquid crystal molecules are aligned nearly vertically to the inclined faces. Thus, the ribs 19 determine distribution of the tilt angle (angle formed by the substrate surface and long axis of the liquid crystal molecules) of the liquid crystal molecules. The slit 18s regularly changes the direction of the electric field applied to the liquid crystal layer. Consequently, when the electric field is applied, the liquid crystal molecules are aligned by the ribs 19 and slit 18s in four directions—upper right, upper left, lower left, and lower right—indicated by arrows in the figure, providing vertically and horizontally symmetrical, good viewing angle characteristics. A rectangular display surface of the liquid crystal panel 10A is typically oriented with its longer dimension placed horizontally and the transmission axis of the polarizing plate 30a placed parallel to the longer dimension. On the other hand, the pixel 10 is typically oriented with its longer dimension orthogonal to the longer dimension of the liquid crystal panel 10A as shown in FIG. 2B.

Preferably, as shown in FIG. 2B, the areas of the first sub-pixel 10a and second sub-pixel 10b are practically equal, each of the sub-pixels contain a first rib extending in a first direction and a second rib extending in a second direction, the first rib and the second rib in each sub-pixel are placed symmetrically with respect to a center line parallel to the scan line 12, and rib arrangement in one of the sub-pixels and rib arrangement in the other sub-pixel are symmetrical with respect to the center line orthogonal to the scan line 12. This arrangement causes the liquid crystal molecules in each sub-pixel to be aligned in four directions—upper right, upper left, lower left, and lower right—and makes the areas of the liquid crystal domains in the entire pixel including the first sub-pixel and second sub-pixel practically equal, providing vertically and horizontally symmetrical, good viewing angle characteristics. This effect is prominent when the area of the pixel is small. Furthermore, it is preferable that the center line parallel to the common scan line in each sub-pixel is placed at an interval equal to approximately one half of an array pitch of the scan line.

Next, description will be given of operation and display characteristics of the liquid crystal display 100 according to the embodiment of the present invention.

First, with reference to FIG. 4, description will be given of display characteristics of the MVA liquid crystal display which has the same electrode, configuration as the conventional liquid crystal display 100' shown in FIG. 3. Incidentally, display characteristics obtained when the same root-mean-square voltage is applied to the liquid crystal layers of the sub-pixels 10a and 10b (i.e., sub-pixel electrodes 18a and 18b) in the liquid crystal display 100 according to the embodiment of the present invention are approximately equal to those of the conventional liquid crystal display.

Figure 4A:
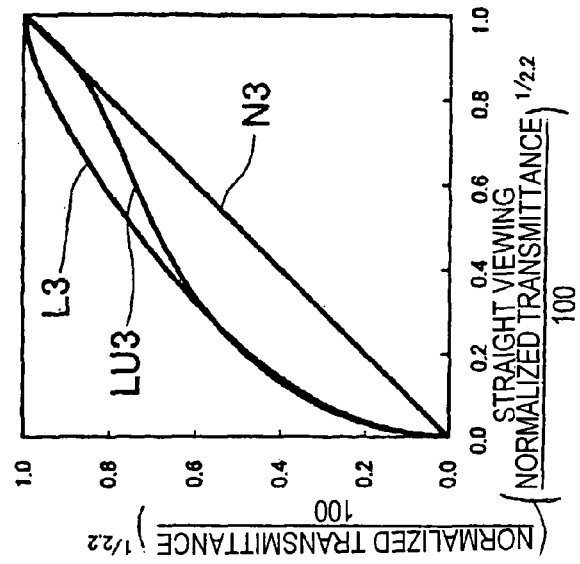
FIGS. 4A to 4C are diagrams illustrating display characteristics of an MVA liquid crystal display, where
Figure 4B:
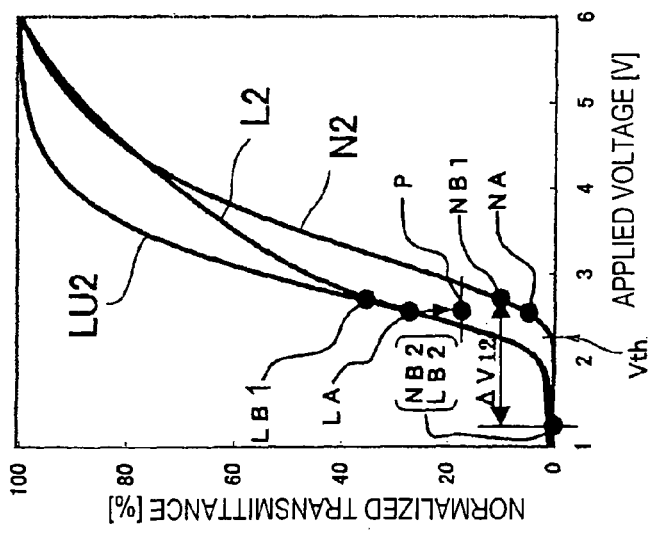

FIG. 4A shows dependence of transmittance on applied voltage when the display is viewed straightly from the front (N1), from the right at an angle of 60 degrees (L1), and from the upper right at an angle of 60 degrees (LU1). FIG. 4B is a diagram showing the three transmittances in FIG. 4A after being normalized by taking the transmittance obtained by the application of the highest grayscale voltage (voltage required to display white) as 100%. It shows dependence of normalized transmittance on applied voltage under the three conditions: a frontal viewing condition (N2), right side 60-degree viewing condition (L2), and upper-right side 60-degree viewing condition (LU2). Incidentally, the phase "60 degrees" here means an angle of 60 degrees from the normal to the display surface.

As can be seen from FIG. 4B, frontal viewing display characteristics differ from right side 60-degree viewing and upper-right side 60-degree viewing display characteristics. This indicates that the γ characteristics depend on the viewing direction.

Figure 4C:
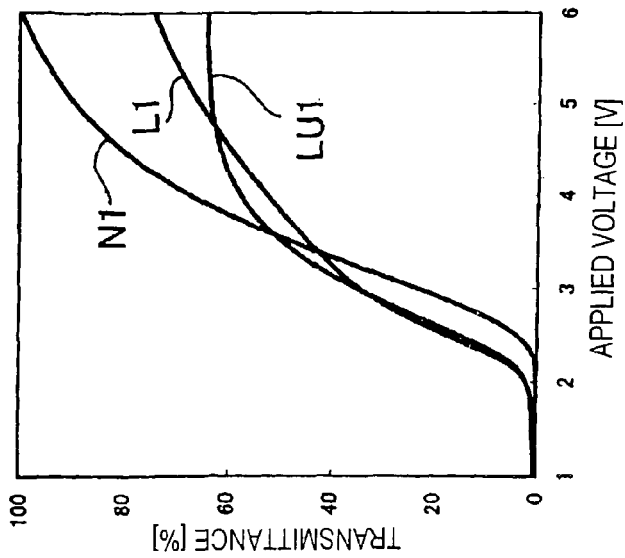

FIG. 4C shows differences in the γ characteristics more lucidly. To illustrate the differences in the γ characteristics clearly, the horizontal axis represents (frontal normalized transmittance/100)^(½.2) while the vertical axis represents grayscale characteristics under the N3, L3, and LU3 conditions as follows: frontal viewing grayscale characteristics= (frontal normalized transmittance/100)^(½.2), right side 60-degree viewing grayscale characteristics=(right side 60-degree normalized transmittance/100)^(½.2), and upper-right side 60-degree viewing grayscale characteristics=(normalized upper-right side 60-degree viewing transmittance/100)^(½.2), where "^" indicates power and the reciprocal of the power exponent corresponds to a γ value. In a typical liquid crystal display, the γ value for the frontal viewing grayscale characteristics is set at 2.2.

Referring to FIG. 4C, ordinate values coincide with abscissa values under the frontal viewing condition (N3), and thus the grayscale characteristics under this condition (N3) are linear. On the other hand, the right side 60-degree viewing grayscale characteristics (L3) and upper-right side 60-degree viewing grayscale characteristics (LU3) are curvilinear. Deviations of the curves (L3 and LU3) from the straight line under the frontal viewing condition (N3) quantitatively represent respective deviations in the γ characteristics, i.e., deviations (differences) in grayscale display.

The present invention aims at reducing such deviations in normally black liquid crystal display. Ideally, the curves (L3 and LU3) which represent the right side 60-degree viewing grayscale characteristics (L3) and upper-right side 60-degree viewing grayscale characteristics (LU3) coincide with the straight line which represent the frontal viewing grayscale characteristics (N3). Effects on improving the γ characteristics will be evaluated below with reference to a drawing which shows deviations in the γ characteristics as is the case with FIG. 4C.

With reference FIG. 4B, description will be given of a principle of how the present invention can reduce the deviations in the γ characteristics by providing a first sub-pixel and second sub-pixel in each pixel and applying different root-mean-square voltages to the liquid crystal layers of the sub-pixels. It is assumed here that the first sub-pixel and second sub-pixel have the same area.

With the conventional liquid crystal display 100', at a voltage at which the frontal viewing transmittance is represented by point NA, the right side 60-degree viewing transmittance is represented by point LA representing the right side 60-degree viewing transmittance at the same voltage as the NA. With the present invention, to obtain the same frontal viewing transmittance as at point NA, frontal viewing transmittances of the first sub-pixel and second sub-pixel can be set at points NB1 and NB2, respectively. Since the frontal viewing transmittance at point NB2 is approximately zero and the first sub-pixel and second sub-pixel have the same area, the frontal viewing transmittance at point NB1 is twice the frontal viewing transmittance at point. NA. The difference in root-mean-square voltage between points NB1 and NB2 is ΔV12. Also, with the present invention, the right side 60-degree viewing transmittance is represented by point P, which is given as the average of the right side 60-degree viewing transmittances LB1 and LB2 at the same voltages as at points NB1 and NB2, respectively.

With the liquid crystal display according to the present invention, point P which represents the right side 60-degree viewing transmittance is closer to point NA which represents the corresponding frontal viewing transmittance than is point LA which represents the right side 60-degree viewing transmittance of the conventional liquid crystal display 100'. This means reduced deviations in the γ characteristics.

From the above description, it can be seen that the fact that the right side 60-degree viewing transmittance (see point LB2) of the second sub-pixel is approximately zero enhances the effect of the present invention. Thus, to enhance the effect of the present invention, it is preferable to curb increases in transmittance when a black screen is viewed obliquely. From this stand point, it is preferable to install the phase difference compensating elements 20a and 20b shown in FIG. 2A, as required, so as to curb increases in transmittance when a black screen is viewed obliquely.

The liquid crystal display 100 according to the present invention improves the γ characteristics by applying different root-mean-square voltages to the two liquid crystal layers of the respective sub-pixels 10a and 10b in each pixel 10. In so doing, the difference ΔV12 (gk)=V1 (gk)−V2 (gk) between the root-mean-square voltages applied to the respective liquid crystal layers of the sub-pixel 10a and sub-pixel 10b is set in such a way as to satisfy the relationships ΔV12 (gk)>0 volts and ΔV12 (gk)≧ΔV12 (gk+1). A case in which the above relationships are satisfied in the entire range of 0<gk≦n will be described below (FIGS. 5B and 5C).

FIGS. 5A, 5B, 5C, and 5D show various relationships between the root-mean-square voltage V1 (gk) applied to the liquid crystal layer of the first sub-pixel 10a and root-mean-square voltage V2 (gk) applied to the liquid crystal layer of the second sub-pixel 10b in the pixel 10 shown in FIG. 1.

Figure 5A:
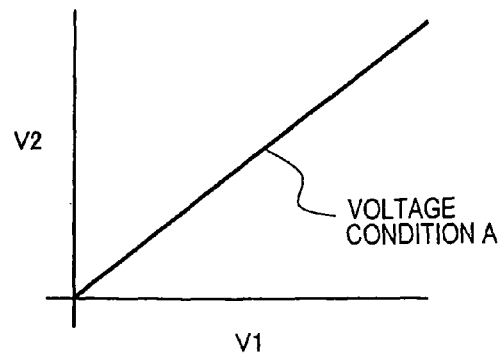
FIGS. 5A to 5D are diagrams showing conditions A to D, respectively, of voltages to be applied to liquid crystal layers of sub-pixels obtained by dividing pixels.

Under voltage application condition A shown in FIG. 5A, the same voltage (V1=V2) is applied to the liquid crystal layers of the two sub-pixels 10a and 10b. Thus, ΔV12 (gk)=0 volts.

Figure 5B:
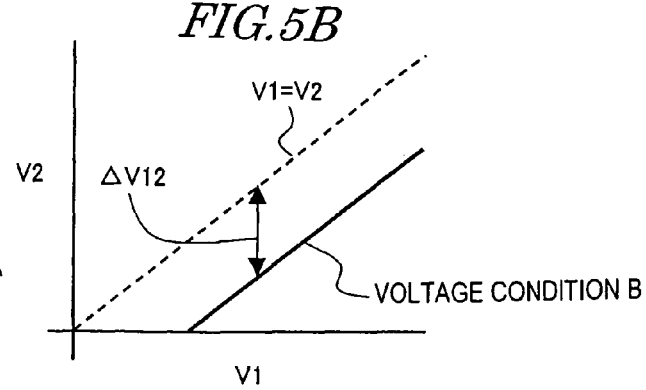
Figure 5C:
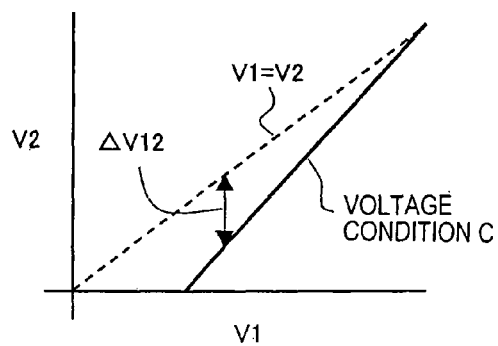

Under voltage condition B shown in FIG. 5B, the relationship V1>V2 holds and ΔV12 is constant regardless of the value of V1. Thus, under voltage condition B, the relationship ΔV12 (gk)=ΔV12 (gk+1) is satisfied for any grayscale gk. This embodiment uses ΔV12 (gk)=1.5 volts as a typical value, but, of course, another value may be used. A large value of ΔV12 (gk) enhances the effect of the present invention, but poses a problem of lowered brightness (transmittance) in white mode. Furthermore, there is the problem that when the value of ΔV12 (gk) exceeds a threshold voltage (i.e., Vth shown in FIG. 4B) for the transmittance of the liquid crystal display, the brightness (transmittance) in black mode increases, lowering display contrast. Thus, it is preferable that ΔV12 (gk)≦Vth.

Under voltage condition C shown in FIG. 5C, the relationship V1>V2 holds and ΔV12 decreases with increases in V1. Thus, under voltage condition C, the relationship ΔV12 (gk) >ΔV12 (gk+1) is satisfied for any grayscale gk.

This embodiment uses ΔV12 (0)=1.5 volts and ΔV12 (n)=0 volts as typical values, but, of course, other values may be used. However, as described above, it is preferable that ΔV12 (gk)≦Vth from the standpoint of display contrast during oblique viewing while it is preferable that ΔV12 (n)=0 volts from the standpoint of brightness in white mode.

Figure 5D:
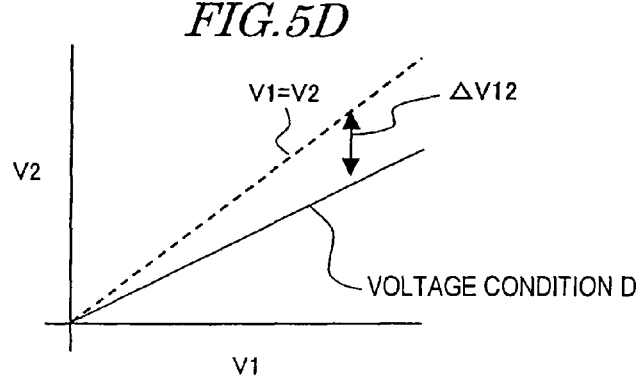

Under voltage condition D shown in FIG. 5D, the relationship V1>V2 holds and ΔV12 increases with increases in V1. Thus, under voltage condition D, the relationship ΔV12 (gk) <ΔV12 (gk+1) holds for any grayscale gk.

This embodiment uses ΔV12 (0)=0 volts and ΔV12 (n)=1.5 volts as typical values.

In the liquid crystal display 100 according to the embodiment of the present invention, voltage is applied to the liquid crystal layers of the sub-pixels 10a and 10b such that voltage condition B or voltage condition C will be satisfied. Incidentally, although the condition ΔV12>0 is satisfied for all grayscales in FIGS. 5B and 5C, ΔV12=0 is all right in the case of an optimum grayscale or the highest grayscale.

Grayscale characteristics of the MVA liquid crystal display under voltage conditions A to D will be described with reference to FIG. 6. The horizontal axis in FIGS. 6A and 6B represents (frontal normalized transmittance/100)^(½.2), the vertical axis in FIG. 6A represents (right side 60-degree normalized transmittance/100)^(½.2), and the vertical axis in FIG. 6B represents (normalized upper-right side 60-degree viewing transmittance/100)^(½.2). A straight line which represents frontal viewing grayscale characteristics is shown together for the purpose of reference.

Under voltage condition A, the same voltage (ΔV12 (gk)= 0) is applied to the liquid crystal layers of the sub-pixels 10a and 10b. As shown in FIGS. 6A and 6B, the γ characteristics deviate greatly, as with the conventional liquid crystal display shown in FIG. 4.

Voltage condition D has less effect on reducing the viewing angle dependence of γ characteristics than do voltage conditions B and C. Voltage condition D corresponds, for example, to voltage conditions for pixel division using conventional capacitance division described in Japanese Laid-Open Patent Publication No. 6-332009. Although it has the effect of improving viewing angle characteristics in normally white mode, it does not have much effect on reducing the viewing angle dependence of γ characteristics in normally black mode.

As described above, preferably voltage condition B or C is used to reduce viewing angle dependence of γ characteristics in normally black mode.

Figure 7:
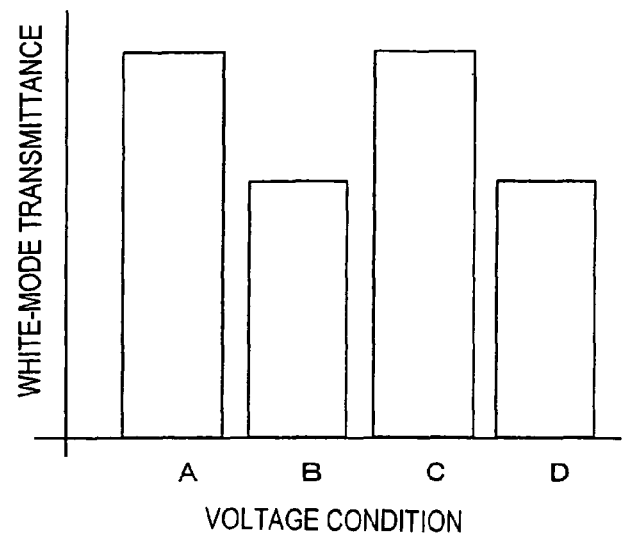
FIG. 7 is a graph showing white-mode transmittance (frontal viewing) obtained under voltage conditions A to D.

Next, with reference to FIG. 7, description will be given of variations in white-mode transmittance among voltage conditions, i.e., when the highest grayscale voltage is applied.

The transmittance in white mode is naturally lower under voltage conditions B and D than under voltage condition A. The transmittance in white mode under voltage condition C is equivalent to transmittance under voltage condition A. In this respect, voltage condition C is preferable to voltage conditions B and D. Thus, taking into consideration the viewing angle dependence of γ characteristics as well as transmittance in white mode, it can be said that voltage condition C is superior.

Next, preferable area ratios between sub-pixels will be described.

According to the present invention, if the root-mean-square voltages applied to the liquid crystal layers of the sub-pixels SP1, SP2, . . . , and SPn are V1, V2, . . . , Vn, if the areas of the sub-pixels are SSP1, SSP2, . . . , and SSPn, and if a relationship V1>V2> . . . >Vn holds, preferably, a relationship SSP1≦SSPn is satisfied. This will be described below.

Figure 9:
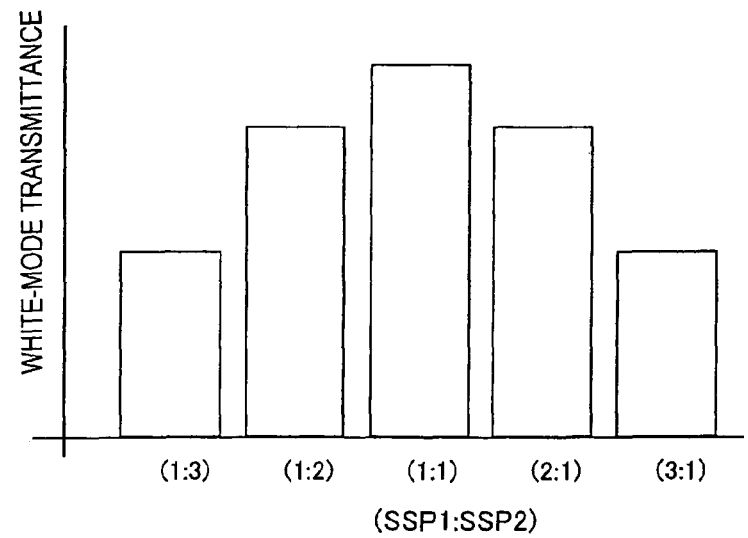
FIG. 9 is a diagram showing relationship between white-mode transmittance (frontal viewing) and sub-pixel area ratios under voltage condition C according to the embodiment of the present invention.
Figure 8A:
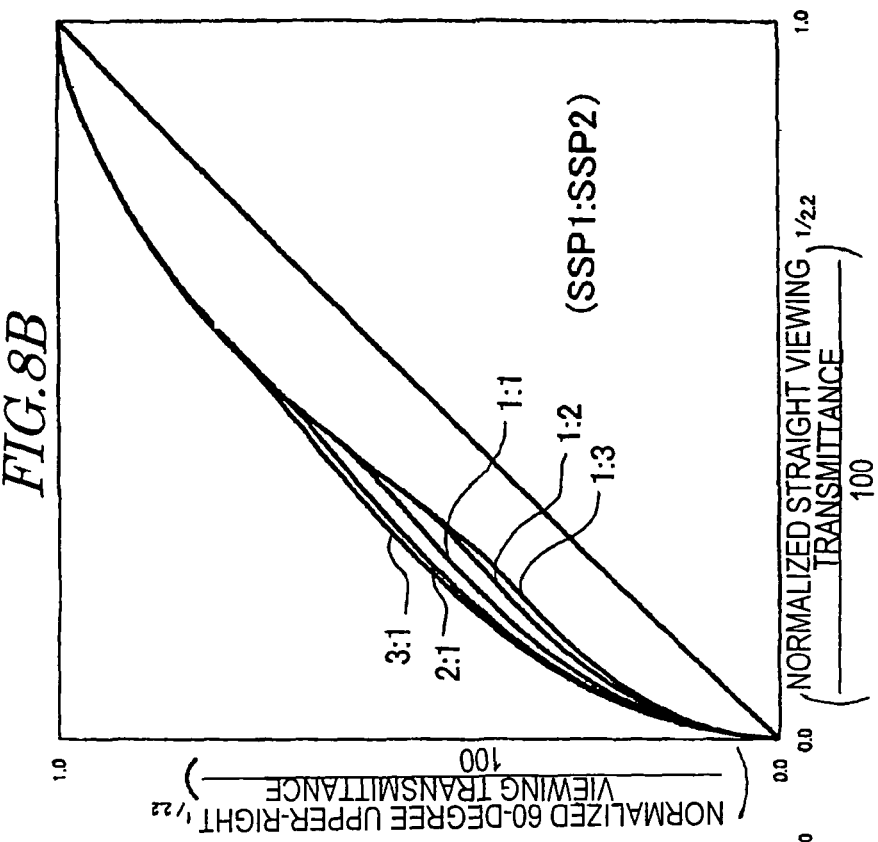
FIGS. 8A to 8B are graphs illustrating effects of area ratios between sub-pixels on γ characteristics under voltage condition C according to the embodiment of the present invention, where
Figure 8B:
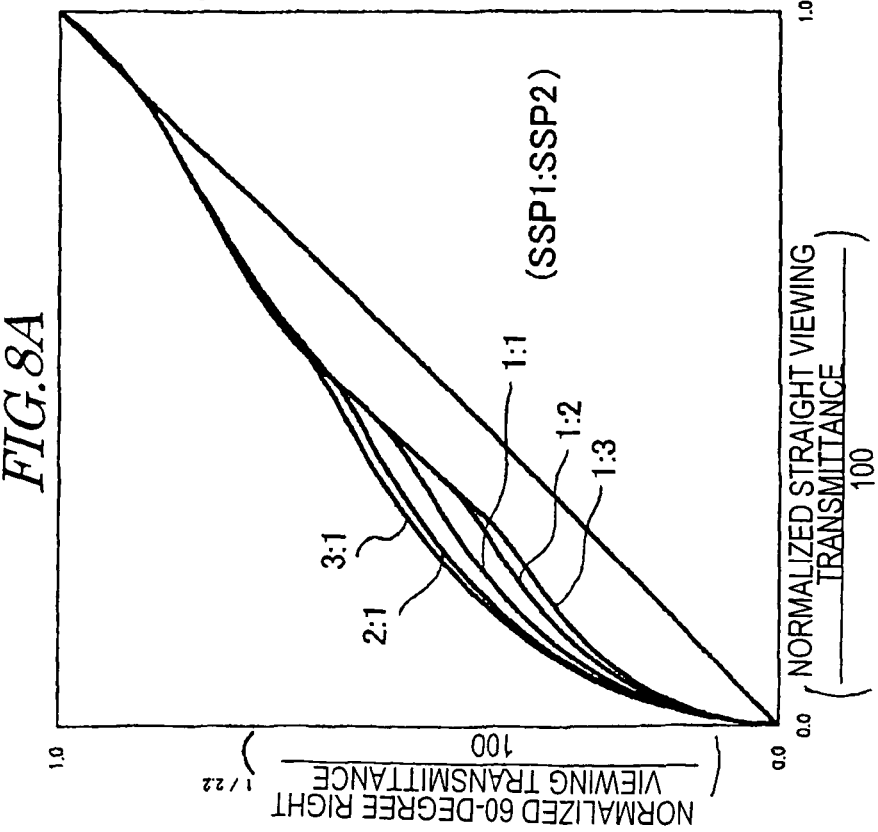

Assuming that SSP1 and SSP2 are the area of the sub-pixels 10a and 10b in the pixel 10 shown in FIG. 1, FIG. 8 compares γ characteristics among their area ratios (SSP1: SSP2)=(1:3), (1:2), (1:1), (2:1), (3:1) under voltage condition C. FIG. 8A shows right viewing γ characteristics while FIG. 8B shows upper-right viewing γ characteristics. FIG. 9 shows frontal viewing transmittance for different split ratios.

As can be seen from FIG. 8, decreasing the area ratio of the sub-pixel (10a) to which the higher voltage is applied is more effective in reducing the viewing angle dependence of γ characteristics.

The transmittance in white mode takes the maximum value when the area ratio is (SSP1:SSP2)=(1:1) and lowers as the area ratio becomes uneven. This is because a good multi-domain vertical alignment is no longer available if the area ratio becomes uneven, reducing the area of the first sub-pixel or second sub-pixel. This tendency is pronounced in high-resolution liquid crystal displays, which has small pixel areas. Thus, although it is preferable that the area ratio is 1:1, it can be adjusted, as required, taking into consideration its effect on reducing the viewing angle dependence of γ characteristics, the transmittance in white mode, the uses of the liquid crystal display, etc.

Next, the number of pixel divisions will be described.

Although with the liquid crystal display 100 shown in FIG. 1, a pixel 10 is composed of two sub-pixels (10a and 10b), the present invention is not limited to this and the number of sub-pixels may be three or more.

Figure 11:
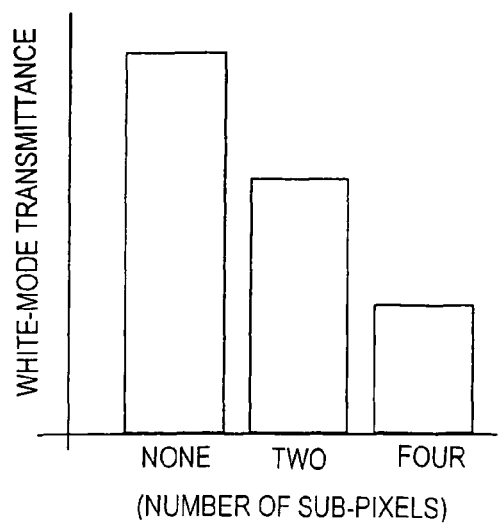
FIG. 11 is a diagram showing relationship between white-mode transmittance (frontal viewing) and sub-pixel counts under voltage condition B according to the embodiment of the present invention.

FIG. 10 compares the γ characteristics obtained under three conditions: when a pixel is divided into two sub-pixels, when a pixel is divided into four sub-pixels, and when a pixel is not divided. FIG. 10A shows right viewing γ characteristics while FIG. 10B shows upper-right viewing γ characteristics. FIG. 11 shows corresponding transmittances of the liquid crystal display in white mode. The area of a pixel was constant and voltage condition B was used.

It can be seen from FIG. 10, increases in the number of sub-pixels increase the effect of correcting the deviations in γ characteristics. Compared to when pixels are not divided, the effect is especially pronounced when a pixel is divided into two sub-pixels. When the number of divisions is increased from two to four, although there is not much difference in deviations in γ characteristics, characteristics are improved in terms of smooth changes in deviations in relation to grayscale changes. However, as can be seen from FIG. 11, the transmittance (frontal viewing) in white mode falls as the number of divisions increases. It falls greatly, especially when the number of divisions is increased from two to four. The main reason for this great fall is that the area of each sub-pixel is reduced greatly as described above. The maid reason for reduction in transmittance when no-division and two-division conditions are compared is the use of voltage condition B. Thus, it is advisable to adjust the number of divisions, as required, taking into consideration its effect on reducing the viewing angle dependence of γ characteristics, the transmittance in white mode, the uses of the liquid crystal display, etc.

From the above, it can be seen that deviations in γ characteristics, shape distortion of the deviations, and the viewing angle dependence of γ characteristics are reduced with increases in the number of pixel divisions. These effects are most pronounced when no-division and two-division (two sub-pixels) conditions are compared. Thus, it is preferable to divides a pixel into two sub-pixels, considering also the falls in white-mode transmittance resulting from increases in the number of sub-pixels as well as falls in manufacturability.

In the liquid crystal display 100 shown in FIG. 1, the sub-pixels 10a and 10b are connected independently of each other to the TFT 16a and TFT 16b, respectively. The source electrodes of the TFTs 16a and 16b are connected to the signal lines 14a and 14b, respectively. Thus, the liquid crystal display 100 allows any root-mean-square voltage to be applied to each of the liquid crystal layers of sub-pixels, but requires twice as many signal lines (14a and 14b) as the signal lines 14 of the conventional liquid crystal display 100' shown in FIG. 3, also requiring twice as many signal line drive circuits.

In contrast, a liquid crystal display 200 according to another preferred embodiment of the present invention has the same number of signal lines as does the conventional liquid crystal display 100', but can apply mutually different root-mean-square voltages to the liquid crystal layers of the sub-pixels 10a and 10b under a voltage condition similar to the voltage condition C described above.

Figure 12:
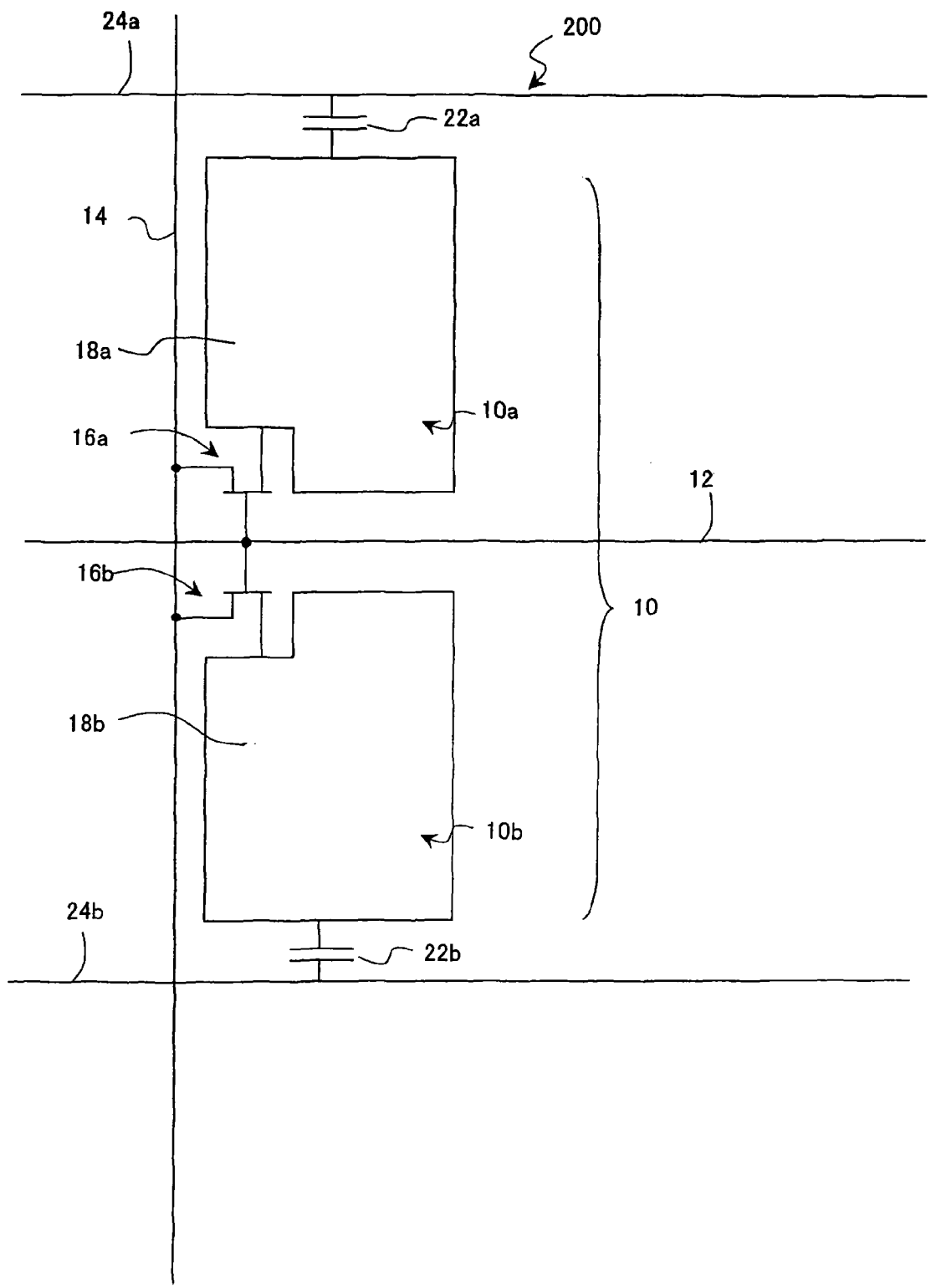
FIG. 12 is a schematic diagram showing a pixel structure of a liquid crystal display 200 according to another embodiment of the present invention.

FIG. 12 schematically shows an electrical configuration of the liquid crystal display 200 according to the other embodiment of the present invention. Components which have practically the same functions as those of the liquid crystal display 100 shown in FIG. 1 are denoted by the same reference numerals as the corresponding components and description thereof will be omitted.

A pixel 10 is divided into sub-pixels 10a and 10b, which are connected with TFT 16a and TFT 16b and storage capacitors (CS) 22a and 22b, respectively. The TFT 16a and TFT 16b have their gate electrodes connected to a scan line 12, and their source electrodes to the a common (the same) signal line 14. The storage capacitors 22a and 22b are connected to storage capacitor lines (CS bus line) 24a and 24b, respectively. The storage capacitors 22a and 22b are formed, respectively, by storage capacitor electrodes electrically connected with sub-pixel electrodes 18a and 18b, storage capacitor counter electrodes electrically connected with the storage capacitor lines 24a and 24b, and insulating layers (not shown) formed between them. The storage capacitor counter electrodes of the storage capacitors 22a and 22b are independent of each other and are supplied with mutually different storage capacitor counter voltages from the storage capacitor lines 24a and 24b.

Next, with reference to drawings, description will be given of a principle of how the liquid crystal display 200 can apply different root-mean-square voltages to the liquid crystal layers of the sub-pixels 10a and 10b.

Figure 13:
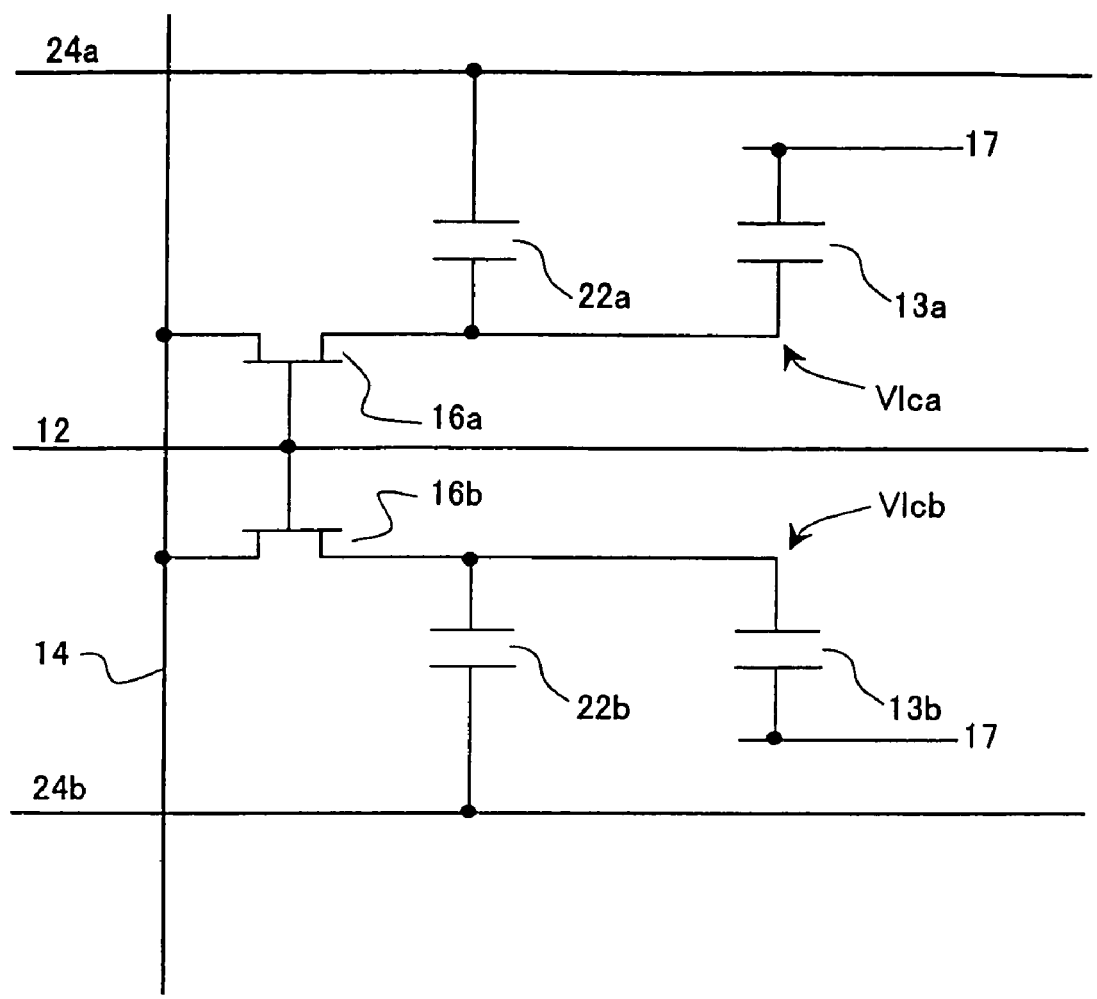
FIG. 13 is a diagram showing an equivalent circuit for a pixel of the liquid crystal display 200.

FIG. 13 shows an equivalent circuit for one pixel of the liquid crystal display 200. In the electric equivalent circuit, the liquid crystal layers of the sub-pixels 10a and 10b are denoted by 13a and 13b. Liquid crystal capacitors formed by the sub-pixel electrodes 18a and 18b, liquid crystal layers 13a and 13b, and counter electrode 17 (common to the sub-pixels 10a and 10b) are denoted by Clca and Clcb.

It is assumed that the liquid crystal capacitors Clca and Clcb have the same capacitance value CLC (V). The value of CLC (V) depends on the root-mean-square voltages applied to the liquid crystal layers of the sub-pixels 10a and 10b. The storage capacitors 22a and 22b connected to liquid crystal capacitors of the sub-pixels 10a and 10b independently of each other are represented by Ccsa and Ccsb and it is assumed that their capacitance value is CCS.

Both liquid crystal capacitor Clca of the sub-pixel 10a and storage capacitor Ccsa have one of their electrodes connected to the drain electrode of the TFT 16a provided to drive the sub-pixel 10a. The other electrode of the liquid crystal capacitor Clca is connected to the counter electrode while the other electrode of the storage capacitor Ccsa is connected to the storage capacitor line 24a. Both liquid crystal capacitor Clcb of the sub-pixel 10b and storage capacitor Ccsb have one of their electrodes connected to the drain electrode of the TFT 16b provided to drive the sub-pixel 10b. The other electrode of the liquid crystal capacitor Clcb is connected to the counter electrode while the other electrode of the storage capacitor Ccsb is connected to the storage capacitor line 24b. The gate electrodes of the TFT 16a and TFT 16b are connected to the scan line 12 and their source electrodes are connected to the signal line 14.

Figure 14:
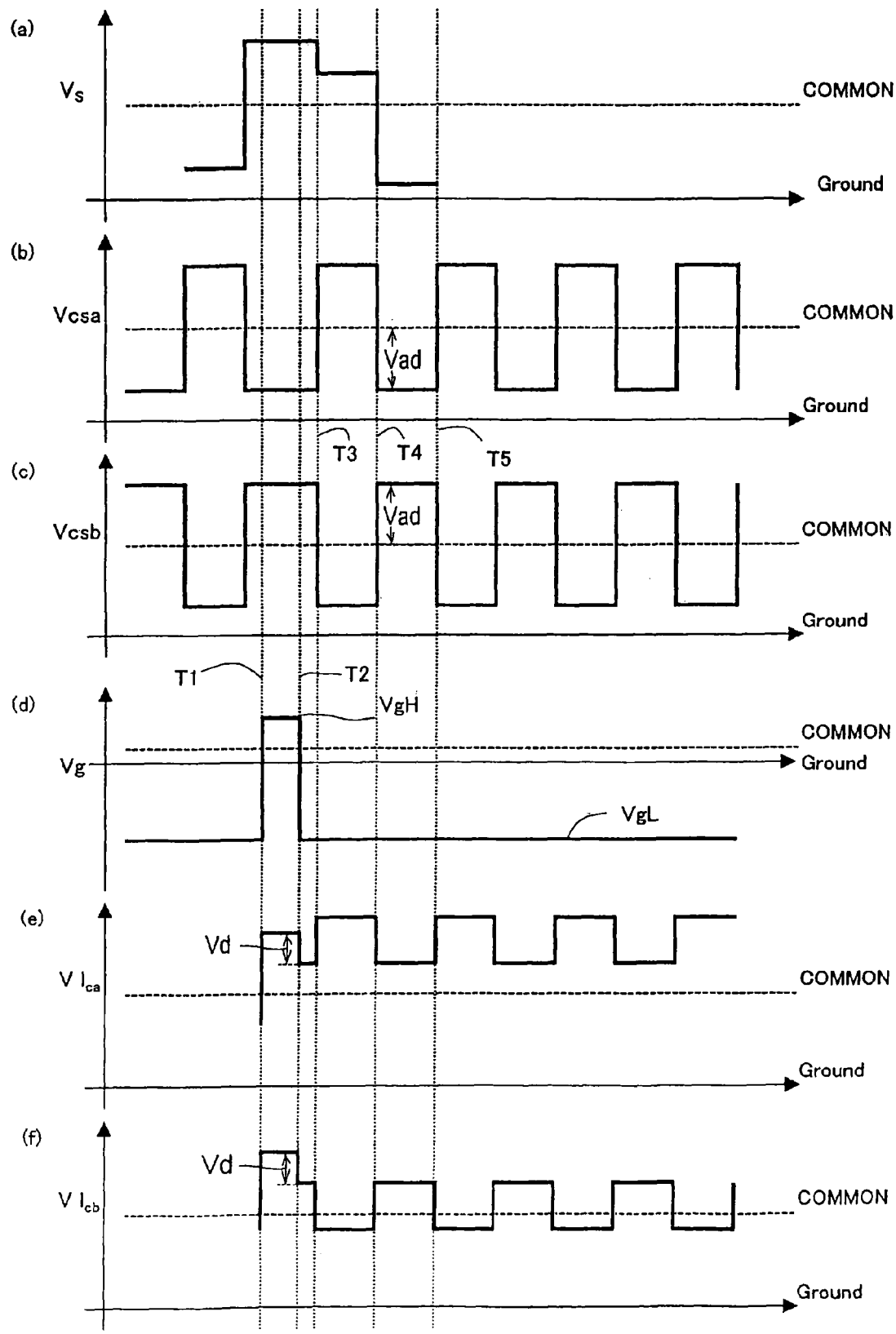
FIG. 14 is a diagram showing various voltage waveforms (a)-(f) for driving the liquid crystal display 200.

FIG. 14 schematically shows voltage application timings for driving the liquid crystal display 200.

In FIG. 14, the waveform (a) is a voltage waveform Vs of the signal line 14, the waveform (b) is a voltage waveform Vcsa of the storage capacitor line 24a, the waveform (c) is a voltage waveform Vcsb of the storage capacitor line 24b, the waveform (d) a voltage waveform Vg of the scan line 12, the waveform (e) is a voltage waveform Vlca of the sub-pixel electrode 18a of the sub-pixel 10a, and the waveform (f) is a voltage waveform Vlcb of the sub-pixel electrode 18b of the sub-pixel 10b. The broken lines in the figures indicate a voltage waveform COMMON (Vcom) of the counter electrode 17.

Operation of the equivalent circuit in FIG. 13 will be described with reference to FIG. 14.

At time T1, when the voltage Vg changes from VgL to VgH, the TFT 16a and TFT 16b are turned on simultaneously and the voltage Vs is transmitted from the signal line 14 to the sub-pixel electrodes 18a and 18b of the sub-pixels 10a and 10b, causing the sub-pixels 10a and 10b to be charged. Similarly, the storage capacitors Csa and Csb of the respective sub-pixels are charged from the signal line.

At time T2, when the voltage Vg of the scan line 12 changes from VgH to VgL, the TFT 16a and TFT 16b are turned off simultaneously. Consequently, the sub-pixels 10a and 10b and storage capacitors Csa and Csb are all cut off from the signal line 14. Immediately afterwards, due to drawing effect caused by parasitic capacitance of the TFT 16a and TFT 16b and the like, voltages Vlca and Vlcb of the respective sub-pixels fall by approximately the same voltage Vd to:

$$Vlca=Vs-Vd$$

$$Vlcb=Vs-Vd$$

At this time, the voltages Vcsa and Vcsb of the respective storage capacitor lines are:

$$Vcsa=Vcom-Vad$$

$$Vcsb=Vcom+Vad$$

At time T3, the voltage Vcsa of the storage capacitor line 24a connected to the storage capacitor Csa changes from "Vcom−Vad" to "Vcom+Vad" and the voltage Vcsb of the storage capacitor line 24b connected to the storage capacitor Csb changes by twice Vad from "Vcom+Vad" to "Vcom−Vad". As a result of the voltage changes of the storage capacitor lines 24a and 24b, voltages Vlca and Vlcb of the respective sub-pixels change to:

$$Vlca=Vs-Vd+2*Kc*Vad$$

$$Vlcb=Vs-Vd-2*Kc*Vad$$

where, Kc=CCS/(CLC (V)+CCS), "*" indicates multiplication.

At time T4, Vcsa changes from "Vcom+Vad" to "Vcom−Vad" and Vcsb changes from "Vcom−Vad" to "VCom+Vad," by twice Vad. Consequently, Vlca and Vlcb change from:

$$Vlca=Vs-Vd+2*Kc*Vad$$

$$Vlcb=Vs-Vd-2*Kc*Vad$$

To:

$$Vlca=V-Vd$$

$$Vlcb=Vs-Vd$$

At time T5, Vcsa changes from "Vcom−Vad" to "Vcom+Vad," by twice Vad and Vcsb changes from "Vcom+Vad" to "Vcom−Vad," by twice Vad. Consequently, Vlca and Vlcb change from:

$$Vlca=Vs-Vd$$

$$Vlcb=Vs-Vd$$

To:

$$Vlca=Vs-Vd+2*Kc*Vad$$

$$Vlcb=Vs-Vd-2*Kc*Vad$$

Vcsa, Vcsb, Vlca, and Vlcb alternate the above changes at T4 and T5 at intervals of an integral multiple of horizontal write time 1 H. The multiple—1, 2, or 3—used for the alternating intervals can be set, as required, by taking into consideration a drive method (method of polarity inversion, etc.) and display conditions (flickering, graininess, etc.) of the liquid crystal display. These alternating cycles are repeated until the pixel 10 is rewritten the next time, i.e., until a time equivalent to T1. Thus, effective values of the voltages Vlca and Vlcb of the sub-pixels are:

$$Vlca=Vs-Vd+Kc*Vad$$

$$Vlcb=Vs-Vd-Kc*Vad$$

Thus, the root-mean-square voltages V1 and V2 applied to the liquid crystal layers 13a and 13b of the sub-pixels 10a and 10b are:

$$V1=Vlca-Vcom$$

$$V2=Vlcb-Vcom$$

Hence, $$V1=Vs-Vd+Kc*Vad-Vcom$$

$$V2=Vs-Vd-Kc*Vad-Vcom$$

Therefore, difference ΔV12 (=V1−V2) between the root-mean-square voltages applied to the liquid crystal layers 13a and 13b of the sub-pixels 10a and 10b is given as ΔV12=2*Kc*Vad (where, Kc=CCS/(CLC (V)+CCS)). This means that mutually different voltages can be applied.

Figure 15:
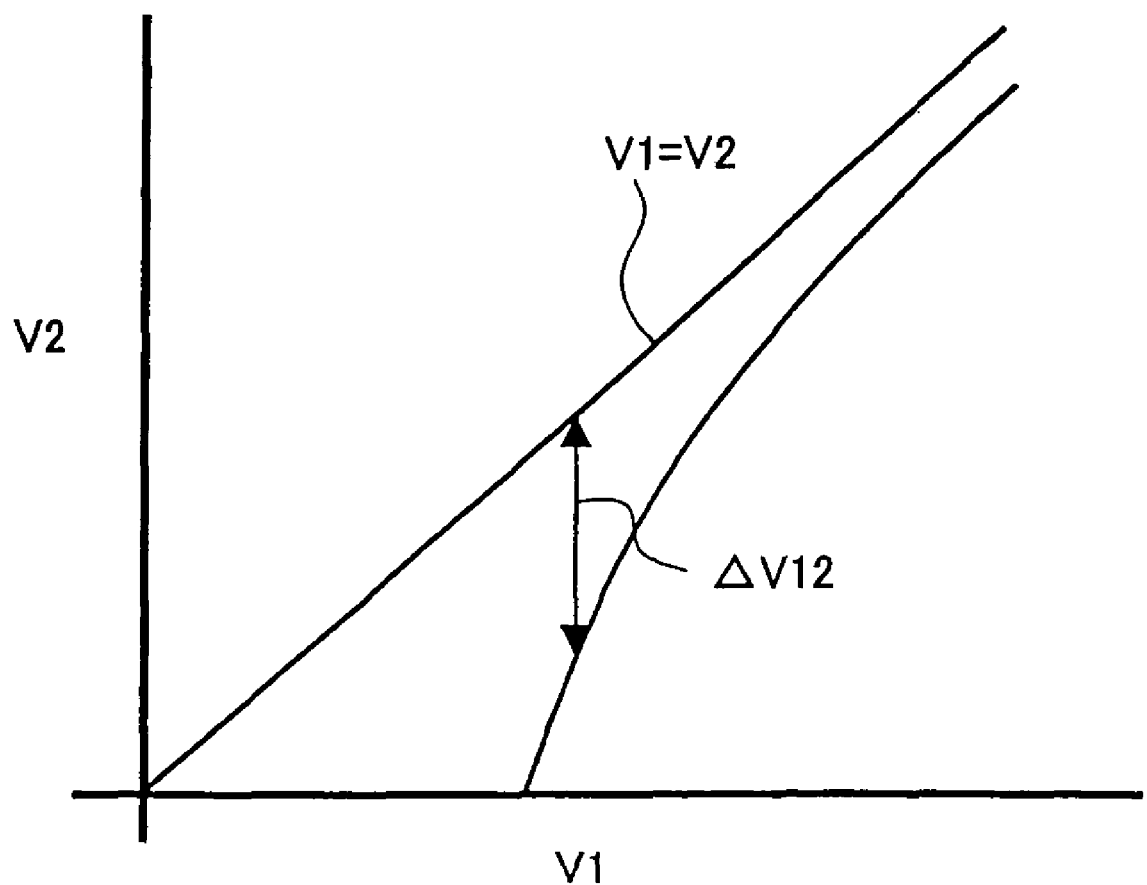
FIG. 15 is a diagram showing relationship between voltages applied to liquid crystal layers of sub-pixels in the liquid crystal display 200.

The relationship between V1 and V2 according to this embodiment shown in FIGS. 12 to 14 is shown schematically in FIG. 15.

As can be seen from FIG. 15, in the liquid crystal display 200 according to this embodiment, the smaller the value of V1, the larger the value of ΔV12. This is similar to the results obtained under the voltage condition C described above. The fact that the value of ΔV12 changes depending on V1 or V2 is attributable to voltage dependence of the capacitance value CLC (V) of the liquid crystal capacitor.

Figure 16B:
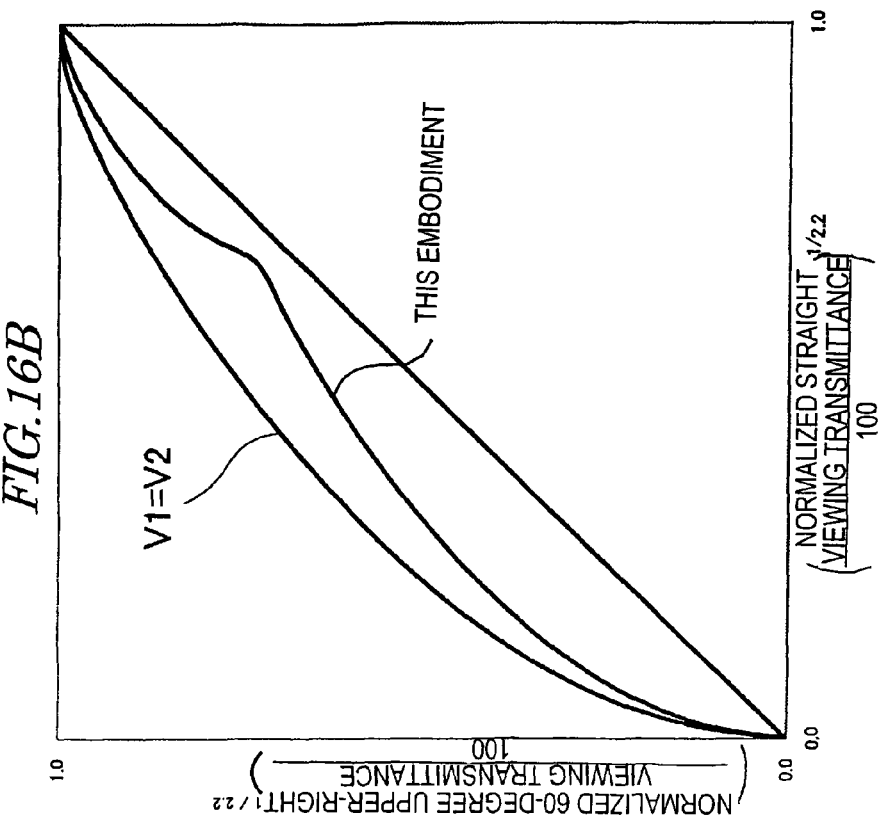
FIGS. 16A to 16B are diagrams showing γ characteristics of the liquid crystal display 200, where
Figure 16A:
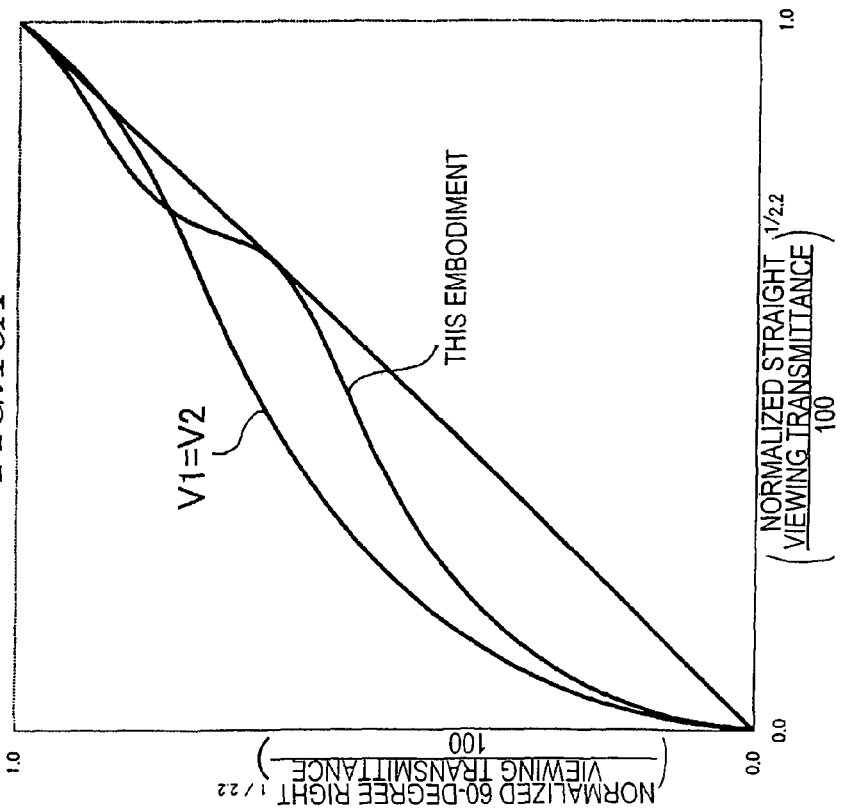

The γ characteristics of the liquid crystal display 200 according to this embodiment is shown in FIG. 16. The γ characteristics obtained when the same voltage is applied to the sub-pixels 10a and 10b are also shown in FIG. 16 for comparison. It can be seen from the figure that γ characteristics are improved also in the liquid crystal display according to this embodiment.

As described above, embodiments of the present invention can improve the γ characteristics of normally black liquid crystal displays, especially MVA liquid crystal displays. However, the present invention is not limited to this and can be applied to IPS liquid crystal displays as well.

Next, description will be given of liquid crystal displays according to embodiments in a second aspect of the present invention.

Description will be given of a preferred form of a pixel arrangement (array of sub-pixels) or drive method which can reduce "flickering" on a liquid crystal display where each pixel has at least two sub-pixels differing from each other in brightness when displaying an intermediate grayscale. Although configuration and operation of the liquid crystal display according to this embodiment will be described here taking as an example the liquid crystal display with the divided pixel structure according to the embodiment in the first aspect of the present invention, the effect produced by a pixel arrangement is not restricted by a method of pixel division, and a liquid crystal display with another divided-pixel structure may be used as well.

A problem of "flickering" on a liquid crystal display will be described first.

Typical liquid crystal displays are designed to use alternating voltage as the voltage applied to liquid crystal layers of pixels (sometimes referred to as an "ac driving method") from a reliability point of view. Magnitude relationship in potential between pixel electrode and counter electrode is reversed at certain time intervals, and consequently, direction of the electric field (electric lines of force) applied to each liquid crystal layer is reversed at the time intervals. With typical liquid crystal displays in which the counter electrode and pixel electrode are mounted on different substrates, the direction of the electric field applied to each liquid crystal layer is reversed from the light source-to-viewer direction to the viewer-to-light source direction.

Typically, the direction reversal cycle of the electric field applied to each liquid crystal layer is twice (e.g., 33.333 ms) the frame period (e.g., 16.667 ms). In other words, in a liquid crystal display, the direction of the electric field applied to each liquid crystal layer is reversed each time a displayed image (frame image) changes. Thus, when displaying a still image, if electric field strengths (applied voltages) in alternate directions do not match exactly, i.e., if the electric field strength changes each time the direction of the electric field changes, the brightness of pixels changes with changes in the electric field strength, resulting in flickering of the display.

To prevent flickering, it is necessary to equate the electric field strengths (applied voltages) in alternate directions exactly. However, with liquid crystal displays produced industrially, it is difficult to exactly equate the electric field strengths in alternate directions. Therefore, to reduce flickering, pixels with electric fields opposite in direction are placed next to each other, thereby averaging brightness of pixels spatially. Generally, this method is referred to as "dot inversion" or "line inversion". Various "inversion driving" methods are available, including inversion of a checkered pattern on a pixel by pixel basis (row-by-row, column-by-column polarity inversion: 1-dot inversion), line-by-line inversion (row-by-row inversion: 1-line inversion), and polarity inversion every two rows and every column. One of them is selected as required.

As described above, to implement high quality display, preferably the following three conditions are satisfied: (1) use ac driving so that the direction of the electric field applied to each liquid crystal layer is reversed at certain time-intervals, for example, every frame, period, (2) equate the voltages applied to each liquid crystal layer (or quantities of electric charge stored in the liquid crystal capacitor) in alternate field directions as well as quantities of electric charge stored in the storage capacitor, and (3) place pixels opposite in the direction of the electric field (sometimes referred to as "voltage polarity") applied to the liquid crystal layer, next to each other in each vertical scanning period (e.g., frame period). Incidentally, the term "vertical scanning period" can be defined as the period after a scan line is selected until the scan line is selected again. One scanning period is equivalent to one frame period in the case of non-interlaced driving and corresponds to one field period in the case of interlaced driving. Also, in each vertical scanning period, the difference (period) between the time when a scan line is selected and the time when the scan line is selected again is referred to as one horizontal scanning period (1 H).

The above-described embodiment of the present invention implements display with excellent viewing angle characteristics by dividing each pixel into at least two sub-pixels and making their brightness (transmittance) different from each other. The inventor found that when each pixel is divided into a plurality of sub-pixels which are intentionally made to vary in brightness, it is preferable that a fourth condition concerning sub-pixel arrangement is satisfied in addition to the three conditions described above. Specifically, it is preferable that the sub-pixels which are intentionally made to vary in brightness are placed in random order of brightness whenever possible. It is most preferable in terms of display quality not to place sub-pixels equal in brightness next to each other in the column or row direction. In other word, most preferably sub-pixels equal in brightness are arranged in a checkered pattern.

A drive method, pixel arrangement, and sub-pixel arrangement suitable for the above-described embodiment of the present invention will be described below. An example of a drive method for the liquid crystal display according to the embodiment of the present invention will be described with reference to FIGS. 17 and 18.

Description will be given below, citing an example in which pixels are arranged in a matrix (rp, cq) with a plurality of rows (1 to rp) and plurality of columns (1 to cq), where each pixel is expressed as P (p, q) (where 1≦p≦rp and 1≦q≦cq) and has at least two sub-pixels SPa (p, q) and SPb (p, q), as shown in FIG. 17. FIG. 17 is a schematic diagram partially showing a relative arrangement (8 rows×6 columns) of: signal lines S-C1, S-C2, S-C4, . . . , S-Ccq; scan lines G-L1, G-L2, G-L3, G-Lrp; storage capacitor lines CS-A and CS-B; pixels P (p, q); and sub-pixels SPa (p, q) and SPb (p, q) which compose the pixels, in the liquid crystal display according to this embodiment.

As shown in FIG. 17, one pixel P (p, q) has sub-pixels SPa (p, q) and SPb (p, q) on either side of the scan line G-Lp which runs through the pixel horizontally at approximately the center. The sub-pixels SPa (p, q) and SPb (p, q) are arranged in the column direction in each pixel. The storage capacitor electrodes (not shown) of the sub-pixels SPa (p, q) and SPb (p, q) are connected to adjacent storage capacitor lines CS-A and CS-B, respectively. The signal lines S-Ccq which supply signal voltages to the pixels P (p, q) according to the image displayed run vertically (in the column direction) between pixels to supply the signal voltages to TFT elements (not shown) of the sub-pixels on the right of the signal lines. According to the configuration shown in FIG. 17, one storage capacitor line or one scan line is shared by two sub-pixels. This has the advantage of increasing the opening rate of pixels.

Figure 18:
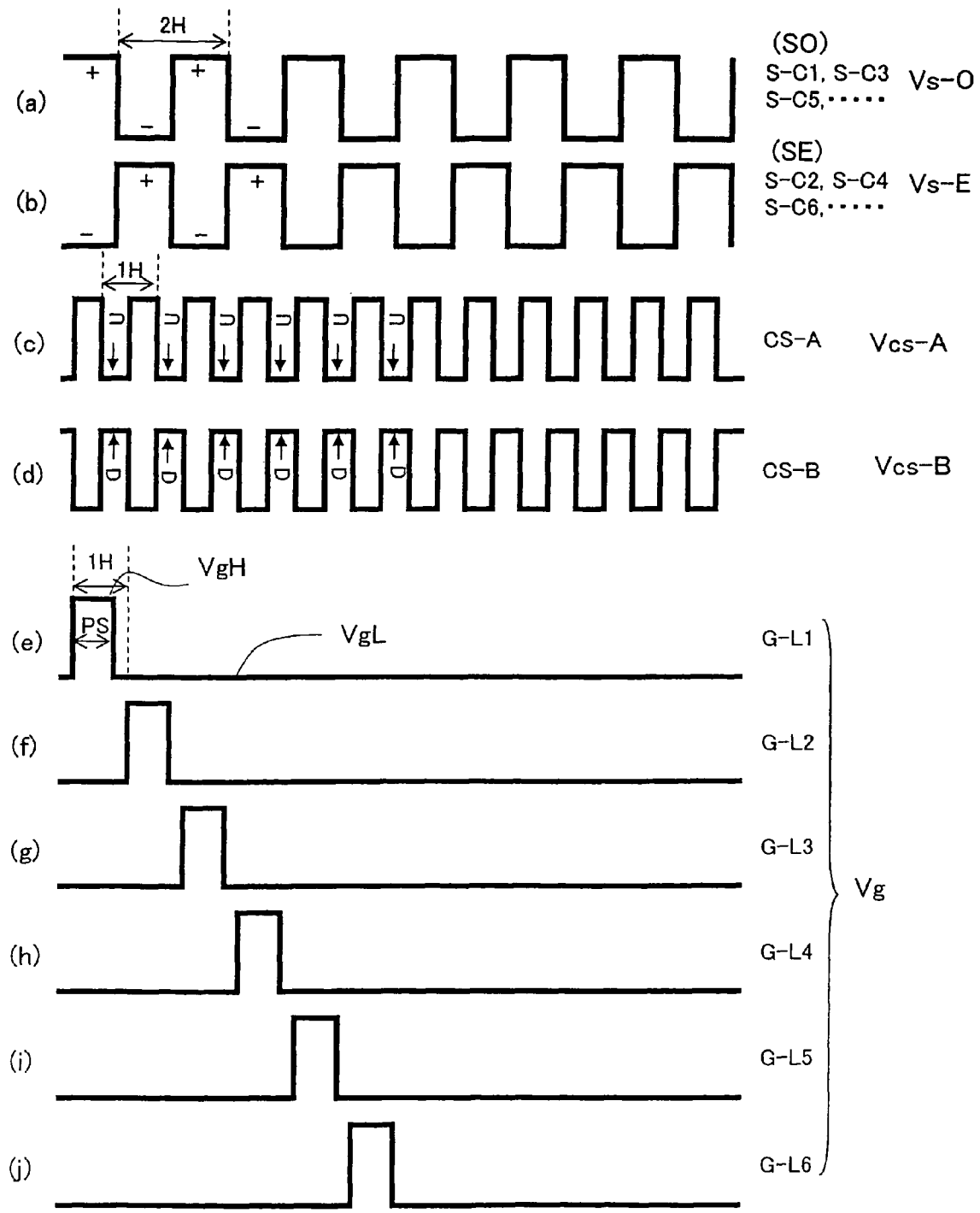
FIG. 18 is a diagram showing waveforms (a)-(j) of various voltages (signals) for driving the liquid crystal display which has the configuration shown in FIG. 17.

FIG. 18 shows the waveforms (a)-(j) of various voltages (signals) used to drive a liquid crystal display with the configuration shown in FIG. 17. By driving the liquid crystal display which has the configuration shown in FIG. 17 with voltages which have the voltage waveforms (a)-(j) shown FIG. 18, it is possible to satisfy the four conditions described above.

Next, description will be given of how the liquid crystal display according to this embodiment satisfies the four conditions described above. For the simplicity of explanation, it is assumed that all pixels are displaying an intermediate grayscale.

In FIG. 18, the waveform (a) is display signal voltage waveforms (source signal voltage waveforms) supplied to the signal lines S-C1, S-C3, S-C5, . . . (a group of odd-numbered signal lines are sometimes referred to as S-O); the waveform (b) is display signal voltage waveforms supplied to the signal lines S-C2, S-C4, S-C6, . . . (a group of even-numbered signal lines are sometimes referred to as S-E); the waveform (c) is a storage capacitor counter voltage waveform supplied to the storage capacitor line CS-A; the waveform (d) is a storage capacitor counter voltage waveform supplied to CS-B; the waveform (e) is a scan voltage waveform supplied to the scan line G-L1; the waveform (f) is a scan voltage waveform supplied to the scan line G-L2; the waveform (g) is a scan voltage waveform supplied to the scan line G-L3; the waveform (h) is a scan voltage waveform supplied to the scan line G-L4; the waveform (i) is a scan voltage waveform supplied to the scan line G-L5; and the waveform (j) is a scan voltage waveform supplied to the scan line G-L6. The period between the time when the voltage of a scan line changes from a low level (VgL) to a high level (VgH) and the time when the voltage of the next scan line changes from VgL to VgH constitutes one horizontal scanning period (1 H). The period during which the voltage of a scan line remains at a high level (VgH) is sometimes referred to as a selection period. PS.

Since all pixels are displaying an intermediate grayscale, all display signal voltages (waveforms (a) and (b) in FIG. 18) have oscillating waveforms of fixed amplitude. Also, the oscillation period of the display signal voltages is two horizontal scanning periods (2 H). The reason why the display signal voltages are oscillating and the voltage waveforms of the signal lines S-O (S-C1, S-C3, . . . ) and voltage waveforms of the signal lines S-E (S-C2, S-C4, . . . ) are 180 degrees out of phase is to satisfy the third condition above. Generally, in TFT driving, signal line voltages transmitted to a pixel electrode via TFT elements are affected by changes in scan voltage waveforms (sometimes called a drawing phenomenon). Considering the drawing phenomenon, the counter voltage is positioned approximately at the center of the signal line voltage waveform after the latter is transmitted to the pixel electrode. In FIG. 18, where the pixel electrode voltage waveform is higher than counter voltage, the signal voltage is indicated by a "+" sign and where the pixel electrode voltage waveform is lower than counter voltage, the signal voltage is indicated by a "−" sign. The "+" and "−" signs correspond to the directions of the electric field applied to the liquid crystal layers. The directions of the electric field are opposite between when the sign is "+" and when it is "−".

As described above with reference to FIGS. 12 to 15, when the scan voltage of a scan line is VgH, the TFT connected to the scan line is turned on, causing the display signal voltage to be supplied to the sub-pixel connected to the TFT. Then, when the scan voltage of the scan line becomes VgL, the storage capacitor counter voltage changes. Since the changes (including the direction and sign of the changes) of the storage capacitor counter voltage differ between the two sub-pixels, so do the root-mean-square voltages applied to the sub-pixels.

In the example shown in FIG. 18, both oscillation amplitudes and periods of the storage capacitor counter voltages (waveforms (c) and (d)) take the same values between the storage capacitor lines CS-A and CS-B: for example, twice Vad (see FIG. 14) and 1 H, respectively. Also, the oscillating waveforms of CS-A and CS-B will overlap if one of them is phase-shifted 180 degrees. That is, they are 0.5 H out of phase with each other. An average voltage of each sub-pixel electrode is higher than the display signal voltage of the corresponding signal line existing during the period when the corresponding scan line is in VgH state if the first voltage change of the corresponding storage capacitor line after the voltage of the corresponding scan line changes from VgH to VgL is an increase, but it is lower than the display signal voltage of the corresponding signal line existing during the period when the corresponding scan line is in VgH state if the first voltage change of the corresponding storage capacitor line is a decrease.

Consequently, if the display signal voltage (waveform (a) or (b)) in FIG. 18 is marked by a "+" sign, the root-mean-square voltage applied to the liquid crystal layer is higher when the voltage change of the storage capacitor line is on the rise than when it is on the decline. On the other hand, if the display signal voltage (waveform (a) or (b)) in FIG. 18 is marked by a "−" sign, the root-mean-square voltage applied to the liquid crystal layer is lower when the voltage change of the storage capacitor line is on the rise than when it is on the decline.

FIG. 17 shows states of the pixels P (p, q) and sub-pixels SPa (p, q) and SPb (p, q) in a vertical scanning period (frame period, in this example). The following three symbols shown symmetrically with respect to the scan line of each sub-pixel indicate states of the sub-pixel.

The first symbol H or L indicates the magnitude relationship of the root-mean-square voltage applied to the sub-pixel, where the symbol H means that the applied root-mean-square voltage is high while the symbol L means that the applied root-mean-square voltage is low. The second symbol "+" or "−" indicates the magnitude relationship of voltages between the counter electrode and sub-pixel electrode. In other words, it indicates the directions of the electric field applied to the liquid crystal layer. The symbol "+" means that the voltage of the sub-pixel electrode is higher than the voltage of the counter electrode while the symbol "−" means the voltage of the sub-pixel electrode is lower than the voltage of the counter electrode. The third symbol A or B indicates whether the appropriate storage capacitor line is CS-A or CS-B.

Look at the states of sub-pixels SPa (1, 1) and SPb (1, 1) of the pixel P (1, 1), for example. As can be seen from the waveforms (a) to (e) shown in FIG. 18, during the period when GL-1 is selected (period PS in which the scan voltage is VgH), the display signal voltage is "+". When the scan voltage of GL-1 changes from VgH to VgL, the voltages of the storage capacitor lines of respective sub-pixels (waveforms (c) and (d)) are in the states indicated by the arrows (the first arrows from the left) shown in FIG. 18. Thus, after the scan voltage of GL-1 changes from VgH to VgL, the first voltage change of the storage capacitor counter voltage of SPa (1, 1) is an increase (indicated by "U" in the waveform (c)) as shown in FIG. 18. On the other hand, after the scan voltage of GL-1 changes from VgH to VgL, the first voltage change of the storage capacitor counter voltage of SPb (1, 1) is a decrease (indicated by "D" in the waveform (d)) as shown in FIG. 18. Therefore, the root-mean-square voltage of SPa (1, 1) increases while the root-mean-square voltage of SPb (1, 1) decreases. Hence, the applied root-mean-square voltage of SPa (1, 1) is higher than that of SPb (1, 1), and a symbol H is attached to SPa (1, 1) and a symbol L is attached to SPb (1, 1).

According to the waveform (b) shown in FIG. 18, during the period when GL-1 is selected, the display signal voltages for SPa (1, 2) and SPb (1, 2) of P (1, 2) is "−". When the scan voltage of GL-1 changes from VgH to VgL, the voltages of the storage capacitor lines of respective sub-pixels (waveforms (c) and (d)) are in the states indicated by the arrows (the first arrows from the left) shown in FIG. 18. Thus, after the scan voltage of GL-1 changes from VgH to VgL, the first voltage change of the storage capacitor counter voltage of SPa (1, 2) is an increase ("U") as shown in FIG. 18. On the other hand, after the scan voltage of GL-1 changes from VgH to VgL, the first voltage change of the storage capacitor counter voltage of SPb (1, 2) is a decrease ("D") as shown in FIG. 18. Therefore, the root-mean-square voltage of SPa (1, 2) decreases while the root-mean-square voltage of SPb (1, 2) increases. Hence, the applied root-mean-square voltage of SPa (1, 2) is lower than that of SPb (1, 2), and a symbol. L is attached to SPa (1, 2) and a symbol H is attached to SPb (1, 2).

According to the waveform (a) shown in FIG. 18, during the period when GL-2 is selected, the display signal voltages for (2, 1) and SPb (2, 1) of P (2, 1) is "−". When the scan voltage of GL-2 changes from VgH to VgL, the voltages of the storage capacitor lines of respective sub-pixels (waveforms (c) and (d)) are in the states indicated by the arrows (the second arrows from the left) shown in FIG. 18. Thus, after the scan voltage of GL-2 changes from VgH to VgL, the first voltage change of the storage capacitor counter voltage of SPa (2, 1) is a decrease ("D") as shown in FIG. 18D. On the other hand, after the scan voltage of GL-2 changes from VgH to VgL, the first voltage change of the storage capacitor counter voltage of SPb (2, 1) is an increase ("U") as shown in FIG. 18C. Therefore, the root-mean-square voltage of SPa (2, 1) increases while the root-mean-square voltage of SPb (2, 1) decreases. Hence, the applied root-mean-square voltage of SPa (2, 1) is higher than that of SPb (2, 1), and a symbol H is attached to SPa (2, 1) and a symbol L is attached to SPb (2, 1). The states shown in FIG. 17 are brought about in this way.

The liquid crystal display according to this embodiment can be driven in such a way as to satisfy the first condition.

Since FIGS. 17 and 18 show states in a frame period, it is not possible to assess from the figures whether the first condition is satisfied. However, by shifting the phase of the voltage waveform on each signal line (S-O (FIG. 18A) or SHE (FIG. 18B)) by 180 degrees from frame to frame, for example, in FIG. 18, it is possible to implement ac driving where the direction of the electric field applied to each liquid crystal layer is reversed every frame period.

Furthermore, in the liquid crystal display according to this embodiment, to prevent the magnitude relationship of the sub-pixels of the pixels, i.e., the order, of brightness of the sub-pixels in a display screen (relative positions of "H" and "L" in FIG. 17) from being changed from frame to frame, the phase of the voltage waveforms on the storage capacitor lines CS-A and CS-LB is changed by 180 degrees as the phase of the voltage waveforms on the signal lines is changed. Consequently, the "+" signs and "−" signs shown in FIG. 17 are inverted in the next frame (for example, (+, H)⇔(−, H), and (+, L)⇔(−, L). The first condition described above can be satisfied in this way.

Now, we will examine whether the second condition is satisfied, i.e., whether the liquid crystal layer of each sub-pixel (storage capacitor of the sub-pixel) is charged to the same level in different field directions. In the liquid crystal display according to this embodiment, where different root-mean-square voltages are applied to the liquid crystal layers of the sub-pixels in each pixel, display quality such as flickering is decisively influenced by sub-pixels ranked high in brightness, i.e., the sub-pixels indicated by the symbol "H" in FIG. 17. Thus, the second condition is imposed especially on the sub-pixels indicated by the symbol "H".

The second condition will be described with reference to voltage waveforms shown in FIG. 18.

The liquid crystal capacitor and storage capacitor of sub-pixels are charged during the period when the voltage of the corresponding scan line is VgH (selection period PS). The quantity of electric charge stored in the liquid crystal capacitor depends on the voltage difference between the display signal voltage of the signal line and counter voltage (not shown in FIG. 18) during the selection period while the quantity of electric charge stored in the storage capacitor depends on the voltage difference between the display signal voltage of the signal line and voltage of the storage capacitor line (storage capacitor counter voltage) during the selection period.

As shown in FIG. 18, the display signal voltage in each selection period can be one of the two types indicated by the "+" or "−" sign in the figures. In either case, there is no voltage change during each selection period. Regarding the counter voltage (not shown), the same DC voltage which does not vary with time is applied to all the sub-pixels.

There are two types of storage capacitor line CS-A, and CS-B. The voltage waveform of CS-A is the same during the selection period of any scan line. Similarly, the voltage waveform of CS-B is the same during the selection period of any scan line. In other words, the DC component (DC level) of the voltage of the storage capacitor lines takes the same value during the selection period of any scan line.

Thus, it is possible to satisfy the second condition by adjusting the DC components (DC levels) of the following voltages as required: display signal voltage of each scan line, voltage of the counter electrode, and voltage of each storage capacitor line.

Next, we will verify whether the third condition is satisfied, i.e., whether pixels opposite in field direction are placed next to each other in each frame period. In the liquid crystal display according to this embodiment, where different root-mean-square voltages are applied to the liquid crystal layers of sub-pixels in each pixel, the third condition applies to the relationship between the sub-pixels which are supplied with the same root-mean-square voltage as well as to the pixels. It is especially important that the third condition be satisfied by the sub-pixels ranked high in brightness, i.e., the sub-pixels indicated by the symbol "H" in FIG. 17, as is the case with the second condition.

As shown in FIG. 17, the "+" and "−" symbols which indicate the polarities (directions of the electric field) of each pixel invert every two pixels (two columns) in the row direction (horizontal direction) such as (+, −), (+, −), (+, −), and every two pixels (two rows) in the column direction (vertical=direction) such as (+, −), (+, −), (+, −), (+, −). Viewed on a pixel-by-pixel basis, they exhibit a state called dot inversion, satisfying the third condition.

Next, we will look at the sub-pixels ranked high in brightness, i.e., the sub-pixels indicated by the symbol "H" in FIG. 17.

Referring to FIG. 17, there is no polarity inversion in the row direction as shown, for example, by +H, +H, +H for the sub-pixels SPa in the first row, but the polarity is inverted every two pixels (two rows) in the column direction as shown, for example, by (+H, −H), (+H, −H), (+H, −H), (+H, −H) in the first column. The state known as line inversion can be observed at the level of the particularly important sub-pixels ranked high in brightness, which means that they satisfy the third condition. The sub-pixels indicated by the symbol L are also arranged in a regular pattern, satisfying the third condition.

Next, we will discuss the fourth condition. The fourth condition requires that sub-pixels equal in brightness should not be placed next to each other among the sub-pixels which are intentionally made to vary in brightness.

According to this embodiment, the sub-pixels which are intentionally made to vary in brightness, i.e., the sub-pixels which have different root-mean-square voltages applied to their liquid crystal layers intentionally are indicated by the symbol "H" or "L" in FIG. 17.

In FIG. 17, if sub-pixels are organized into groups of four consisting of two sub-pixels in the row direction and two sub-pixels in the column direction (e.g., SPa (1, 1), SPb (1, 1), SPa (1, 2), and SPb (1, 2)), the entire matrix is made up of the sub-pixel groups in each of which H and L are arranged from left to right in the upper row and L and H are arranged in the lower row. Thus, in FIG. 17; the symbols "H" and "L" are arranged in a checkered pattern at the sub-pixel level, satisfying the fourth condition.

Looking at the matrix, at the pixel level, the correspondence between the order of brightness of the sub-pixels in each pixel and position of the sub-pixels arranged in the column direction changes in the row direction periodically (every pixel) in the case of a pixel in an arbitrary row, but it is constant in the case of a pixel in an arbitrary column. Thus, in a pixel P (p, q) in an arbitrary row, the brightest sub-pixel (sub-pixel indicated by "H," in this example) is SPa (p, q) when q is an odd number, and SPb (p, q) when q is an even number. Of course, conversely, the brightest sub-pixel may be SPb (p, q) when q is an odd number, and SPa (p, q) when q is an even number. On the other hand, in a pixel P (p, q) in an arbitrary column, the brightest sub-pixel is always SPa (p, q) or SPb (p, q) in the same column regardless of whether p is an odd number or even number. The alternative of SPa (p, q) or SPb (p, q) here means that the brightest sub-pixel is SPa (p, q) in an odd-numbered column regardless of whether p is an odd number or even number while it is SPb (p, q) in an even-numbered column regardless of whether p is an odd number or even number.

As described above with reference to FIGS. 17 and 18, the liquid crystal display according to this embodiment satisfies the four conditions described above, and thus it can implement high quality display.

Figure 19:
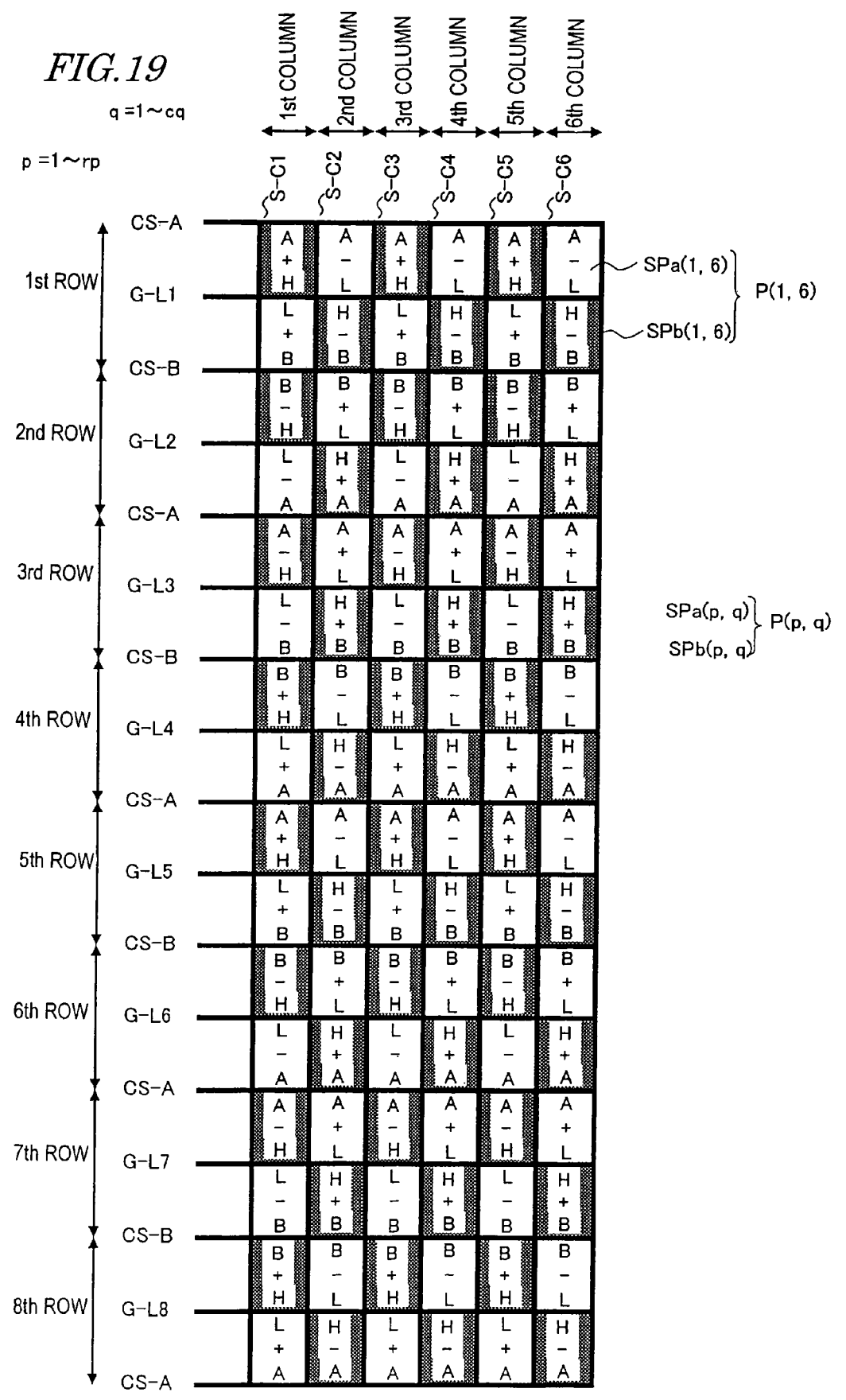
Figure 20:
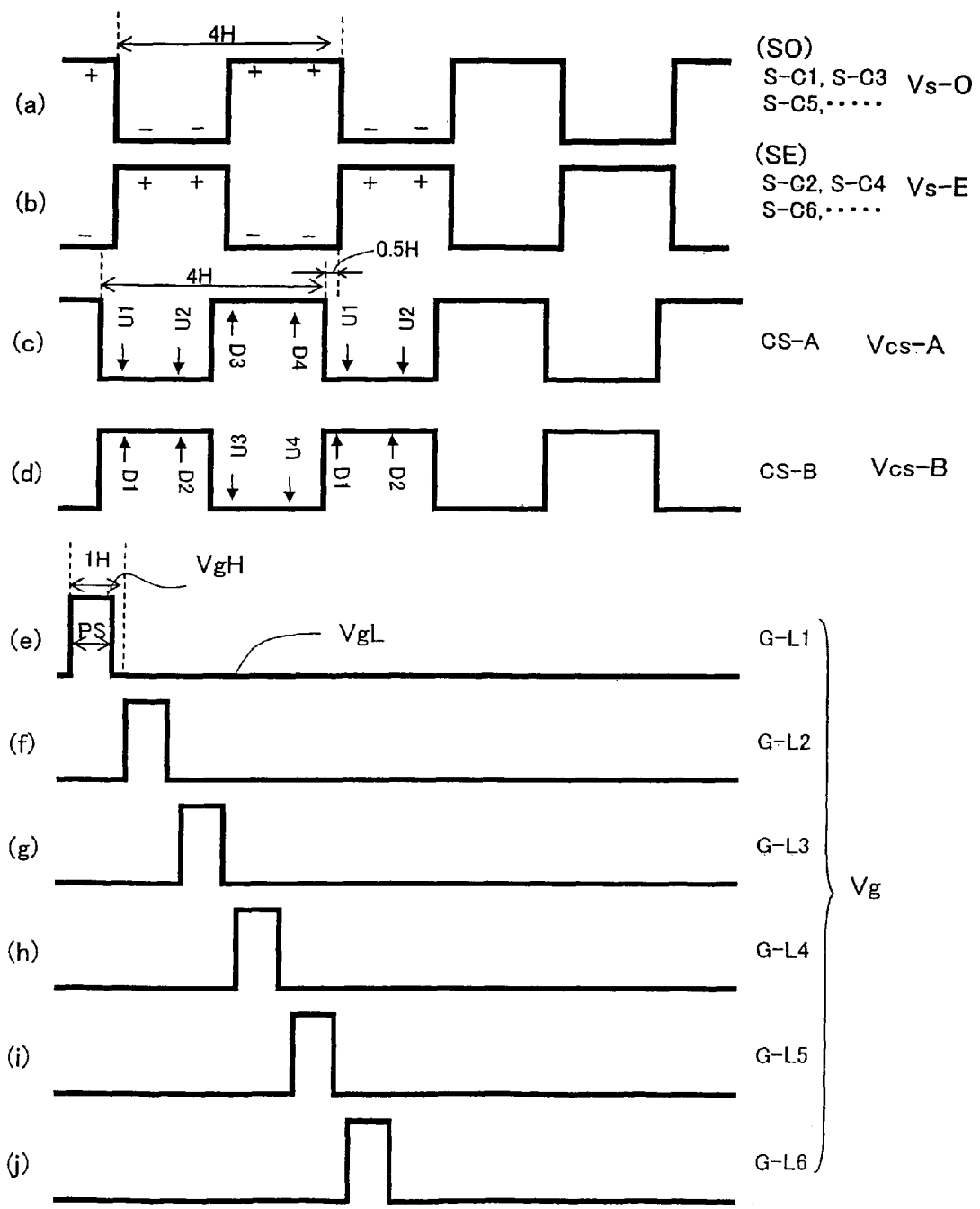
FIG. 20 is a diagram showing waveforms (a)-(j) of various voltages (signals) for driving the liquid crystal display which has the configuration shown in FIG. 19.

Next, a liquid crystal display according to another embodiment using a different drive method for pixels and sub-pixels will be described with reference to FIGS. 19 and 20. FIG. 19 and FIG. 20 correspond to FIG. 17 and FIG. 18.

As shown in FIG. 20, in the liquid crystal display according to this embodiment, display signal voltage and storage capacitor counter voltage oscillate every 2 H. Thus the period of oscillation is 4 H (four horizontal write, times). The oscillations of the signal voltages of odd-numbered signal lines S-O (S-C1, S-C3, S-C5, ...) and even-numbered signal lines S-E (S-C2, S-C4, S-C6, ...) are 180 degrees (2 H in terms of time) out of phase with each other. The oscillations of the voltages of the storage capacitor lines CS-A and CS-B are also 180 degrees (2 H in terms of time) out of phase with each other. Furthermore, the oscillation of the voltage of the signal lines lags the oscillation of the voltage of the storage capacitor line CS-A by a phase difference of 45 degrees (⅛ period, i.e., H/2). Incidentally, the phase difference of 45 degrees is used to prevent the VgH-to-VgL voltage change of the scan line and the voltage change of the storage capacitor line from overlapping, and the value used here is not restrictive and another value may be used as required.

With the liquid crystal display according to this embodiment, again every pixel consists of two sub-pixels which are intentionally made to vary in brightness and are indicated by the symbol "H" or "L". Furthermore, as shown in FIG. 19, the sub-pixels indicated by the symbol "H" or "L" are arranged in a checkered pattern, which means that the fourth condition is satisfied, as with the above embodiment. Regarding the first condition, it can be satisfied using the same inversion method as the one used by the embodiment described with reference to FIGS. 17 and 18.

However, the embodiment shown in FIGS. 19 and 20 cannot satisfy the second condition described above.

Now, we will look at the brighter sub-pixels Pa (1, 1), Pa (2, 1), Pa (3, 1), and Pa (4, 1) of the pixels P (1, 1), P (2, 1), P (3, 1), and P (4, 1) shown in the first to fourth rows of the first column in FIG. 19. When Pa (1, 1) is being charged, i.e., when G-L1 is selected, the polarity symbol of the corresponding signal line is "+". When Pa (3, 1) is being charged, i.e., when G-L3 is selected, the polarity symbol of the corresponding signal line is "−". Also, when Pa (1, 1) is being charged, i.e., when G-L1 is selected, the voltage waveform of the corresponding storage capacitor line CS-A decreases stepwise beginning at approximately the center of the selection period. When Pa (3, 1) is being charged, i.e., when G-L3 is selected, the voltage waveform of the corresponding storage capacitor line CS-A increases stepwise beginning at approximately the center of the selection period. Thus, by controlling the phases of the signal voltage waveforms of both storage capacitor line CS-B and scan line precisely, it is possible to make the storage capacitor counter electrode have the same DC level both when Pa (1, 1) is being charged and when Pa (3, 1) is being charged. By setting the DC level to the average between the voltage (equal to the voltage of the sub-pixel electrode) of the storage capacitor counter electrode when Pa (1, 1) is being charged and the voltage (equal to the voltage of the sub-pixel electrode) of the storage capacitor counter electrode when Pa (3, 1) is being charged, it is possible to equate the quantities of electric charge stored in the storage capacitors of Pa (1, 1) and Pa (3, 1). Next, looking at Pa (2, 1), during the corresponding period, i.e., when G-L2 is selected, the polarity symbol of the corresponding signal line is "−" (the same as with Pa (3, 1) described above) and the voltage of the corresponding storage capacitor line takes a fixed value (not an oscillating waveform such as those above) regardless of time. Thus, by equating the voltage value of the storage capacitor line corresponding to Pa (2, 1) and the DC level described above in relation to Pa (1, 1) and Pa (3, 1), it is possible to equate the quantities of electric charge stored in the storage capacitors of Pa (1, 1), Pa (3, 1), and Pa (2, 1). However, it is impossible to equate the quantities of electric charge stored in the storage capacitor Pa (4, 1) with those in the storage capacitors of Pa (1, 1), Pa (2, 1), and Pa (3, 1) for the following reason. The polarity symbol of the signal line for Pa (4, 1) is the same as that for Pa (1, 1) and the voltage of the corresponding storage capacitor line takes a fixed value (not an oscillating waveform such as those above) regardless of time. Thus, it is necessary to equate the voltage value (the fixed value described above) of the storage capacitor line for Pa (4, 1) with the DC level described above in relation to Pa (1, 1) and Pa (3, 1), as in the case of Pa (2, 1), i.e., to equate the voltage value (the fixed value described above) of the storage capacitor line for Pa (4, 1) with that for Pa (2, 1). However, this is not possible because, as can be seen from FIGS. 19 and 20, both the storage capacitor lines for Pa (2, 1) and Pa (4, 1) are CS-B, which has a rectangular oscillating waveform, and the maximum value of the oscillating waveform is selected during the selection period of Pa (2, 1) while the minimum value of the oscillating waveform is selected during the selection period of Pa (4, 1), making the two voltages necessarily different.

Also, in terms of the third condition to arrange the sub-pixels with the same polarity so as not to adjoin each other as much as possible, this embodiment is inferior to the embodiment described with reference to FIGS. 17 and 18.

Referring to FIG. 19, we will look at the polarity inversion of the sub-pixels which have a large voltage applied to their liquid crystal layers intentionally, i.e., the sub-pixels indicated by the symbol H, out of the sub-pixels composing pixels. In FIG. 19, there is no polarity inversion in the row direction as shown, for example, by +H, +H, +H for the sub-pixels SPa in the first row (as with FIG. 17), but the polarity is inverted every four pixels in the column direction as shown, for example, by (+H, −H, −H, +H), (+H, −H, −H, +H) in the first column. In the embodiment described with reference to FIGS. 17 and 18, polarity inversion occurs every two pixels, ½ the polarity inversion cycle of this embodiment. In other words, in the embodiment described with reference to FIGS. 17 and 18, polarity inversion occurs twice as frequently as in this embodiment described with reference to FIGS. 19 and 20. In this respect, this embodiment (described with reference to FIGS. 19 and 20) is inferior to the embodiment described with reference to FIGS. 17 and 18.

Display quality was actually compared between the drive method of the previous embodiment which implements the pixel arrangement shown in FIG. 17 and the drive method of this embodiment and differences were observed in the display quality. Specifically, when, for example, a $^{64}/_{255}$-grayscale display which produces relatively large brightness differences among sub-pixels which were intentionally made to vary in brightness was observed with the line of sight fixed, no significant difference was observed between the two drive methods. However, when the display was observed by moving the line of sight, horizontal streaks were observed in the case of the drive method of this embodiment (FIG. 19) whereas the drive method of the previous embodiment (FIG. 17) was free of such a problem. It is believed that the difference was caused by the difference in the polarity inversion cycle described above. Since the brighter of the two sub-pixels contained in each pixel is more conspicuous, it is preferable to minimize the polarity inversion cycle of the brighter sub-pixel. Each pixel is divided into two sub-pixels in the example described above, but if it is divided into three or more sub-pixels, it is preferable to arrange them in such a way as to minimize the polarity inversion cycle of the brightest sub-pixel. Needless to say, it is most preferable that all the other sub-pixels have the same polarity inversion cycle as the brightest sub-pixel.

Next, with reference to FIGS. 21A and 21B, description will be given of an embodiment which makes the above-described horizontal streaks more inconspicuous using a shorter polarity inversion cycle than the embodiment shown in FIG. 17 even if the display is observed by moving the line of sight.

According to the embodiment shown in FIG. 17, although the "+" and "−" signs of the brighter sub-pixels (indicated by the symbol "H") composing pixels are inverted in the column direction as shown by (+, −), (+, −), (+, −), (+, −), they are not inverted in the row direction as shown by +, +, +, +, +, + or −, −, −, −, −, −. In contrast, according to the embodiment shown in FIG. 21, the "+" and "−" signs of the brighter sub-pixels are inverted not only in the column direction as shown by (+, −), (+, −), (+, −), (+, −), but also in the row direction as shown by (+, −), (+, −). Thus, this embodiment shown in FIG. 20 uses a shorter polarity inversion cycle than the embodiment shown in FIG. 17. In this respect, this embodiment shown in FIG. 20 is more preferable than the embodiment shown in FIG. 17.

Even in the embodiment shown in FIG. 21, out of the sub-pixels composing the pixels, the brighter sub-pixels indicated by the symbol "H" are arranged in a checkered pattern, satisfying the fourth condition.

The pixel arrangement shown in FIG. 21A can be implemented, for example, as follows.

Figures 21A, 21B:
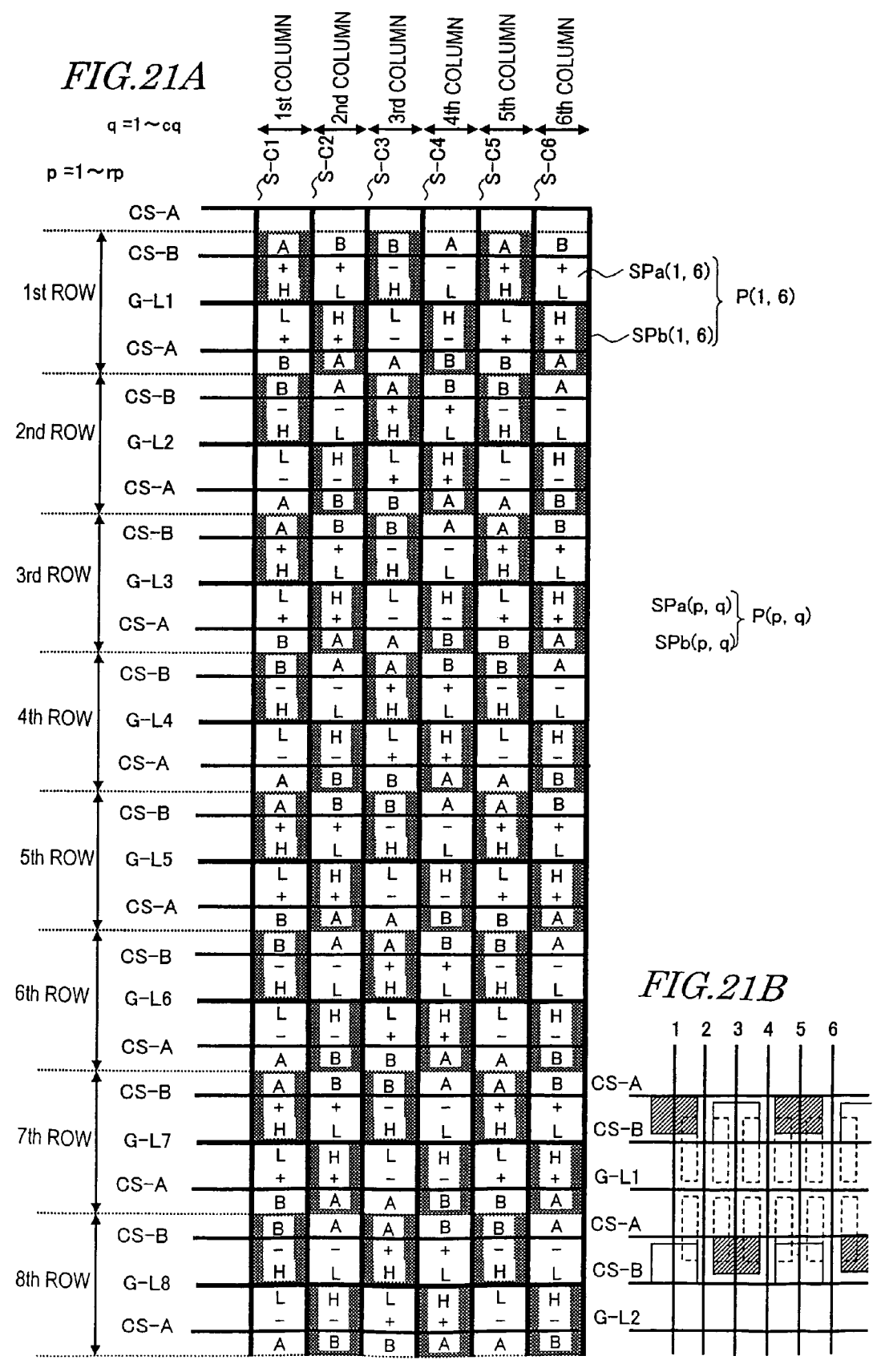

As shown schematically in FIG. 21B, the storage capacitor counter electrodes for the sub-pixels in each row are connected alternately to the storage capacitor line CS-A or CS-B every two columns. This structural change can be seen clearly by comparing FIG. 21 for this embodiment and FIG. 17 or 18 for the embodiment described earlier. Specifically, this can be seen by looking at the storage capacitor lines selected at the sub-pixel in the row direction. For example, in the row of sub-pixels SPa (1, 1) to SPa (1, 6), out of the storage capacitor counter electrodes indicated by the symbol "A" or "B," "A" is selected for SPa (1, 1), "B" for SPa (1, 2) and SPa (1, 2), "A" for SPa (1, 4) and SPa (1, 5), and "B" for SPa (1, 6) in FIG. 21 (this embodiment) whereas "A" is selected for all the sub-pixels SPa (1, 1) to SPa (1, 6) in FIG. 17 or 18 (the embodiment described earlier).

The voltage waveforms (a)-(j) shown in FIG. 18 can be used as the voltage waveforms supplied to the lines, including the storage capacitor lines CS-A and CS-B, according to this embodiment shown in FIG. 21. However, since display signal voltages are inverted every two columns, the display signal voltages having the waveform (a) shown in FIG. 18 are supplied to S-C1, S-C2, S-C5, S-C6, ... shown in FIG. 21A, while the display signal voltages having the waveform (b) shown in FIG. 20 are supplied to S-C3, S-C4, S-C7 (not shown), S-C8 (not shown), ... in FIG. 21A.

Although in the embodiments described above, the storage capacitor counter voltages supplied to the storage capacitor lines are oscillating voltages which have rectangular waveforms with a duty ratio of 1:1, the present invention can also use rectangular waves with a duty ratio of other than 1:1. Besides other waveforms such as sine waves or triangular waves may also be used. In that case, when TFTs connected to a plurality of sub-pixels are turned off, the changes which occur in the voltages supplied to the storage capacitor counter-electrodes of sub-pixels can be varied depending on the sub-pixels. However, the use of rectangular waves makes it easy to equate quantities of electric charge stored in different sub-pixels (liquid crystal capacitors and storage capacitors) as well as root-mean-square voltages applied to different sub-pixels.

Also, although in the embodiments described above with reference to FIGS. 17 and 21, the oscillation period of the oscillating voltages supplied to the storage capacitor lines (waveforms (c) and (d)) are 1 H as shown in FIG. 18, it may be a fraction of 1 H, such as ¹⁄₁ H, ½ H, ⅓ H, ¼ H, etc., obtained by dividing 1 H by a natural number. However, as the oscillation period of the oscillating voltages becomes shorter, it becomes difficult to build drive circuits or power consumption of the drive circuits increases.

Next, description will be given of an embodiment of a third aspect of the present invention.

The embodiment of the third aspect of the present invention relates to a large or high-resolution liquid crystal display and its drive method which improve viewing angle characteristics, especially, display contrast by dividing each pixel into a plurality of sub-pixels differing in brightness.

As described above, the embodiment of the first aspect of the present invention is a liquid crystal display or a drive method which can improve viewing angle characteristics, especially, display contrast by dividing each pixel into a plurality of sub-pixels differing in brightness. This type of display and driving is referred to herein as multi-pixel display, multi-pixel driving, area ratio gray scale display, or area ratio gray scale driving. Also, the embodiment of the second aspect of the present invention is a liquid crystal display or its drive method equipped with a sub-pixel array which can reduce "flickering" of the display and is combined suitably with the embodiment according to the first aspect.

In the liquid crystal display according to the embodiment of the second aspect of the present invention, the oscillating voltages (storage capacitor counter voltages) applied to CS buslines (storage capacitor lines) have periods of oscillation equal to or shorter than one horizontal scanning period. If oscillating voltages with a short period of oscillation are applied to CS buslines in this way, increases in resolution and size of the display panel and the resulting short periods of oscillation of the oscillating voltages will make oscillating voltage generator circuits difficult (expensive) to build, increase power consumption, or increase the impact of waveform blunting resulting from electrical load impedance of the CS buslines.

To describe the liquid crystal display according to the embodiment of the third aspect of the present invention in comparison with the liquid crystal display according to the embodiment of the second aspect, concrete configuration and operation of the liquid crystal display according to the embodiment of the second aspect of the present invention will be described here again. Below is an example in which the area ratio gray scale display described above is achieved by setting the periods of oscillation of the oscillating voltages of CS buslines to one horizontal scanning period. The description will be focused on the following three points and provided with reference to drawings. The first point concerns configuration of a liquid crystal display, centering around connection patterns between the storage capacitor counter electrodes of the storage capacitors connected to sub-pixels and CS buslines. Second point concerns the periods and phases of oscillation of CS buslines in terms of voltage waveforms of gate buslines. Third point concerns driving and display states of sub-pixels.

Figures 1, 22:
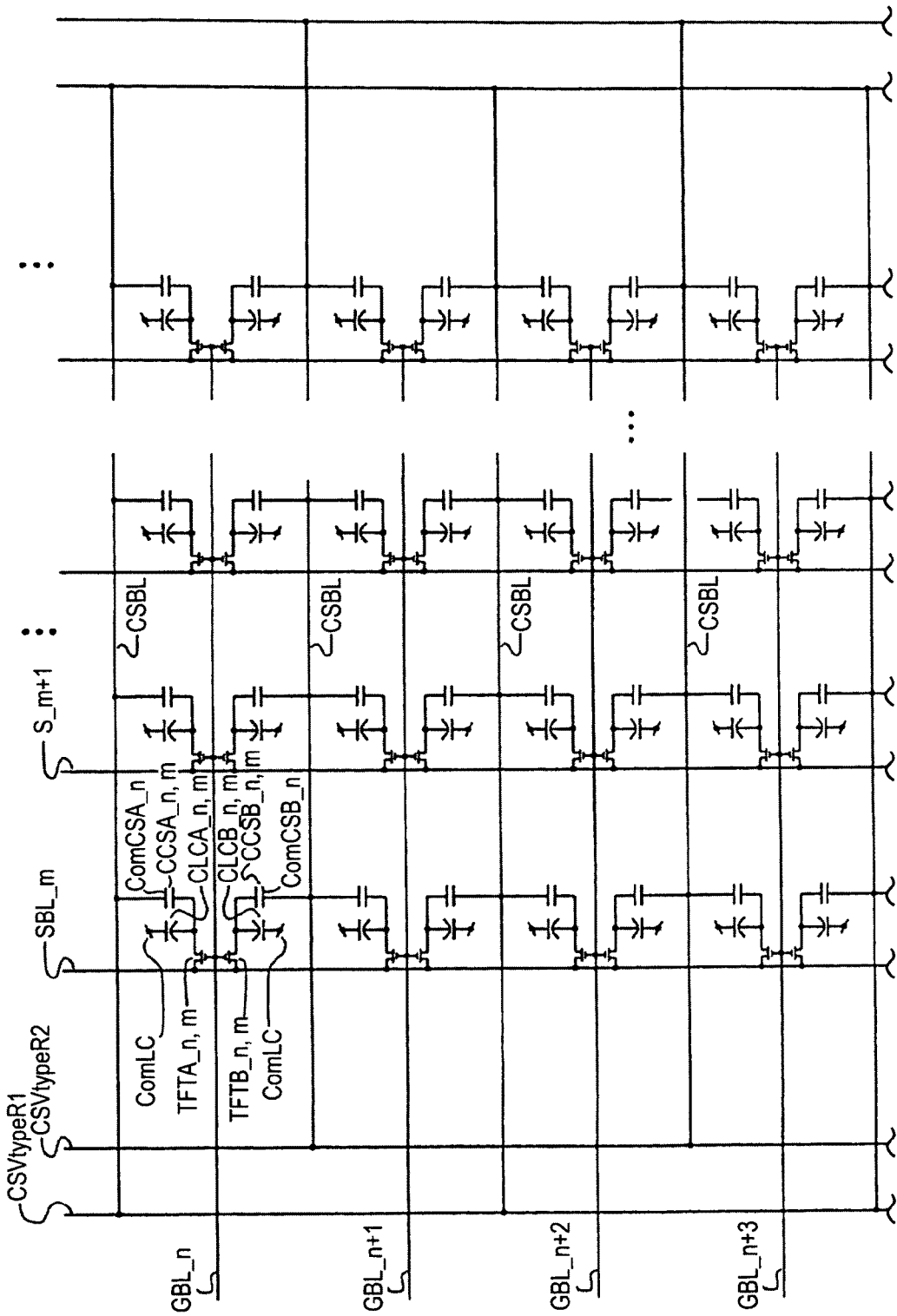
Figures 2, 22:
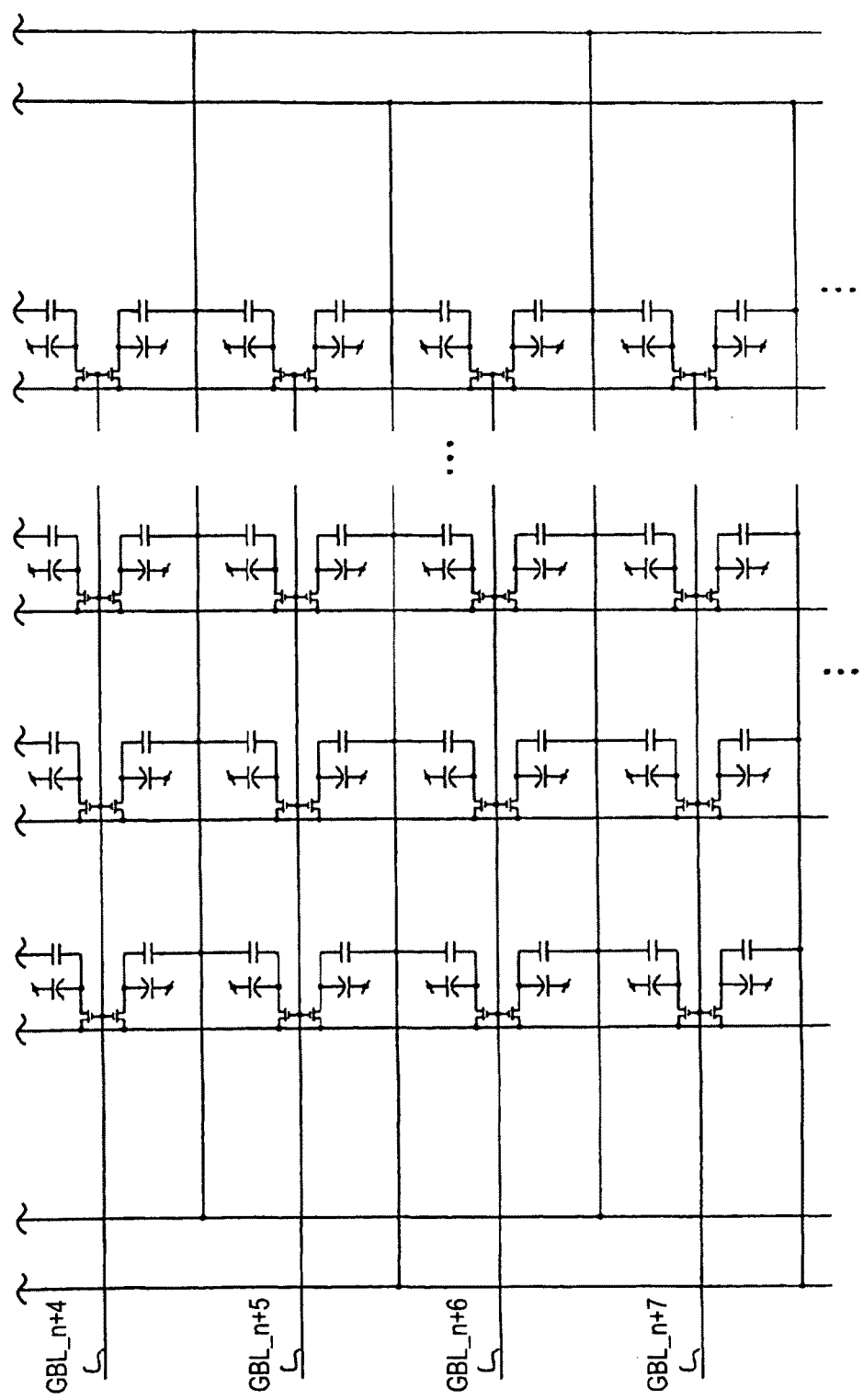

FIG. 22 is an equivalent circuit diagram of a certain area of a liquid crystal display which has the pixel array shown in FIG. 17. The liquid crystal display has pixels arranged in a matrix of rows and columns. Each pixel has two sub-pixels (indicated by symbols A and B). Each sub-pixel comprises a liquid crystal capacitor CLCA_n,m or CLCB_n,m as well as a storage capacitor CCSA_n,m or CCSB_n,m. Each liquid crystal capacitor is composed of a sub-pixel electrode, counter electrode ComLC, and liquid crystal layer sandwiched between them. Each storage capacitor is composed of a storage capacitor electrode, insulating film, and storage capacitor counter electrode (ComCSA_n or ComCSB_n). The two sub-pixels are connected to a common signal line (source busline) SBL_m via respective TFTA_n,m and TFTB_n,m. The TFTA_n,m and TFTB_n,m are turned on and off by a scanning signal voltage supplied to a common scanning line (gate busline). GBL_n. When the two TFTs are on, display signal voltages are supplied to the respective sub-pixel electrodes and storage capacitor electrodes of the two sub-pixels via a common signal line. Via a CS busline (CSBL), the storage capacitor counter electrode of one of the two sub-pixels is connected to a storage capacitor trunk (CS trunk) CSVtypeR1 and the storage capacitor counter electrode of the other sub-pixel is connected to a storage capacitor trunk (CS trunk) CSVtypeR2.

It should be noted in FIG. 22 that sub-pixels of adjacent pixels in the column direction share an electrically common CS busline. Specifically, the CS busline CSBL for the sub-pixel with CLCB_n,m in raw n, and the CS busline CSBL for the sub-pixel with CLCA_n+1,m of a pixel in an adjacent raw in the column direction are electrically common.

Figures 1, 23A:
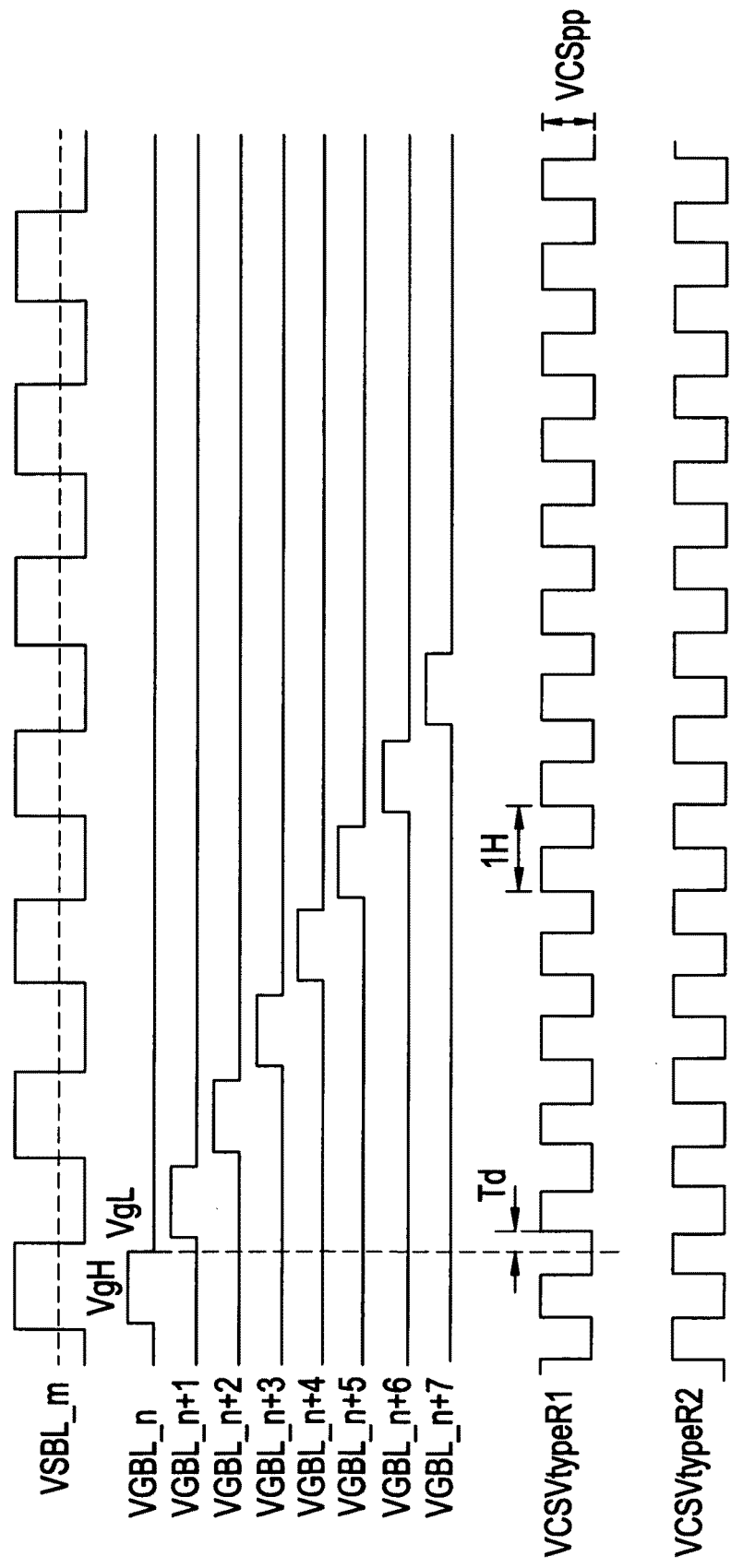
Figures 3, 23A:
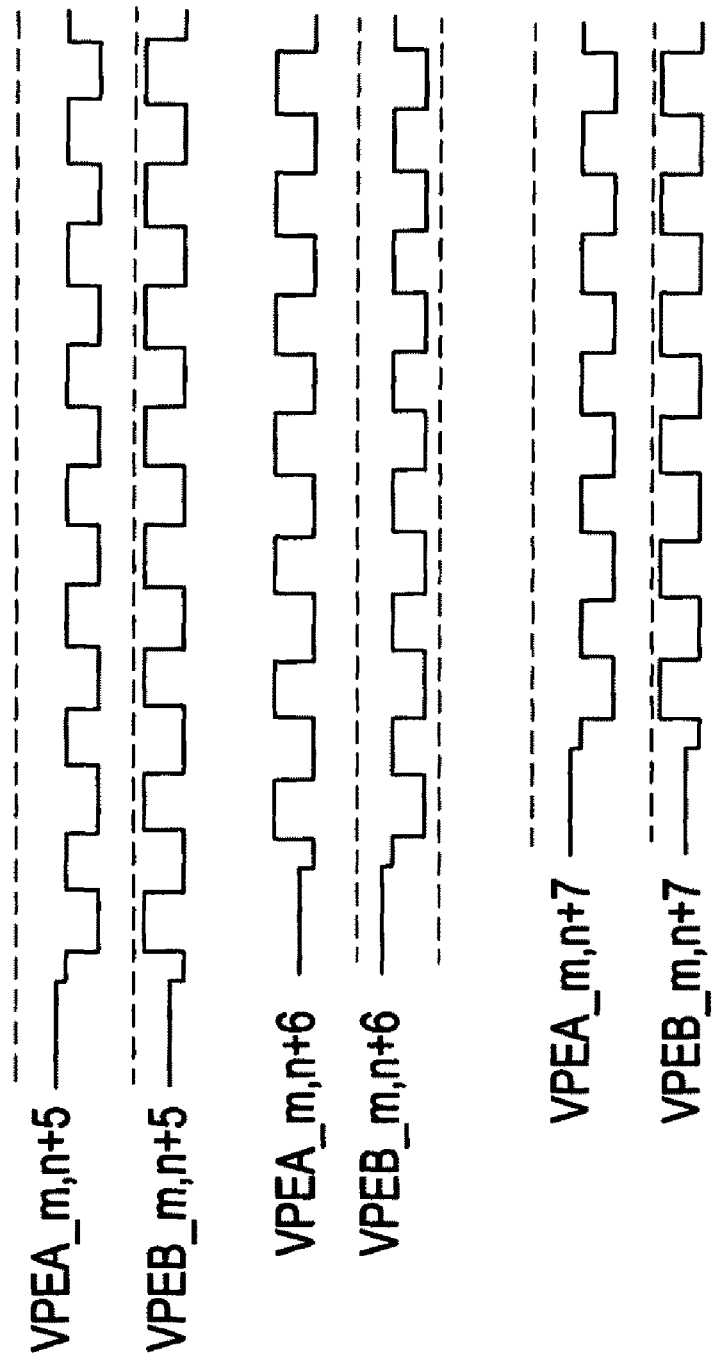
Figures 1, 23B:
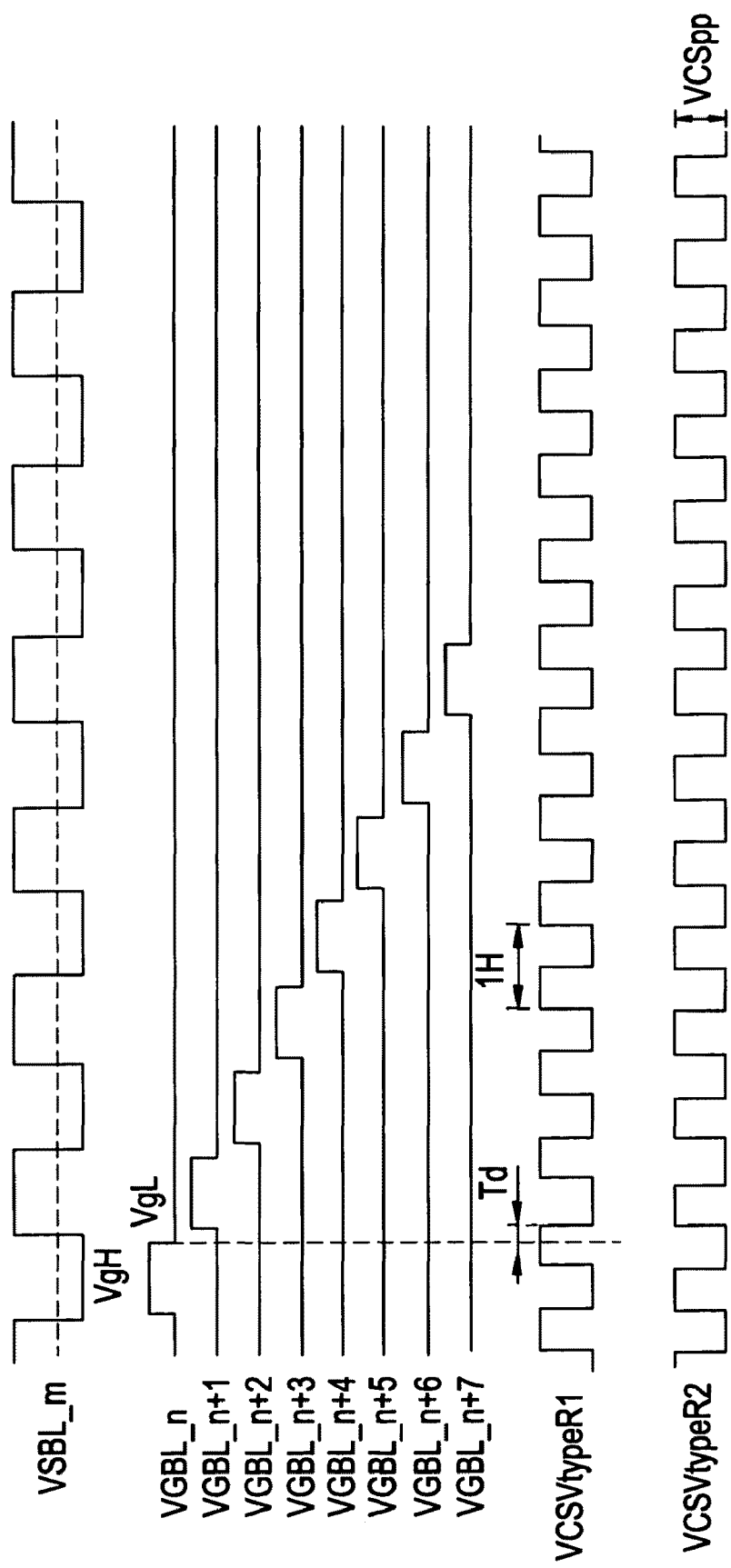
Figures 2, 23B:
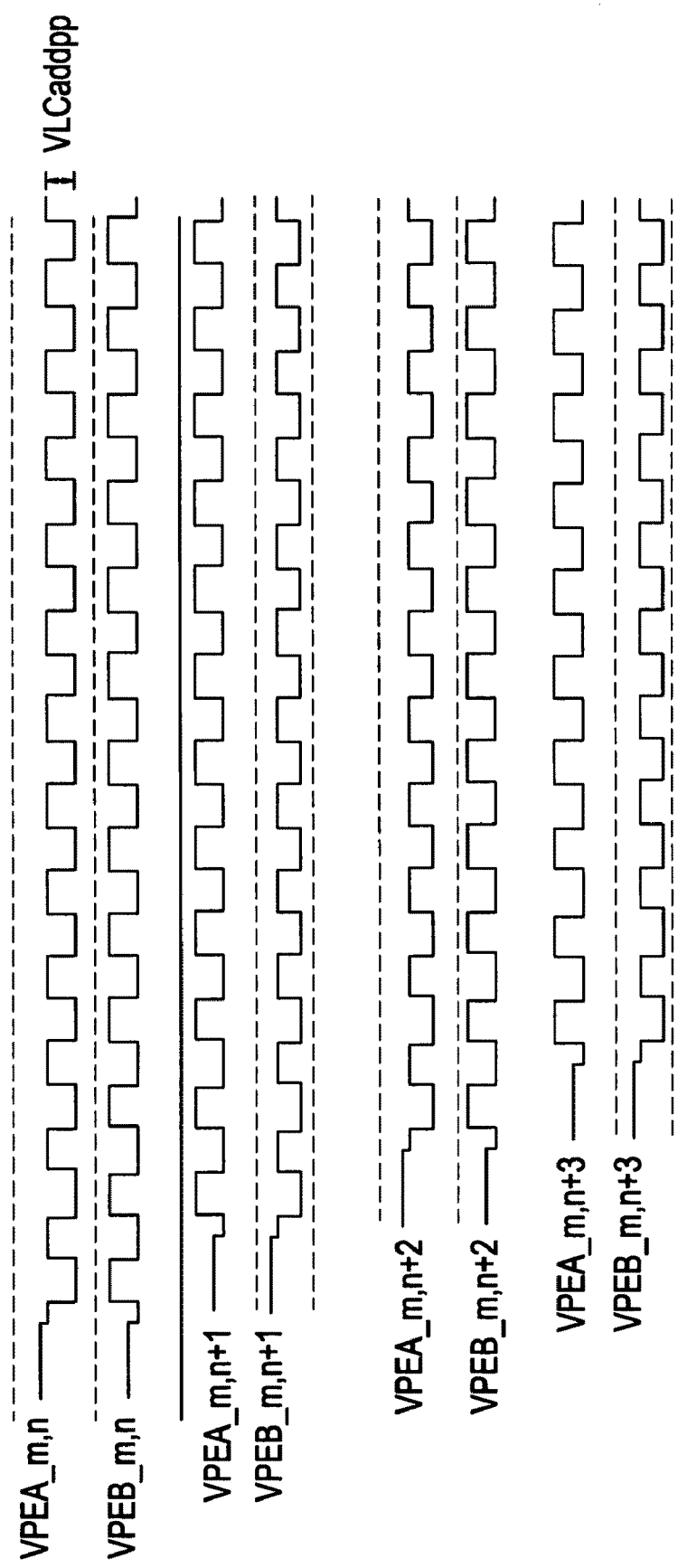
Figures 3, 23B:
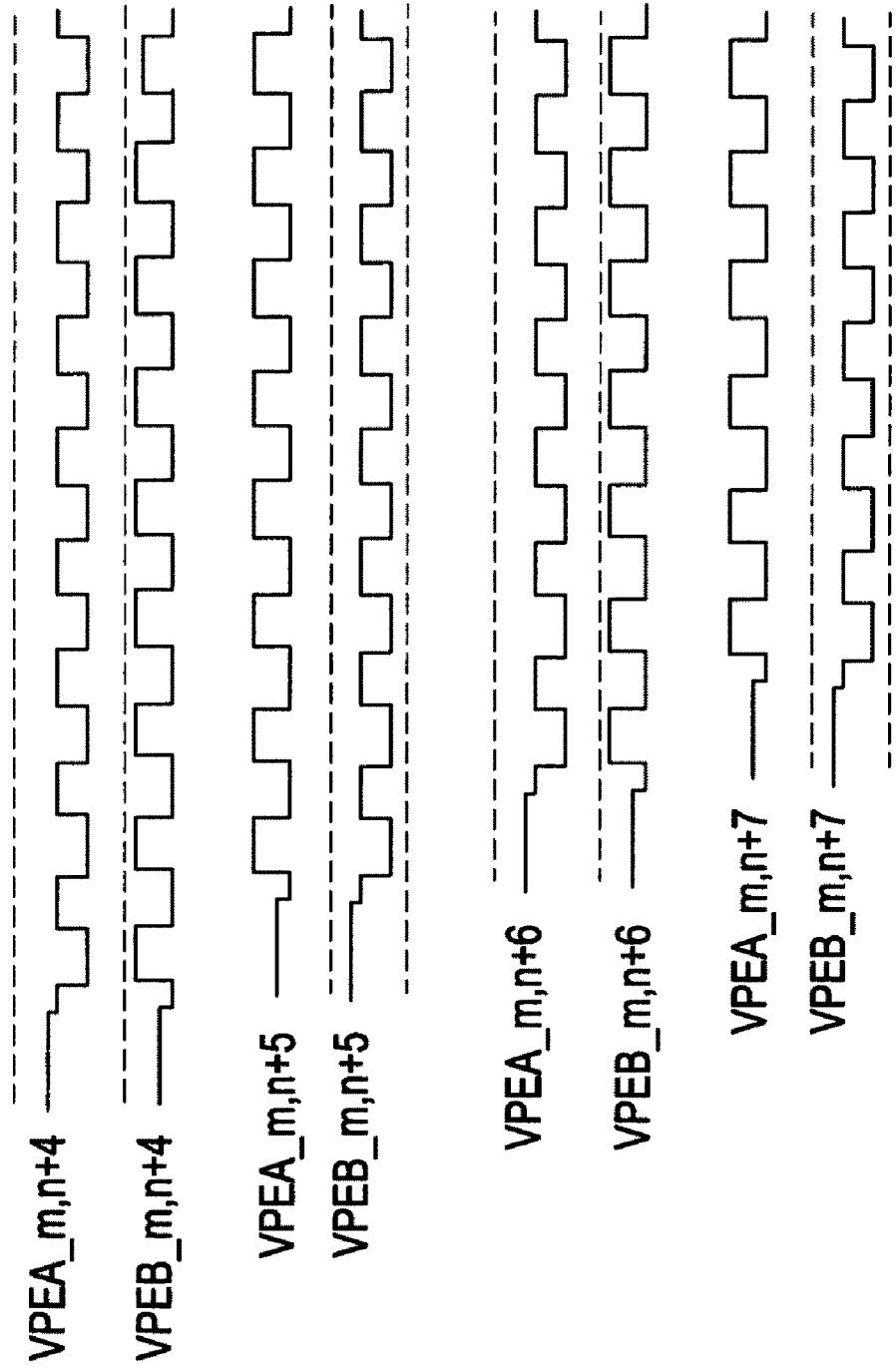

FIGS. 23A and 23B show the periods and phases of oscillation of oscillating voltages supplied to CS buslines in terms of voltage waveforms of gate buslines as well as show voltages of sub-pixel electrodes. A liquid crystal display generally reverses, at regular time intervals, the direction of the electric field applied to the liquid crystal layer of each pixel, and thus it is necessary to consider two types of drive voltage waveform corresponding to the directions of the electric field. The two types of driving state are shown in FIGS. 23A and 23B, respectively.

In FIGS. 23A and 23B, VSBL_m represents a waveform of a display signal voltage (source signal voltage) supplied to the source busline SBL_m of column m while VGBL_n represents a waveform of a scanning signal voltage (gate signal voltage) supplied to the gate busline GBL_n of column n. VCSVtypeR1 and VCSVtypeR2 represent waveforms of the oscillating voltages supplied to the CS trunks CSVtypeR1 and CSVtypeR2, respectively, as storage capacitor counter voltages. VPEA_m,n and VPEB_m,n represent voltage waveforms of the liquid crystal capacitors of respective sub-pixels.

The first point to be noted in FIGS. 23A and 23B is that the oscillation periods of the voltages VCSVtypeR1 and VCSVtypeR2 of CSVtypeR1 and CSVtypeR2 are all equal to one horizontal scanning period (1H).

The second point to be noted in FIGS. 23A and 23B is that the phases of VCSVtypeR1 and VCSVtypeR2 are as follows. First, looking at the phase difference between CS trunks, VCSVtypeR2 lags the VCSVtypeR1 by 0.5H. Next, looking at the voltages of the CS trunks and gate buslines, the phases of the voltages of the CS trunks and gate buslines are as follows. As can be seen from FIGS. 23A and 23B, the time when the voltages of the gate buslines corresponding to respective CS trunks change from VgH to VgL coincides with the time when the flat parts of the CS trunk voltages reach their centers. In other words, the value of Td in FIGS. 23A and 23B is 0.25H. However, Td may take any value larger than 0H but smaller than 0.5H.

Although the periods and phases of voltages of the CS trunks have been described with reference to FIGS. 23A and 23B, the voltage waveforms of the CS trunks are not limited to this and the CS trunks may have any waveforms as long as one of the following two conditions is satisfied. The first condition is that the first change of the voltage VCSVtypeR1 after the voltage of a corresponding gate busline changes from VgH to HgL is a voltage increase while the first change of the voltage VCSVtypeR2 after the voltage of a corresponding gate busline changes from VgH to HgL is a voltage decrease. The second condition is that the first change of the voltage VCSVtypeR1 after the voltage of a corresponding gate busline changes froth VgH to HgL is a voltage decrease while the first change of the voltage VCSVtypeR2 after the voltage of a corresponding gate busline changes from VgH to HgL is a voltage increase.

Figures 1, 24A:
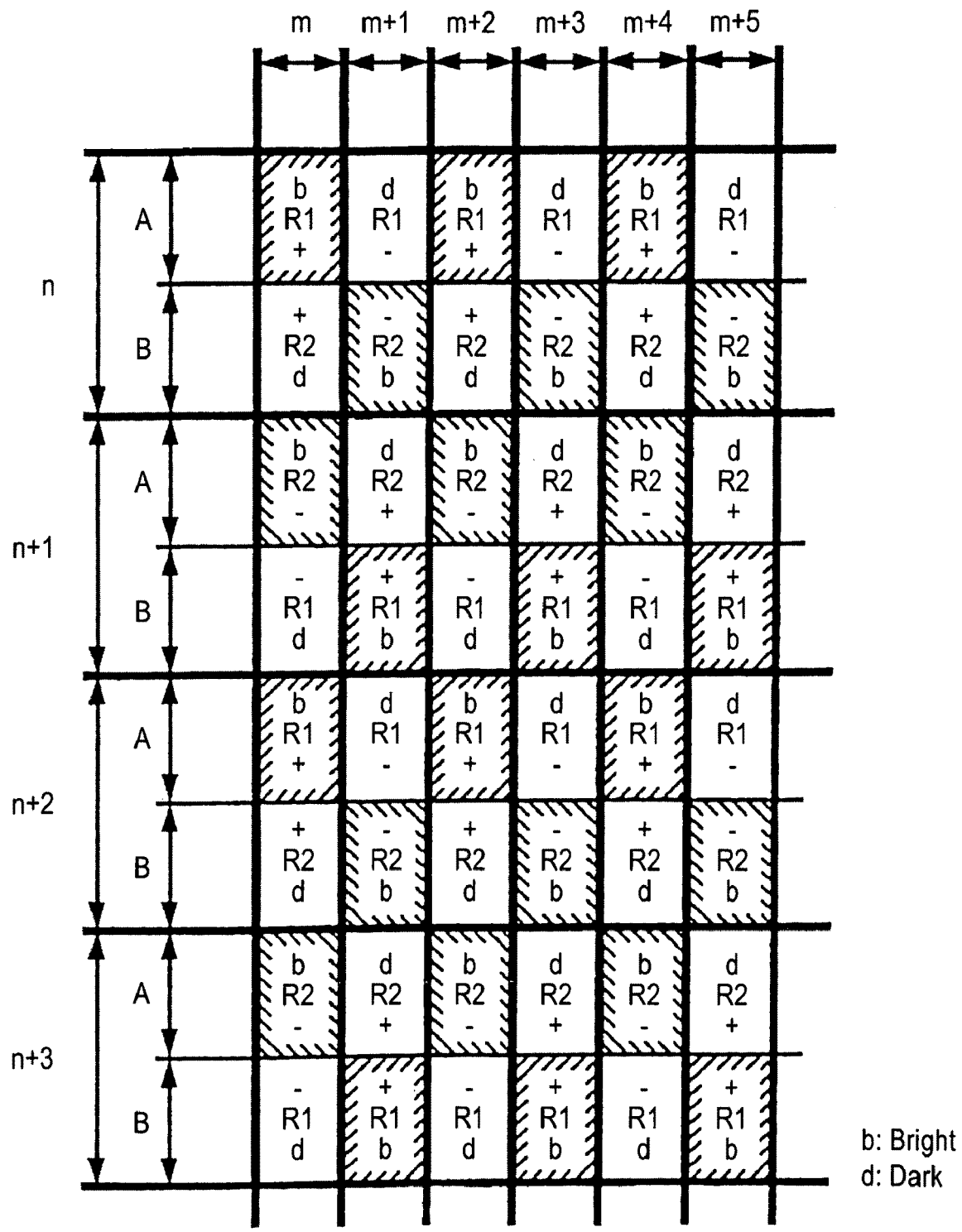
Figures 2, 24A:
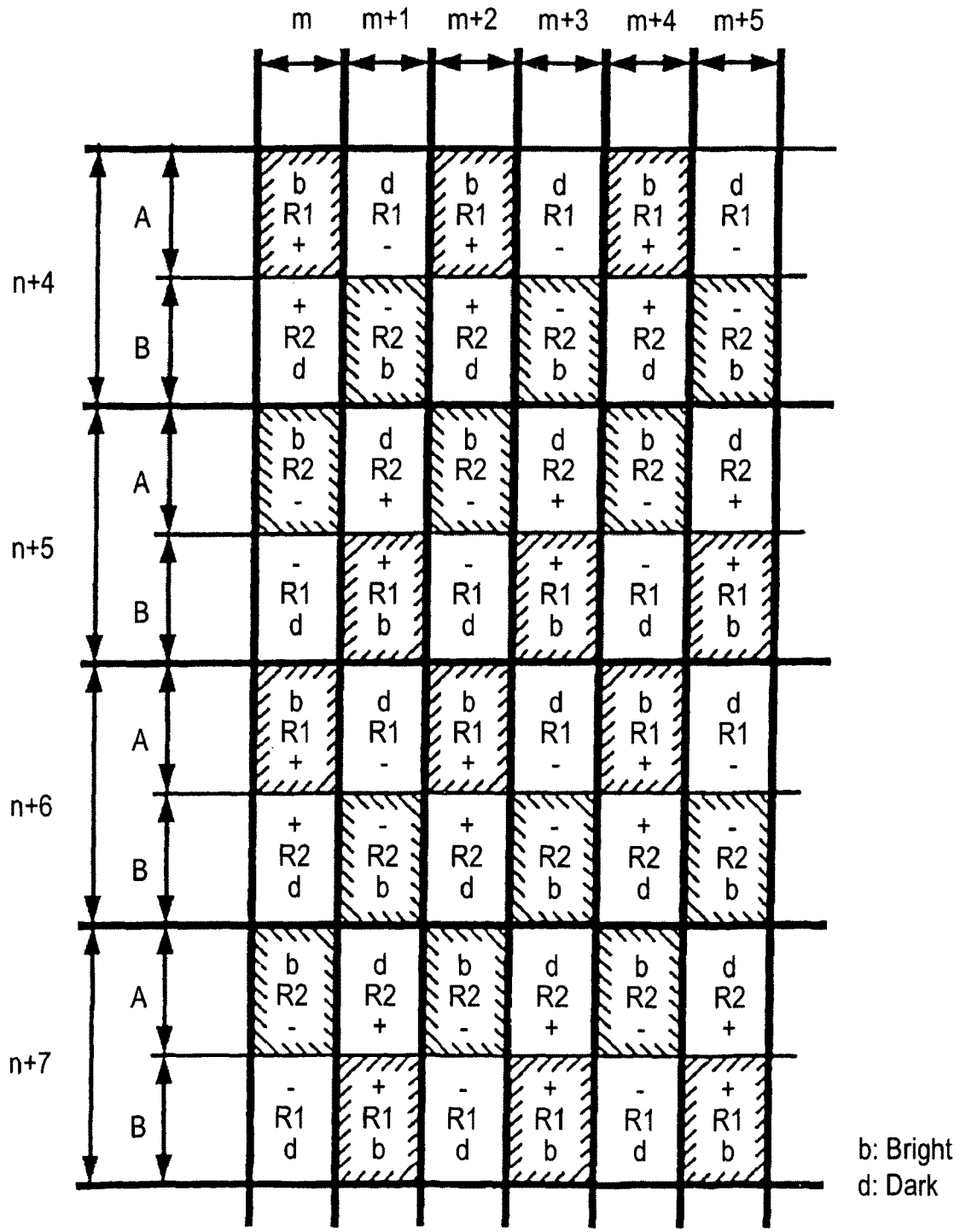
Figures 1, 24B:
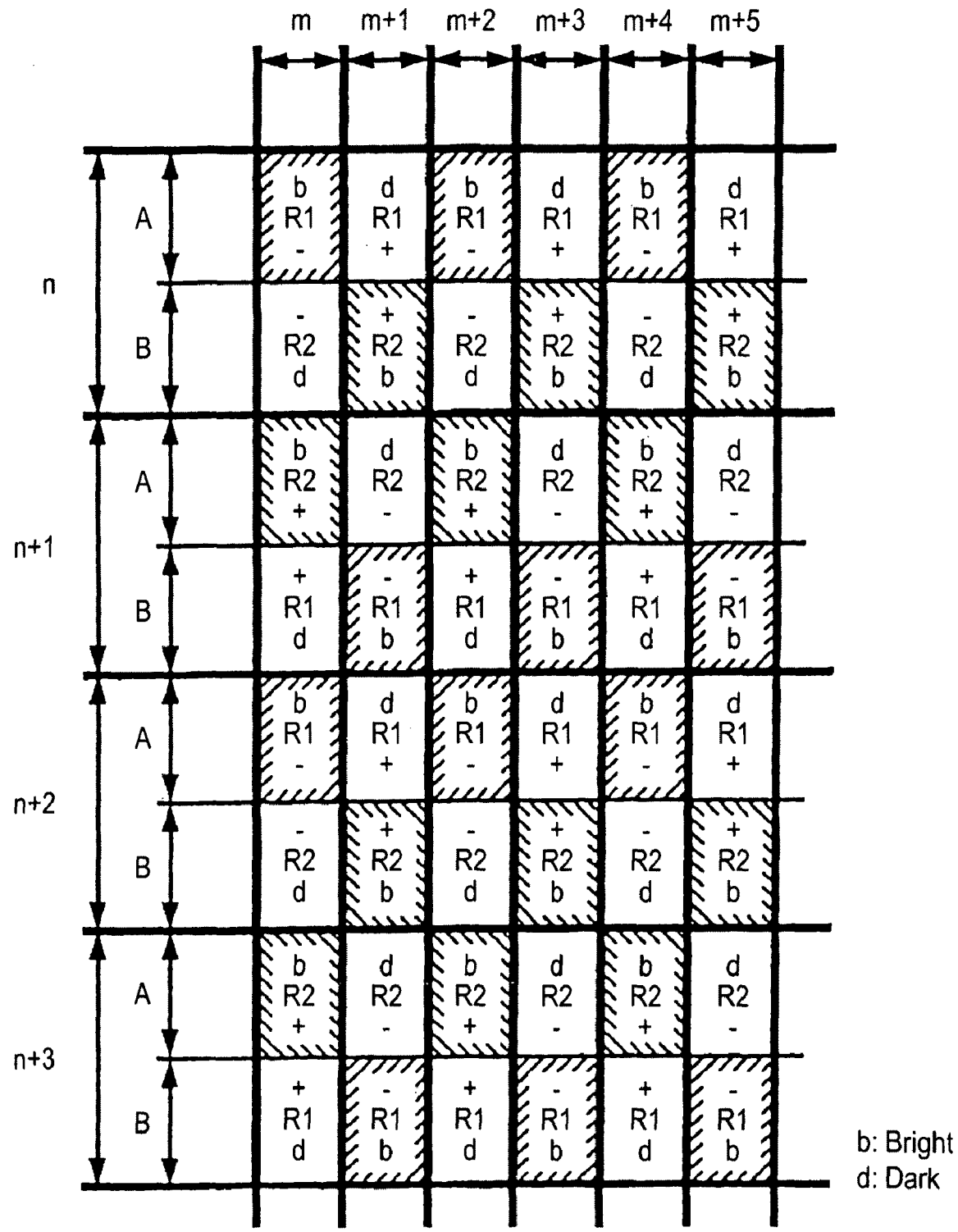
Figures 2, 24B:
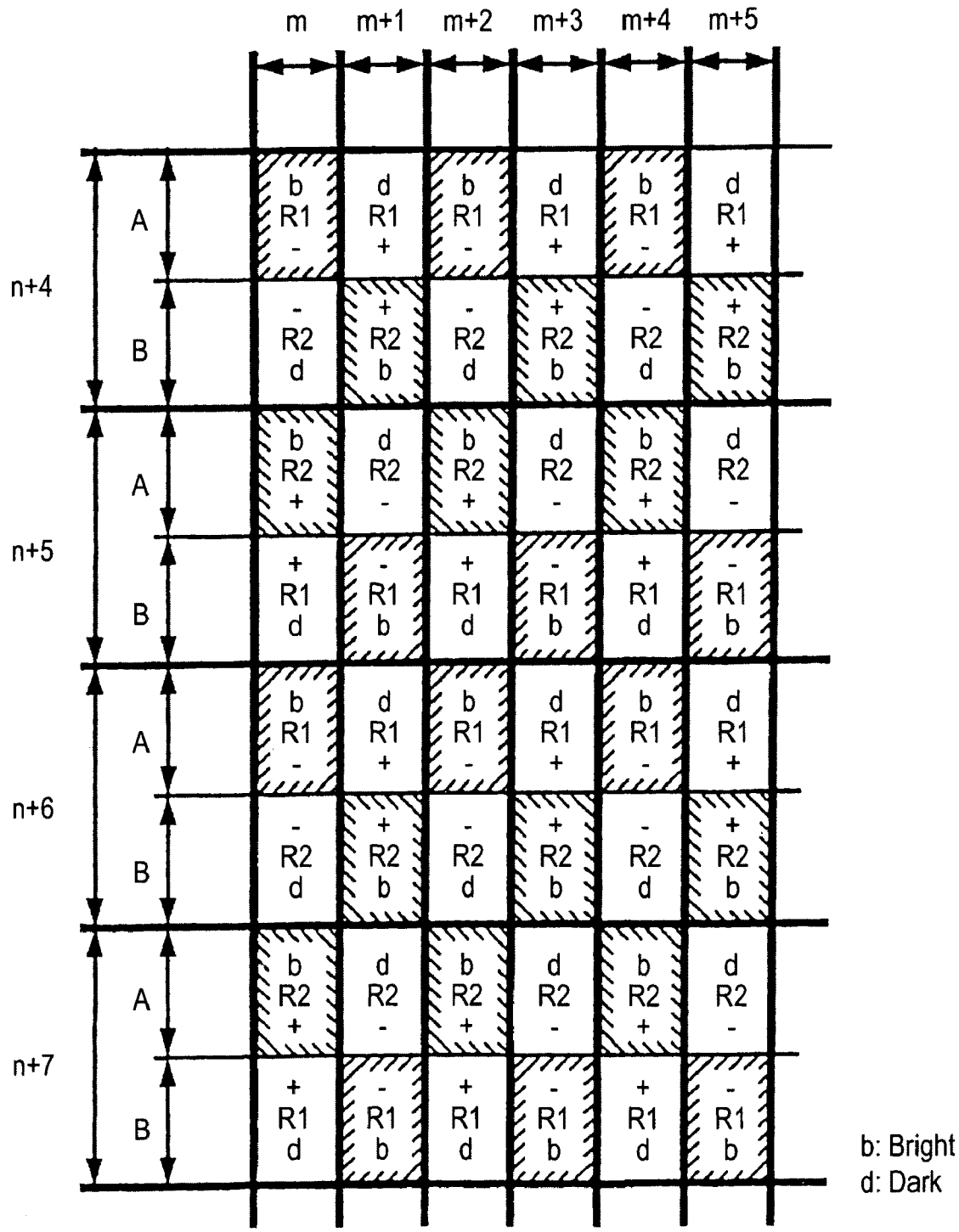

FIGS. 24A and 24B summarize driving states of the liquid crystal display. The driving states of the liquid crystal display are also classified into two types according to the polarity of the drive voltages of the sub-pixels as in the case of FIGS. 23A and 23B. The driving states in FIG. 24A correspond to the drive voltage waveforms in FIG. 23A while the driving states in FIG. 24B correspond to the drive voltage waveforms in FIG. 23B.

FIGS. 24A and 24B schematically show the driving states of the pixels in "the eight rows from row n to row n+7"×"the six columns from column m to column m+5" among a plurality of pixels arranged in a matrix. Each pixel has sub-pixels which differ in brightness, namely a sub-pixel indicated as "b(Bright)" and sub-pixel indicated as "d(Dark)" FIGS. 24A and 24B are basically equivalent to FIG. 17.

A point to be noted in FIGS. 24A and 24B is whether requirements for an area ratio gray scale panel are satisfied. An area ratio gray scale panel has five requirements.

The first requirement is that each pixel consists of a plurality of sub-pixels which differ in brightness when displaying an intermediate grayscale.

The second requirement is that the order of brightness of the sub-pixels which differ in brightness is constant regardless of time.

The third requirement is that the sub-pixels which differ in brightness are arranged elaborately.

The fourth requirement is that pixels of opposite polarity are arranged elaborately in any frame.

The fifth requirement is that sub-pixels of the same polarity, equal in the order of brightness—especially the brightest sub-pixels—are arranged elaborately in any frame.

Compliance with the first requirement will be verified. Here, each pixel consists of two sub-pixels which differ in brightness. Specifically, for example, in FIG. 24A, the pixel in row n and column m consists of a high-brightness sub-pixel indicated as "b(Bright)" and low-brightness sub-pixel indicated as "d(Dark)". Thus, the first requirement is satisfied.

Compliance with the second requirement will be verified. The liquid crystal display alternates two display states which differ in driving state at regular time intervals. FIGS. 24A and 24B which show the driving states corresponding to the two display states coincide in the locations of high-brightness sub-pixels and low-brightness sub-pixels. Thus, the second requirement is satisfied.

Compliance with the third requirement will be verified. In FIGS. 24A and 24B, the sub-pixels which differ in the order of brightness, i.e., the sub-pixels indicated as "b(Bright))" and sub-pixels indicated as "d(Dark)" are arranged checkerwise. Visual observation of the liquid crystal display revealed no display problem such as reduced resolution resulting from the use of sub-pixels differing in brightness. Thus, the third requirement is satisfied.

Compliance with the fourth requirement will be checked. In FIGS. 24A and 24B, pixels of opposite polarity are arranged checkerwise. Specifically, for example, in FIG. 24A, the pixel in row n+2 and column m+2 has a "+" polarity. Beginning with this pixel, the polarity changes every other pixel between "−" and "+" both in the row direction and column direction. With a liquid crystal display, which does not satisfy the fourth requirement, it is believed that flickering of display is observed in sync with changes in the drive polarity of pixels between "+" and "−". However, no flickering was observed when the liquid crystal display of the embodiment was checked visually. Thus, the fourth requirement is satisfied.

Compliance with the fifth requirement will be checked. In FIGS. 24A and 24B, looking at the drive polarity of the sub-pixels equal in the order of brightness, the drive polarity reverses every two rows of sub-pixels, i.e., every other pixel width. Specifically, for example, in row n_B in FIG. 24A, the sub-pixels in columns m+1, m+3, and m+5 are "b(Bright)" and the polarity of all these sub-pixels is "−". In row n+1_A, the sub-pixels in columns m, m+2, and m+4 are "b(Bright)" and the polarity of all these sub-pixels is "−". In row n+1_B, the sub-pixels in columns m+1, m+3, and m+5 are "b(Bright)" and the polarity of all these sub-pixels is "+". In row n+2_A, the sub-pixels in columns m, m+2, and m+4 are "b(Bright))" and the polarity of all these sub-pixels is "+". With a liquid crystal display, which does not satisfy the fifth requirement, it is believed that flickering of display is observed in sync with changes in the drive polarity of pixels between "+" and "−". However, no flickering was observed when the liquid crystal display according to the present invention was checked visually. Thus, the fifth requirement is satisfied.

When the liquid crystal display was observed by varying the amplitude VCSpp of the CS voltage, viewing angle characteristics was improved with display contrast improved during oblique observation as the amplitude VCSpp of the CS voltage was increased from 0 V (0 V was used to support typical liquid crystal displays other than the liquid crystal display according to the present invention). Although the improvement of the viewing angle characteristics seemed slightly different depending on displayed images, the best improvement was achieved when VCSpp was set such that the value of VLCaddpp would fall within 0.5 to 2 times the threshold voltage of the liquid crystal display in a typical drive mode (VCSpp was 0V).

Thus, the liquid crystal display according to the embodiment of the second aspect of the present invention improves the viewing angle characteristics by applying oscillating voltages to the storage capacitor counter electrodes and thereby achieving multi-pixel display, where the oscillation periods of the oscillating voltages applied to the storage capacitor counter electrodes are equal to or shorter than one horizontal scanning period. However, when the periods of oscillation of the oscillating voltages supplied to CS buslines are short, it is relatively difficult to implement multi-pixel display on large liquid crystal displays with high load capacitance and resistance of CS buslines, high-resolution liquid crystal displays with a short horizontal scanning period, or displays with high-speed driving and short vertical and horizontal scanning periods.

This problem will be described with reference to FIGS. 25 to 28.

Figure 25A:
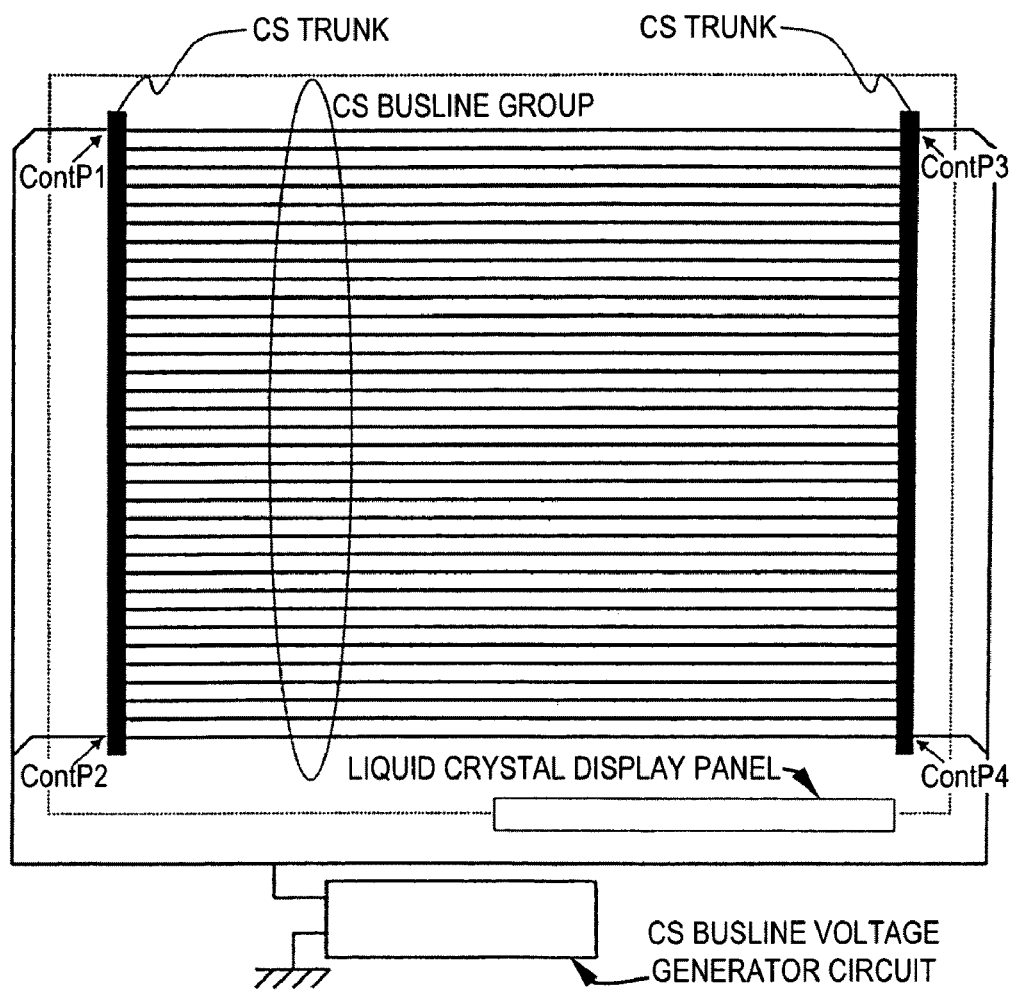
FIG. 25A is a diagram schematically showing a configuration used to supply oscillating voltages to CS buslines in a liquid crystal display according to an embodiment of the second aspect of the present invention and 25B is a diagram schematically showing an equivalent circuit which approximates electrical load impedance of the liquid crystal display.
Figure 25B:
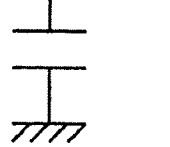

FIG. 25A is a diagram schematically showing a configuration used to supply oscillating voltages to the CS buslines in the liquid crystal display according to the embodiment of the second aspect of the present invention. The oscillating voltages are supplied from CS trunks to a plurality of CS buslines provided in the liquid crystal display panel. The oscillating voltages are supplied from a CS busline voltage generator circuit to the CS trunks via connection points ContP1 and ContP2 and via ContP3 and ContP4. With increases in the size of the liquid crystal display panel, the distance from the pixels in the center of the display panel to the connection points ContP1 to ContP4 increases making it impossible to ignore the load impedance between the pixels in the center and the connection points. Main components of the load impedance include the liquid crystal capacitance (CLC) and storage capacitance (CCS) of pixels, the resistance RCS of the CS buslines, and the resistance Rtrunk of the CS trunks. A first approximation of the load impedance can be a low pass filter composed of the above capacitors and resistance as shown schematically in FIG. 25B. The value of the load impedance is a function of location on the liquid crystal display panel. For example, it is a function of the distance from the connection points ContP1, ContP2, ContP3, and ContP4. Specifically, the load impedance decreases with decreasing distance from the connection points, and increases with increasing distance from the connection points.

That is, since the CS busline voltage generated by an oscillating voltage generator circuit is affected by the CS busline load approximated by a CR low pass filter, the CS buslines undergo waveform blunting, which varies with the location on the panel.

As described in relation to the embodiment of the first aspect of the present invention, oscillating voltages are applied to CS buslines in order to compose each pixel of two or more sub-pixels and vary brightness among the sub-pixels. That is, the liquid crystal display according to the embodiment of the present invention uses a configuration and drive method which make the voltage waveforms of the sub-pixel electrodes dependent on the oscillating voltages of the CS buslines and which vary effective voltages according to the oscillating waveforms of the CS buslines. Thus, if the waveforms of CS busline voltages vary from place to place, so do the effective voltages of the sub-pixel electrodes. In other words, if waveform blunting of the CS busline voltages varies with location, display brightness varies with location as well, resulting in irregular display brightness.

The ability to correct irregularities in display brightness by increasing the oscillation periods of CS buslines is a main advantage of the liquid crystal display according to the third aspect of the present invention. This will be explained as follows.

Figure 27A:
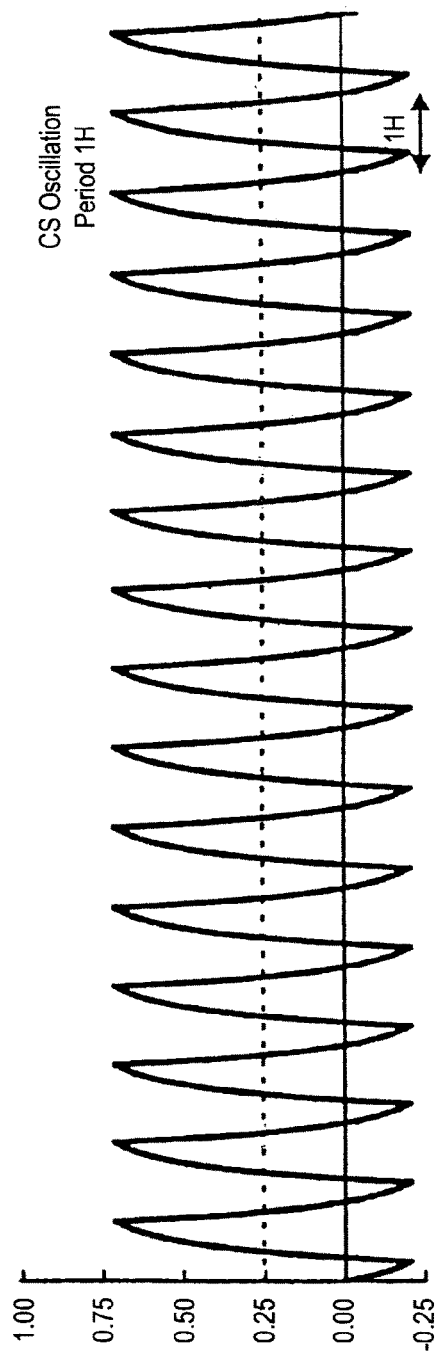
Figure 27B:
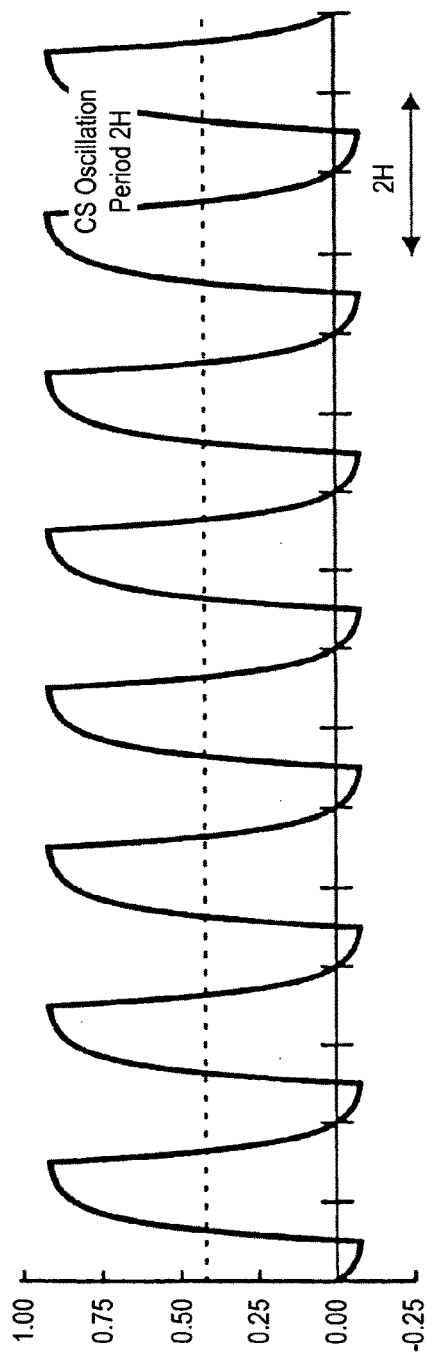
Figure 27E:
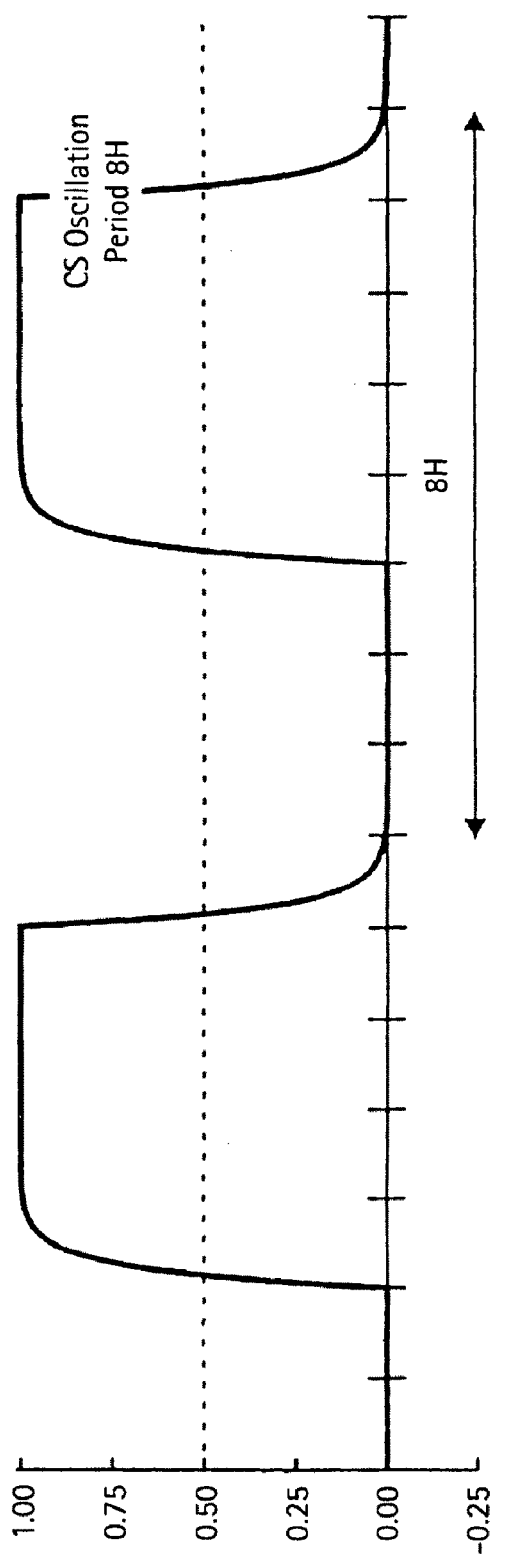

FIGS. 26 and 27 schematically show oscillating voltage waveforms of sub-pixel electrodes in the case where the CS load is kept constant. FIGS. 26 and 27 are schematic diagrams which assume that the voltage of sub-pixel electrodes is "0 V" when the voltages of CS buslines are not oscillating voltages and that the amplitude of the sub-pixel electrode voltage caused by the oscillation of the CS buslines is "1 V". The waveforms (a) to (e) in FIG. 26 show the waveforms when there is no waveform blunting of CS voltage, i.e., the CR time constant of the CR low pass filter is "0H" while the waveforms (a) to (e) in FIG. 27 schematically show waveform blunting when the CR time constant of the CR low pass filter is "0.2H". FIGS. 26 and 27 schematically show voltage waveforms of sub-pixel electrode voltages when CR time constants of the CR low pass filter are "0H" and "0.2H," respectively, and the oscillation periods of the oscillating voltages of the CS buslines are varied. The waveforms (a) to (e) in FIGS. 26 and 27 show cases in which the oscillation periods of waveforms are 1H, 2H, 4H, 8H, respectively.

When FIGS. 26 and 27 are compared, it can be seen that differences in the waveforms in FIGS. 26 and 27 are reduced with increases in the oscillation period. This tendency is shown quantitatively in FIG. 28.

Figure 28:
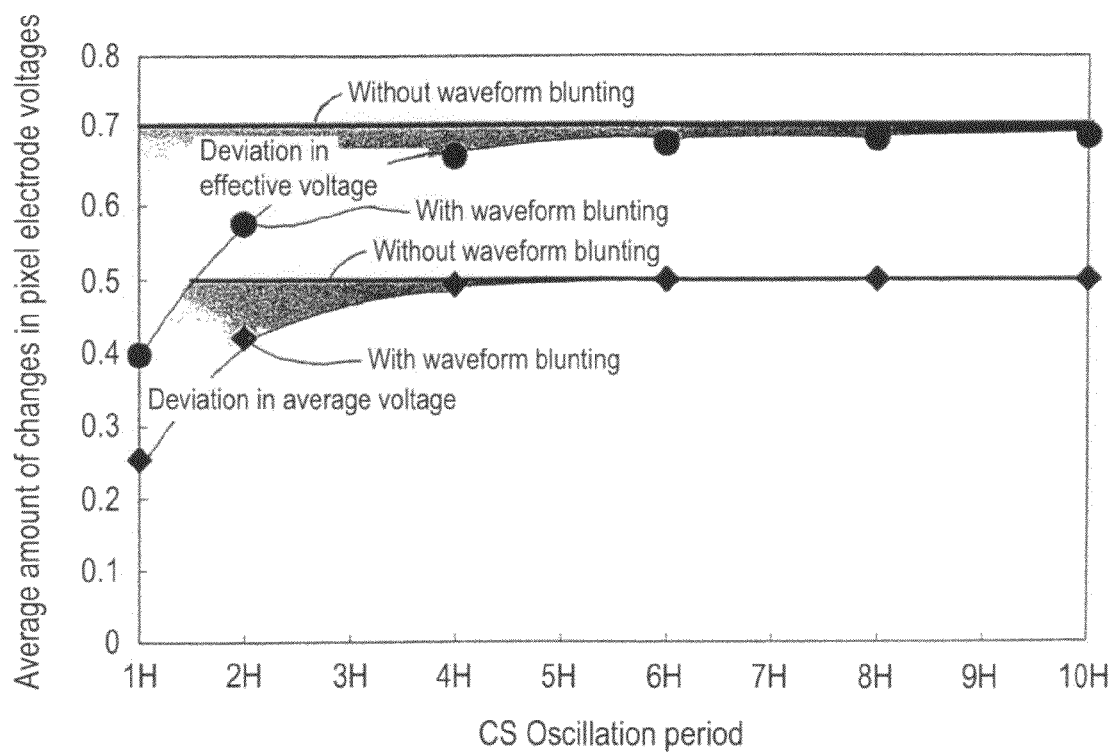
FIG. 28 is a graph showing relationship of the average value and effective value of oscillating voltages calculated based on the waveforms in FIGS. 26 and 27 vs. the oscillation period of CS busline voltages.

FIG. 28 shows relationship of the average value and effective value of oscillating voltages calculated based on the waveforms in FIG. 27 vs. the oscillation period (one division corresponds to one horizontal scanning period: 1H) of CS busline voltages. As can be seen from FIG. 28, deviations in both average voltage and effective voltage between when the CR time constant is 0H and when the CR time constant is 0.2H are reduced with increases in the oscillation period of the CS buslines. It can be seen that the impact of waveform blunting can be greatly reduced especially when the oscillation period of the oscillating voltage of the CS buslines is greater than 8 times the CR time constant (an approximate value of the load impedance) of the CS buslines.

In this way, by increasing the oscillation period of the oscillating voltage of the CS buslines, it is possible to reduce irregularities in display brightness caused by waveform blunting on the CS buslines. The impact of waveform blunting can be greatly reduced especially when the oscillation period of the oscillating voltage of the CS buslines is greater than 8 times the CR time constant (an approximate value of the load impedance) of the CS buslines.

The third aspect of the present invention has been proposed in view of the above problem with the liquid crystal display according to the second aspect of the present invention. It provides a preferable structure and drive method of a liquid crystal display which can increase the oscillation periods of the oscillating voltages applied to CS buslines.

In the liquid crystal display according to the embodiment of the third aspect of the present invention, electrically independent CS buslines are used for sub-pixels differing in the order of brightness (e.g., a first sub-pixel and second sub-pixel) among the sub-pixels of pixels which are in the same column of the matrix-driven liquid crystal display and are adjacent to each other in the column direction. Specifically, the CS busline for the first sub-pixel in row n and the CS busline for the second sub-pixel in row n+1 are electrically independent of each other. Here, the pixels in the same column of a matrix-driven liquid crystal display are pixels driven by the same signal line (typically, a source busline). Also, the pixels adjacent to each other in the column direction of a matrix-driven liquid crystal display are pixels driven by the scanning lines selected at adjacent time points among the scanning lines (typically, gate buslines) selected in sequence on the time axis. Besides, assuming that there are L electrically independent sets of CS trunks, the oscillation period of the CS buslines can be L times the horizontal scanning period. As described earlier, preferably the number of CS trunks is larger than 8 times the quotient obtained by dividing one horizontal scanning period by a CR time constant which approximates maximum load impedance of the CS busline. Furthermore, as described later, preferably the number is an even number in addition to being larger than 8 times. The number of electrically independent sets (L sets) of CS trunks may be expressed herein as the number of electrically independent CS trunks (L trunks). If electrically equivalent CS trunks are installed on both sides of the panel, the number of electrically equivalent CS trunks does not change.

The liquid crystal display and its drive method according to the embodiment of the third aspect of the present invention will be described below with reference to drawings.

First, with reference to FIGS. 29 to 31B, description will be given of a liquid crystal display which achieves the area ratio gray scale display by setting the oscillation period of the oscillating voltages of the CS buslines to four times the horizontal scanning period. The description will be focused on the following points and provided with reference to drawings. The first point concerns the configuration of the liquid crystal display centering around connection patterns between the storage capacitor counter electrodes of the storage capacitors connected to sub-pixels and CS buslines. The second point concerns the periods and phases of oscillation of the CS buslines in terms of voltage waveforms of gate buslines. The third point concerns driving and display states of sub-pixels according to this embodiment.

Figures 1, 29:
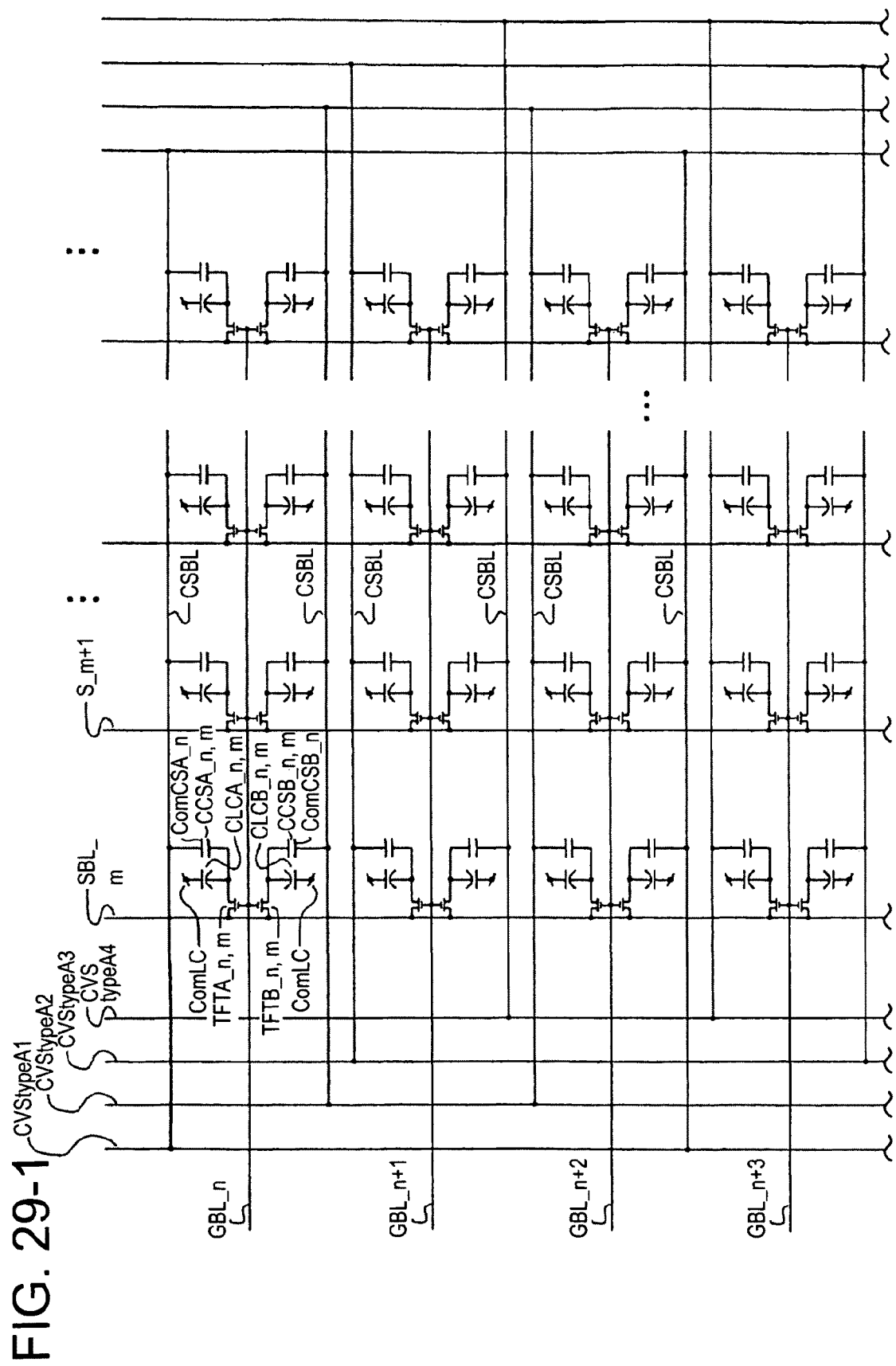
Figures 2, 29:
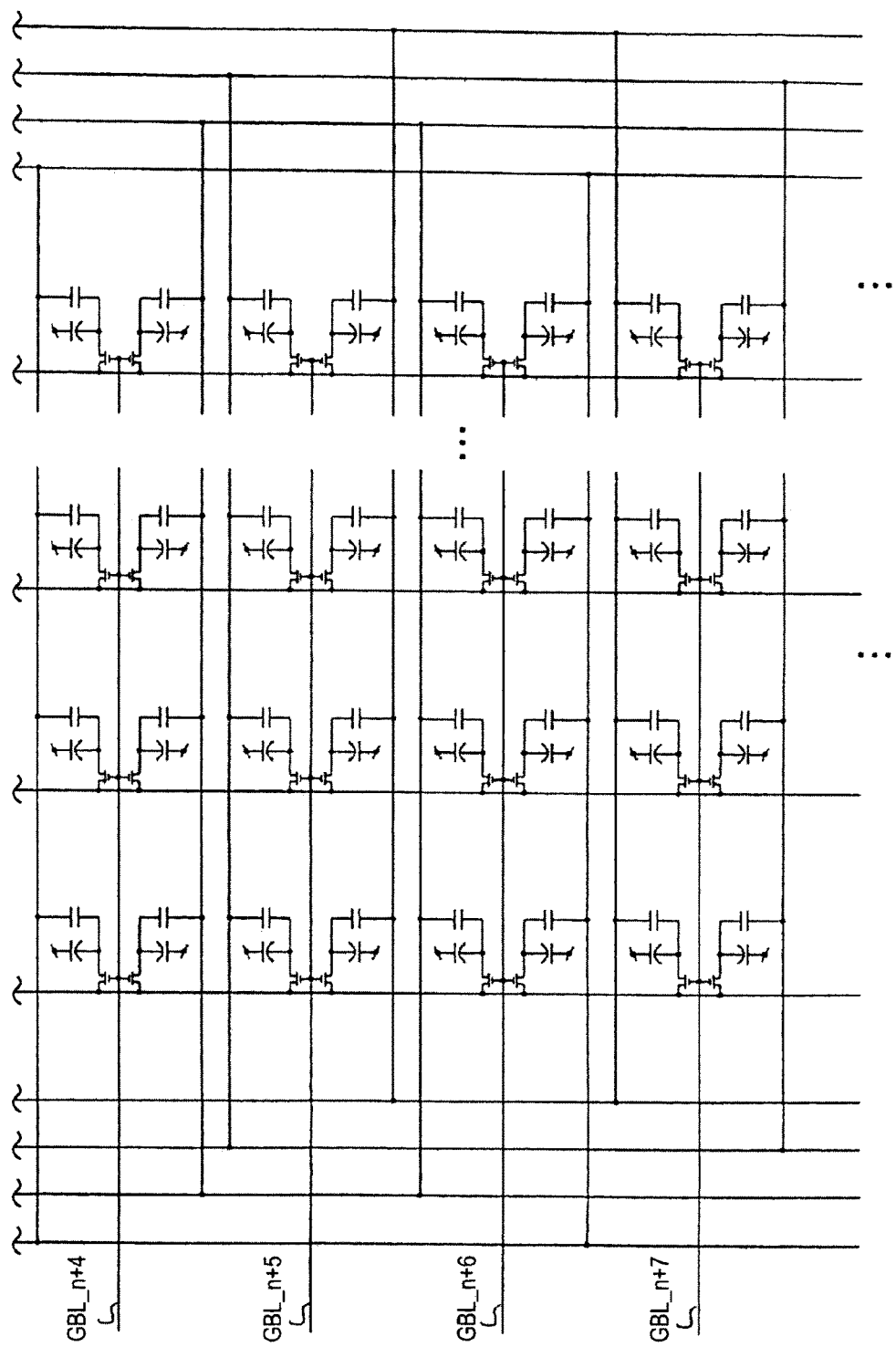

FIG. 29 is a diagram schematically showing an equivalent circuit of the liquid crystal display according to the embodiment of the third aspect of the present invention and corresponds to FIG. 22. The same components as those in FIG. 22 are denoted by the same reference numerals/characters as those in FIG. 22 and description thereof will be omitted. The liquid crystal display in FIG. 29 differs from the liquid crystal display in FIG. 22 in that it has four electrically independent CS trunks CSVtypeA1 to CSVtypeA4 as well as in the state of connections between CS trunks and CS buslines.

The first point to be noted in FIG. 29 is that CS buslines for adjacent sub-pixels (e.g., sub-pixels corresponding to CLCB_n,m and CLCA_n+1,m) of pixels in adjacent rows in the column direction are electrically independent of each other. Specifically, for example, the CS busline CSBL_B_n for the sub-pixel CLCB_n,m in row n and the CS busline CSBL_A_n+1 for the sub-pixel CLCA_n+1,m of a pixel in an adjacent row in the column direction are electrically independent of each other.

The second point to be noted in FIG. 29 is that each CS busline (CSBL) is connected to one of four CS trunks (CSVtypeA1, CSVtypeA2, CSVtypeA3, and CSVtypeA4) at a panel end. That is, in the liquid crystal display according to this embodiment, there are four electrically independent sets of CS trunks.

The third point to be noted in FIG. 29 is the state of connections between the CS buslines and the four CS trunks, i.e., arrangement of electrically independent CS buslines in the column direction. According to the connection rules for CS buslines and CS trunks in FIG. 29, the buslines connected to the CS trunks CSVtypeA1, CSVtypeA2, CSVtypeA3, and CSVtypeA4 are as shown in Table 1 below.

TABLE 1

| CS trunk | CS busline connected to CS trunk | | General notation of CS busline listed on left |
|---|---|---|---|
| CSVtypeA1 | CSBL_A_n, CSBL_A_n + 4, CSBL_A_n + 8, CSBL_A_n + 12, ... | CSBL_B_n + 2, CSBL_B_n + 6, CSBL_B_n + 10, CSBL_B_n + 14, ... | CSBL_A_n + 4 · k, CSBL_B_n + 2 + 4 · k (k = 0, 1, 2, 3, ...) |
| CSVtypeA2 | CSBL_B_n, CSBL_B_n + 4, CSBL_B_n + 8, CSBL_B_n + 12, ... | CSBL_A_n + 2, CSBL_A_n + 6, CSBL_A_n + 10, CSBL_A_n + 14, ... | CSBL_B_n + 4 · k, CSBL_A_n + 2 + 4 · k (k = 0, 1, 2, 3, ...) |
| CSVtypeA3 | CSBL_A_n + 1, CSBL_A_n + 5, CSBL_A_n + 9, CSBL_A_n + 13, ... | CSBL_B_n + 3, CSBL_B_n + 7, CSBL_B_n + 11, CSBL_B_n + 15, ... | CSBL_A_n + 1 + 4 · k, CSBL_B_n + 3 + 4 · k (k = 0, 1, 2, 3, ...) |
| CSVtypeA4 | CSBL_B_n + 1, CSBL_B_n + 5, CSBL_B_n + 9, CSBL_B_n + 13, ... | CSBL_A_n + 3, CSBL_A_n + 7, CSBL_A_n + 11, CSBL_A_n + 15, ... | CSBL_B_n + 1 + 4 · k, CSBL_A_n + 3 + 4 · k (k = 0, 1, 2, 3, ...) |

Four electrically independent sets of CS buslines are connected, respectively, to the four CS trunks shown in Table 1 above.

Figures 2, 30A:
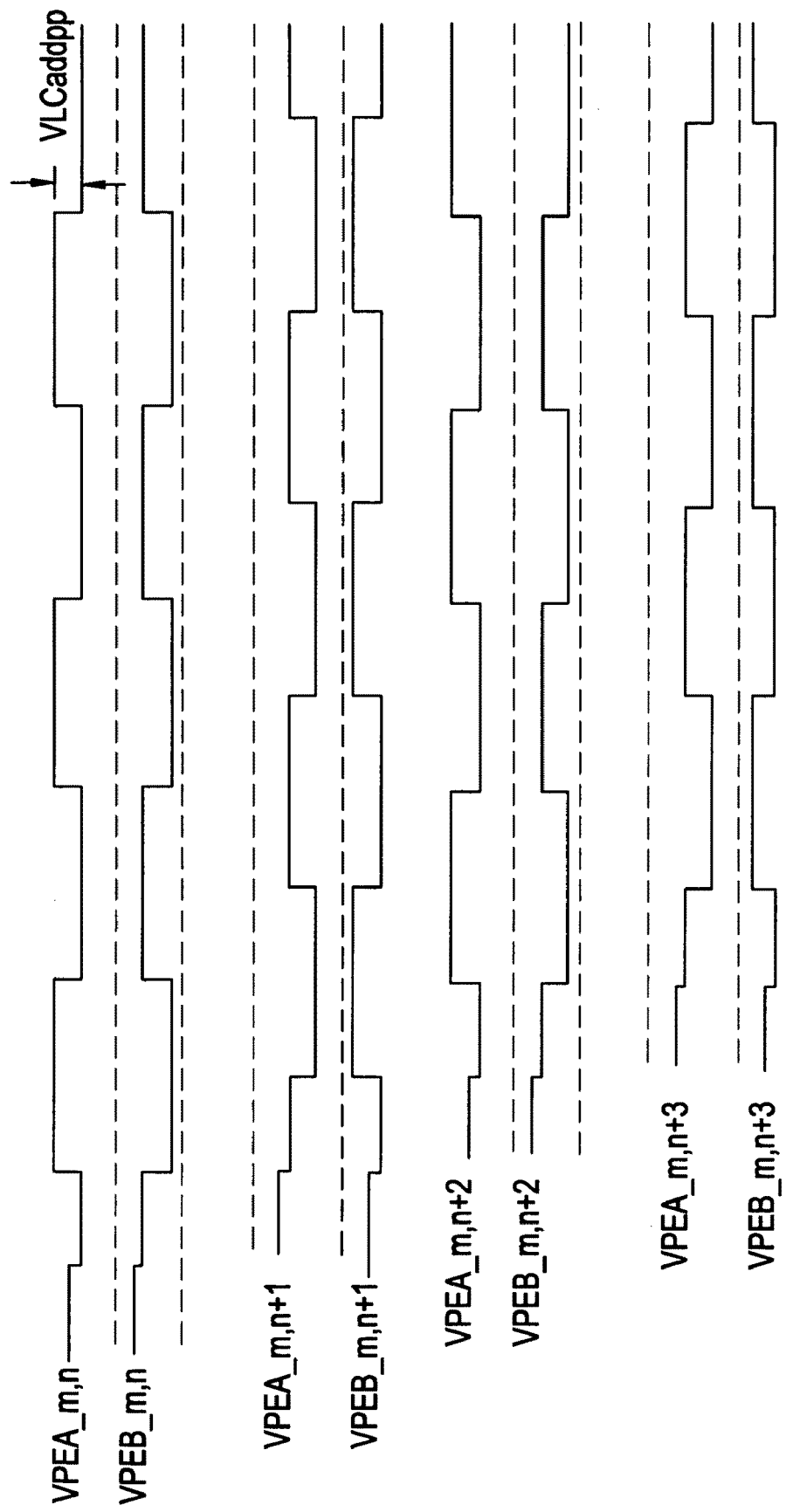
Figures 3, 30A:
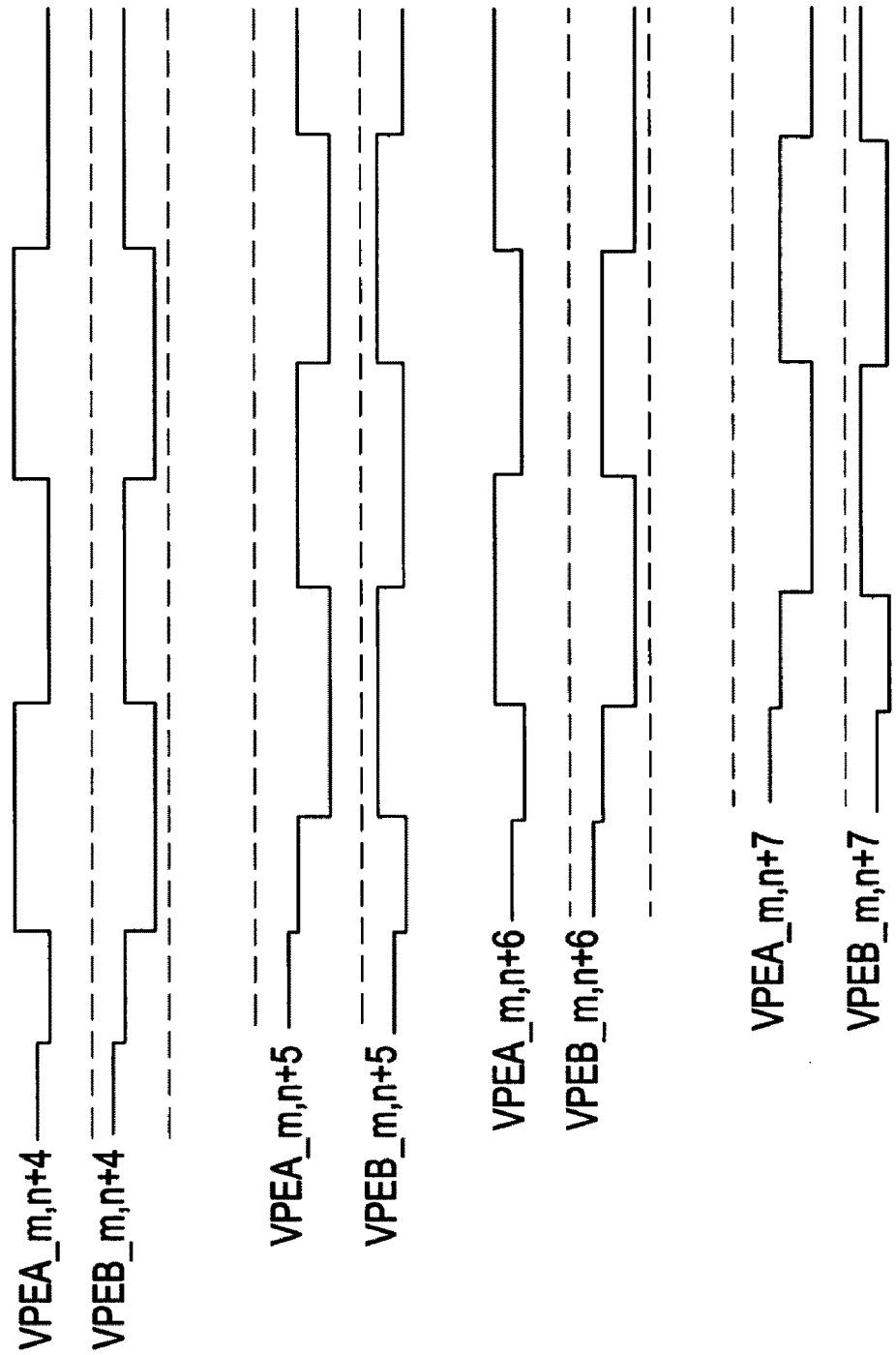
Figures 1, 30B:
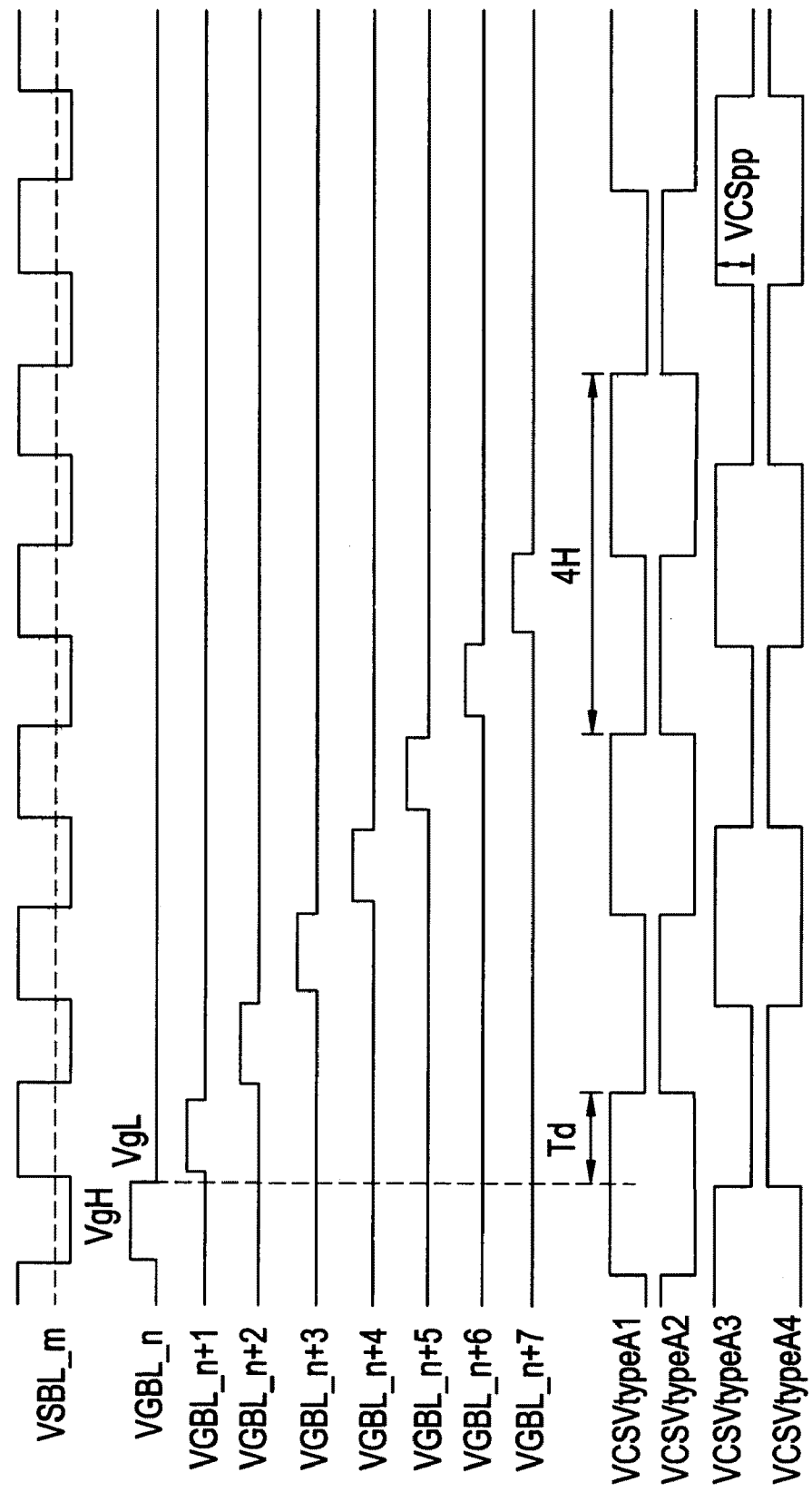
Figures 2, 30B:
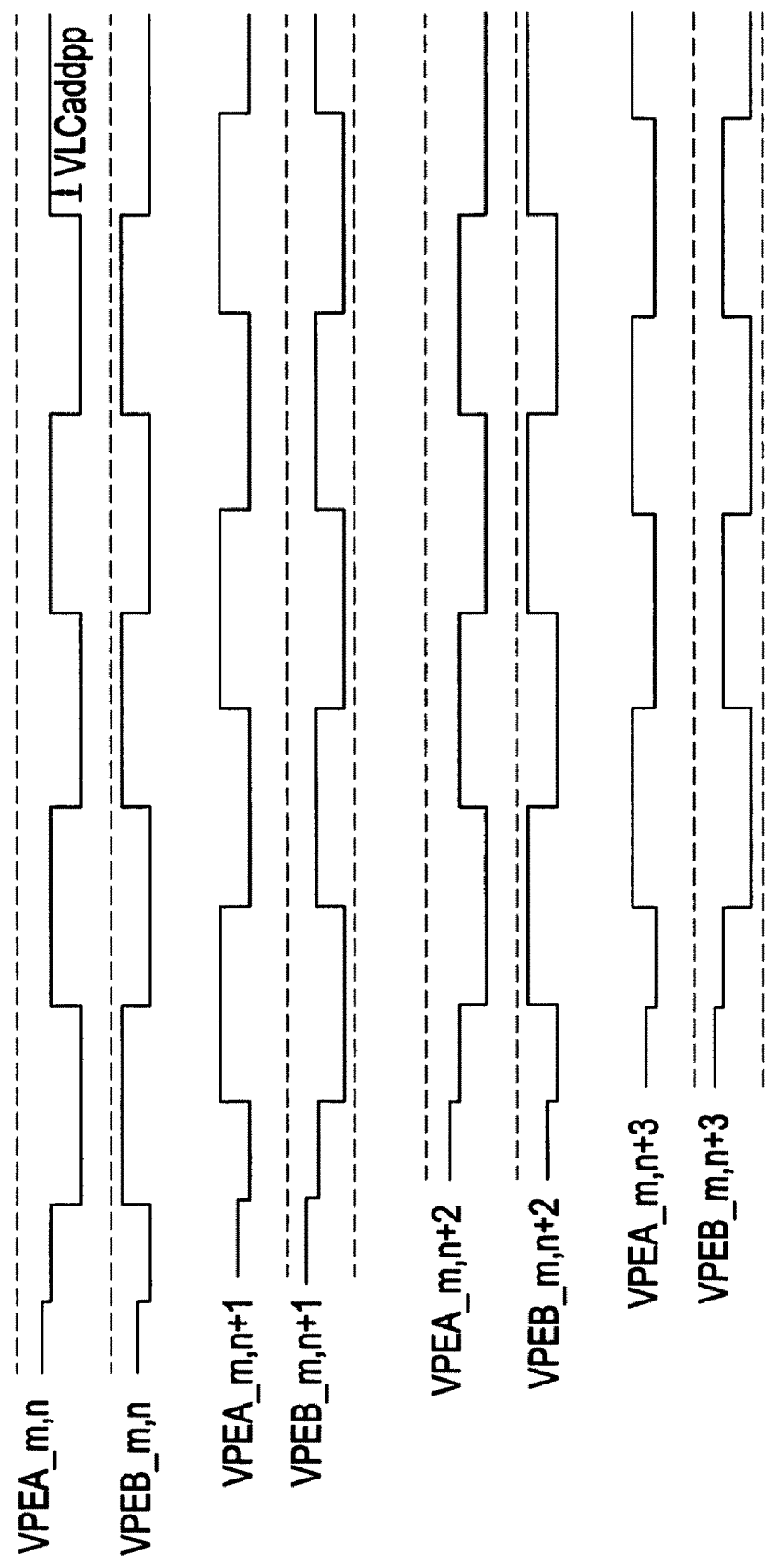
Figures 3, 30B:
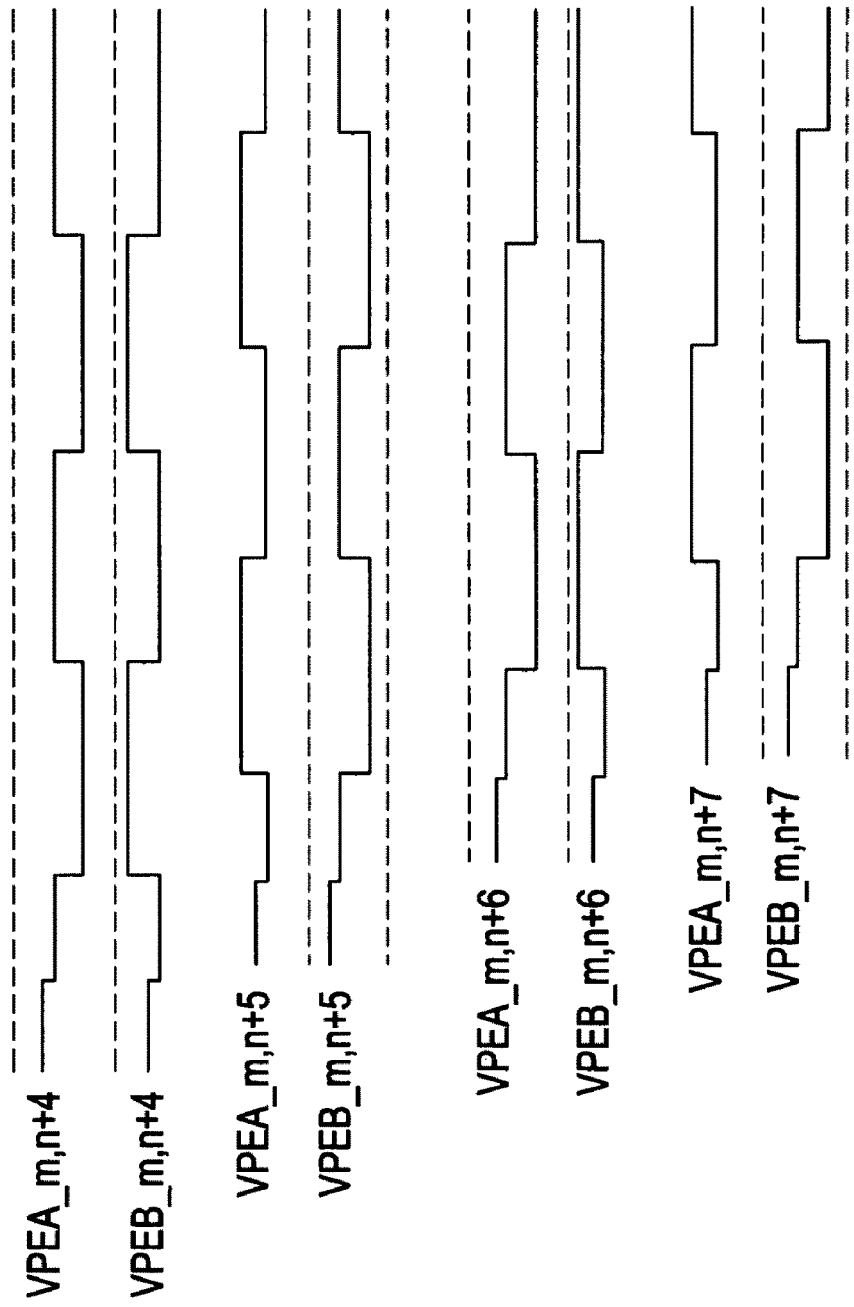

FIGS. 30A and 30B show the periods and phases of oscillation of the CS buslines in terms of voltage waveforms of gate buslines as well as show voltages of sub-pixel electrodes. FIGS. 30A and 30B correspond to FIGS. 23A and 23B above. The same components as those in FIGS. 23A and 23B are denoted by the same reference numerals/characters as those in FIGS. 23A and 23B and description thereof will be omitted. A liquid crystal display generally reverses, at regular time intervals, the direction of the electric field applied to the liquid crystal layer of each pixel, and thus it is necessary to consider two types of drive voltage waveform corresponding to the directions of the electric field. The two types of driving state are shown in FIGS. 30A and 30B, respectively.

The first point to be noted in FIGS. 30A and 30B is that the periods of oscillation of voltages VCSVtypeA1, VCSVtypeA2, VCSVtypeA3, and VCSVtypeA4 of CSVtypeA1, CSVtypeA2, CSVtypeA3, and CSVtypeA4 are all four times the horizontal scanning period (4H).

The second point to be noted in FIGS. 30A and 30B is that the phases of VCSVtypeA1, VCSVtypeA2, VCSVtypeA3, and VCSVtypeA4 are as follows. First, comparing phases among the CS trunks, VCSVtypeA2 lags VCSVtypeA1 by 2H, VCSVtypeA3 lags VCSVtypeA1 by 3H, and VCSVtypeA4 lags VCSVtypeA1 by 1H. Next, looking at the voltages of the CS trunks and voltages of the gate buslines, the phases of the CS trunk voltages and gate busline voltages are as follows. As shown in FIGS. 30A and 30B, the time when the voltages of the gate buslines corresponding to respective CS trunks change from VgH to VgL coincides with the time when the flat parts of the CS trunk voltages reach their centers. In other words, the value of Td in FIGS. 30A and 30B is 1H. However, Td may take any value larger than 0H but smaller than 2H.

Here, the gate buslines corresponding to respective CS trunks are the CS trunks and gate buslines to which CS buslines which are connected to the same sub-pixel electrodes via auxiliary capacitances CS and TFT elements. Based on FIG. 29, the gate buslines and CS buslines corresponding to each CS trunk in this liquid crystal display, are shown in Table 2 below.

TABLE 2

| CS trunk | Corresponding gate busline | Corresponding CS busline |
|---|---|---|
| CSVtypeA1 | GBL_n, GBL_n + 2, GBL_n + 4, GBL_n + 6, GBL_n + 8, ... [GBL_n + 2 · k (k = 0, 1, 2, 3, ...)] | CSBL_A_n, CSBL_B_n + 2, CSBL_A_n + 4, CSBL_B_n + 6, CSBL_A_n + 8, ... [CSBL_A_n + 4 · k, CSBL_B_n + 2 + 4 · k (k = 0, 1, 2, 3, ...)] |
| CSVtypeA2 | GBL_n, GBL_n + 2, GBL_n + 4, GBL_n + 6, GBL_n + 8, ... [GBL_n + 2 · k (k = 0, 1, 2, 3, ...)] | CSBL_B_n, CSBL_A_n + 2, CSBL_B_n + 4, CSBL_A_n + 6, CSBL_B_n + 8, ... [CSBL_B_n + 4 · k, CSBL_A_n + 2 + 4 · k (k = 0, 1, 2, 3, ...)] |
| CSVtypeA3 | GBL_n + 1, GBL_n + 3, GBL_n + 5, GBL_n + 7, GBL_n + 9, ... [GBL_n + 1 + 2 · k (k = 0, 1, 2, 3, ...)] | CSBL_A_n + 1, CSBL_B_n + 3, CSBL_A_n + 5, CSBL_B_n + 7, CSBL_A_n + 9, ... [CSBL_A_n + 1 + 4 · k, CSBL_B_n + 3 + 4 · k (k = 0, 1, 2, 3, ...)] |
| CSVtypeA4 | GBL_n + 1, GBL_n + 3, GBL_n + 5, GBL_n + 7, GBL_n + 9, ... [GBL_n + 1 + 2 · k (k = 0, 1, 2, 3, ...)] | CSBL_B_n + 1, CSBL_A_n + 3, CSBL_B_n + 5, CSBL_A_n + 7, CSBL_B_n + 9, ... [CSBL_B_n + 1 + 4 · k, CSBL_A_n + 3 + 4 · k (k = 0, 1, 2, 3, ...)] |

Although the periods and phases of voltages of the CS trunks have been described with reference to FIGS. 30A and 30B, voltage waveforms of the CS trunks are not limited to this. The CS trunks may have other voltage waveforms, provided the following two conditions are satisfied.

The first condition is that the first change of the voltage VCSVtypeA1 after the voltage of a corresponding gate busline changes from VgH to HgL is a voltage increase, that the first change of the voltage VCSVtypeA2 after the voltage of a corresponding gate busline changes from VgH to HgL is a voltage decrease, that the first change of the voltage VCSVtypeA3 after the voltage of a corresponding gate busline changes from VgH to HgL is a voltage decrease, and that the first change of the voltage VCSVtypeA4 after the voltage of a corresponding gate busline changes from VgH to HgL is a voltage increase. The drive voltage waveforms shown in FIG. 30A satisfy this condition.

The second condition is that the first change of the voltage VCSVtypeA1 after the voltage of a corresponding gate busline changes from VgH to HgL is a voltage decrease, that the first change of the voltage VCSVtypeA2 after the voltage of a corresponding gate busline changes from VgH to HgL is a voltage increase, that the first change of the voltage VCSVtypeA3 after the voltage of a corresponding gate busline changes from VgH to HgL is a voltage increase, and that the first change of the voltage VCSVtypeA4 after the voltage of a corresponding gate busline changes from VgH to HgL is a voltage decrease. The drive voltage waveforms shown in FIG. 30B satisfy this condition.

However, for the reasons described below, the waveforms shown in FIGS. 30A and 30B are used preferably.

In FIGS. 30A and 30B, the period of oscillation is constant. This can simplify the signal generator circuit.

Also, in FIGS. 30A and 30B, the duty ratio of oscillation is constant. This makes it possible to keep the amplitude of oscillation constant, and thus simplify the signal generator circuit because when oscillating voltages are used as CS busline voltages, the amounts of change in the voltages applied to the liquid crystal layers depend on the amplitude and duty ratio of the oscillation. Thus, by keeping the duty ratio of oscillation constant, it is possible to keep the amplitude of oscillation constant. The duty ratio is set, for example, to 1:1.

Also, in FIGS. 30A and 30B, for any CS oscillating voltage, there exists an oscillating voltage 180 degrees out of phase (oscillating voltage in opposite phase). That is, four electrically independent CS trunks are grouped into pairs (two pairs) of CS trunks which supply oscillating voltages 180 degrees out of phase with each other. This makes it possible to minimize the amount of the current flowing through the counter electrodes of storage capacitors, and thus simplify the drive circuit connected to the counter electrodes.

Figures 1, 31A:
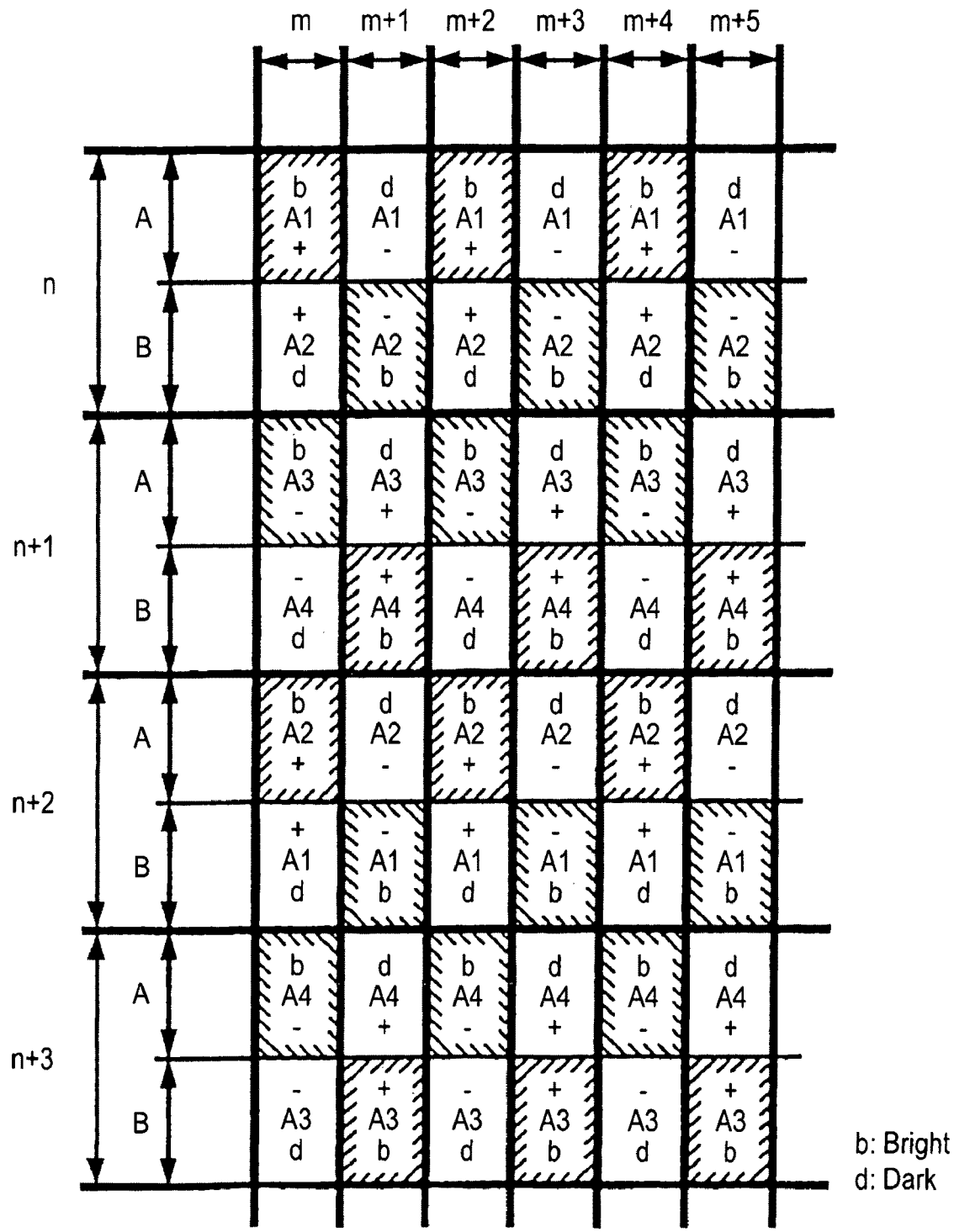
Figures 2, 31A:
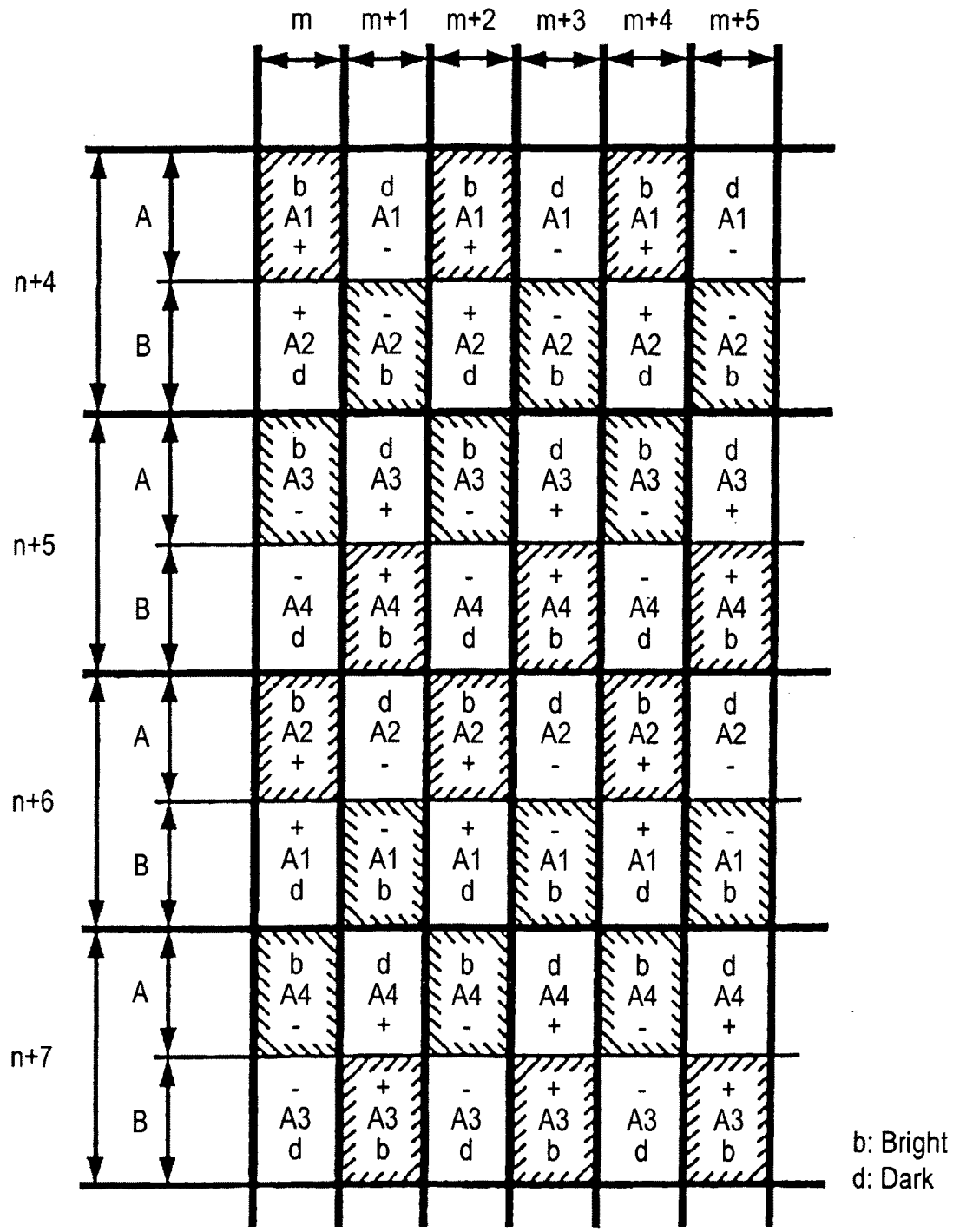
Figures 1, 31B:
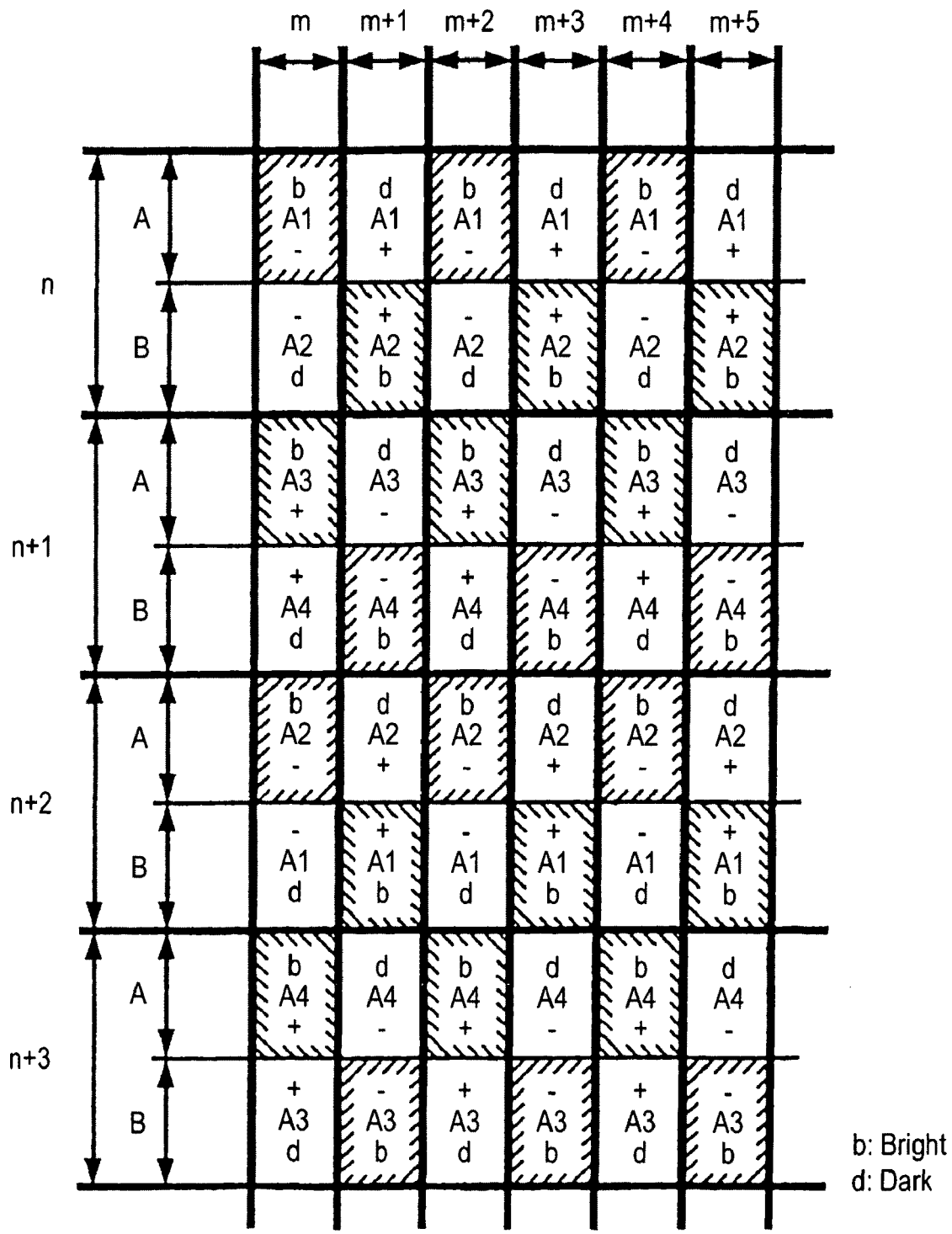
Figures 2, 31B:
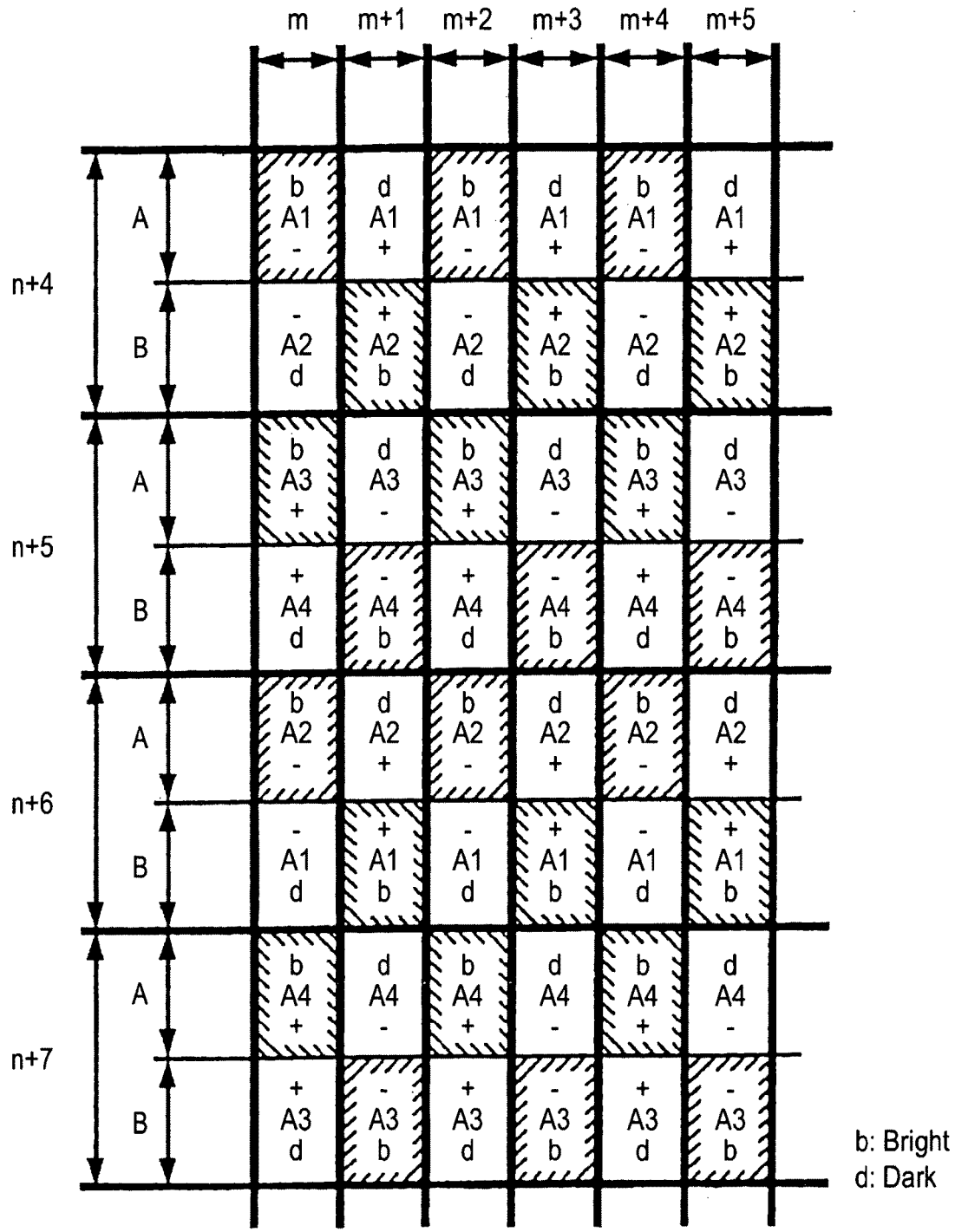

FIGS. 31A and 31B summarize driving states of the liquid crystal display according to this embodiment. The driving states of the liquid crystal display are also classified into two types according to the polarity of the drive voltages of the sub-pixels as in the case of FIGS. 30A and 30B. The driving states in FIG. 31A correspond to the drive voltage waveforms in FIG. 30A while the driving states in FIG. 31B correspond to the drive voltage waveforms in FIG. 30B. FIGS. 31A and 31B correspond to FIGS. 24A and 24B above.

A point to be noted in FIGS. 31A and 31B is whether requirements for an area ratio gray scale panel are satisfied. Compliance with the following five requirements for an area ratio gray scale panel will be verified.

The first requirement is that each pixel consists of a plurality of sub-pixels which differ in brightness when displaying an intermediate grayscale.

The second requirement is that the order of brightness of the sub-pixels which differ in brightness is constant regardless of time.

The third requirement is that the sub-pixels which differ in brightness are arranged elaborately.

The fourth requirement is that pixels of opposite polarity are arranged elaborately in any frame.

The fifth requirement is that sub-pixels of the same polarity, equal in the order of brightness—especially the brightest sub-pixels—are arranged elaborately in any frame.

Compliance with the first requirement will be verified. In FIGS. 31A and 31B, each pixel consists of two sub-pixels which differ in brightness. Specifically, for example, in FIG. 31A, the pixel in row n and column m consists of a high-brightness sub-pixel indicated as "b (Bright)" and low-brightness sub-pixel indicated as "d(Dark)". Thus, the first requirement is satisfied.

Compliance with the second requirement will be verified. The liquid crystal display alternates two display states which differ in driving state at regular time intervals. FIGS. 31A and 31B which show the driving states corresponding to the two display states coincide in the locations of high-brightness sub-pixels and low-brightness sub-pixels. Thus, the second requirement is satisfied.

Compliance with the third requirement will be verified. In FIGS. 31A and 31B, the sub-pixels which differ in the order of brightness, i.e., the sub-pixels indicated as "b(Bright)" and sub-pixels indicated as "d(Dark)" are arranged checkerwise. Visual observation of the liquid crystal display revealed no display problem such as reduced resolution resulting from the use of sub-pixels differing in brightness. Thus, the third requirement is satisfied.

Compliance with the fourth requirement will be checked. In FIGS. 31A and 31B, pixels of opposite polarity are arranged checkerwise. Specifically, for example, in FIG. 31A, the pixel in row n+2 and column m+2 has a "+" polarity. Beginning with this pixel, the polarity changes every other pixel between "−" and "+" both in the row direction and column direction. With a liquid crystal display, which does not satisfy the fourth requirement, it is believed that flickering of display is observed in sync with changes in the drive polarity of pixels between "+" and "−". However, no flickering was observed when the liquid crystal display of the embodiment was checked visually. Thus, the fourth requirement is satisfied.

Compliance with the fifth requirement will be checked. In FIGS. 31A and 31B, looking at the drive polarity of the sub-pixels equal in the order of brightness, the drive polarity reverses every two rows of sub-pixels, i.e., every other pixel width. Specifically, for example, in row n_B, the sub-pixels in columns m+1, m+3, and m+5 are "b (Bright))" and the polarity of all these sub-pixels is "−". In row n+1_A, the sub-pixels in columns m, m+2, and m+4 are "b (Bright)" and the polarity of all these sub-pixels is "−". In row n+1_B, the sub-pixels in columns m+1, m+3, and m+5 are "b(Bright)" and the polarity of all these sub-pixels is "+". In row n+2_A, the sub-pixels in columns m, m+2, and m+4 are "b(Bright)" and the polarity of all these sub-pixels is "+". With a liquid crystal display, which does not satisfy the fifth requirement, it is believed that flickering of display is observed in sync with changes in the drive polarity of pixels between "+" and "−". However, no flickering was observed when the liquid crystal display according to the present invention was checked visually. Thus, the fifth requirement is satisfied.

When the liquid crystal display according to this embodiment was observed by varying the amplitude VCSpp of the CS voltage, viewing angle characteristics were improved with display contrast suppressed during oblique observation as the amplitude VCSpp of the CS voltage was increased from 0 V (0 V was used to support typical liquid crystal displays other than the liquid crystal display according to the present invention). Although the improvement of the viewing angle characteristics seemed slightly different depending on displayed images, the best improvement was achieved when VCSpp was set such that the value of VLCaddpp would fall within 0.5 to 2 times the threshold voltage of the liquid crystal display in a typical drive mode (VCSpp was 0V).

Summarizing, this embodiment makes it possible to set the periods of oscillation of the oscillating voltages applied to the storage capacitor counter electrodes to four times the horizontal scanning period in a liquid crystal display which improves the viewing angle characteristics by applying oscillating voltages to the storage capacitor counter electrodes and thereby achieving multi-pixel display. It can readily implement multi-pixel display even on large liquid crystal displays with high load capacitance and resistance of CS buslines, high-resolution liquid crystal displays with a short horizontal scanning period, or liquid crystal displays with high-speed driving and short vertical and horizontal scanning periods.

Next, configuration and operation of the liquid crystal display according to the embodiment of the third aspect of the present invention will be described with reference to FIGS. 32 to 34B.

This embodiment achieves the area ratio gray scale display by setting the oscillation period of the oscillating voltages of the CS buslines to twice the horizontal scanning period. The description will be focused on the following points and provided with reference to drawings. The first point concerns the configuration of the liquid crystal display centering around connection patterns between the storage capacitor counter electrodes of the storage capacitors connected to sub-pixels and CS buslines. The second point concerns the periods and phases of oscillation of the CS buslines in terms of voltage waveforms of gate buslines. The third point concerns driving and display states of sub-pixels according to this embodiment.

Figures 1, 32:
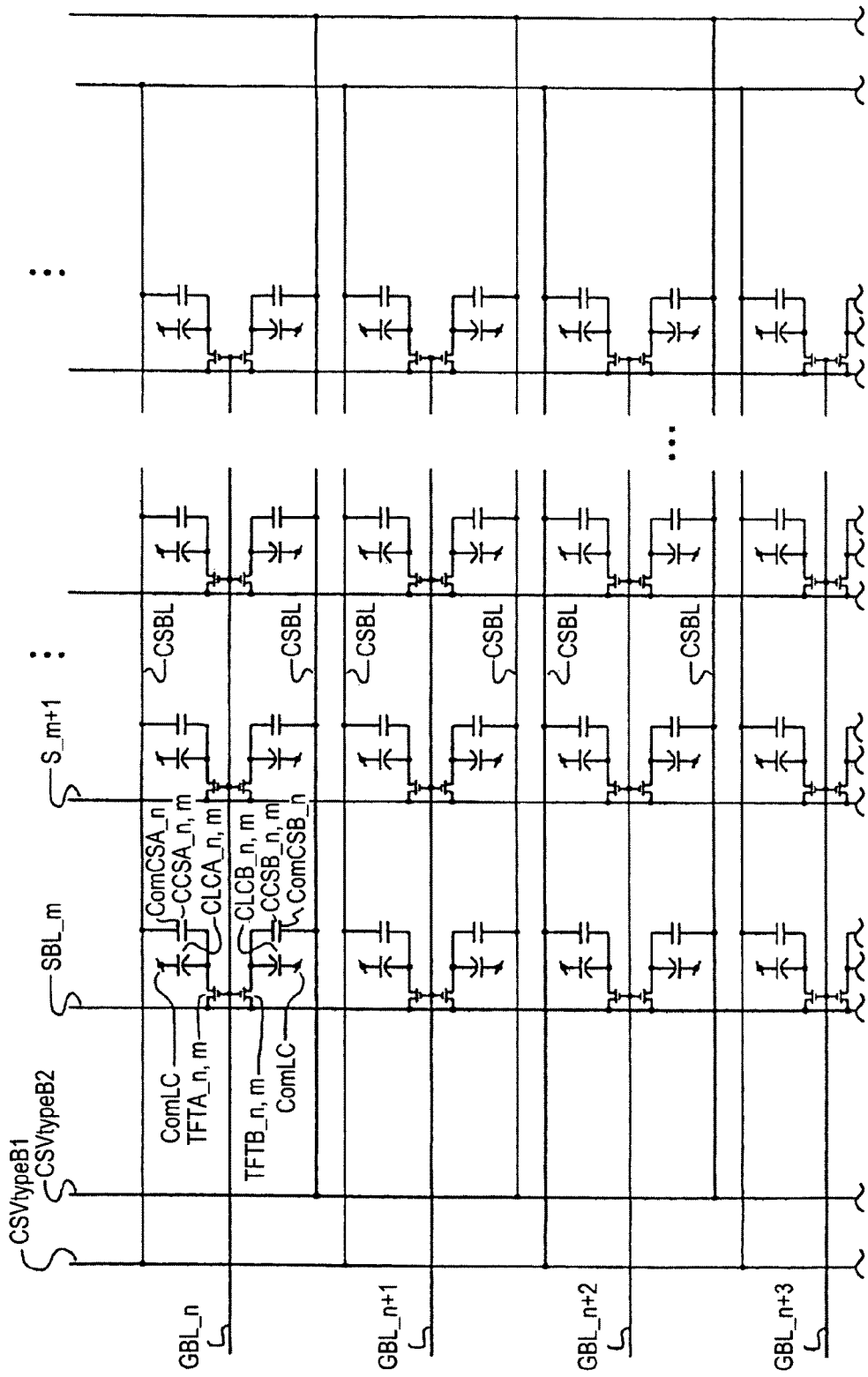
Figures 2, 32:
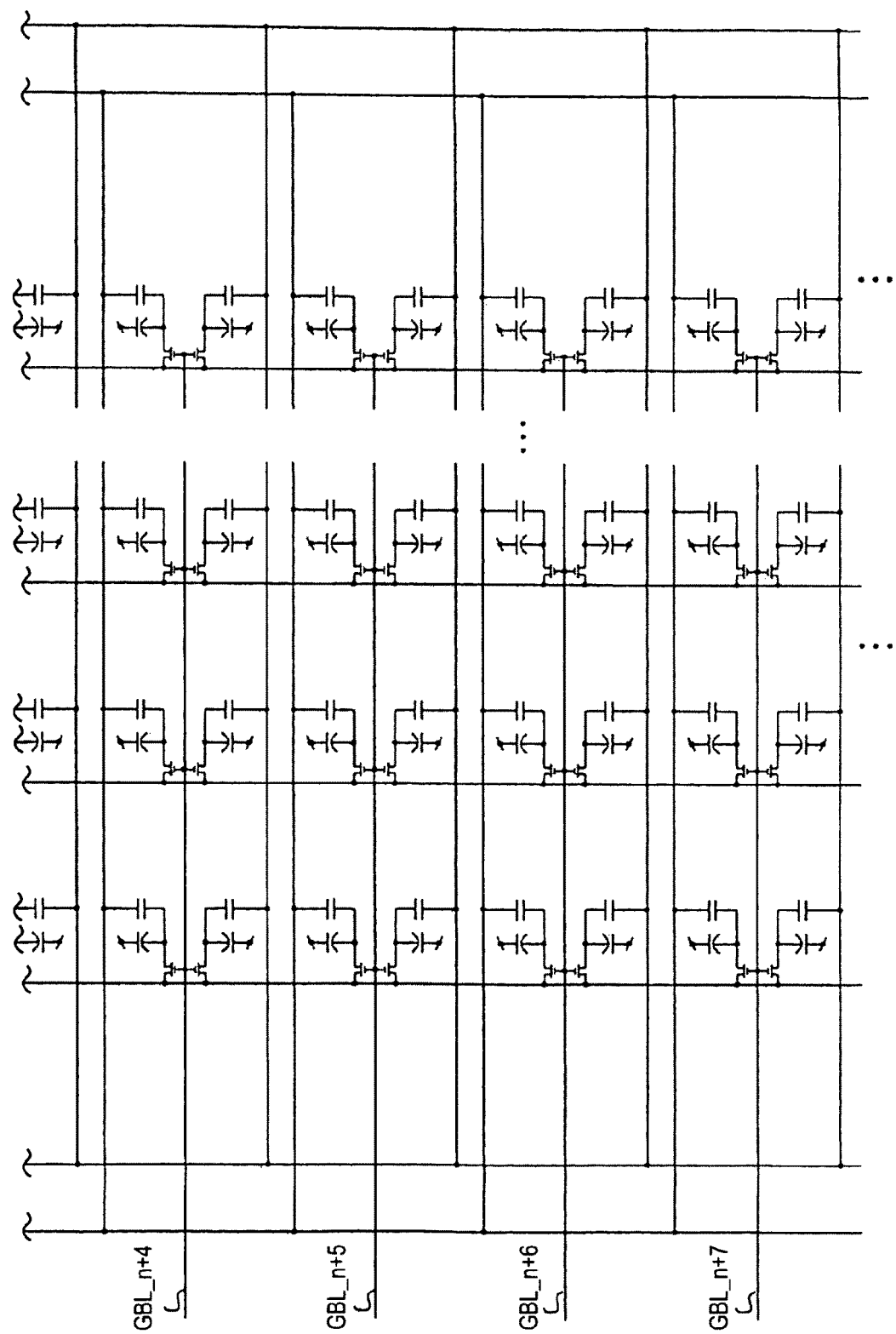

FIG. 32 is a diagram schematically showing an equivalent circuit of the liquid crystal display according to an embodiment of the third aspect of the present invention and corresponds to FIG. 29. The same components as those in FIG. 29 are denoted by the same reference numerals/characters as those in FIG. 29 and description thereof will be omitted. The liquid crystal display in FIG. 32 differs from the liquid crystal display in FIG. 29 in that it has two electrically independent CS trunks CSVtypeB1 and CSVtypeB2 as well as in the state of connections between CS trunks and CS buslines.

The first point to be noted in FIG. 32 is that CS buslines for adjacent sub-pixels of pixels in adjacent rows in the column direction are electrically independent of each other. Specifically, the CS busline CSBL_B_n for the sub-pixel CLCB_n,m in row n and the CS busline CSBL_A_n+1 for the sub-pixel CLCA_n+1,m of a pixel in an adjacent row in the column direction are electrically independent of each other.

The second point to be noted in FIG. 32 is that each CS busline (CSBL) is connected to two CS trunks (CSVtypeB1 and CSVtypeB2) at a panel end. That is, in the liquid crystal display according to this embodiment, there are two electrically independent sets of CS trunks.

The third point to be noted in FIG. 32 is the state of connections between the CS buslines and the two CS trunks, i.e., arrangement of electrically independent CS buslines in the column direction. According to the connection rules for CS buslines and CS trunks in FIG. 32, the CS buslines connected to the CS trunks CSVtypeB1 and CSVtypeB2 are as shown in Table 3 below.

TABLE 3

| CS trunk | CS busline connected to CS trunk | General notation of CS busline listed on left |
|---|---|---|
| CSVtypeB1 | CSBL_A_n, CSBL_A_n+1, CSBL_A_n+2, CSBL_A_n+3, ... | CSBL_A_n+k, (k = 0, 1, 2, 3, ...) |
| CSVtypeB2 | CSBL_B_n, CSBL_B_n+1, CSBL_B_n+2, CSBL_B_n+3, ... | CSBL_B_n+k, (k = 0, 1, 2, 3, ...) |

Two electrically independent sets of CS buslines are connected, respectively, to the two CS trunks shown in Table 3 above.

Figures 1, 33A:
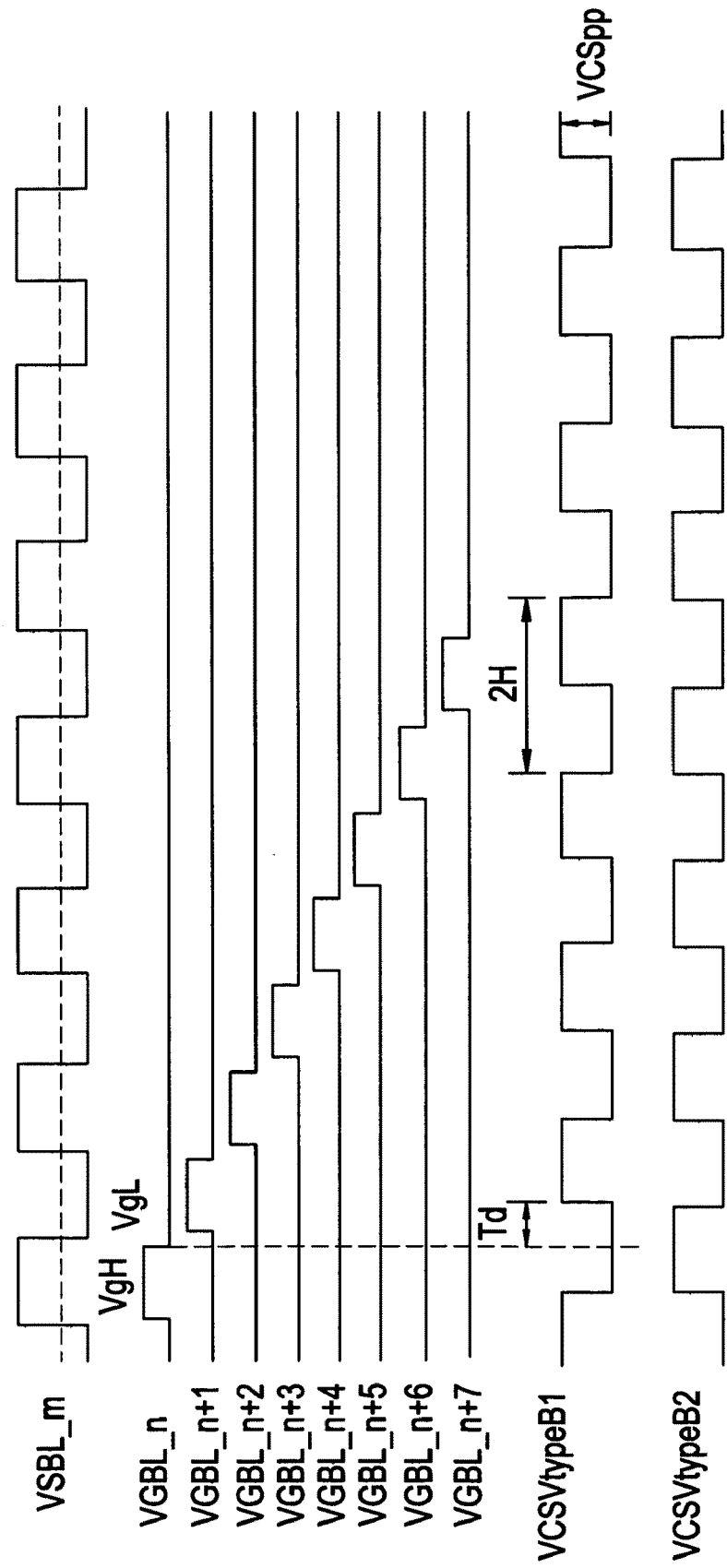
Figures 2, 33A:
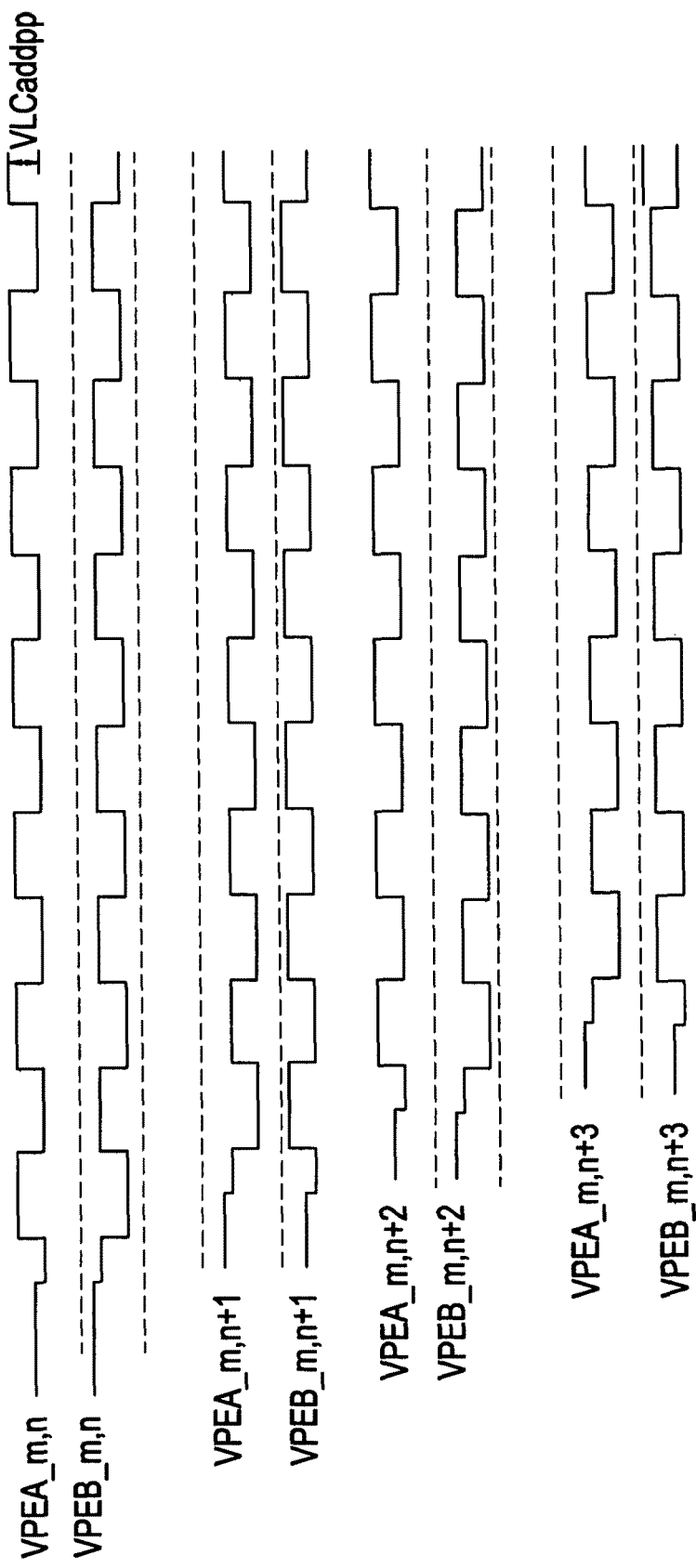
Figures 3, 33A:
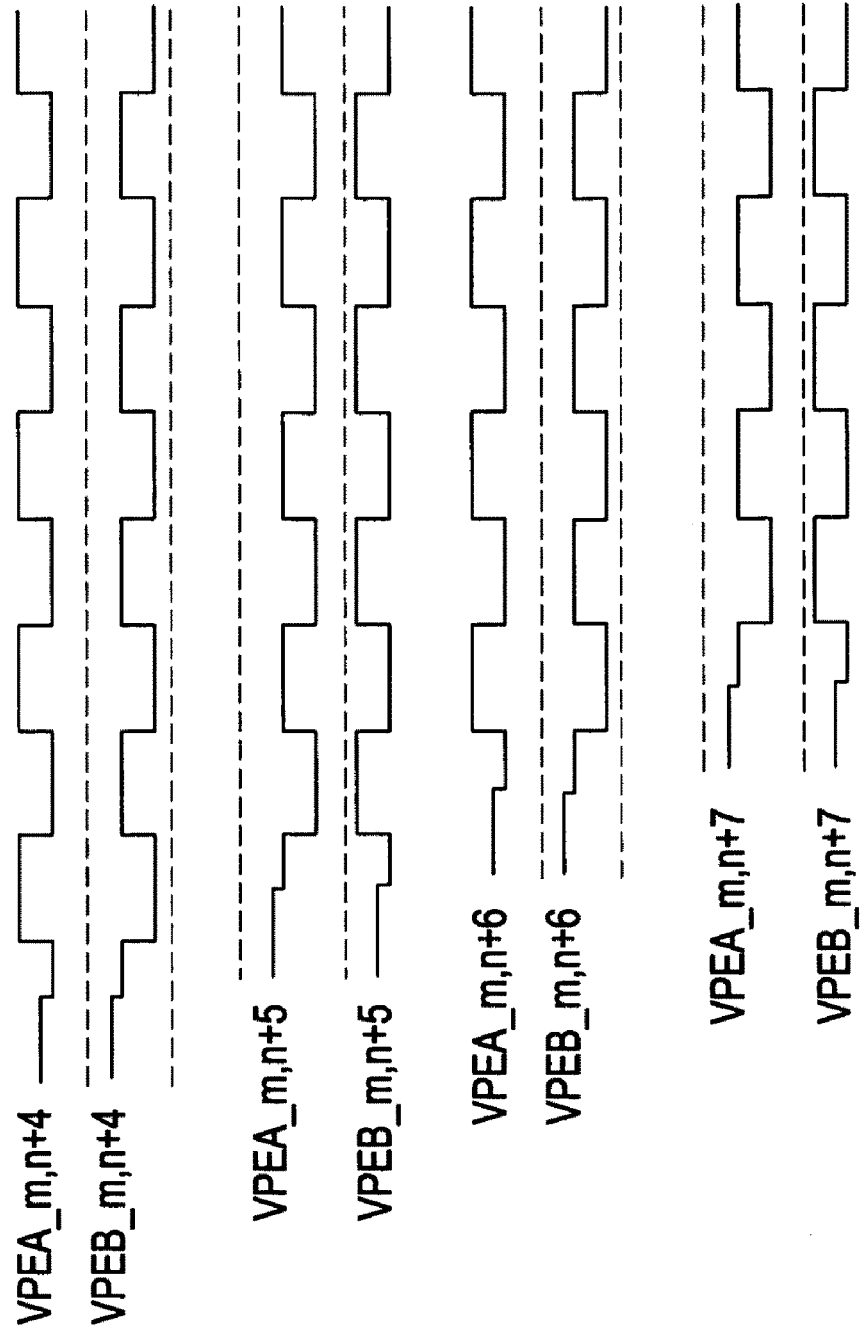
Figures 1, 33B:
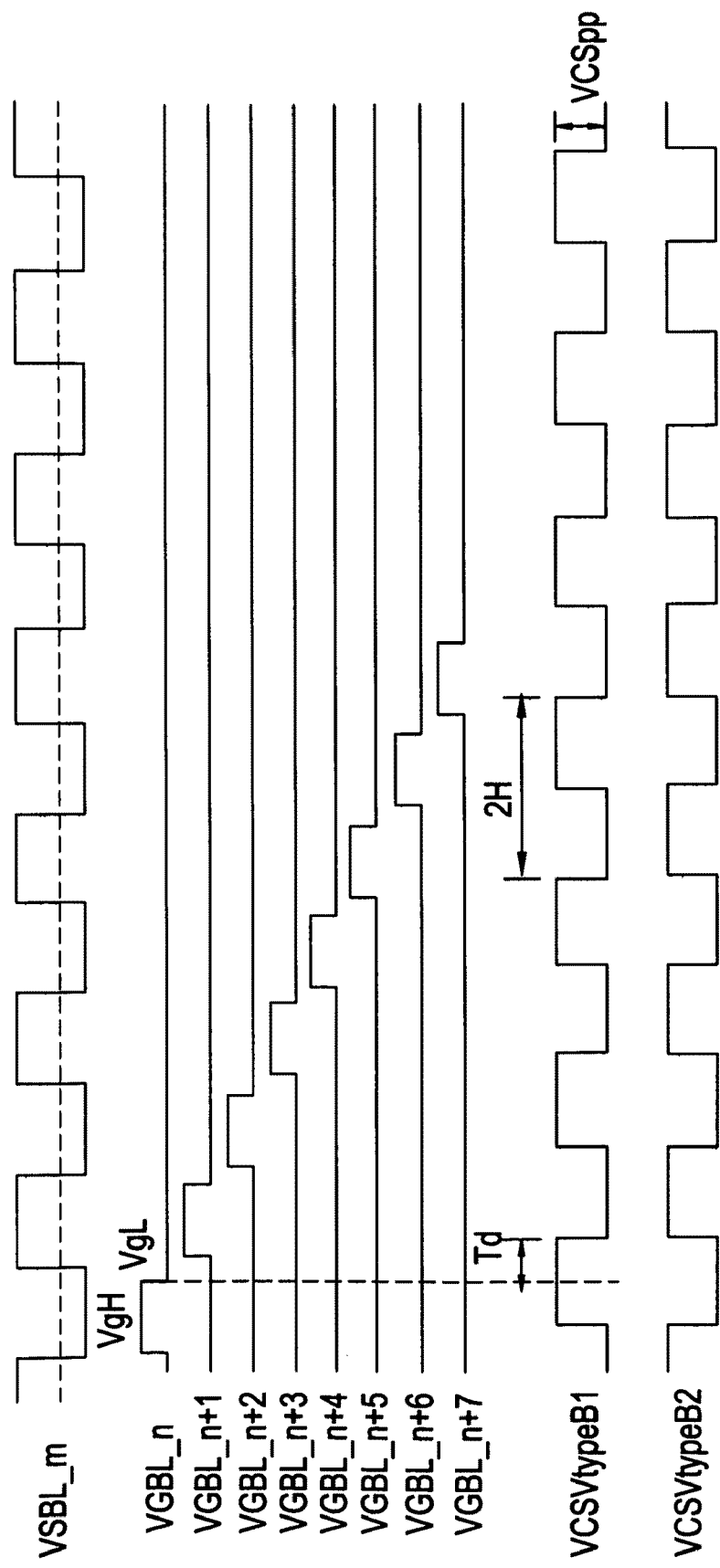
Figures 2, 33B:
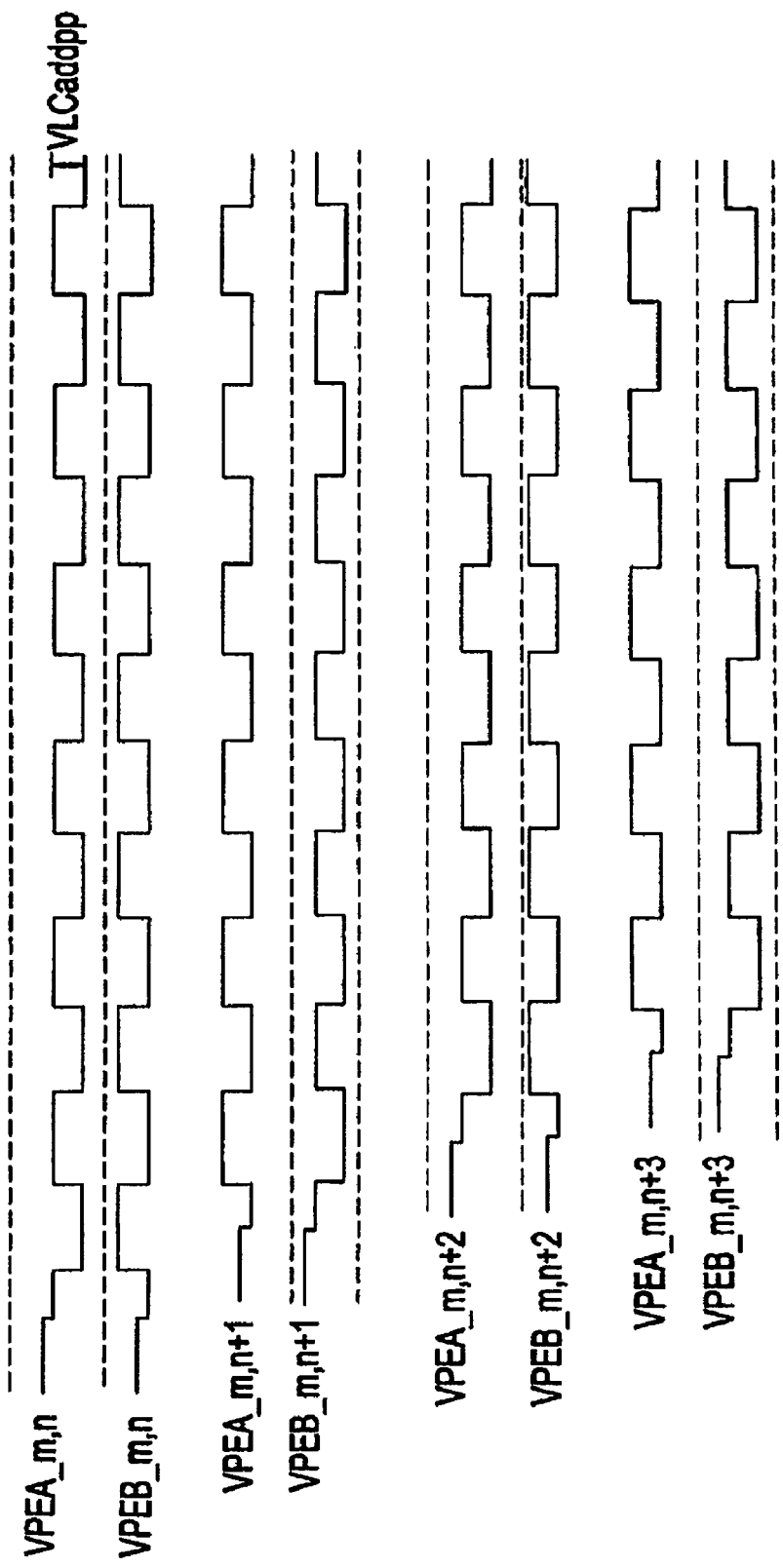

FIGS. 33A and 33B show the periods and phases of oscillation of the CS buslines in terms of voltage waveforms of gate buslines as well as show voltages of sub-pixel electrodes. FIGS. 33A and 33B correspond to FIGS. 30A and 30B of the previous embodiment. The same components as those in FIGS. 30A and 30B are denoted by the same reference numerals/characters as those in FIGS. 30A and 30B and description thereof will be omitted. A liquid crystal display generally reverses, at regular time intervals, the direction of the electric field applied to the liquid crystal layer of each pixel, and thus it is necessary to consider two types of drive voltage waveform corresponding to the directions of the electric field. The two types of driving state are shown in FIGS. 33A and 33B, respectively.

The first point to be noted in FIGS. 33A and 33B is that the periods of oscillation of voltages VCSVtypeB1 and VCSVtypeB2 of CSVtypeB1 and CSVtypeB2 are all two times the horizontal scanning period (2H).

The second point to be noted in FIGS. 33A and 33B is that the phases of VCSVtypeB1 and VCSVtypeB2 are as follows. First, comparing phases among the CS trunks, VCSVtypeB2 lags VCSVtypeB1 by 1H. Next, looking at the voltages of the CS trunks and voltages of the gate buslines, the phases of the CS trunk voltages and gate busline voltages are as follows. As shown in FIGS. 33A and 33B, the time when the voltages of the gate buslines corresponding to respective CS trunks change from VgH to VgL coincides with the time when the flat parts of the CS trunk voltages reach their centers. In other words, the value of Td in FIGS. 33A and 33B is 0.5H. However, Td may take any value larger than 0H but smaller than 1H.

Here, the gate buslines corresponding to respective CS trunks are the CS trunks and gate buslines to which CS buslines which are connected to the same sub-pixel electrodes via auxiliary capacitances CS and TFT elements. Based on FIGS. 33A and 33B, the gate buslines and CS buslines corresponding to each CS trunk in the liquid crystal display of this embodiment are shown in Table 4 below.

TABLE 4

| CS trunk | Corresponding gate busline | Corresponding CS busline |
|---|---|---|
| CSVtypeB1 | GBL_n, GBL_n + 1, GBL_n + 2, GBL_n + 3, GBL_n + 4, . . . [GBL_n + k (k = 0, 1, 2, 3, . . . )] | CSBL_A_n, CSBL_A_n + 1, CSBL_A_n + 2, CSBL_A_n + 3, CSBL_A_n + 4, . . . [CSBL_A_n + k (k = 0, 1, 2, 3, . . . )] |
| CSVtypeB2 | GBL_n, GBL_n + 1, GBL_n + 2, GBL_n + 3, GBL_n + 4, . . . [GBL_n + k (k = 0, 1, 2, 3, . . . )] | CSBL_B_n, CSBL_B_n + 1, CSBL_B_n + 2, CSBL_B_n + 3, CSBL_B_n + 4, . . . [CSBL_B_n + k (k = 0, 1, 2, 3, . . . )] |

Although the periods and phases of voltages of the CS trunks have been described with reference to FIGS. 33A and 33B, voltage waveforms of the CS trunks of this embodiment are not limited to this. The CS trunks may have other voltage waveforms, provided the following two conditions are satisfied.

The first condition is that the first change of the voltage VCSVtypeB1 after the voltage of a corresponding gate busline changes from VgH to HgL is a voltage increase and that the first change of the voltage VCSVtypeB2 after the voltage of a corresponding gate busline changes from VgH to HgL is a voltage decrease. FIG. 33A satisfies this condition.

The second condition is that the first change of the voltage VCSVtypeB1 after the voltage of a corresponding gate busline changes from VgH to HgL is a voltage decrease and that the first change of the voltage VCSVtypeB2 after the voltage of a corresponding gate busline changes from VgH to HgL is a voltage increase. FIG. 33B satisfies this condition.

Figures 1, 34A:
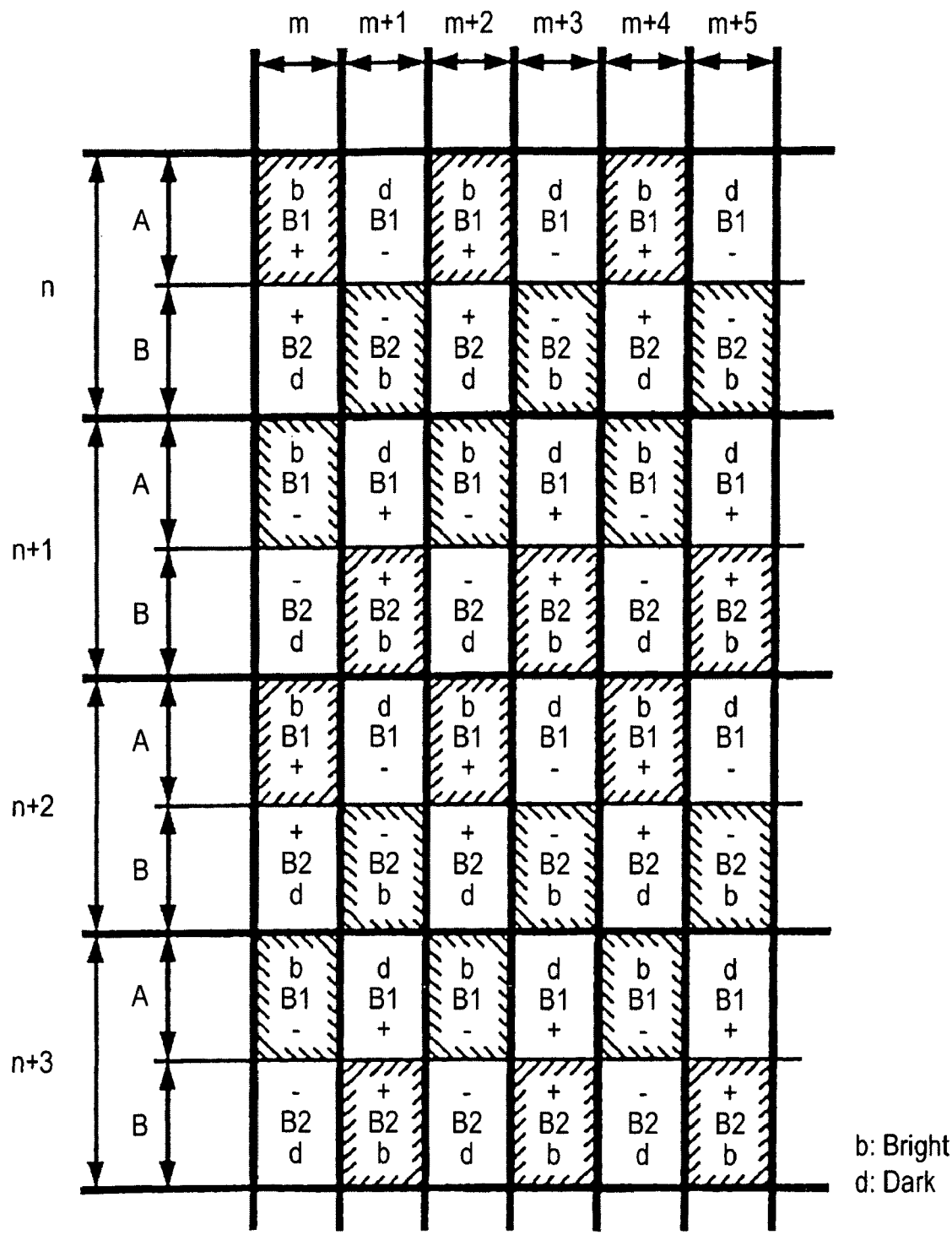
Figures 2, 34A:
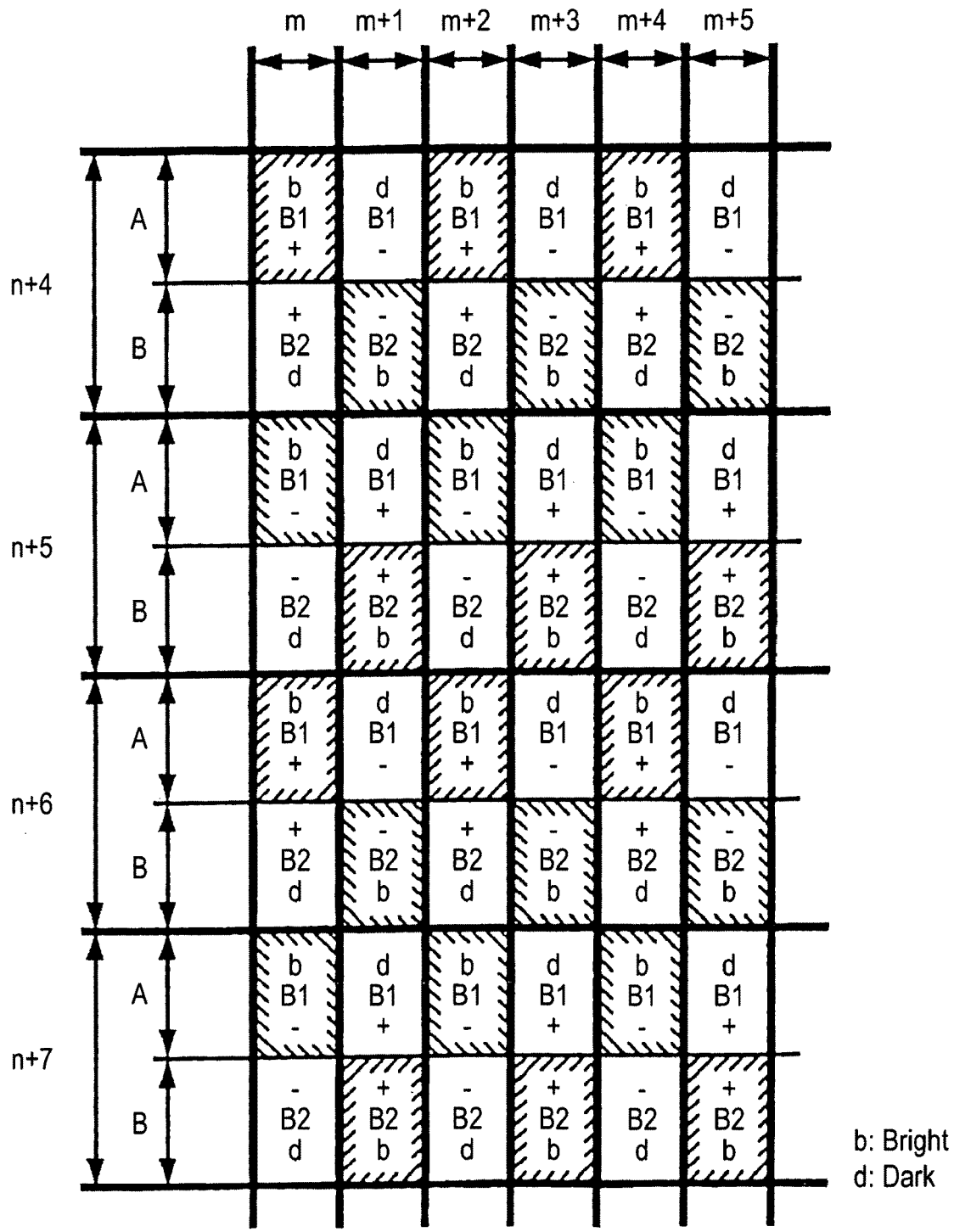
Figures 1, 34B:
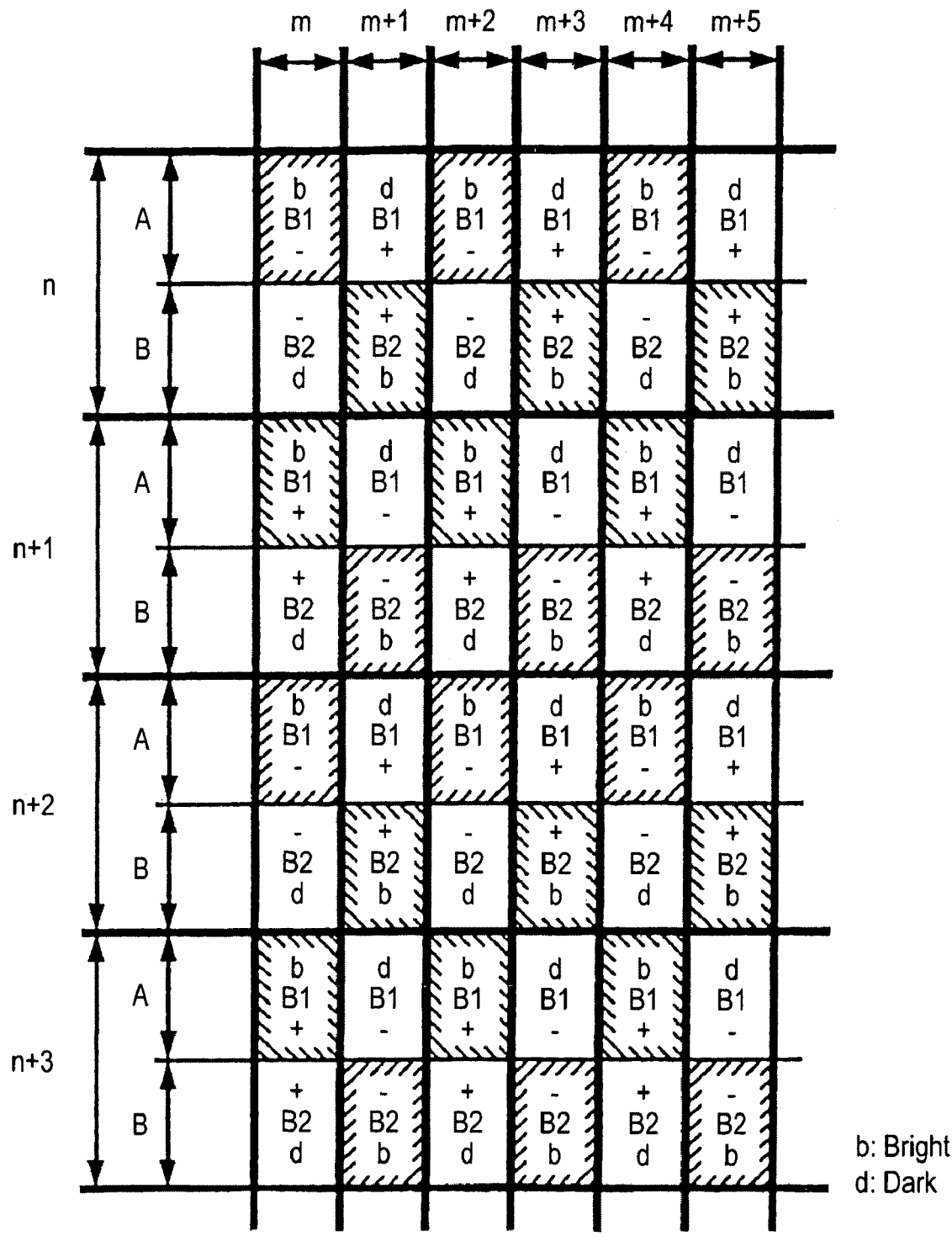
Figures 2, 34B:
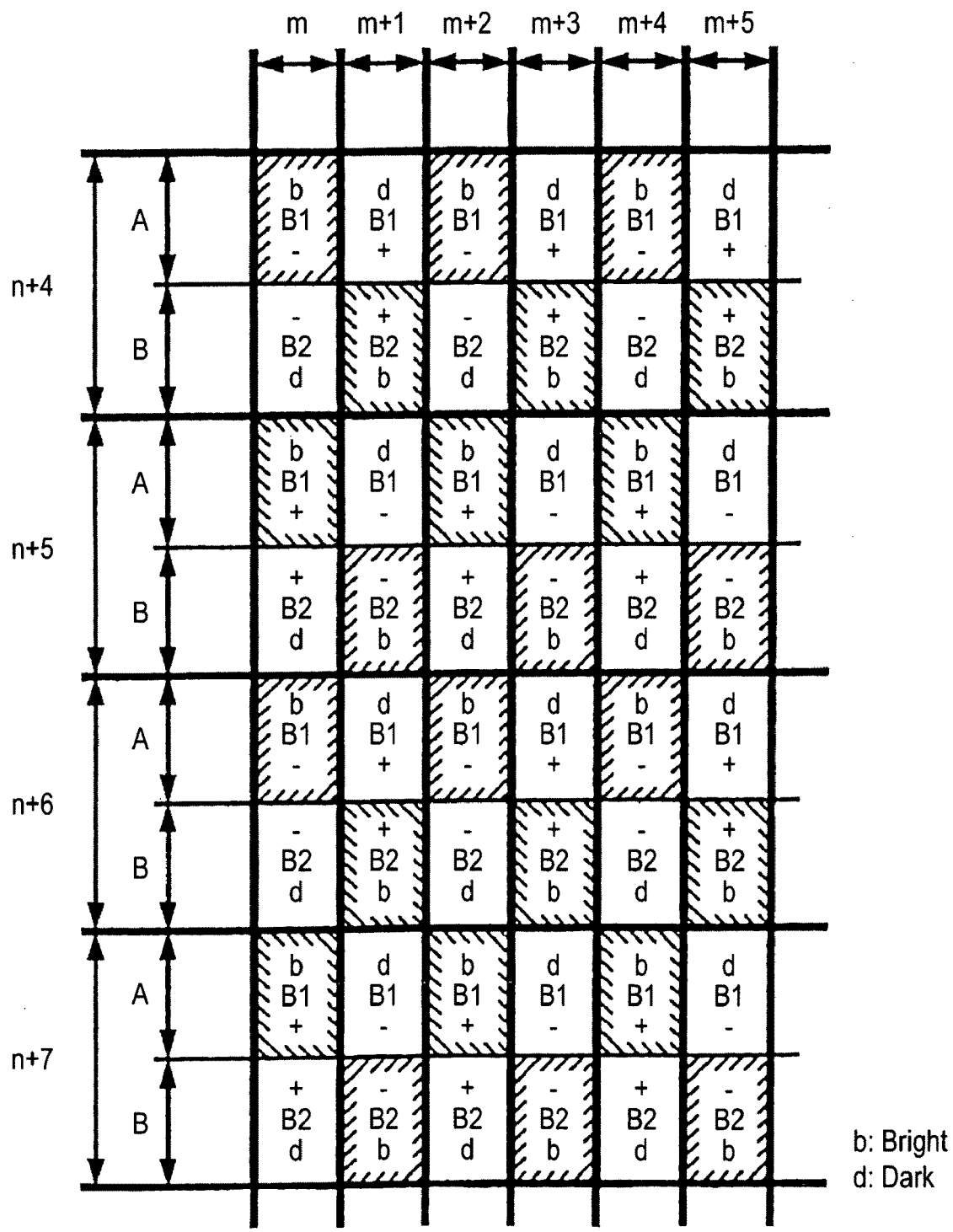

FIGS. 34A and 34B summarize driving states of the liquid crystal display according to this embodiment. The driving states of the liquid crystal display are also classified into two types according to the polarity of the drive voltages of the sub-pixels as in the case of FIGS. 33A and 33B. The driving states in FIG. 34A correspond to the drive voltage waveforms in FIG. 33A while the driving states in FIG. 34B correspond to the drive voltage waveforms in FIG. 33B. FIGS. 34A and 34B correspond to FIGS. 31A and 31B of the previous embodiment.

A point to be noted in FIGS. 34A and 34B is whether requirements for an area ratio gray scale panel are satisfied. An area ratio gray scale panel has five requirements.

The first requirement is that each pixel consists of a plurality of sub-pixels which differ in brightness when displaying an intermediate grayscale.

The second requirement is that the order of brightness of the sub-pixels which differ in brightness is constant regardless of time.

The third requirement is that the sub-pixels which differ in brightness are arranged elaborately.

The fourth requirement is that pixels of opposite polarity are arranged elaborately in any frame.

The fifth requirement is that sub-pixels of the same polarity, equal in the order of brightness—especially the brightest sub-pixels—are arranged elaborately in any frame.

Compliance with the first requirement will be verified. In FIGS. 34A and 34B, each pixel consists of two sub-pixels which differ in brightness. Specifically, for example, in FIG. 34A, the pixel in row n and column m consists of a high-brightness sub-pixel indicated as "b(Bright)" and low-brightness sub-pixel indicated as "d(Dark)". Thus, the first requirement is satisfied.

Compliance with the second requirement will be verified. The liquid crystal display of this embodiment, alternates two display states which differ in driving state at regular time intervals. FIGS. 34A and 34B which show the driving states corresponding to the two display states coincide in the locations of high-brightness sub-pixels and low-brightness sub-pixels. Thus, the second requirement is satisfied.

Compliance with the third requirement will be verified. In FIGS. 34A and 34B, the sub-pixels which differ in the order of brightness, i.e., the sub-pixels indicated as "b(Bright)" and sub-pixels indicated as "d(Dark)" are arranged checkerwise. Visual observation of the liquid crystal display revealed no display problem such as reduced resolution resulting from the use of sub-pixels differing in brightness. Thus, the third requirement is satisfied.

Compliance with the fourth requirement will be checked. In FIGS. 34A and 34B, pixels of opposite polarity are arranged checkerwise. Specifically, for example, in FIG. 34A, the pixel in row n+2 and column m+2 has a "+" polarity. Beginning with this pixel, the polarity changes every other pixel between "−" and "+" both in the row direction and column direction. With a liquid crystal display, which does not satisfy the fourth requirement, it is believed that flickering of display is observed in sync with changes in the drive polarity of pixels between "+" and "−". However, no flickering was observed when the liquid crystal display of this embodiment was checked visually. Thus, the fourth requirement is satisfied.

Compliance with the fifth requirement will be checked. In FIGS. 34A and 34B, looking at the drive polarity of the sub-pixels equal in the order of brightness, the drive polarity reverses every two rows of sub-pixels, i.e., every other pixel width. Specifically, for example, in row n_B, the sub-pixels in columns m+1, m+3, and m+5 are "b(Bright)" and the polarity of all these sub-pixels is "−". In row n+1_A, the sub-pixels in columns m, m+2, and m+4 are "b(Bright))" and the polarity of all these sub-pixels is "−". In row n+1_B, the sub-pixels in columns m+1, m+3, and m+5 are "b(Bright))" and the polarity of all these sub-pixels is "+". In row n+2_A, the sub-pixels in columns m, m+2, and m+4 are "b(Bright))" and the polarity of all these sub-pixels is "+". With a liquid crystal display, which does not satisfy the fifth requirement, it is believed that flickering of display is observed in sync with changes in the drive polarity of pixels between "+" and "−". However, no flickering was observed when the liquid crystal display of this embodiment was checked visually. Thus, the fifth requirement is satisfied.

When the liquid crystal display according to this embodiment was observed by the inventor, etc. by varying the amplitude VCSpp of the CS voltage, viewing angle characteristics were improved with display contrast suppressed during oblique observation as the amplitude VCSpp of the CS voltage was increased from 0V (0V was used to support typical liquid crystal displays other than the liquid crystal display according to the present invention). However, further increases in the value of VCSpp presented a problem of reduced display contrast. Thus, the value of VCSpp should be set only to the extent that viewing angle characteristics can be improved sufficiently without causing this problem. Although the improvement of the viewing angle characteristics seemed slightly different depending on displayed images, the best improvement was achieved when VCSpp was set such that the value of VLCaddpp would fall within 0.5 to 2 times the threshold voltage of the liquid crystal display in a typical drive mode (VCSpp was 0V).

where the number L of electrically independent CS trunks is 6 or 8. When L is an even number, relationships of CS trunks with corresponding gate buslines and CS buslines are roughly divided into cases where L/2 is an odd number (L=2, 6, 10, 14, . . . ) and cases where L/2 is an even number (L=4, 8, 12, 16, . . . ). General relationship in the case where L/2 is an odd number is described below Table 5 while general relationship in the case where L/2 is an even number is described below Table 6 in which L=8.

TABLE 5

| CS trunk | Corresponding gate busline | Corresponding CS busline |
|---|---|---|
| CSVtypeC1 | GBL_n, GBL_n + 3, GBL_n + 6, GBL_n + 9, GBL_n + 12, . . . [GBL_n + 3 · k (k = 0, 1, 2, 3, . . . )] | CSBL_A_n, CSBL_A_n + 3, CSBL_A_n + 6, CSBL_A_n + 9, CSBL_A_n + 12, . . . [CSBL_A_n + 3 · k, (k = 0, 1, 2, 3, . . . )] |
| CSVtypeC2 | GBL_n, GBL_n + 3, GBL_n + 6, GBL_n + 9, GBL_n + 12, . . . [GBL_n + 3 · k (k = 0, 1, 2, 3, . . . )] | CSBL_B_n, CSBL_B_n + 3, CSBL_B_n + 6, CSBL_B_n + 9, CSBL_B_n + 12, . . . [CSBL_B_n + 3 · k (k = 0, 1, 2, 3, . . . )] |
| CSVtypeC3 | GBL_n + 1, GBL_n + 4, GBL_n + 7, GBL_n + 10, GBL_n + 13, . . . [GBL_n + 1 + 3 · k (k = 0, 1, 2, 3, . . . )] | CSBL_A_n + 1, CSBL_A_n + 4, CSBL_A_n + 7, CSBL_A_n + 10, CSBL_A_n + 13, . . . [CSBL_A_n + 1 + 3 · k (k = 0, 1, 2, 3, . . . )] |
| CSVtypeC4 | GBL_n + 1, GBL_n + 4, GBL_n + 7, GBL_n + 10, GBL_n + 13, . . . [GBL_n + 1 + 3 · k (k = 0, 1, 2, 3, . . . )] | CSBL_B_n + 1, CSBL_B_n + 4, CSBL_B_n + 7, CSBL_B_n + 10, CSBL_B_n + 13, . . . [CSBL_B_n + 1 + 3 · k (k = 0, 1, 2, 3, . . . )] |
| CSVtypeC5 | GBL_n + 2, GBL_n + 5, GBL_n + 8, GBL_n + 11, GBL_n + 14, . . . [GBL_n + 2 + 3 · k (k = 0, 1, 2, 3, . . . )] | CSBL_A_n + 2, CSBL_A_n + 5, CSBL_A_n + 8, CSBL_A_n + 11, CSBL_A_n + 14, . . . [CSBL_A_n + 2 + 3 · k (k = 0, 1, 2, 3, . . . )] |
| CSVtypeC6 | GBL_n + 2, GBL_n + 5, GBL_n + 8, GBL_n + 11, GBL_n + 14, . . . [GBL_n + 2 + 3 · k (k = 0, 1, 2, 3, . . . )] | CSBL_B_n + 2, CSBL_B_n + 5, CSBL_B_n + 8, CSBL_B_n + 11, CSBL_B_n + 14, . . . [CSBL_B_n + 2 + 3 · k (k = 0, 1, 2, 3, . . . )] |

Summarizing, this embodiment makes it possible to set the periods of oscillation of the oscillating voltages applied to the storage capacitor counter electrodes to twice the horizontal scanning period in a liquid crystal display which improves the viewing angle characteristics by applying oscillating voltages to the storage capacitor counter electrodes and thereby achieving multi-pixel display. It can readily implement multi-pixel display even on large liquid crystal displays with high load capacitance and resistance of CS buslines, high-resolution liquid crystal displays with a short horizontal scanning period, or liquid crystal displays with high-speed driving and short vertical and horizontal scanning periods.

Although in the embodiment illustrated above, the number of electrically independent (sets of) CS trunks is either four or two, the number of electrically independent (sets of) CS trunks in the liquid crystal display according to the embodiment of the third aspect of the present invention is not limited to this and may be three, five, or more than five. However, it is preferable that the number L of electrically independent CS trunks is an even number. This is because when electrically independent CS trunks are grouped into pairs of CS trunks which supply oscillating voltages 180 degrees out of phase with each other (meaning that L is an even number), it is possible to minimize the amount of current flowing through the counter electrodes of storage capacitors.

Tables 5 and 6 below show relationship of CS trunks with corresponding gate buslines and CS buslines in the cases When ½ the number L of electrically independent CS trunks is an odd number i.e., L=2, 6, 10, or the like, if the storage capacitor line connected to the storage capacitor counter electrode of the first sub-pixel of the pixel located at the intersection of an arbitrary column and a given row n among rows formed by a plurality of pixels arranged in a row-and-column matrix is designated as CSBL_A_n, if the storage capacitor line connected to the storage capacitor counter electrode of the second sub-pixel is designated as CSBL_B_n, and if k is a natural number (including 0):

CSBL_A_n+(L/2)*k is connected to the first storage capacitor trunk,

CSBL_B_n+(L/2)*k is connected to the second storage capacitor trunk,

CSBL_A_n+1+(L/2)*k is connected to the third storage capacitor trunk,

CSBL_B_n+1+(L/2)*k is connected to the fourth storage capacitor trunk,

CSBL_A_n+2+(L/2)*k is connected to the fifth storage capacitor trunk,

CSBL_B_n+2+(L/2)*k is connected to the sixth storage capacitor trunk,

. . . similar connections are repeated,

CSBL_A_n+(L/2)−2+(L/2)*k is connected to the (L−3)-th storage capacitor trunk,

CSBL_B_n+(L/2)−2+(L/2)*k is connected to the (L−2)-th storage capacitor trunk;

CSBL_A_n+(L/2)−1+(L/2)*k is connected to the (L−1)-th storage capacitor trunk, and CSBL_B_n+(L/2)−1+(L/2)*k is connected to the L-th storage capacitor trunk.

TABLE 6

| CS trunk | Corresponding gate busline | Corresponding CS busline |
|---|---|---|
| CSVtypeD1 | GBL_n, GBL_n + 4, GBL_n + 8, GBL_n + 12, GBL_n + 16, ... [GBL_n + 4 · k (k = 0, 1, 2, 3, ... )] | CSBL_A_n, CSBL_B_n + 4, CSBL_A_n + 8, CSBL_B_n + 12, CSBL_A_n + 16, ... [CSBL_A_n + 8 · k, CSBL_B_n + 4 + 8 · k, (k = 0, 1, 2, 3, ... )] |
| CSVtypeD2 | GBL_n, GBL_n + 4, GBL_n + 8, GBL_n + 12, GBL_n + 16, ... [GBL_n + 4 · k (k = 0, 1, 2, 3, ... )] | CSBL_B_n, CSBL_A_n + 4, CSBL_B_n + 8, CSBL_A_n + 12, CSBL_B_n + 16, ... [CSBL_B_n + 8 · k, CSBL_A_n + 4 + 8 · k (k = 0, 1, 2, 3, ... )] |
| CSVtypeD3 | GBL_n + 1, GBL_n + 5, GBL_n + 9, GBL_n + 13, GBL_n + 17, ... [GBL_n + 1 + 4 · k (k = 0, 1, 2, 3, ... )] | CSBL_A_n + 1, CSBL_B_n + 5, CSBL_A_n + 9, CSBL_B_n + 13, CSBL_A_n + 17, ... [CSBL_A_n + 1 + 8 · k, CSBL_B_n + 5 + 8 · k, (k = 0, 1, 2, 3, ... )] |
| CSVtypeD4 | GBL_n + 1, GBL_n + 5, GBL_n + 9, GBL_n + 13, GBL_n + 17, ... [GBL_n + 1 + 4 · k (k = 0, 1, 2, 3, ... )] | CSBL_B_n + 1, CSBL_A_n + 5, CSBL_B_n + 9, CSBL_A_n + 13, CSBL_B_n + 17, ... [CSBL_B_n + 1 + 8 · k, CSBL_A_n + 5 + 8 · k (k = 0, 1, 2, 3, ... )] |
| CSVtypeD5 | GBL_n + 2, GBL_n + 6, GBL_n + 10, GBL_n + 14, GBL_n + 18, ... [GBL_n + 2 + 4 · k (k = 0, 1, 2, 3, ... )] | CSBL_A_n + 2, CSBL_B_n + 6, CSBL_A_n + 10, CSBL_B_n + 14, CSBL_A_n + 18, ... [CSBL_A_n + 2 + 8 · k, CSBL_B_n + 6 + 8 · k (k = 0, 1, 2, 3, ... )] |
| CSVtypeD6 | GBL_n + 2, GBL_n + 6, GBL_n + 10, GBL_n + 14, GBL_n + 18, ... [GBL_n + 2 + 4 · k (k = 0, 1, 2, 3, ... )] | CSBL_B_n + 2, CSBL_A_n + 6, CSBL_B_n + 10, CSBL_A_n + 14, CSBL_B_n + 18, ... [CSBL_B_n + 2 + 8 · k, CSBL_A_n + 6 + 8 · k (k = 0, 1, 2, 3, ... )] |
| CSVtypeD7 | GBL_n + 3, GBL_n + 7, GBL_n + 11, GBL_n + 15, GBL_n + 19, ... [GBL_n + 3 + 4 · k (k = 0, 1, 2, 3, ... )] | CSBL_A_n + 3, CSBL_B_n + 7, CSBL_A_n + 11, CSBL_B_n + 15, CSBL_A_n + 19, ... [CSBL_A_n + 3 + 8 · k, CSBL_B_n + 7 + 8 · k (k = 0, 1, 2, 3, ... )] |
| CSVtypeC8 | GBL_n + 3, GBL_n + 7, GBL_n + 11, GBL_n + 15, GBL_n + 19, ... [GBL_n + 3 + 4 · k (k = 0, 1, 2, 3, ... )] | CSBL_B_n + 3, CSBL_A_n + 7, CSBL_B_n + 11, CSBL_A_n + 15, CSBL_B_n + 19, ... [CSBL_B_n + 3 + 8 · k, CSBL_A_n + 7 + 8 · k (k = 0, 1, 2, 3, ... )] |

When ½ the number L of electrically independent storage capacitor trunks is an even number i.e., L=4, 8, 12, or the like, if the storage capacitor line connected to the storage capacitor counter electrode of the first sub-pixel of the pixel located at the intersection of an arbitrary column and a given row n among rows formed by a plurality of pixels arranged in a row-and-column matrix is designated as CSBL_A_n, if the storage capacitor line connected to the storage capacitor counter electrode of the second sub-pixel is designated as CSBL_B_n, and if k is a natural number (including 0):

CSBL_A_n+L*k and CSBL_B_n+(L/2)+L*k are connected to the first storage capacitor trunk, CSBL_B_n+L*k and CSBL_A_n+(L/2)+L*k are connected to the second storage capacitor trunk, CSBL_A_n+1+L*k and CSBL_B_n+(L/2)+1+L*k are connected to the third storage capacitor trunk, CSBL_B_n+1+L*k and CSBL_A_n+(L/2)+1+L*k are connected to the fourth storage capacitor trunk, CSBL_A_n+2+L k and CSBL_B_n+(L/2)+2+L*k are connected to the fifth storage capacitor trunk, CSBL_B_n+2+L*k and CSBL_A_n+(L/2)+2+L*k are connected to the sixth storage capacitor trunk, CSBL_A_n+3+CSBL_B_n+(L/2)+3+L*k are connected to the seventh storage capacitor trunk, CSBL_B_n+3+L*k and CSBL_A_n+(L/2)+3+L*k are connected to the eighth storage capacitor trunk, . . . similar connections are repeated, CSBL_A_n+(L/2)−2+L*k and CSBL_B_n+L−2+L*k are connected to the (L−3)-th storage capacitor trunk, CSBL_B_n+(L/2)−2+L*k and CSBL_A_n+L−2+L*k are connected to the (L−2)-th storage capacitor trunk, CSBL_A_n+(L/2)−1+L*k and CSBL_B_n+L−1+L*k are connected to the (L−1)-th storage capacitor trunk, and CSBL_B_n+(L/2)−1+L*k and CSBL_A_n+L−1+L*k are connected to the L-th storage capacitor trunk.

As described above, the third aspect of the present invention makes it easy to apply multi-pixel liquid crystal display which can greatly improve display contrast during oblique observation to large liquid crystal displays, high-resolution liquid crystal displays and liquid crystal displays with high-speed driving and short vertical and horizontal scanning periods. Because by increasing the periods of oscillation of the voltages applied to CS buslines, it is possible to ease the following problems: increases in the size of a multi-pixel liquid crystal display which apply oscillating voltages to CS buslines increase the load capacitance and resistance of CS buslines, blunting the waveforms of CS busline voltages; and increases in the resolution and driving speed of a liquid crystal display decrease the periods of oscillation of CS buslines, enhancing the impact of waveform blunting and causing marked changes in the effective value of VLCadd in the display screen, and thus resulting in display irregularities.

In the liquid crystal display according to the embodiment of the second aspect of the present invention, which uses electrically common CS buslines for adjacent sub-pixels of pixels in adjacent rows and employs two electrically independent sets of CS trunks, the period of oscillation of CS busline voltages is 1H. On the other hand, the liquid crystal display according to the embodiment of the third aspect of the present invention, which uses electrically independent CS buslines for adjacent sub-pixels of pixels in adjacent rows, can set the period of oscillation of CS busline voltages to 2H when two electrically independent sets of CS trunks are used, and set the period of oscillation of CS busline voltages to 4H when four electrically independent sets of CS trunks are used.

The configuration or drive waveforms of the liquid crystal display according to the embodiment of the third aspect of the present invention can set the period of oscillation of the CS busline voltages to L times the horizontal scanning period (to L Hs) by using electrically independent CS trunks for adjacent sub-pixels of pixels in adjacent rows and employing L electrically independent sets of CS trunks.

The liquid crystal display and its drive method according to the embodiment of the fourth aspect of the present invention will be described below.

As described above, the liquid crystal display according to the embodiment of the third aspect of the present invention can set the oscillation period of the oscillating voltages applied to the storage capacitor counter electrodes to L times the horizontal scanning period (H) using L sets of electrically independent storage capacitor counter electrodes (L electrically independent CS trunks): This makes it possible to implement multi-pixel display on large high-resolution liquid crystal displays with heavy electrical loads of the storage capacitor counter electrode line.

Figure 35A:
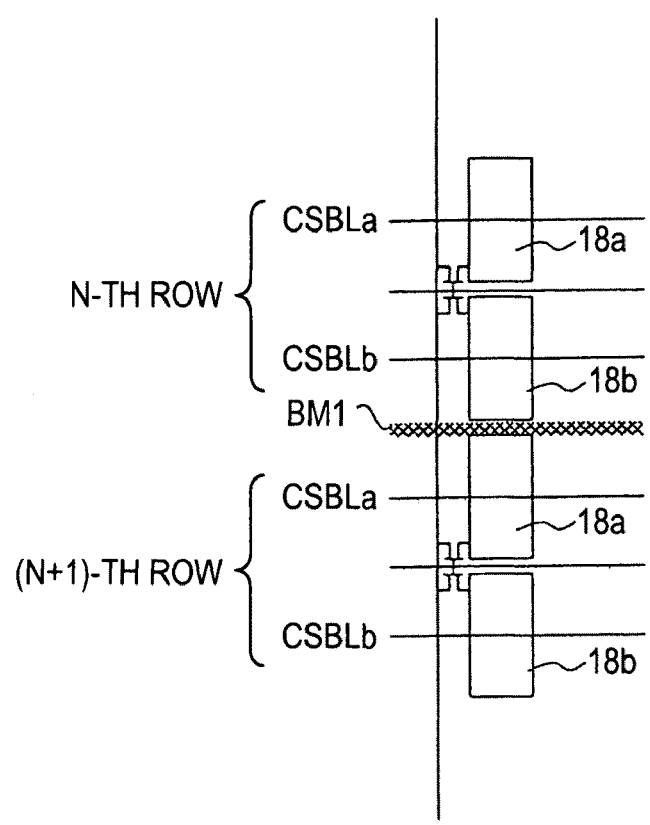
FIG. 35A is a schematic diagram showing a layout example of CS buslines and an inter-pixel black matrix in the liquid crystal display according to an embodiment of the third aspect of the present invention and 35B is a schematic diagram showing a layout example of CS buslines which also serve as an inter-pixel black matrix in a liquid crystal display according to an embodiment of a fourth aspect of the present invention.

However, the embodiment of the third aspect needs to use electrically independent storage capacitor counter electrodes for the sub-pixels in two adjacent pixels in the column direction (i.e., two pixels in adjacent rows) (see, for example, FIG. 29), meaning that two CS buslines are required for each pixel. This presents a problem of a decreased pixel aperture ratio. Specifically, for example, as shown in FIG. 35A, the use of a configuration in which CS buslines for sub-pixels are arranged in such a way as to cross the center of respective sub-pixels makes it necessary to provide a black matrix BM1 to prevent light from escaping through between pixels adjacent in the column direction. Thus, an area which overlap the two CS buslines and black matrix BM1 cannot contribute to display. This reduces the pixel aperture ratio.

Figure 35B:
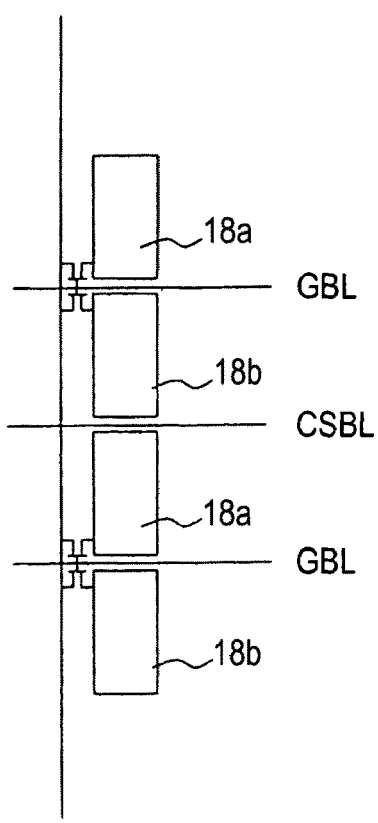

In contrast, according to the embodiment of the fourth aspect, as shown in FIG. 35B, two adjacent sub-pixels in two different pixels adjacent in the column direction have their storage capacitor counter electrodes connected to a common CS busline and the CS busline is allowed to be disposed between the adjacent pixels in the column direction, thereby making the CS busline function also as a black matrix. This offers the advantages of being able to reduce the number of CS buslines in comparison to the configuration in FIG. 35A as well as improve the pixel aperture ratio by omitting the black matrix BM1 which otherwise would have to be provided separately.

With the liquid crystal display according to the embodiment of the third aspect, in order to set the oscillation period of the oscillating voltages applied the CS buslines to L times the horizontal scanning period, it is necessary to use electrically independent CS trunks, requiring L drive power supplies for storage capacitor counter electrodes. Consequently, to increase the oscillation period of the oscillating voltages applied the CS buslines as desired, it is necessary to increase the number of CS trunks as well as the number of drive power supplies for storage capacitor counter electrodes accordingly. In this way, with the liquid crystal display according to the embodiment of the third aspect, there are certain restrictions on increases in the period of the oscillating voltages applied the CS buslines because it is necessary to increase the number of CS trunks as well as the number of drive power supplies for storage capacitor counter electrodes.

In contrast, with the liquid crystal display according to the embodiment of the fourth aspect of the present invention, when the number of electrically independent CS trunks is L (L is an even number), the period of oscillation of oscillating voltages can be set to 2*K*L times the horizontal scanning period (K is a positive integer).

Thus, the liquid crystal display according to the embodiment of the fourth aspect of the present invention is more suitable for large high-resolution liquid crystal displays than is the liquid crystal display according to the embodiment of the third aspect.

Figures 1, 36A:
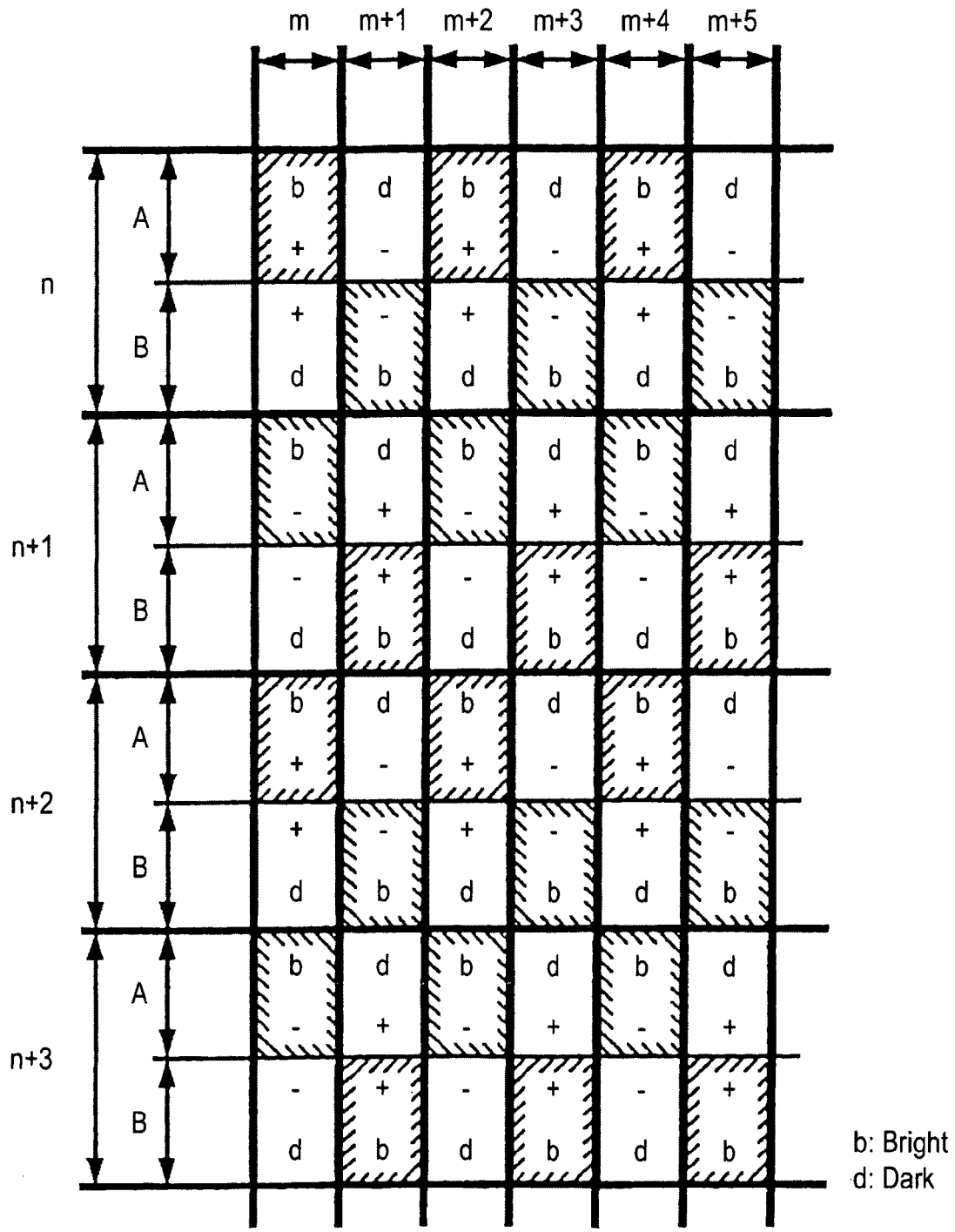
Figures 2, 36A:
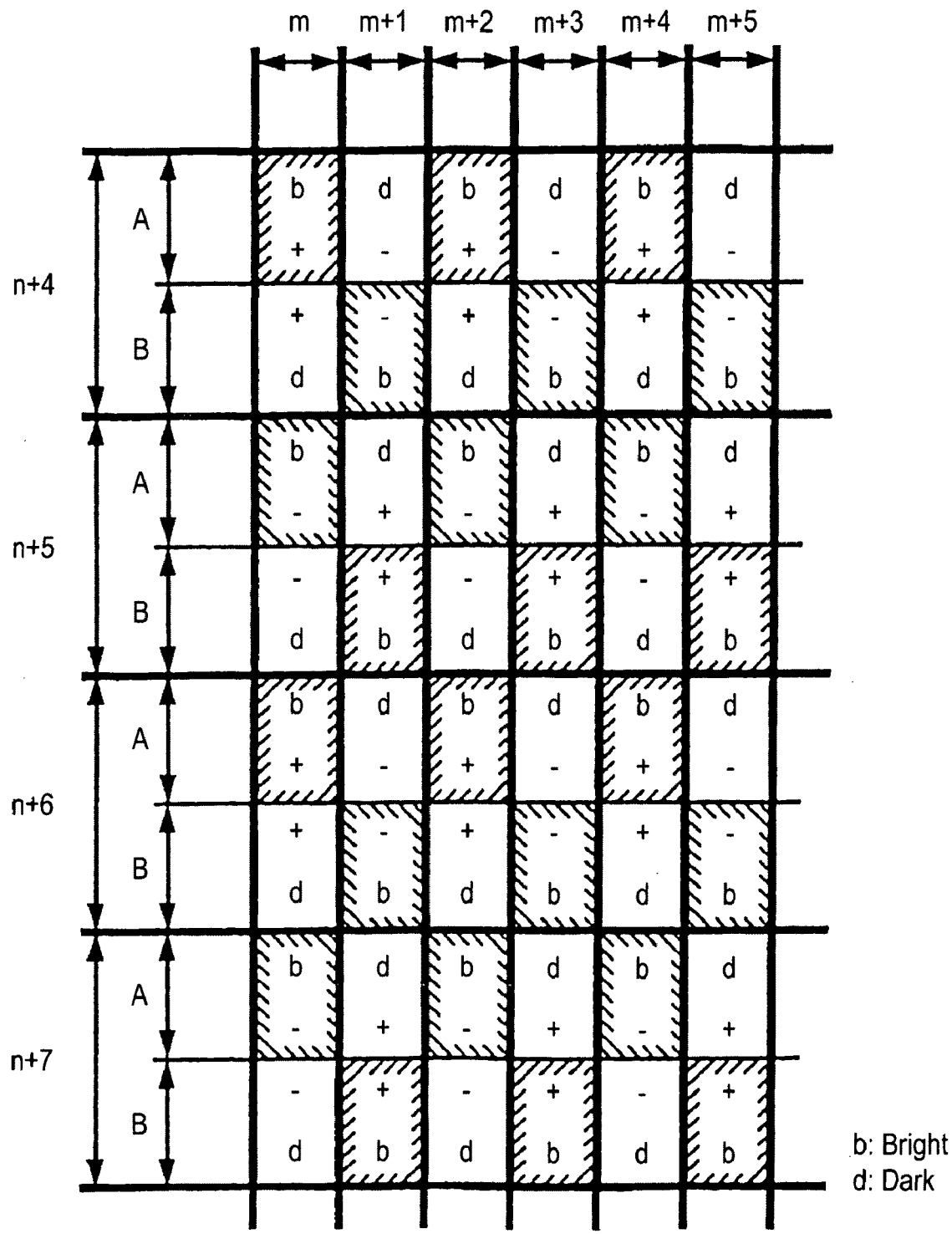
Figures 1, 36B:
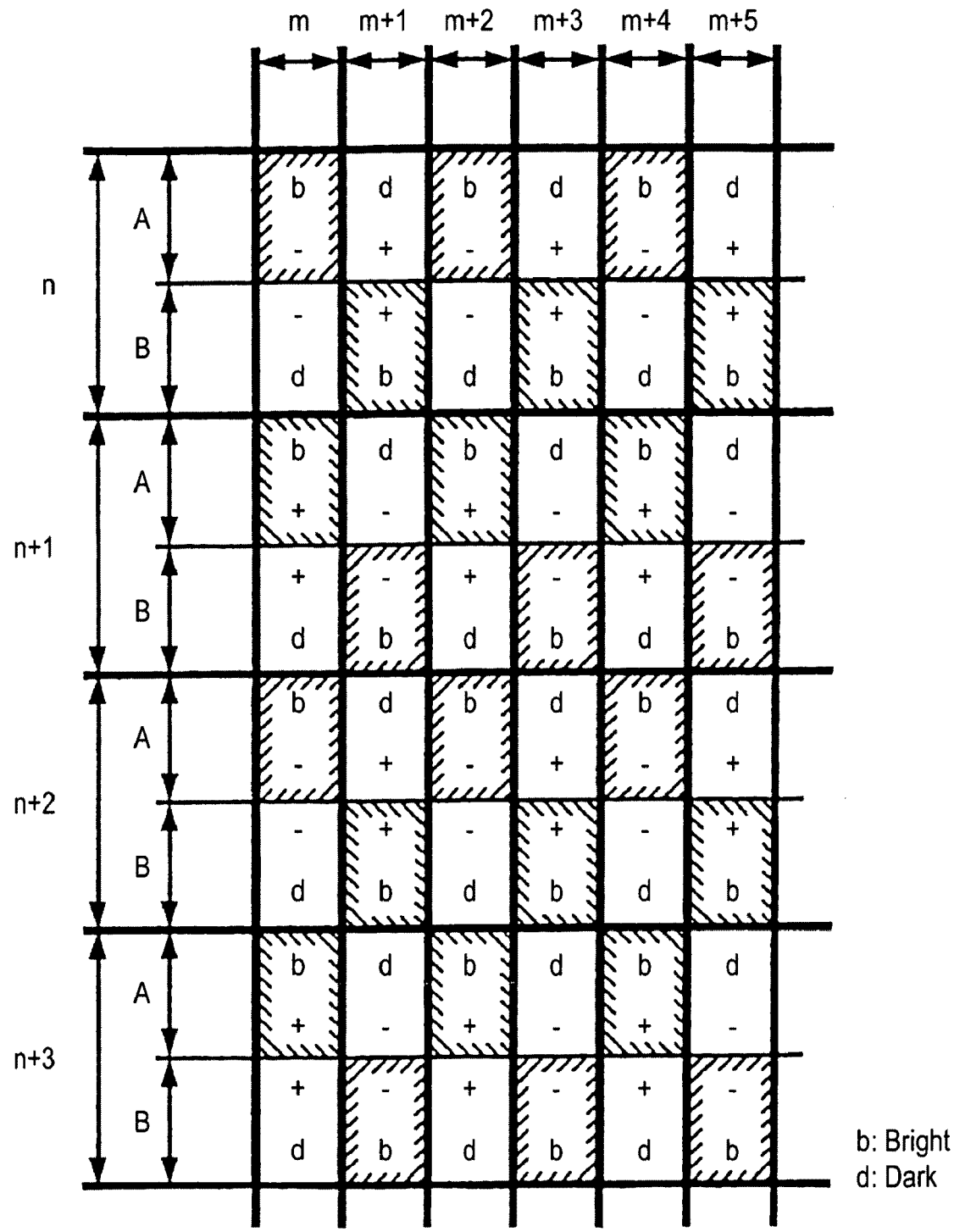
Figures 2, 36B:
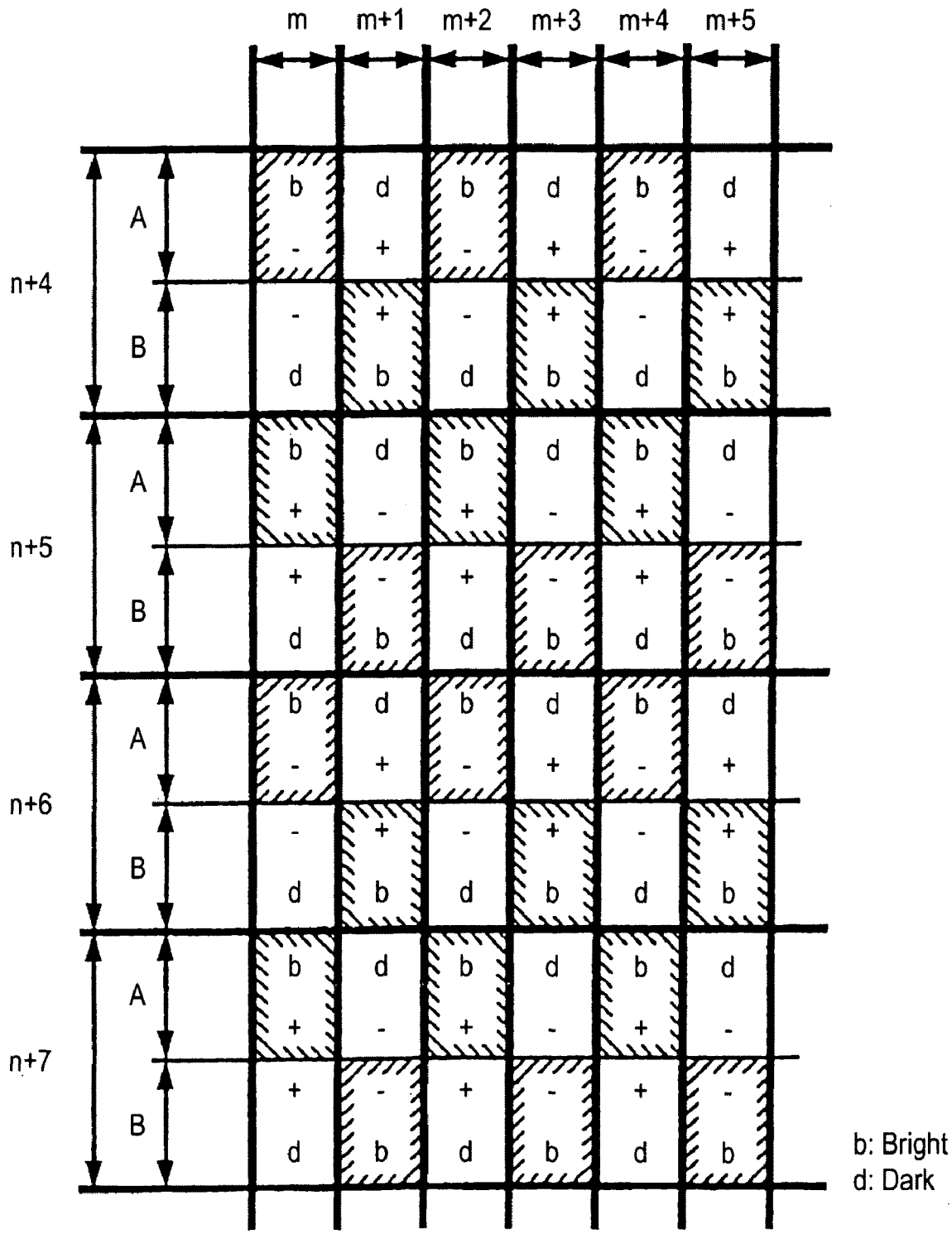

Concrete embodiments of the fourth aspect of the present invention will be described below, citing as an example of a liquid crystal display which implements the driving states shown in FIGS. 36A and 36B. The directions of the electric fields applied to the liquid crystal layers of pixels are opposite between FIGS. 36A and 36B which correspond to FIGS. 24A and 24B, respectively. A configuration used to implement the driving states shown FIG. 36A will be described below. Incidentally, to implement the driving states shown FIG. 36B, the polarity of the voltages applied to the source buslines and the polarity of storage capacitor voltages can be reversed from those shown in FIG. 36A in the same manner as described with reference to FIGS. 23A and 23B. This makes it possible to fix the first and second sub-pixels in position ("b(Bright)" or "d(Dark)" in the figures) while reversing the display polarity ("+" or "−" in the figures) of the pixels. However, the present invention is not limited to this and allows only the voltages applied to the source buslines to be reversed. In this case, since the first and second sub-pixels change positions ("b(Bright)" or "d(Dark)" in the figures) along with the polarity reversal of the pixels, it is possible to alleviate the problem of color bleeding and the like encountered during intermediate grayscale display when the sub-pixel positions are fixed.

In the liquid crystal display according to the embodiment described below, as shown in FIG. 35B, two adjacent pixels (the n-th row and (n+1)-th row) in the column direction share a common CS busline CSBL provided between a sub-pixel electrode 18b of the pixel in the n-th row and sub-pixel electrode 18a of the pixel in the (n+1)-th row to supply storage capacitor counter voltages (oscillating voltages) to the auxiliary capacitances of the sub-pixels. The common CS busline CSBL also functions as a black matrix to block passage of light between pixels in the n-th row and (n+1)-th row. The common CS busline CSBL may be placed in such a way as to partially overlap the sub-pixel electrode 18a and 18b via an insulating film.

In the liquid crystal display according to the embodiment cited below as an example, when the oscillation periods of oscillating voltages applied to CS buslines are longer than one horizontal scanning period and the number of electrically independent CS trunks is L (L is an even number), the periods of oscillation of oscillating voltages applied to the CS buslines can be set to 2*K*L times one horizontal scanning period (K is a positive integer). That is, whereas the liquid crystal display according to the embodiment of the third aspect of the present invention allows the periods of oscillation of oscillating voltages to be set only to L times, the liquid crystal display according to the embodiment of the fourth aspect of the present invention has the advantage of allowing the oscillation periods to be further increased by a factor of 2*K, where K does not depend on the number of electrically independent CS trunks. K is a parameter which depends on the connection patterns between electrically independent individual CS trunks and CS buslines and is equal to ½ the number of CS buslines (number of electrically equivalent CS buslines) connected to a common CS trunk among consecutive CS buslines which make up one cycle of connections with CS trunks.

The multi-pixel driving for the liquid crystal display according to the embodiment of the present invention divides each pixel into two sub-pixels, supplies different oscillating voltages (storage capacitor counter voltages) to the auxiliary capacitances connected to the respective sub-pixels, and thereby obtains a bright sub-pixel and dark sub-pixel. The bright sub-pixel occurs, for example, if the first change of the oscillating voltage after a TFT is turned off is a voltage increase and the dark sub-pixel occurs, conversely, if the first change of the oscillating voltage after the TFT is turned off is a voltage decrease. Thus, if the CS buslines for the sub-pixels whose oscillating voltage should be increased after the TFT is turned off are connected to a common CS trunk and the CS buslines for the sub-pixels whose oscillating voltage should be decreased after the TFT is turned off are connected to another common CS trunk, it is possible to decrease the number of CS trunks. K is a parameter which represents effect of increases in the period by way of connection patterns between the CS buslines and CS trunks.

By increasing the value of K, it is possible to increase the oscillating voltage accordingly. However, preferably the value of K is not too large. The reason will be described below.

Increasing the value of K increases the number of sub-pixels connected to a common CS trunk. They are connected to different TFTs, which turn off at different intervals (multiples of 1H). Thus, the time required for the oscillating voltage of a sub-pixel connected to the common CS trunk to increase (or decrease) for the first time after the TFT of the sub-pixel is turned off differs from the time required for the oscillating voltage of another sub-pixel connected to the common CS trunk to increase (or decrease) for the first time after the TFT of the sub-pixel is turned off. This time difference increases with increases in the value of K, i.e., with increases in the number of CS buslines connected to the common CS trunk. This may cause visual perception of linear brightness irregularities. To prevent such brightness irregularities, preferably the time difference is not more than 5% of the number of scanning lines (number of pixel rows) as a rule of thumb. For example, in the case of XGA, preferably the value of K is set such that the time difference will be not more than 5% of 768 rows or not more than 38H. Incidentally, the lower limit on the periods of oscillating voltages should be set with reference to FIG. 28 and the like in such a way as not to cause brightness irregularities due to waveform blunting. For example, in the case of 45-inch XGA displays, there is no problem with waveform blunting if the oscillation period is 12H or longer. Thus, in the case of 45-inch liquid crystal display, if K is set to 1 or 2, L is set to 6, 8, 10, or 12, and the periods of oscillating voltages are set to within 12H to 48H, it is possible to achieve high-quality display without brightness irregularities. Incidentally, the number L of electrically independent CS trunks should be specified, taking into consideration the number of oscillating voltage sources (drive power supplies for storage capacitor counter electrodes), wiring on the panel (TFT substrate), etc.

The liquid crystal display and its drive method according to the embodiment of the fourth aspect of the present invention will be described below, citing examples in which K=1 and L=4, 6, 8, 10, or 12 and examples in which K=2 and L=4 or 6. To avoid repeating what has already been described in relation to previous embodiments, the following description will focus on topologies between CS buslines and CS trunks.

[K=1, L=4, oscillation period=8H]

Figures 1, 37:
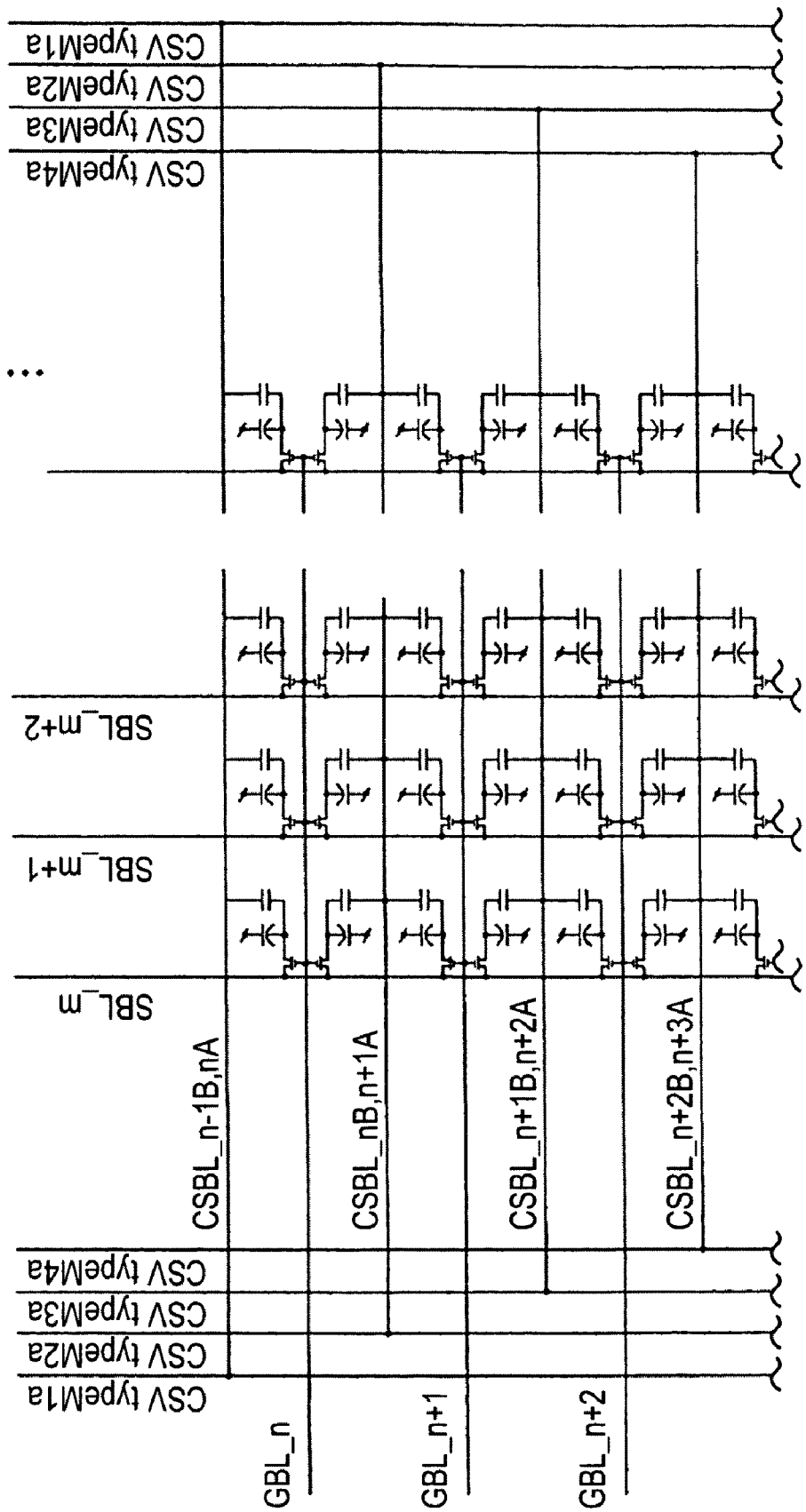
Figures 2, 37:
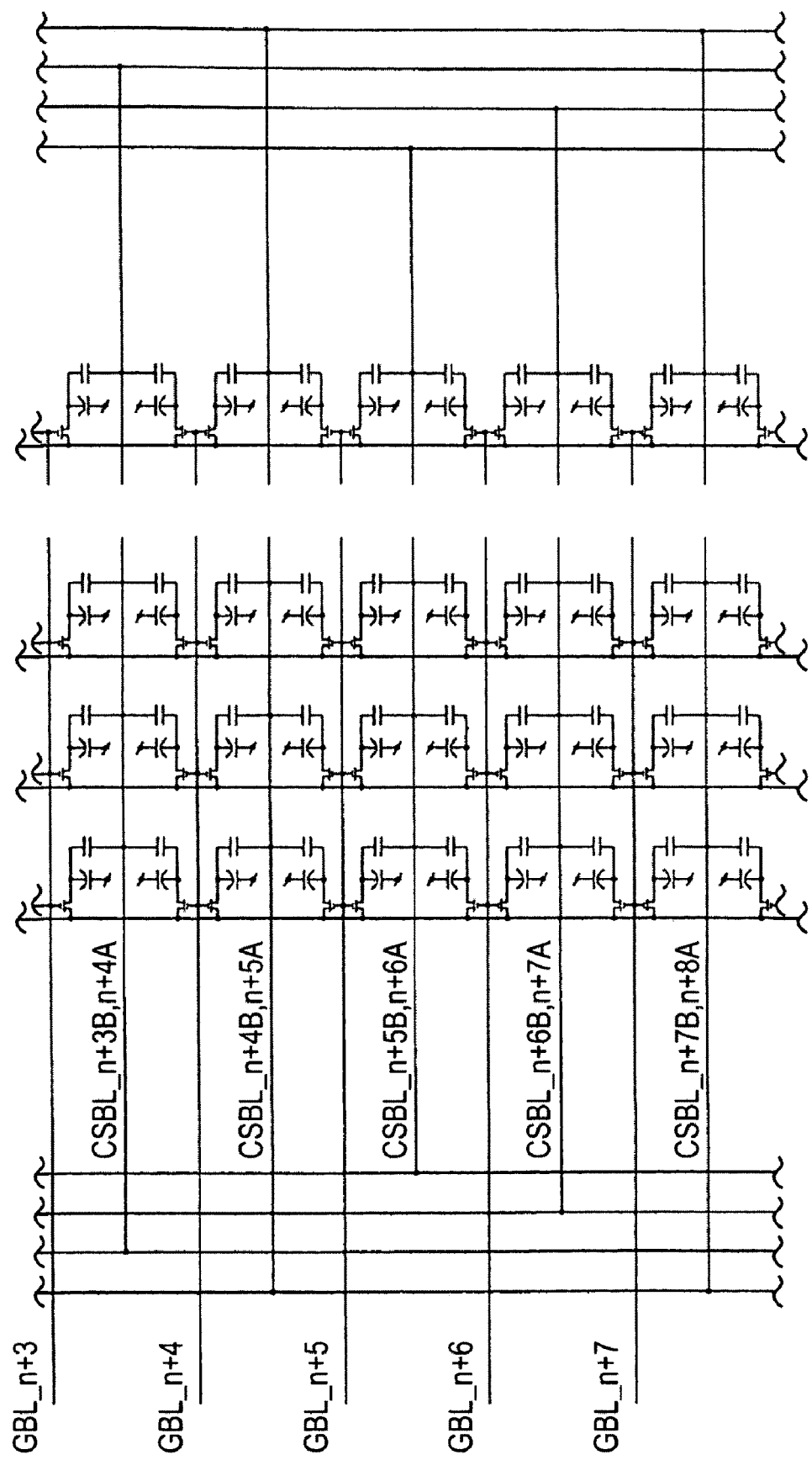
Figures 3, 37:
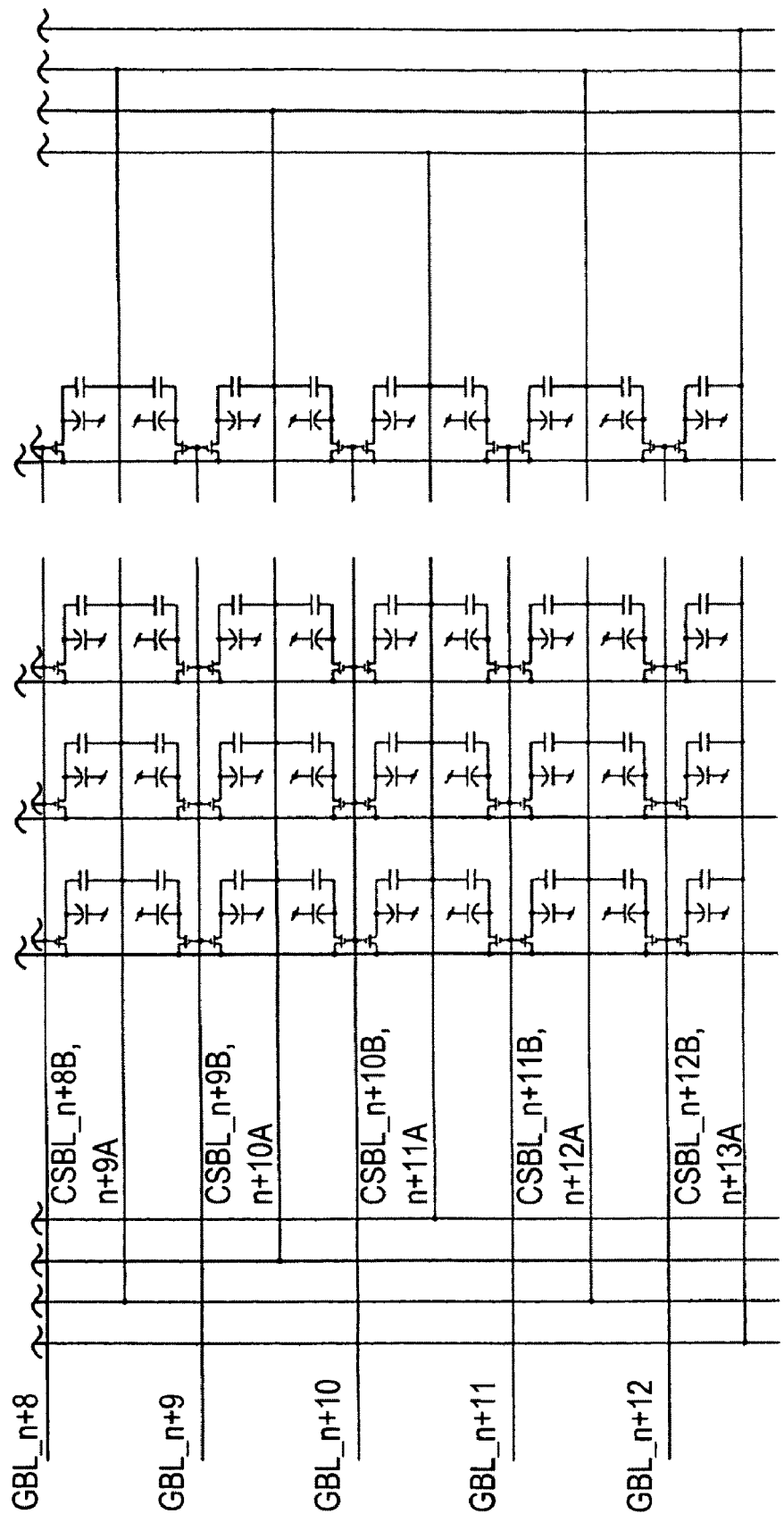
Figures 1, 38:
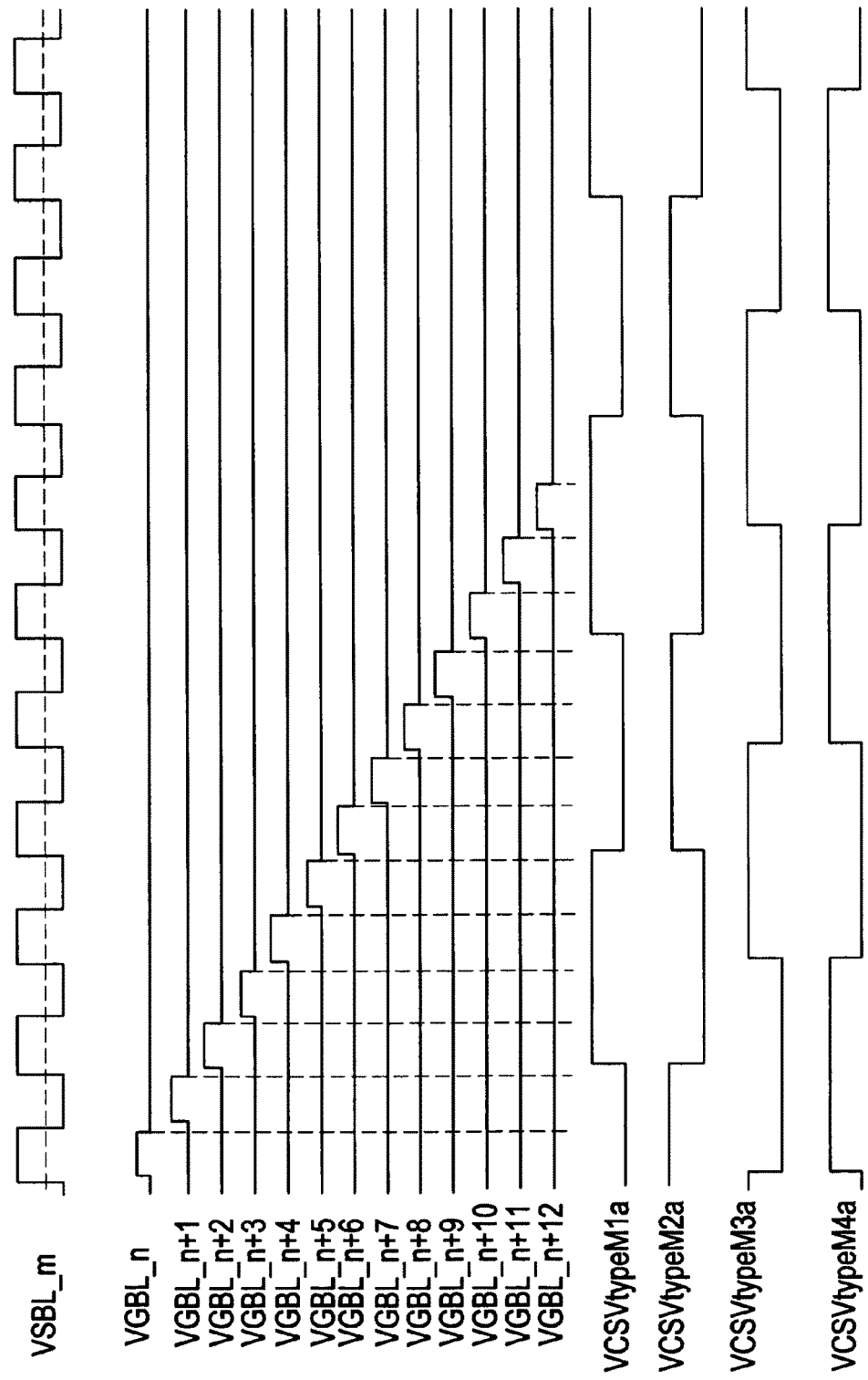
Figures 2, 38:
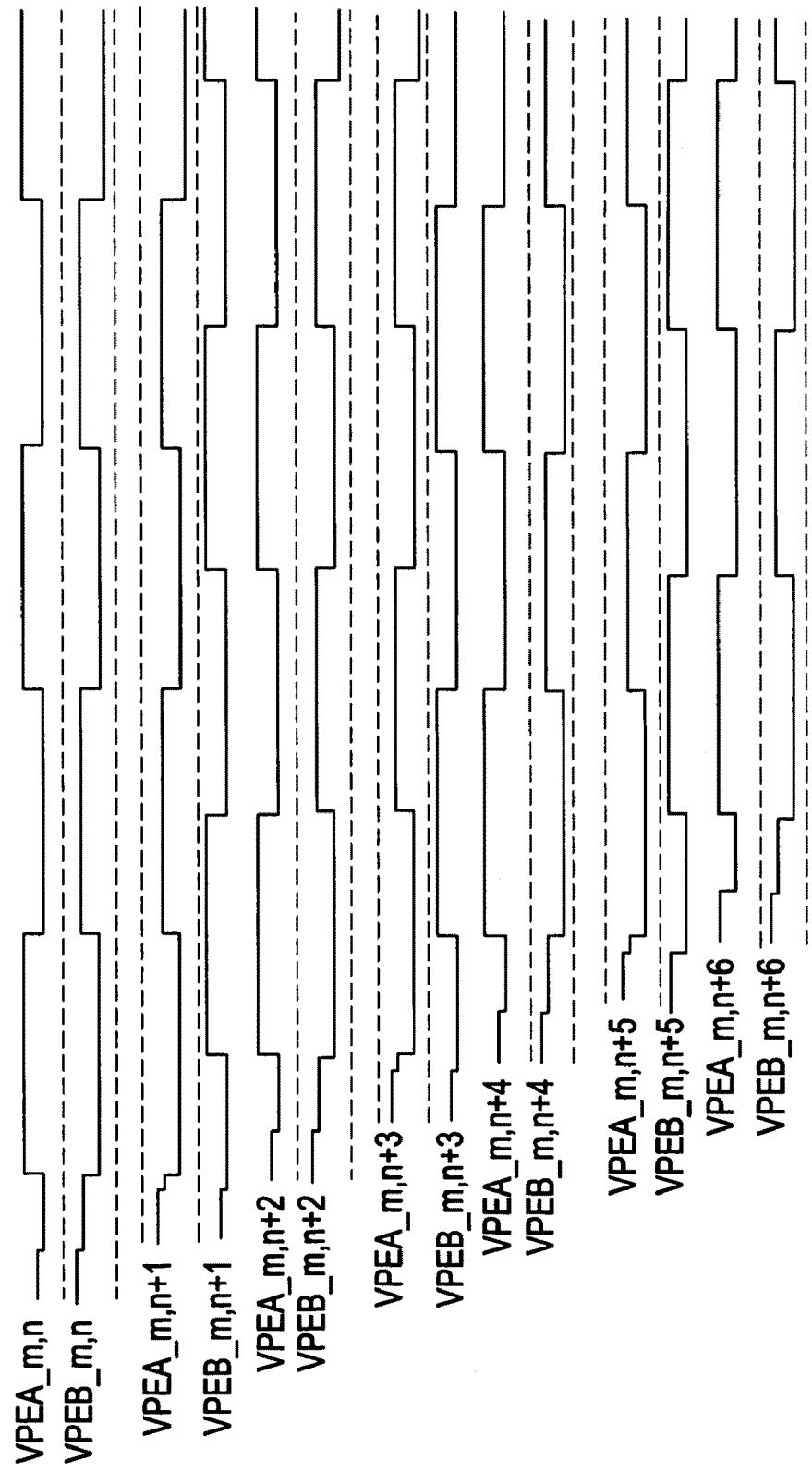
Figures 3, 38:
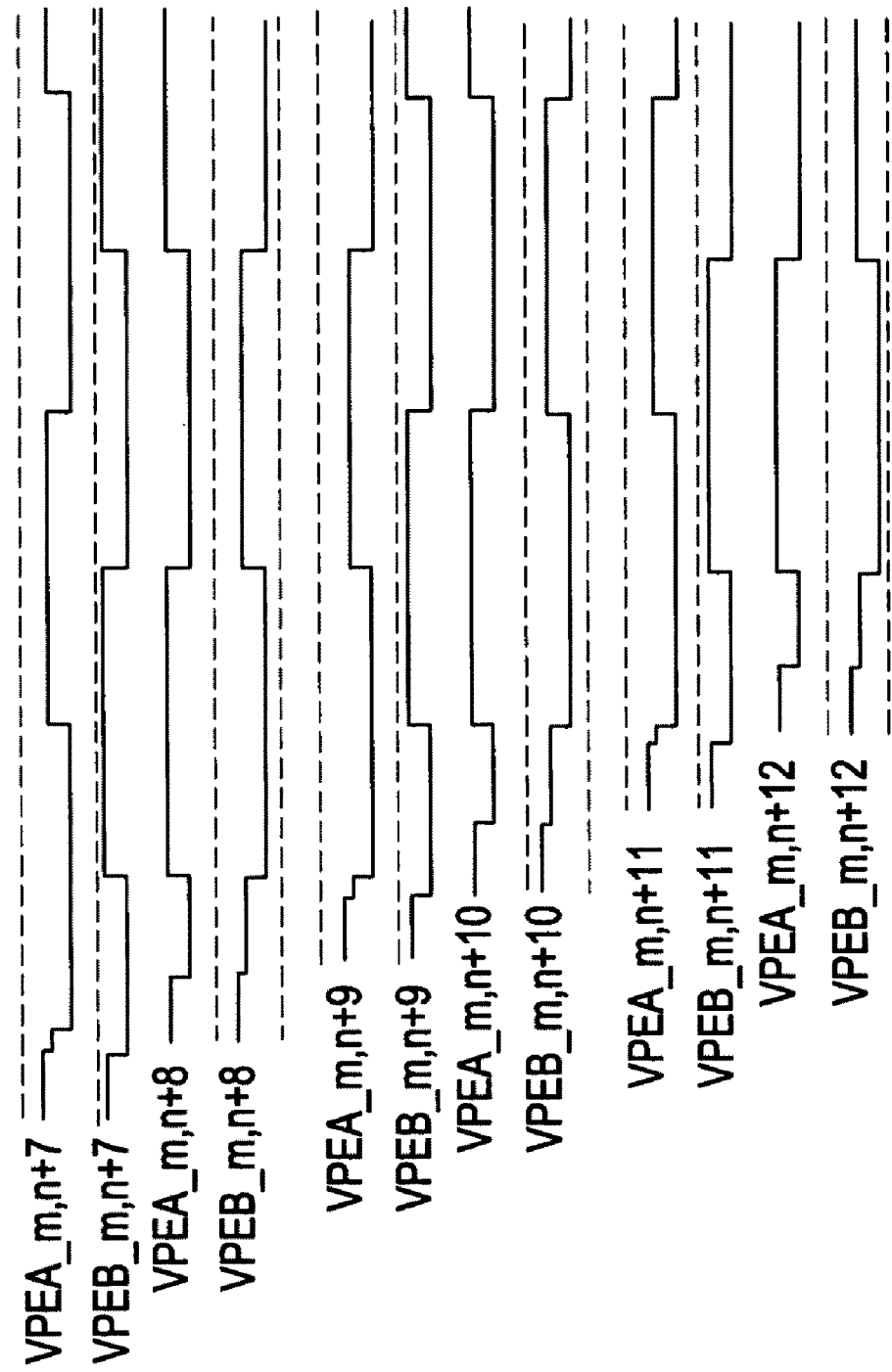

A matrix configuration (connection patterns of CS buslines) of the liquid crystal display according to this embodiment is shown in FIG. 37 and waveforms of signal used to drive the liquid crystal display are shown in FIG. 38. Also, the connection patterns used in FIG. 37 are shown in Table 7. With a matrix configuration shown in FIG. 37, driving states shown in FIG. 35A is implemented as oscillating voltages are applied to the CS buslines using timings shown in FIG. 38.

In FIG. 37, each CS busline is connected to any of four CS trunks provided at both left and right ends of the figure. Therefore, there are four electrically independent sets of CS buslines, and thus L=4. Also, in FIG. 37, there is some regularity in connection patterns between the CS buslines and CS trunks, namely the same connection pattern repeats every eight CS buslines in the figure. Thus, K=1 (=8/(2L)).

TABLE 7

| | L = 4, K = 1 |
|---|---|
| CS trunk | CS busline connected to CS trunk |
| M1a | CSBL_(n − 1) B, (n) A |
| | CSBL_(n + 4) B, (n + 5) A |
| M2a | CSBL_(n) B, (n + 1) A |
| | CSBL_(n + 3) B, (n + 4) A |
| M3a | CSBL_(n + 1) B, (n + 2) A |
| | CSBL_(n + 6) B, (n + 7) A |
| M4a | CSBL_(n + 2) B, (n + 3) A |
| | CSBL_(n + 5) B, (n + 6) A | where n = 1, 9, 17, . . .

It can be seen from Table 7, that the CS buslines in FIG. 37 come in two types, namely:

type α which satisfies the following expressions for any p $CSBL\_(p)B,(p+1)A$ $CSBL\_(p+5)B,(p+6)A$ and type β which satisfies the following expressions for any p $CSBL\_(p+1)B,(p+2)A$ $CSBL\_(p+4)B,(p+5)A$ Specifically, the CS buslines connected to CS trunks M1a and M3a are type α while the CS buslines connected to CS trunks M2a and M4a are type β.

Eight consecutive CS buslines which constitute one cycle of connections are composed of four type α buslines (two buslines connected to M1a and two buslines connected to M3a) and four type β buslines (two buslines connected to M2a and two buslines connected to M4a).

Using the parameters L and K, the above expressions can be given as follows for any p:

$CSBL\_(p+2*(K-1))B,(p+2*(K-1)+1)A$ $CSBL\_(p+2*(K-1)+K*L+1)B,(p+2*(K-1)+K*L+2)A$ or $CSBL\_(p+2*(K-1)+1)B,(p+2*(K-1)+2)A$ $CSBL\_(p+2*(K-1)+K*L)B,(p+2*(K-1)+K*L+1)A$

Thus, it is sufficient to electrically equalize the CS buslines within each CS busline group represented by each of the above sets of expressions, where either p=1, 3, 5, . . . or p=0, 2, 4, . . . . This condition is introduced because there is no CS busline that would satisfy both type α and type β.

Incidentally, in FIG. 38, it can be seen that the oscillation period of oscillating voltages applied to the CS buslines is 8H, i.e., 2*K*L times the horizontal scanning period.

[K=1, L=6, oscillation period=12H]

Figures 1, 39:
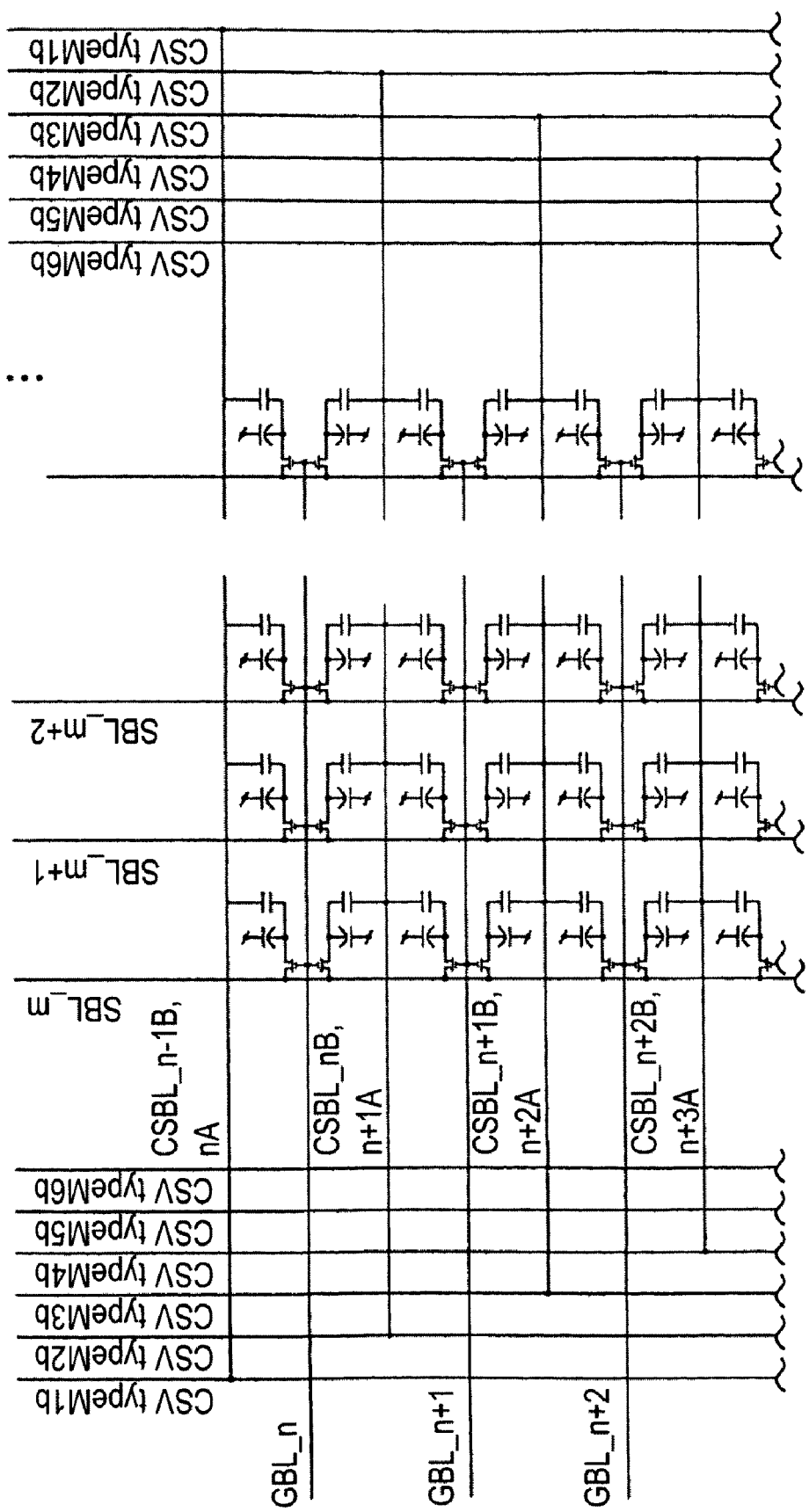
Figures 2, 39:
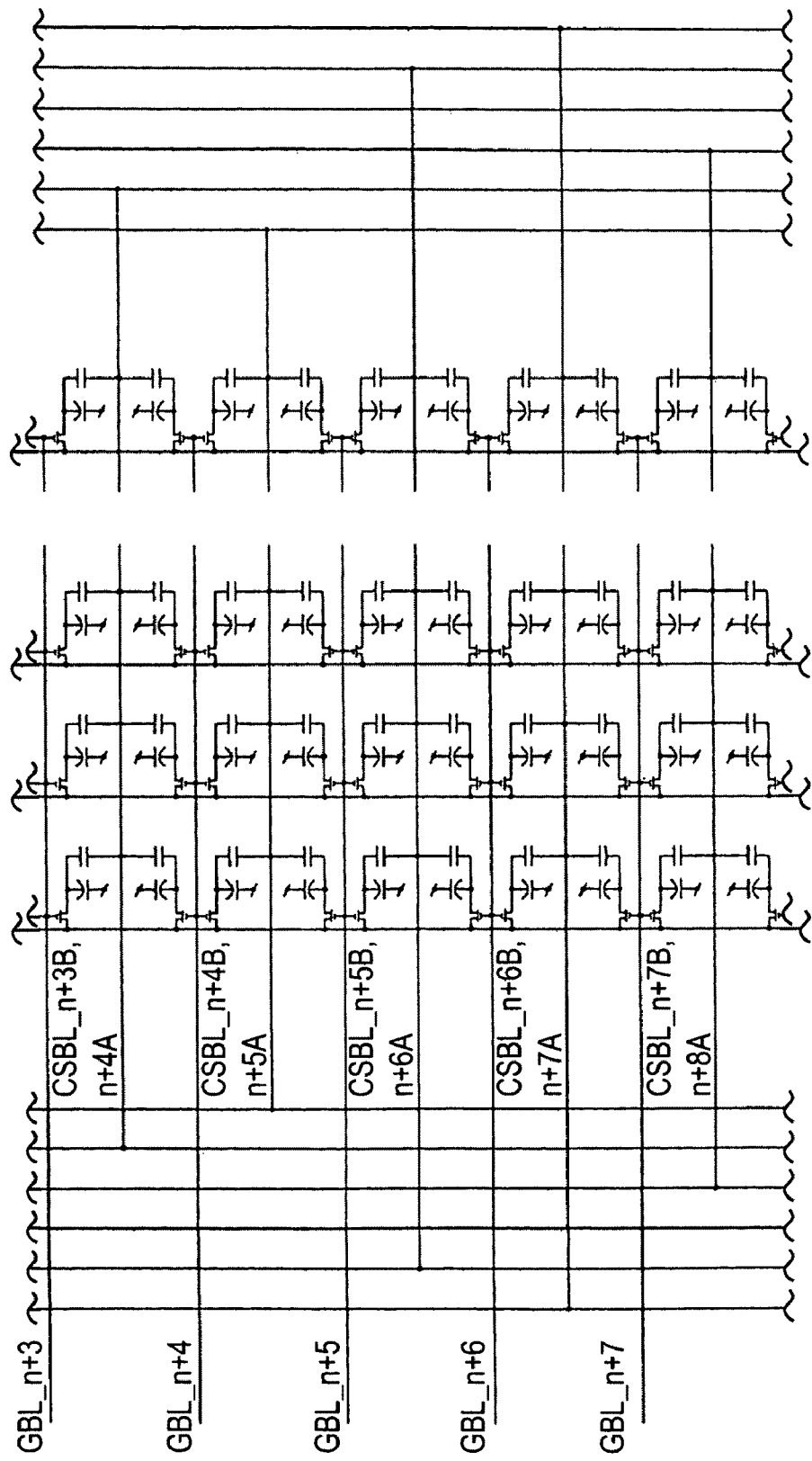
Figures 3, 39:
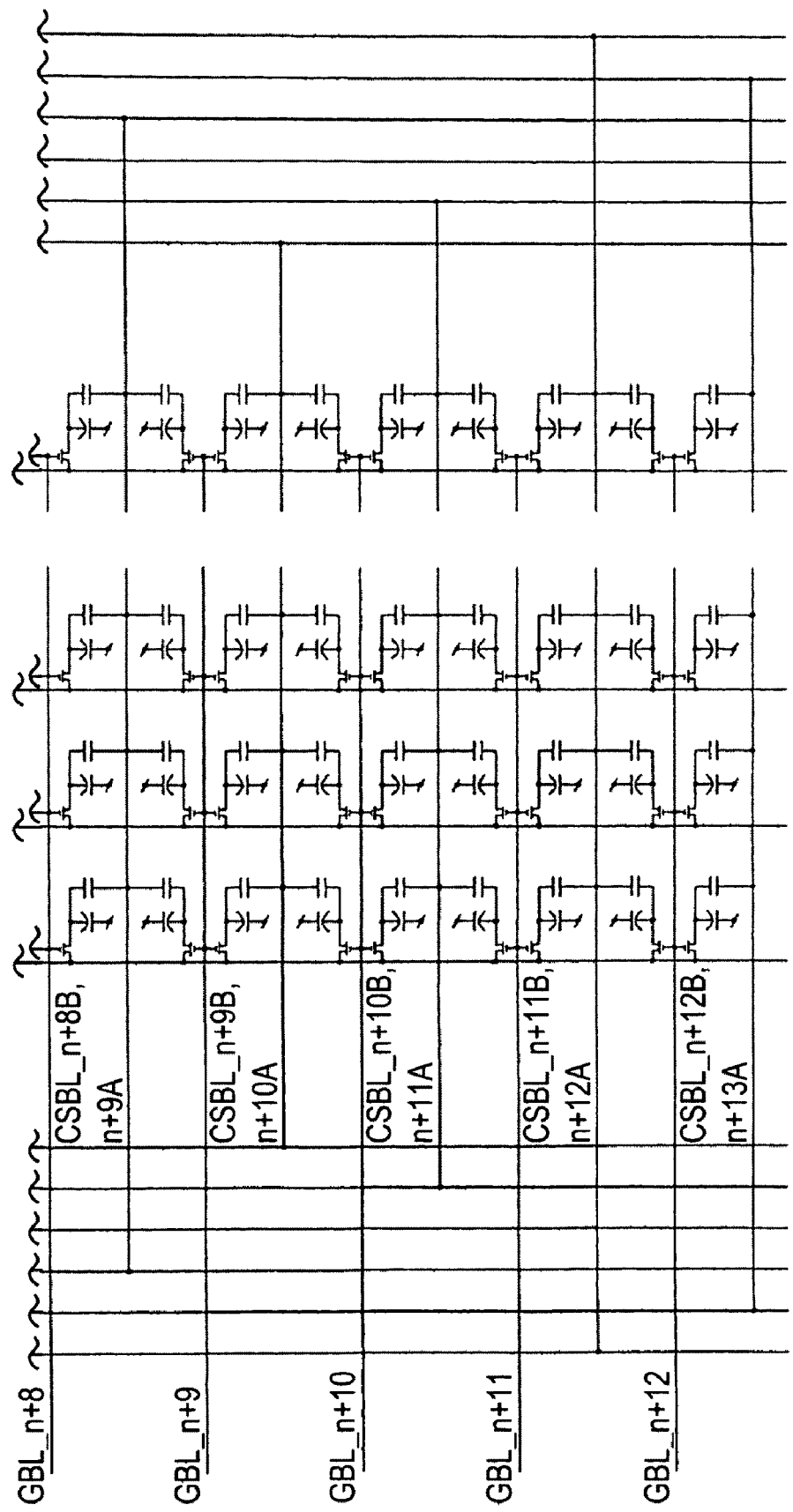
Figures 1, 40:
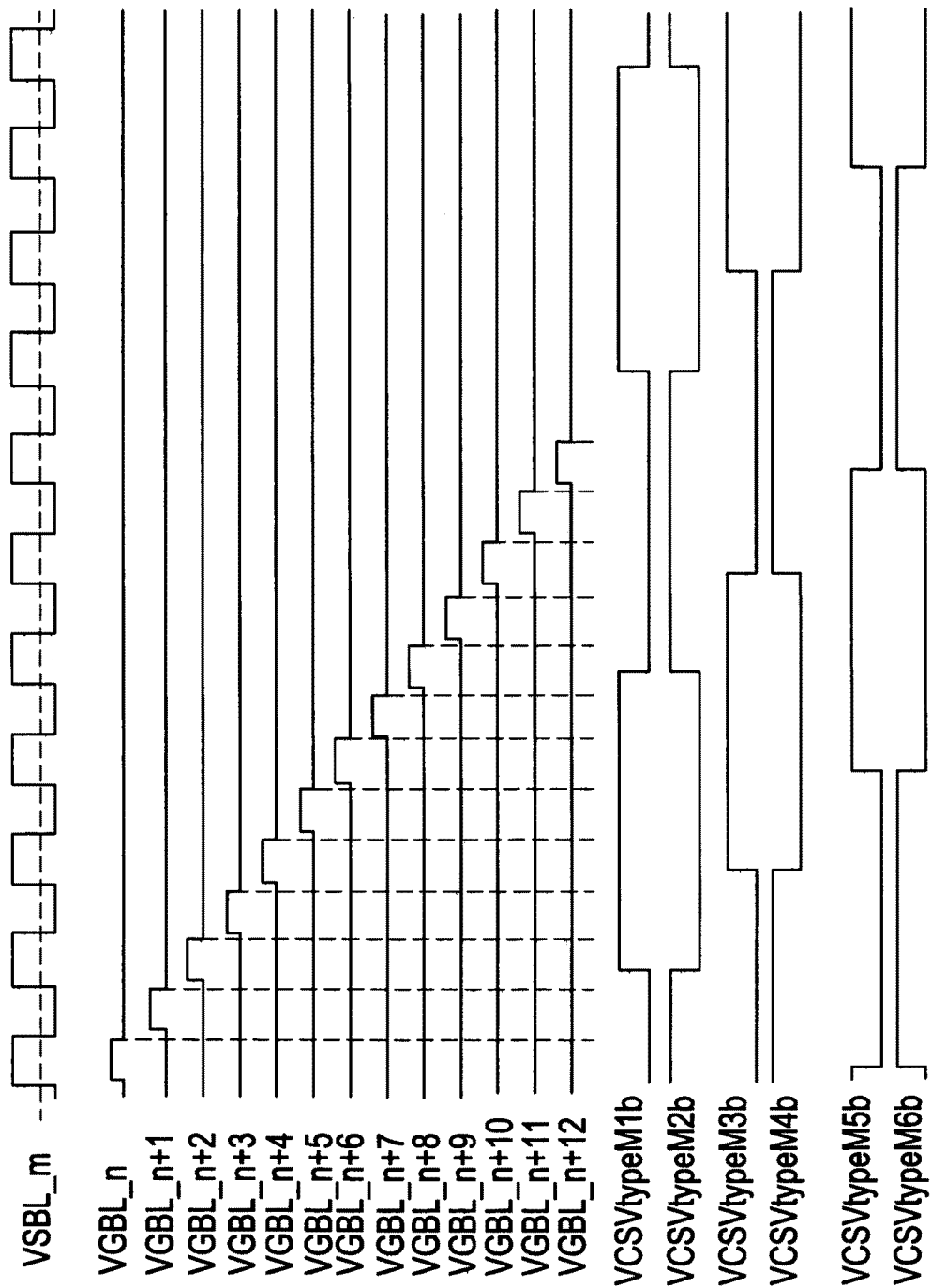
Figures 2, 40:
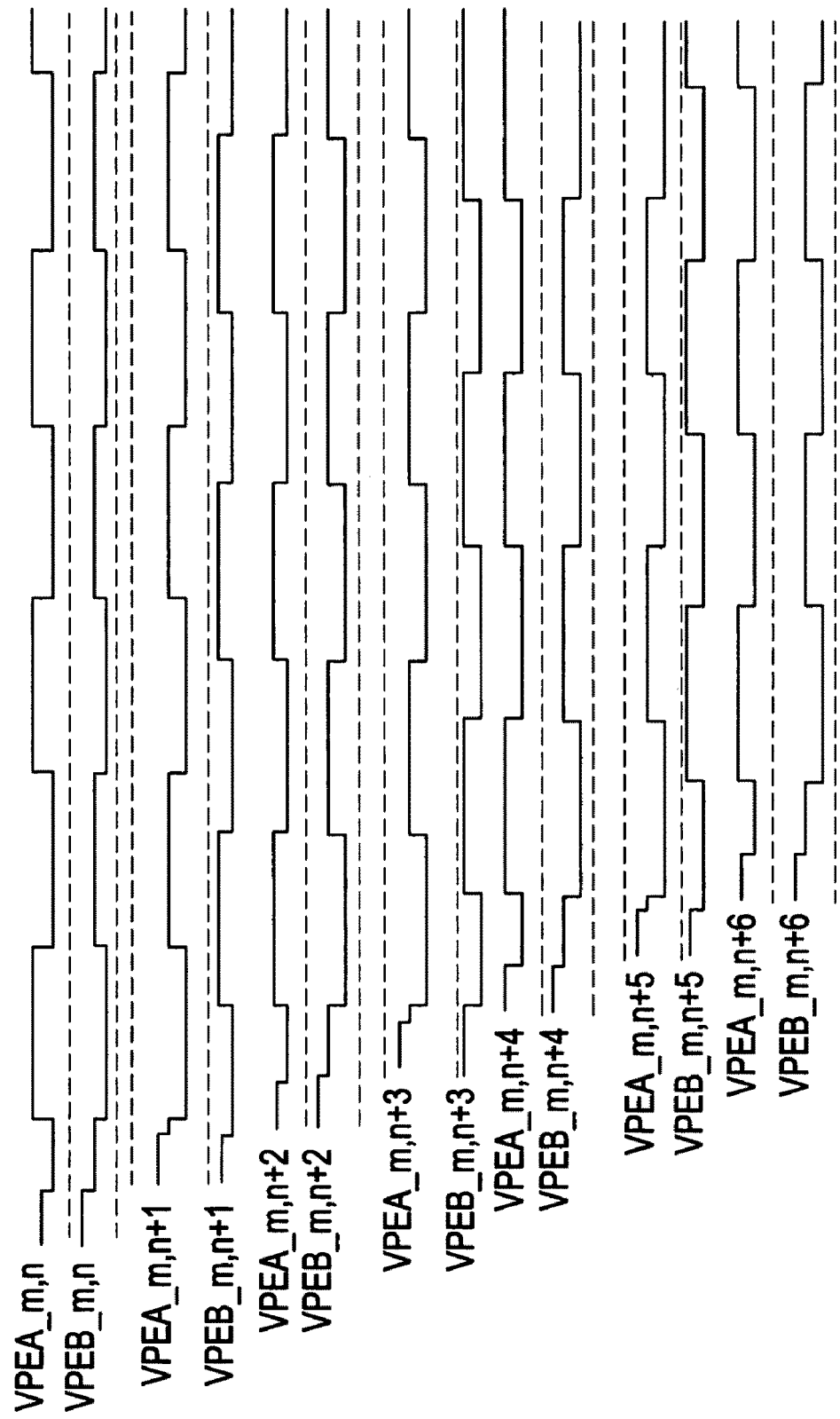
Figures 3, 40:
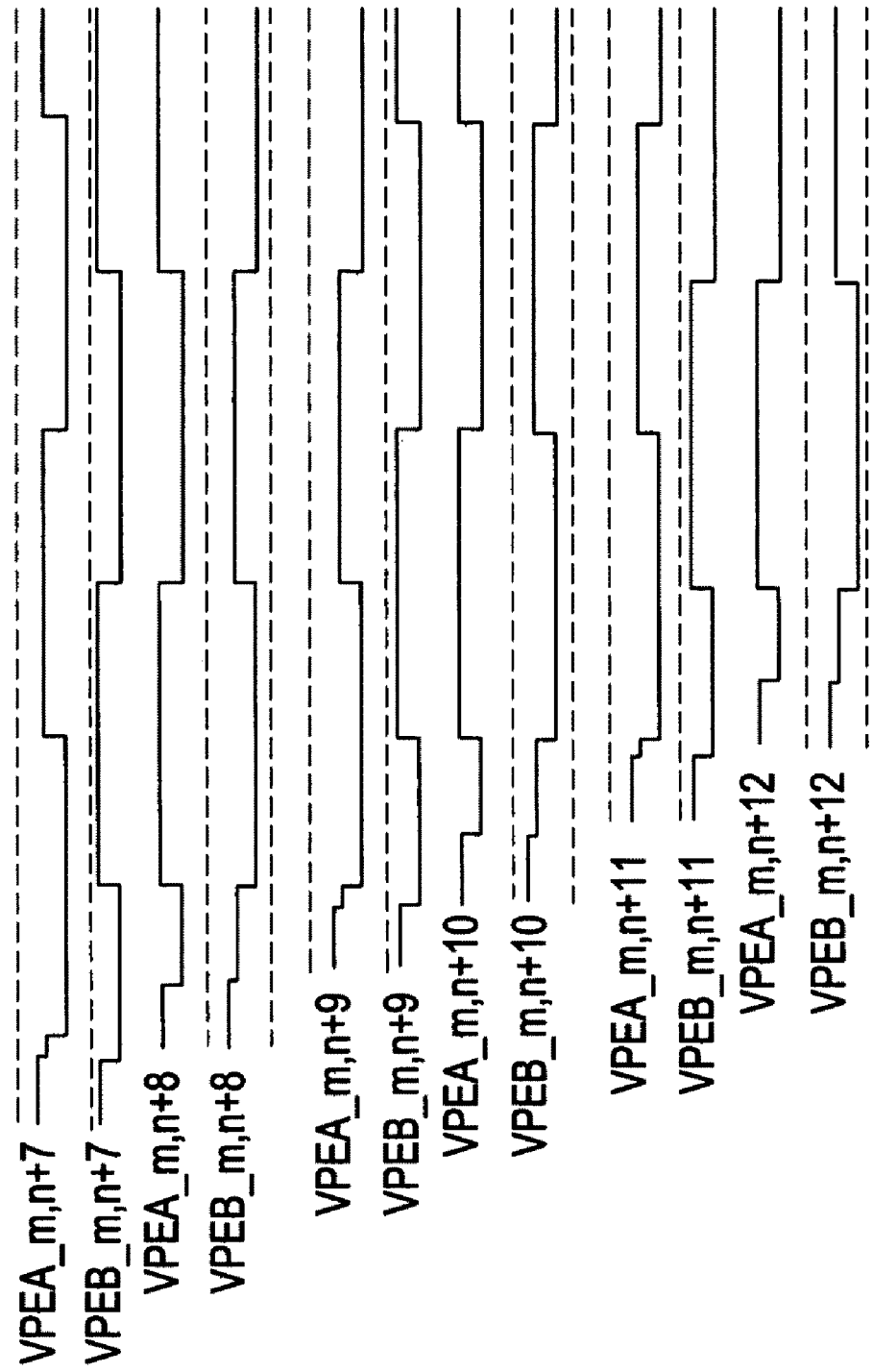

Assuming that there are six electrically independent sets of CS trunks, connection patterns are shown in FIG. 39 and drive waveforms are shown in FIG. 40. Also, the connection patterns used in FIG. 39 are shown in Table 8.

In FIG. 40, each CS busline is connected to any of six CS trunks provided at both left and right ends of the figure. Therefore, there are six electrically independent sets of CS buslines, and thus L=6.

Also, in FIG. 39, there is some regularity in connection patterns between the CS buslines and CS trunks, namely the same connection pattern repeats every 12 CS buslines in the figure. Thus, K=1 (=12/(2L)).

TABLE 8

| CS trunk | CS busline connected to CS trunk L = 4, K = 1 |
|---|---|
| M1a | CSBL_(n − 1) B, (n) A |
|  | CSBL_(n + 4) B, (n + 5) A |
| M2a | CSBL_(n) B, (n + 1) A |
|  | CSBL_(n + 3) B, (n + 4) A |
| M3a | CSBL_(n + 1) B, (n + 2) A |
|  | CSBL_(n + 6) B, (n + 7) A |
| M4a | CSBL_(n + 2) B, (n + 3) A |
|  | CSBL_(n + 5) B, (n + 6) A | where n = 1, 9, 17, . . .

It can be seen from Table 8, that the CS buslines in FIG. 39 are electrically equal within each group represented by any of the following sets of expressions:

$$CSBL\_(p)B,(p+1)A$$

$$CSBL\_(p+7)B,(p+8)A$$

or $$CSBL\_(p+1)B,(p+2)A$$

$$CSBL\_(p+6)B,(p+7)A$$

where either p=1, 3, 5, . . . or p=0, 2, 4, . . .

Using the parameters L and K, the above expressions can be given as follows for any p:

$$CSBL\_(p+2*(K-1))B,(p+2*(K-1)+1)A$$

$$CSBL\_(p+2*(K-1)+K*L+1)B,(p+2*(K-1)+K*L+2)A$$

or $$CSBL\_(p+2*(K-1)+1)B,(p+2*(K-1)+2)A$$

$$CSBL\_(p+2*(K-1)+K*L)B,(p+2*(K-1)+K*L+1)A$$

Thus, it is sufficient to electrically equalize the CS buslines within each CS busline group represented by each of the above sets of expressions, where either p=1, 3, 5, . . . or p=0, 2, 4, . . . .

Incidentally, in FIG. 40, it can be seen that the oscillation period of oscillating voltages applied to the CS buslines is 12H, i.e., 2*K*L times the horizontal scanning period. [K=1, L=8, oscillation period=16H]

Figures 1, 41:
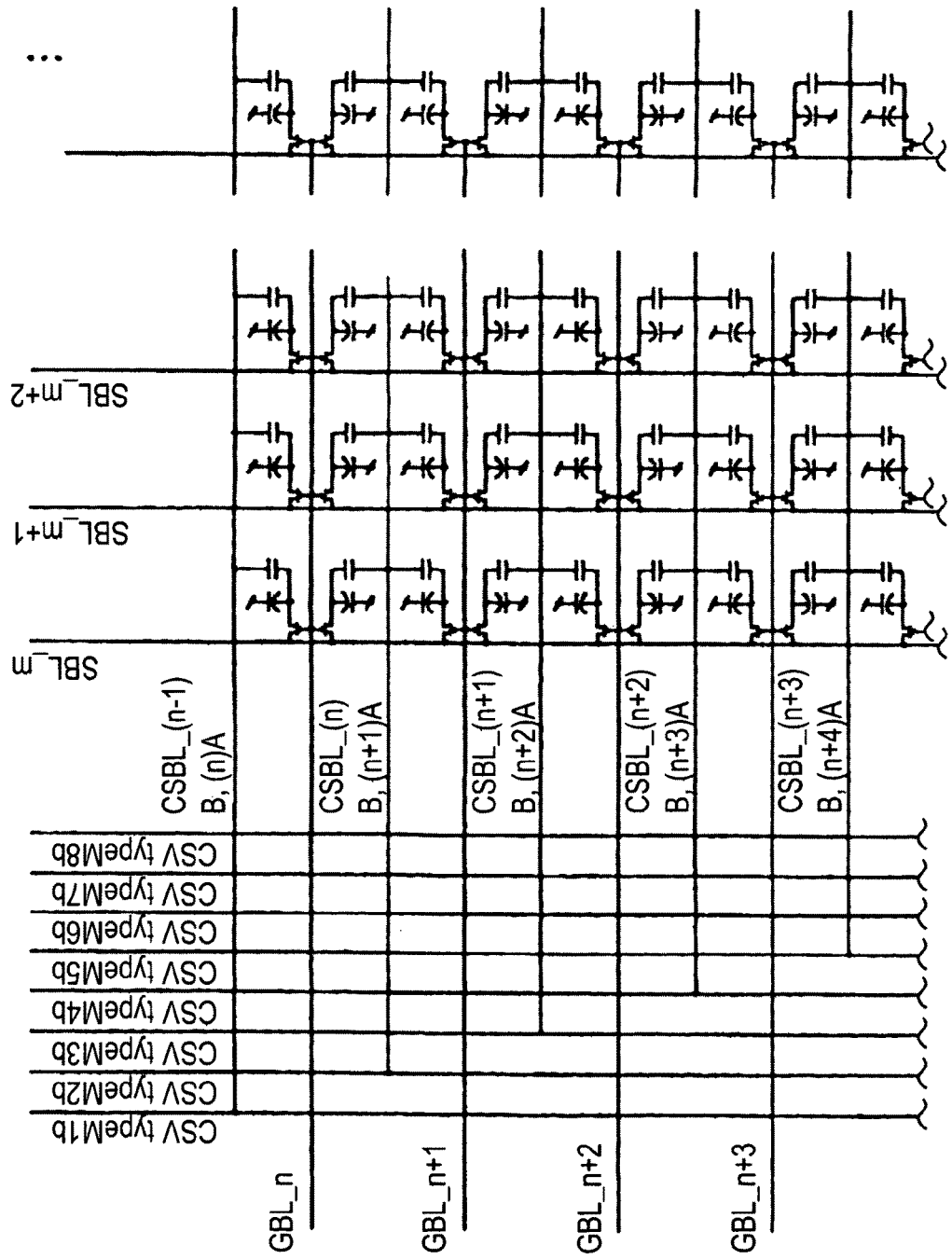
Figures 2, 41:
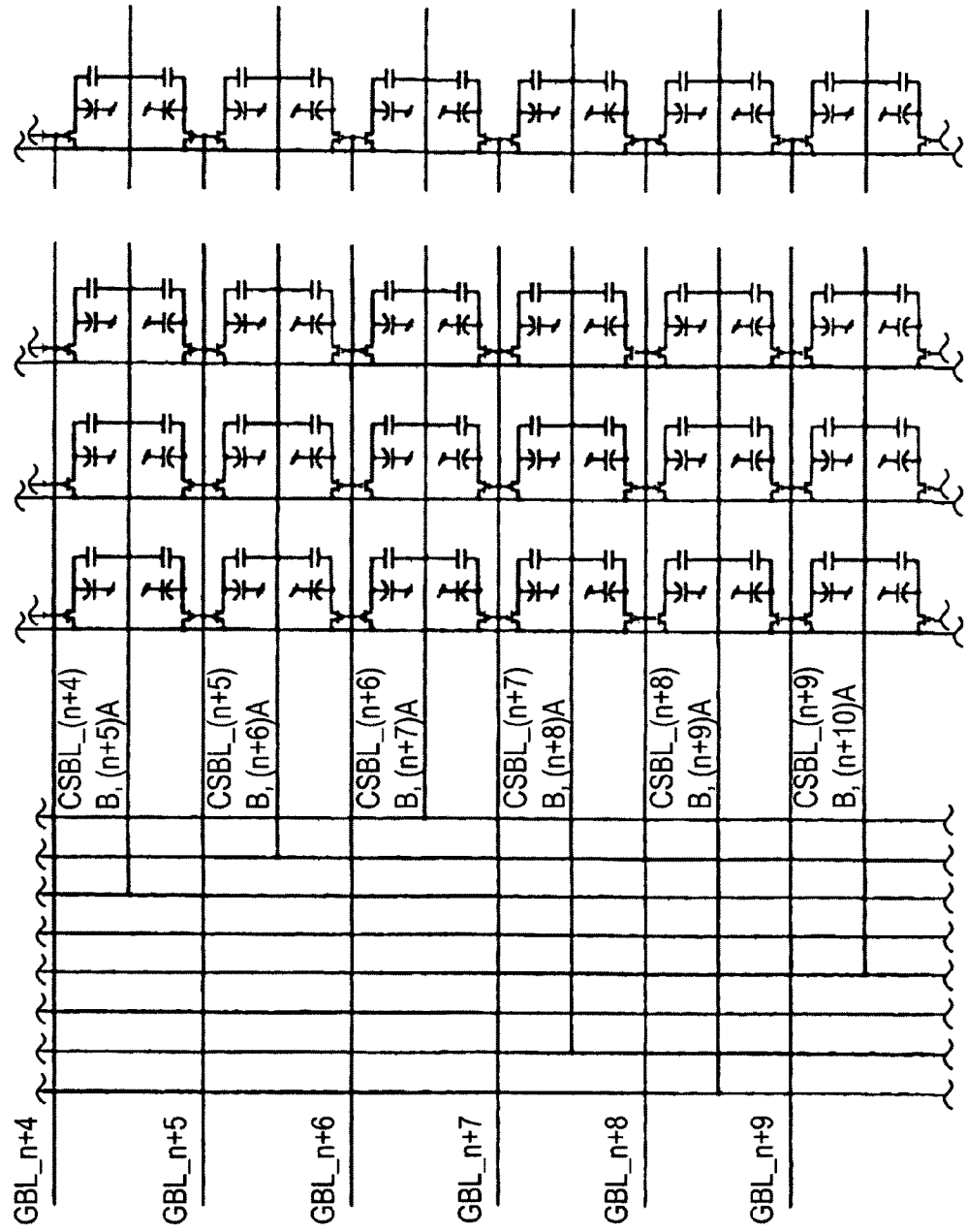
Figures 3, 41:
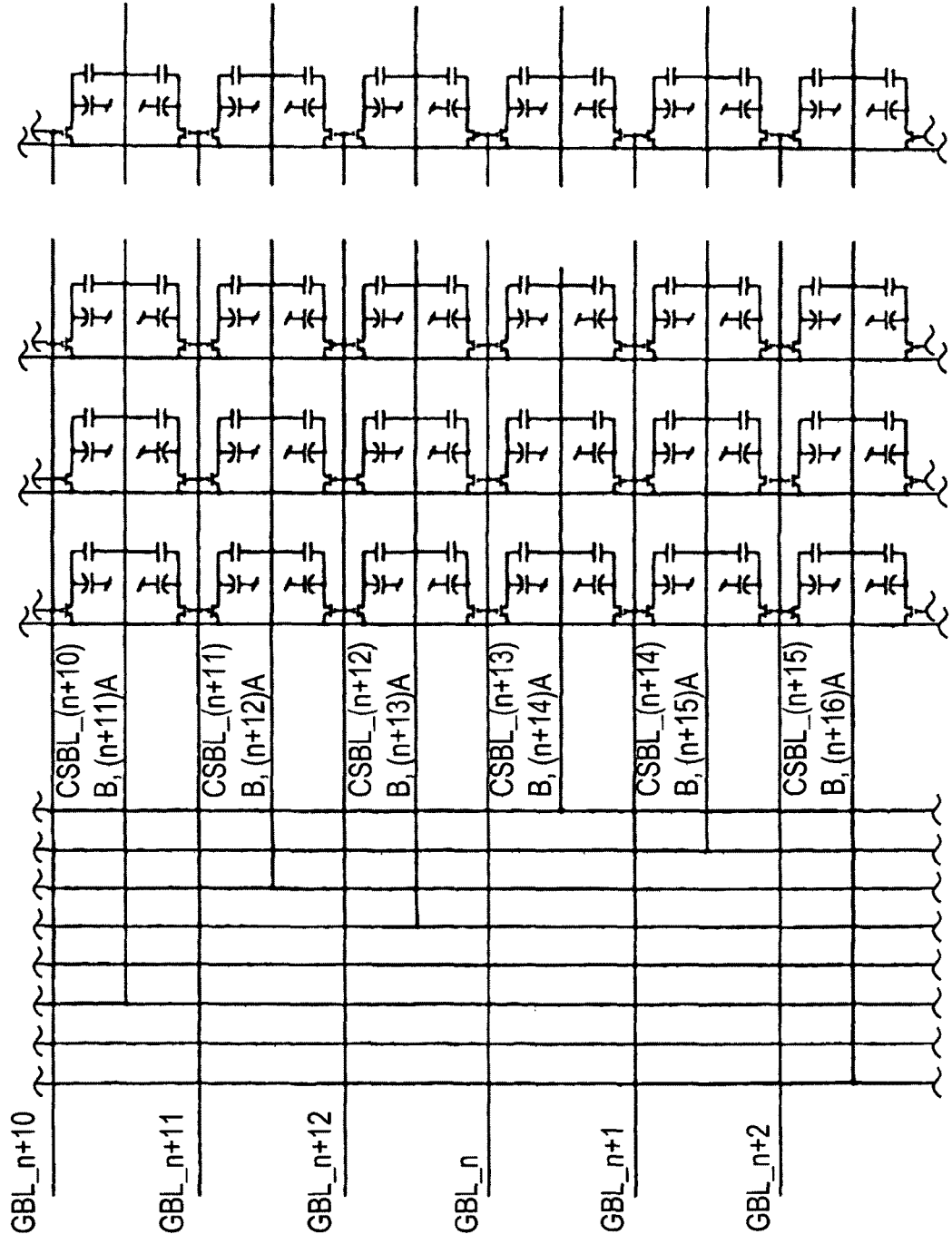
Figures 4, 41:
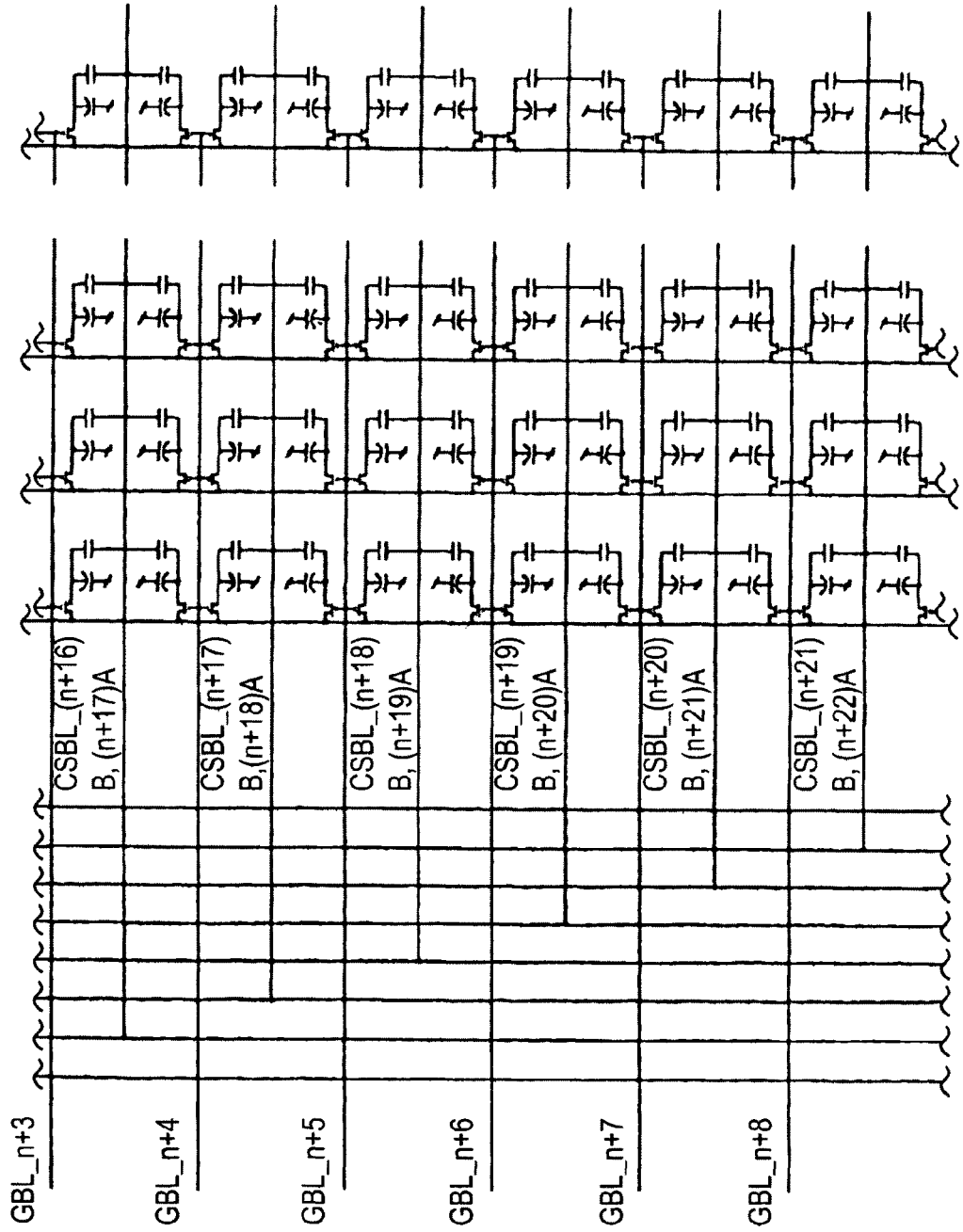
Figures 5, 41:
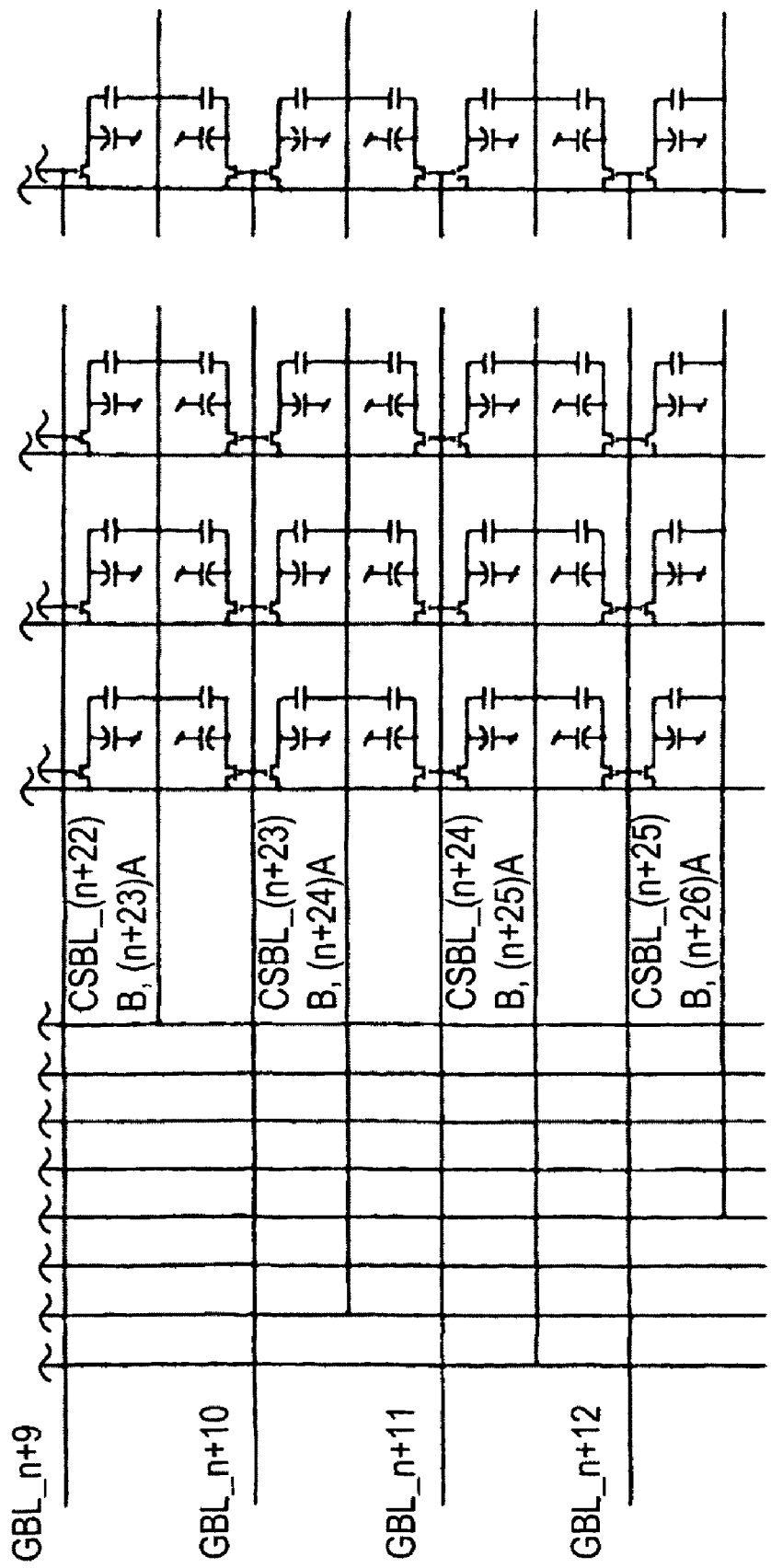
Figures 1, 42:
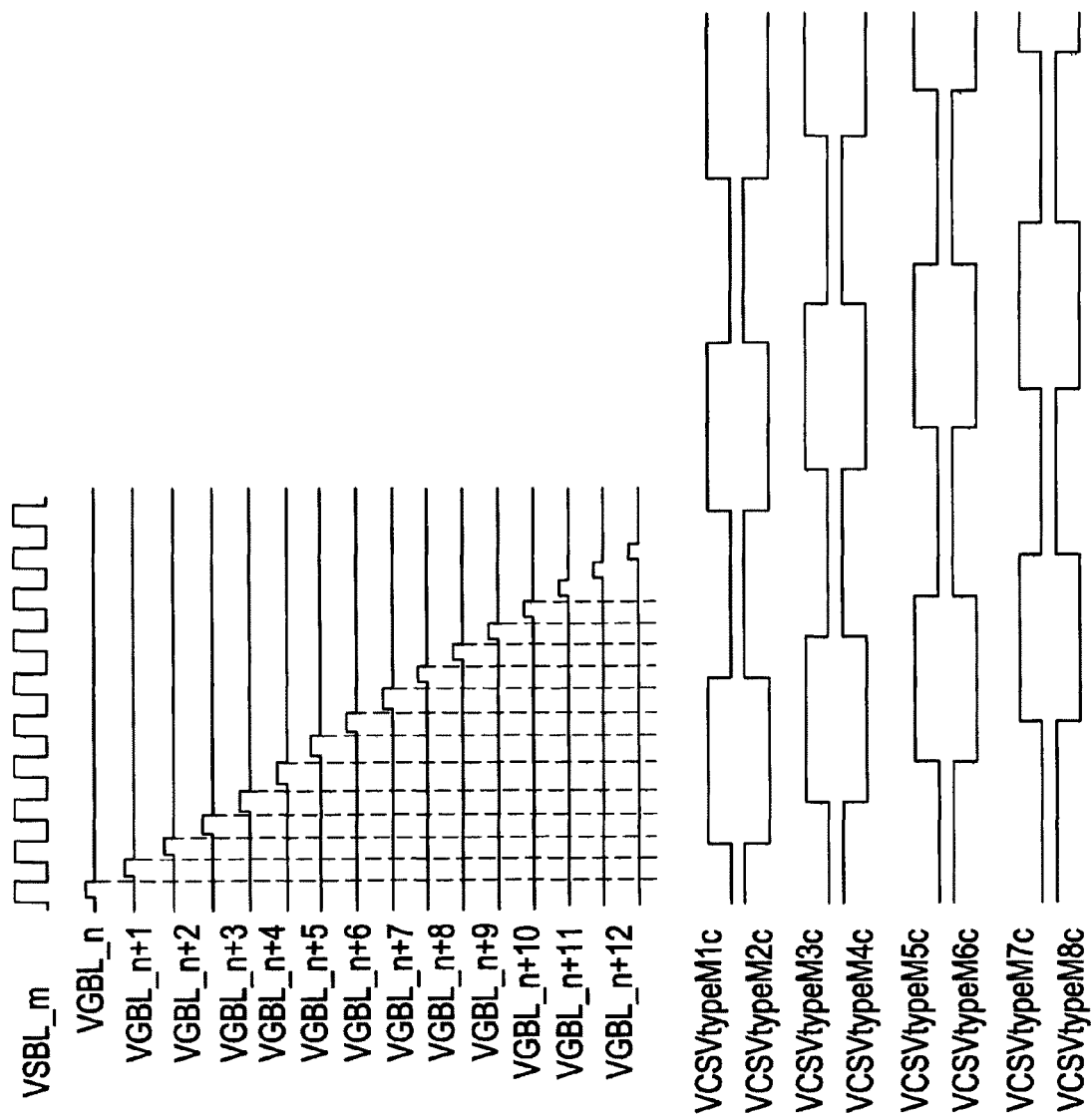
Figures 2, 42:
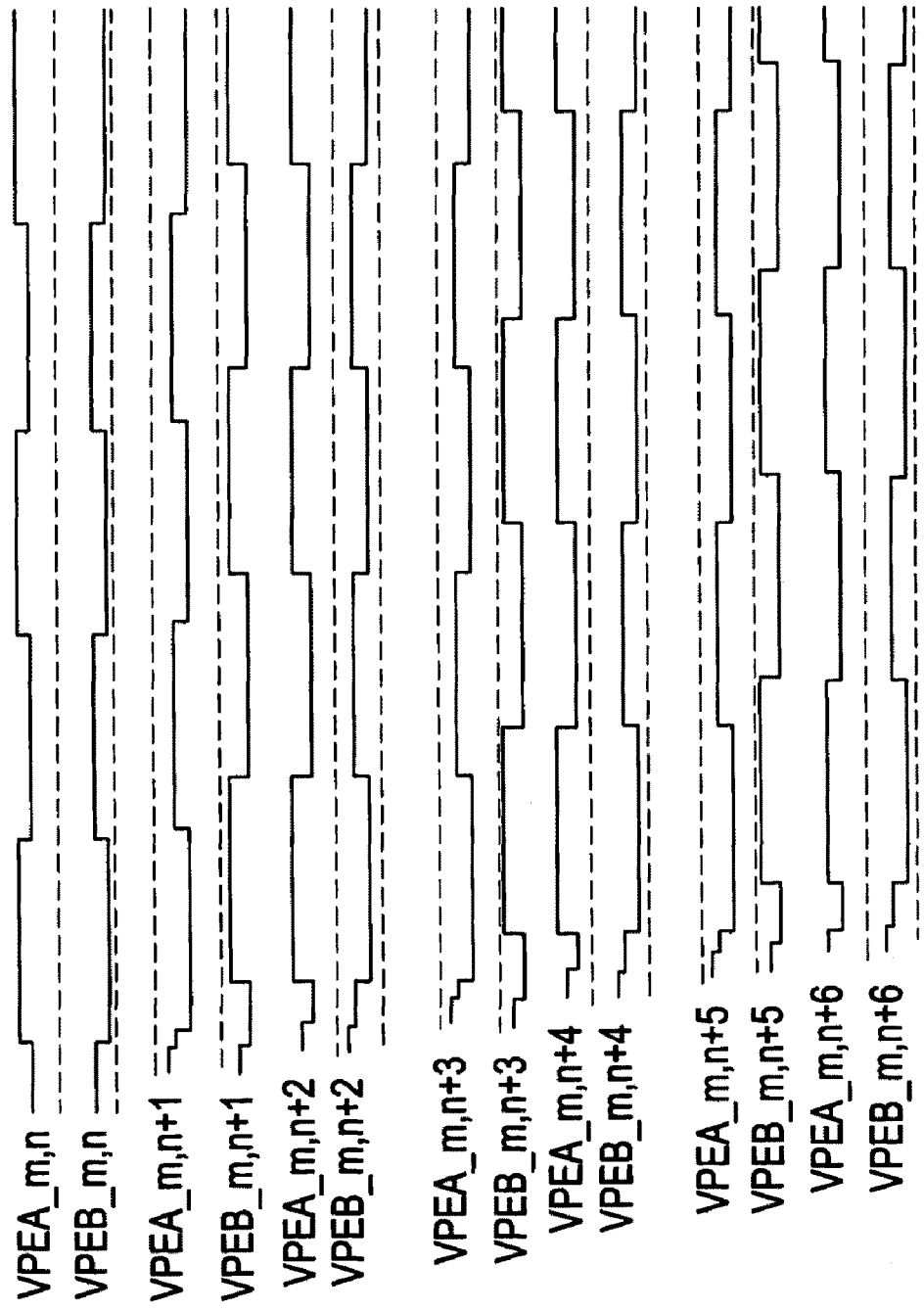
Figures 3, 42:
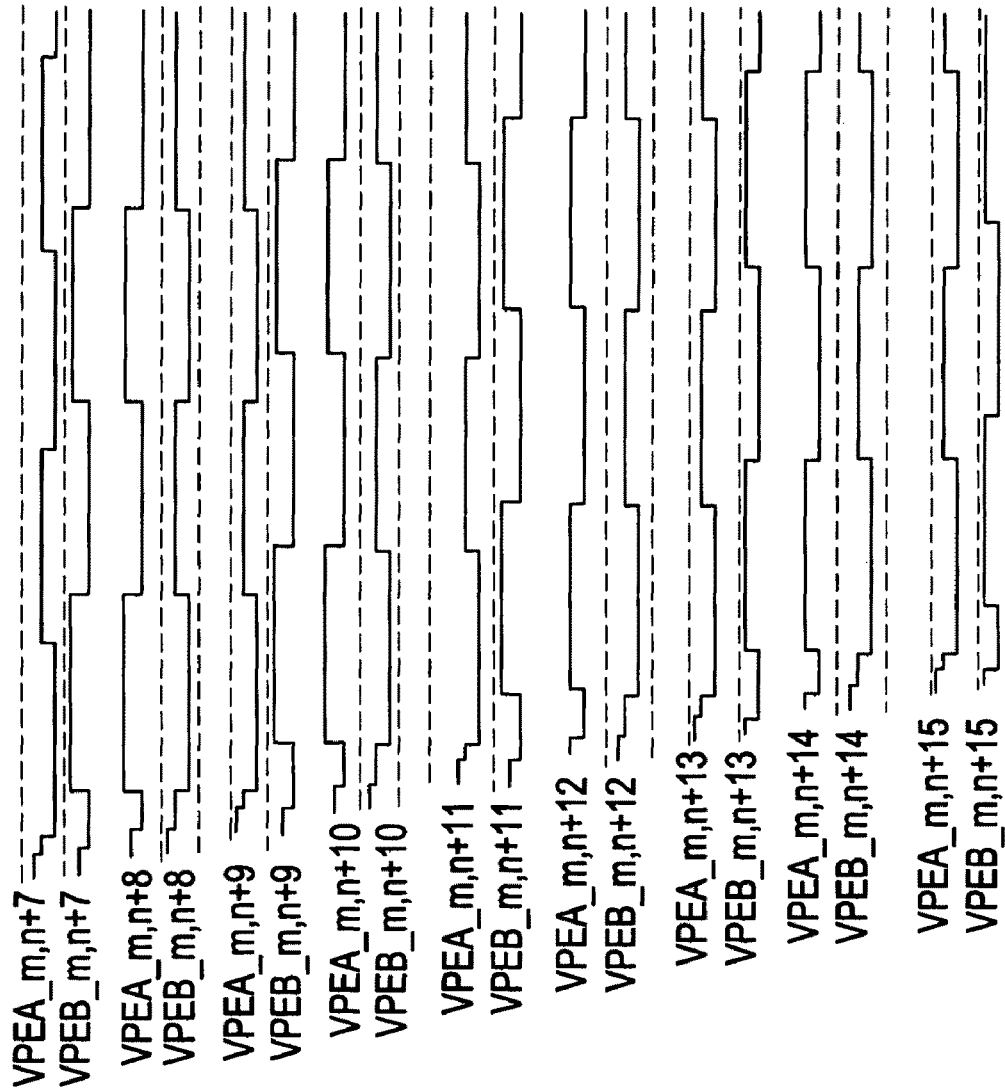

Assuming that there are eight electrically independent sets of CS buslines, connection patterns are shown in FIG. 41 and drive waveforms are shown in FIG. 42. Also, the connection patterns used in FIG. 41 are shown in Table 9.

In FIG. 41, each CS busline is connected to any of eight CS trunks provided at the left end of the figure. Therefore, there are eight electrically independent sets of CS buslines, and thus L=8.

Also, in FIG. 41, there is some regularity in connection patterns between the CS buslines and CS trunks, namely the same connection pattern repeats every 16 CS buslines in the figure. Thus, K=1 (=16/(2L)).

TABLE 9

| CS trunk | CS busline connected to CS trunk L = 8, K = 1 |
|---|---|
| M1c | CSBL_(n − 1) B, (n) A |
|  | CSBL_(n + 8) B, (n + 9) A |
| M2c | CSBL_(n) B, (n + 1) A |
|  | CSBL_(n + 7) B, (n + 8) A |
| M3c | CSBL_(n + 1) B, (n + 2) A |
|  | CSBL_(n + 10) B, (n + 11) A |
| M4c | CSBL_(n + 2) B, (n + 3) A |
|  | CSBL_(n + 9) B, (n + 10) A |
| M5c | CSBL_(n + 3) B, (n + 4) A |
|  | CSBL_(n + 12) B, (n + 13) A |
| M6c | CSBL_(n + 4) B, (n + 5) A |
|  | CSBL_(n + 11) B, (n + 12) A |
| M7c | CSBL_(n + 5) B, (n + 6) A |
|  | CSBL_(n + 14) B, (n + 15) A |
| M8c | CSBL_(n + 6) B, (n + 7) A |
|  | CSBL_(n + 13) B, (n + 14) A | where n = 1, 17, 33, . . .

It can be seen from Table 9, that the CS buslines in FIG. 41 are electrically equal within each group represented by any of the following sets of expressions:

$$CSBL\_(p)B,(p+1)A$$

$$CSBL\_(p+9)B,(p+10)A$$

or $$CSBL\_(p+1)B,(p+2)A$$

$$CSBL\_(p+8)B,(p+9)A$$

where either p=1, 3, 5, . . . or p=0, 2, 4, . . . .

Using the parameters L and K, the above expressions can be given as follows for any p:

$$CSBL\_(p+2*(K-1))B,(p+2*(K-1)+1)A$$

$$CSBL\_(p+2*(K-1)+K*L+1)B,(p+2*(K-1)+K*L+2)A$$

or $$CSBL\_(p+2*(K-1)+1)B,(p+2*(K-1)+2)A$$

$$CSBL\_(p+2*(K-1)+K*L)B,(p+2(K-1)+K*L+1)A$$

Thus, it is sufficient to electrically equalize the CS buslines within each CS busline group represented by each of the above sets of expressions, where either p=1, 3, 5, . . . or p=0, 2, 4, . . . .

Incidentally, in FIG. 42, it can be seen that the oscillation period of oscillating voltages applied to the CS buslines is 16H, i.e., 2*K*L times the horizontal scanning period. [K=1, L=10, oscillation period=20]

Figures 1, 43:
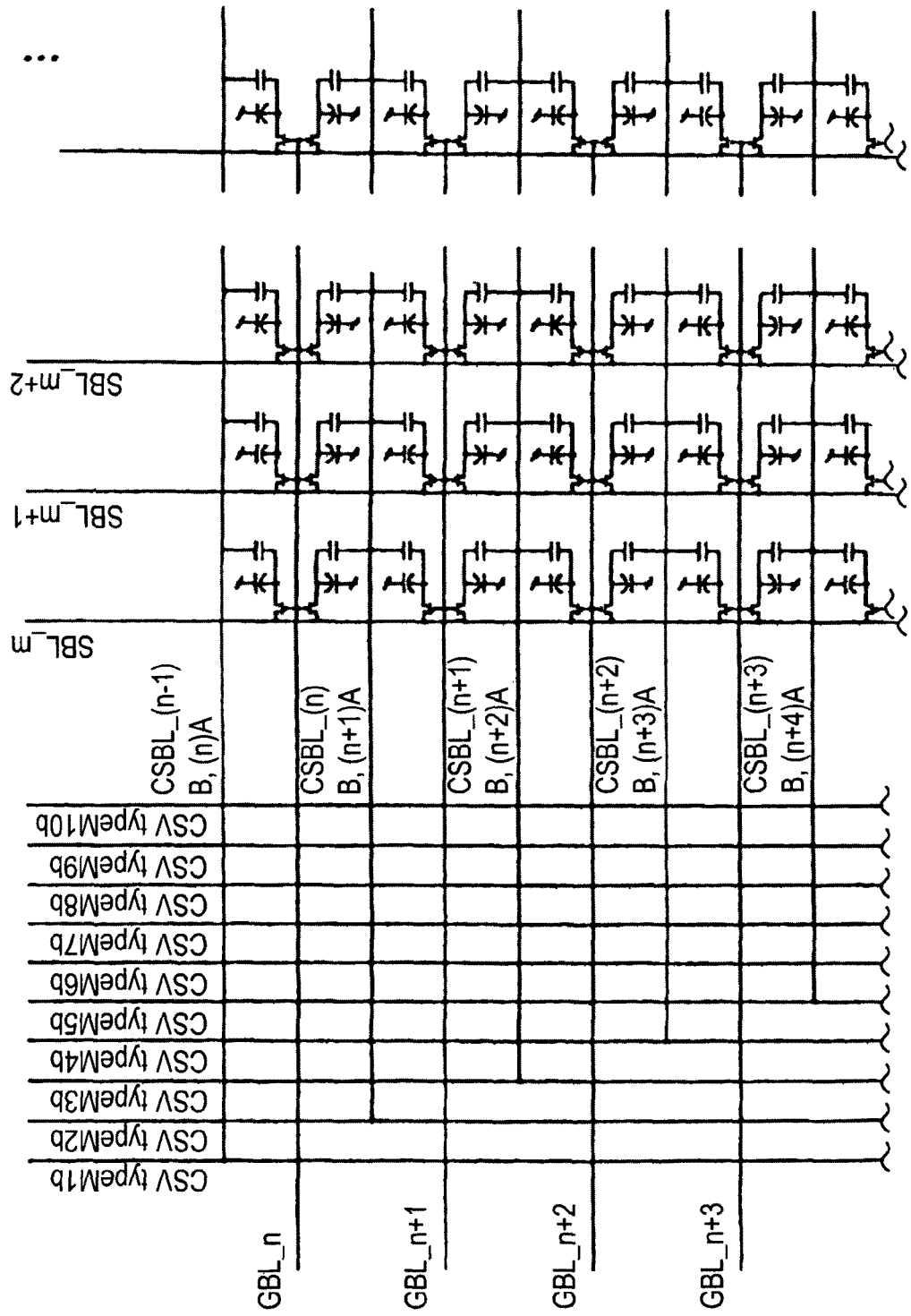
Figures 2, 43:
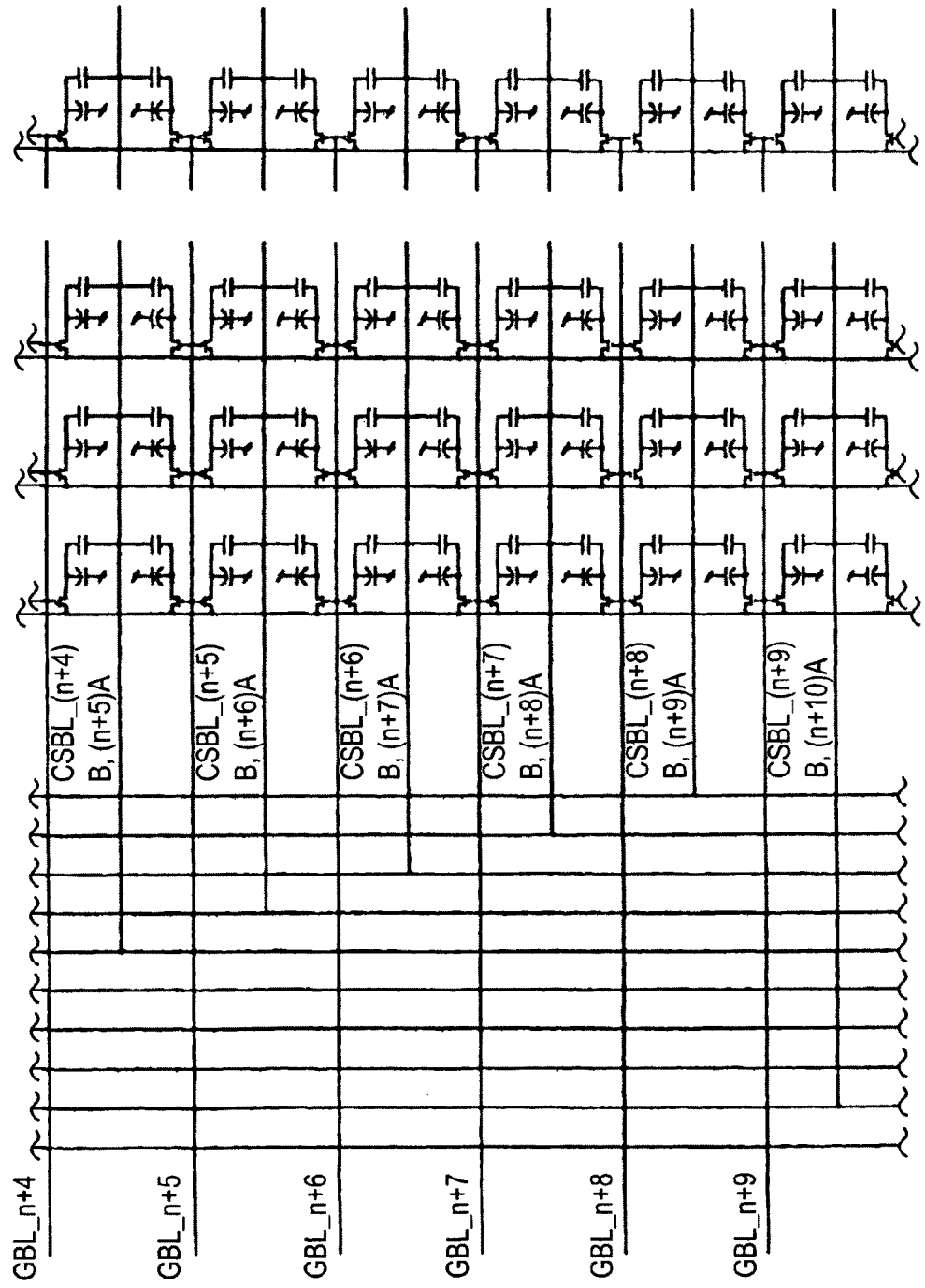
Figures 3, 43:
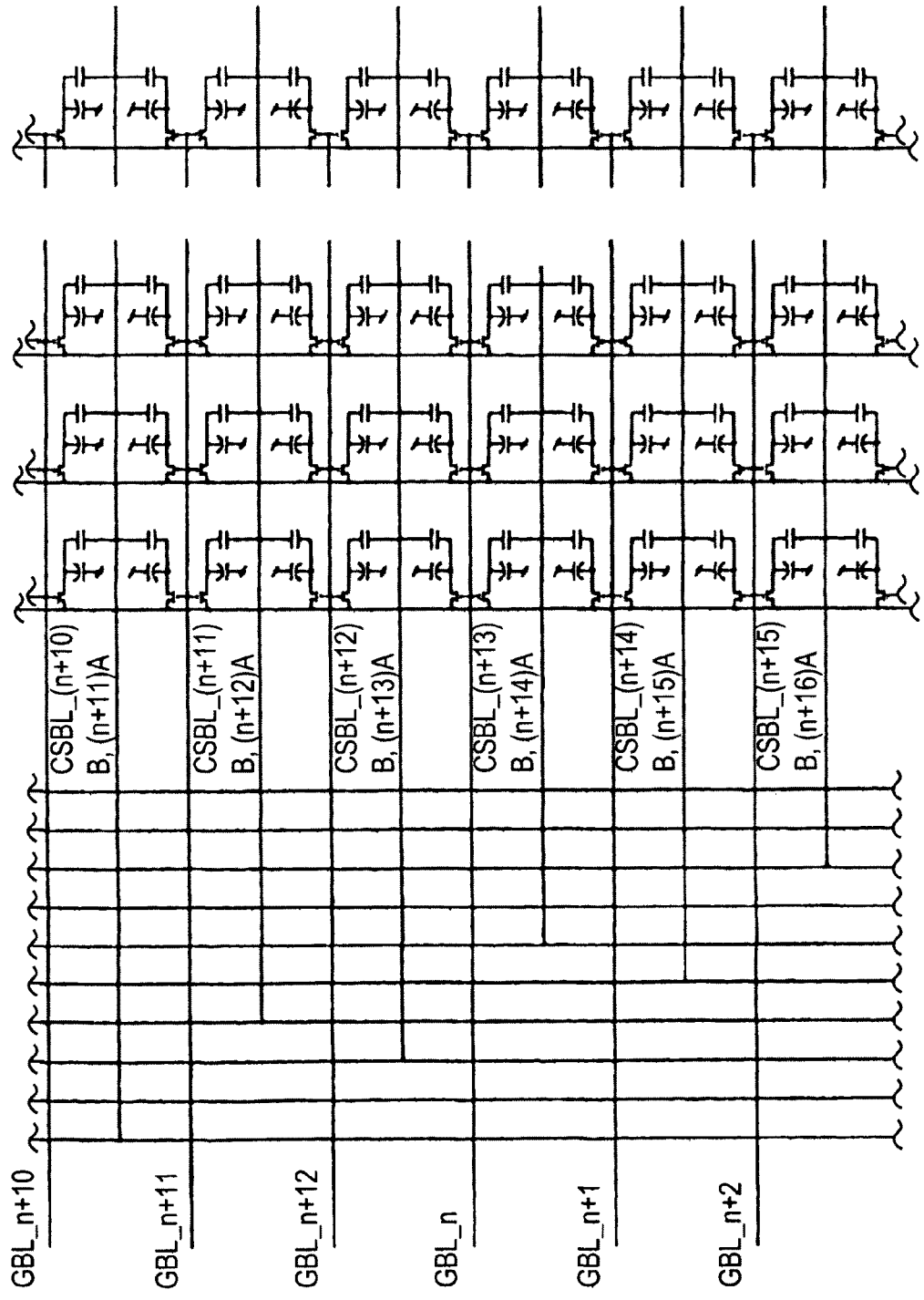
Figures 4, 43:
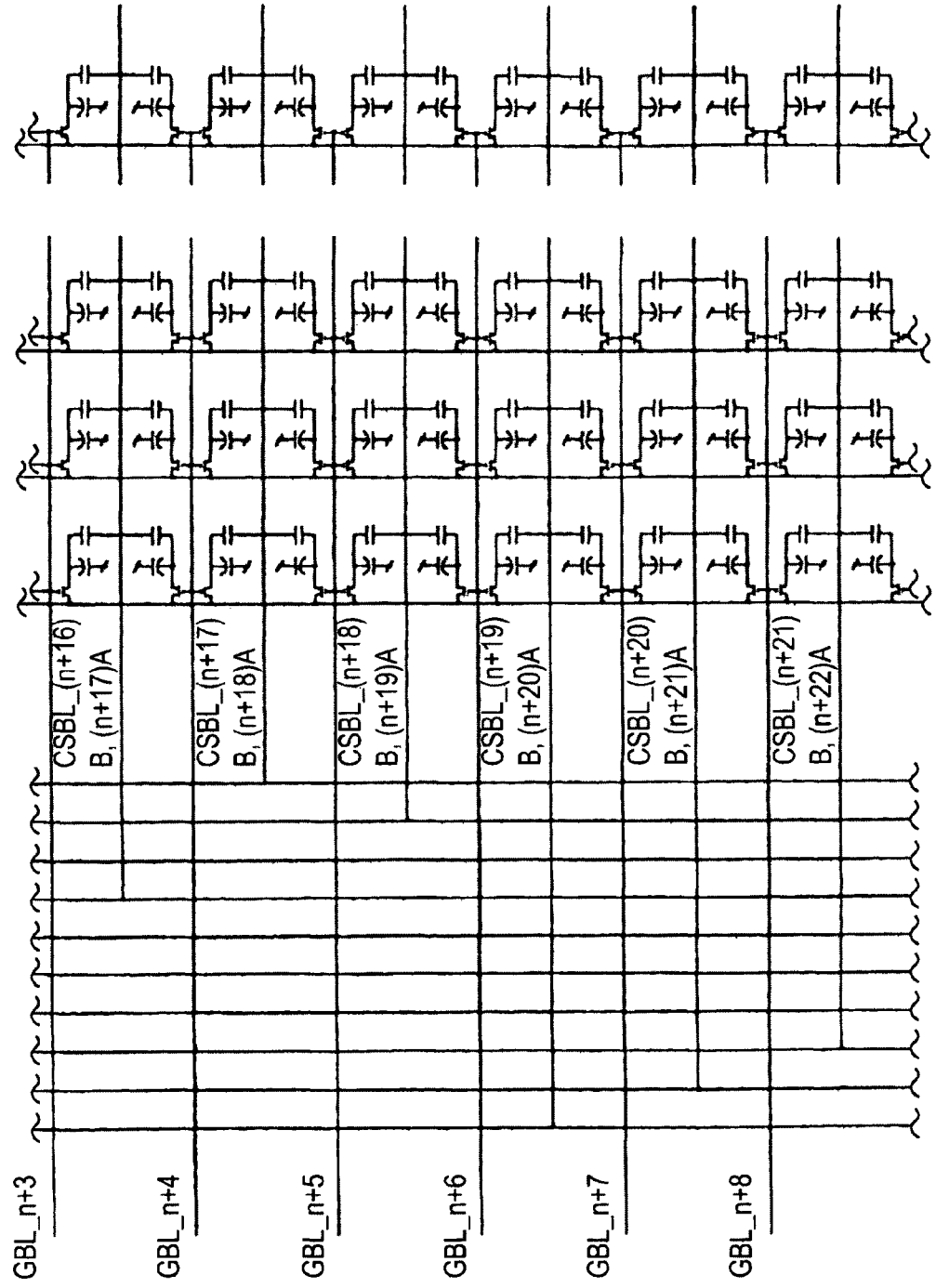
Figures 5, 43:
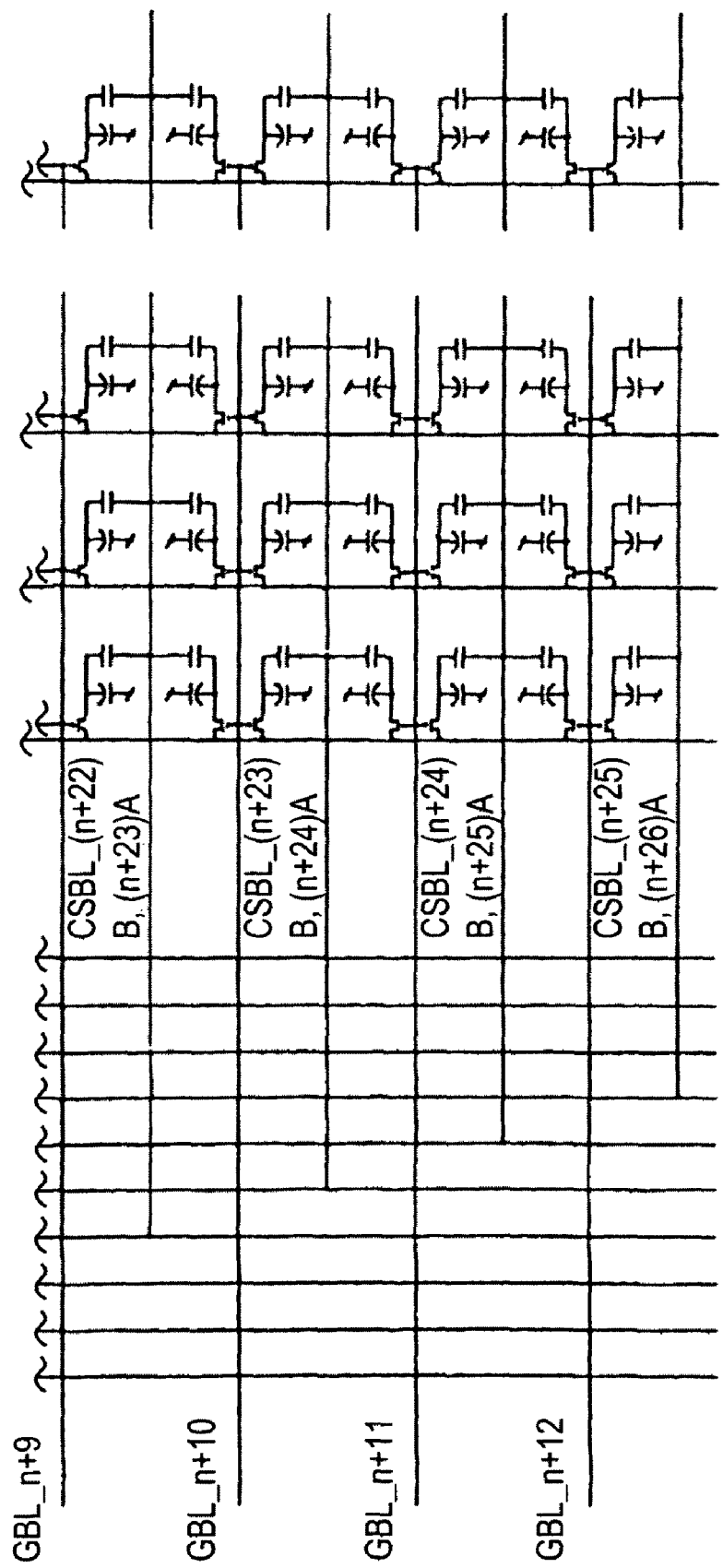
Figures 1, 44:
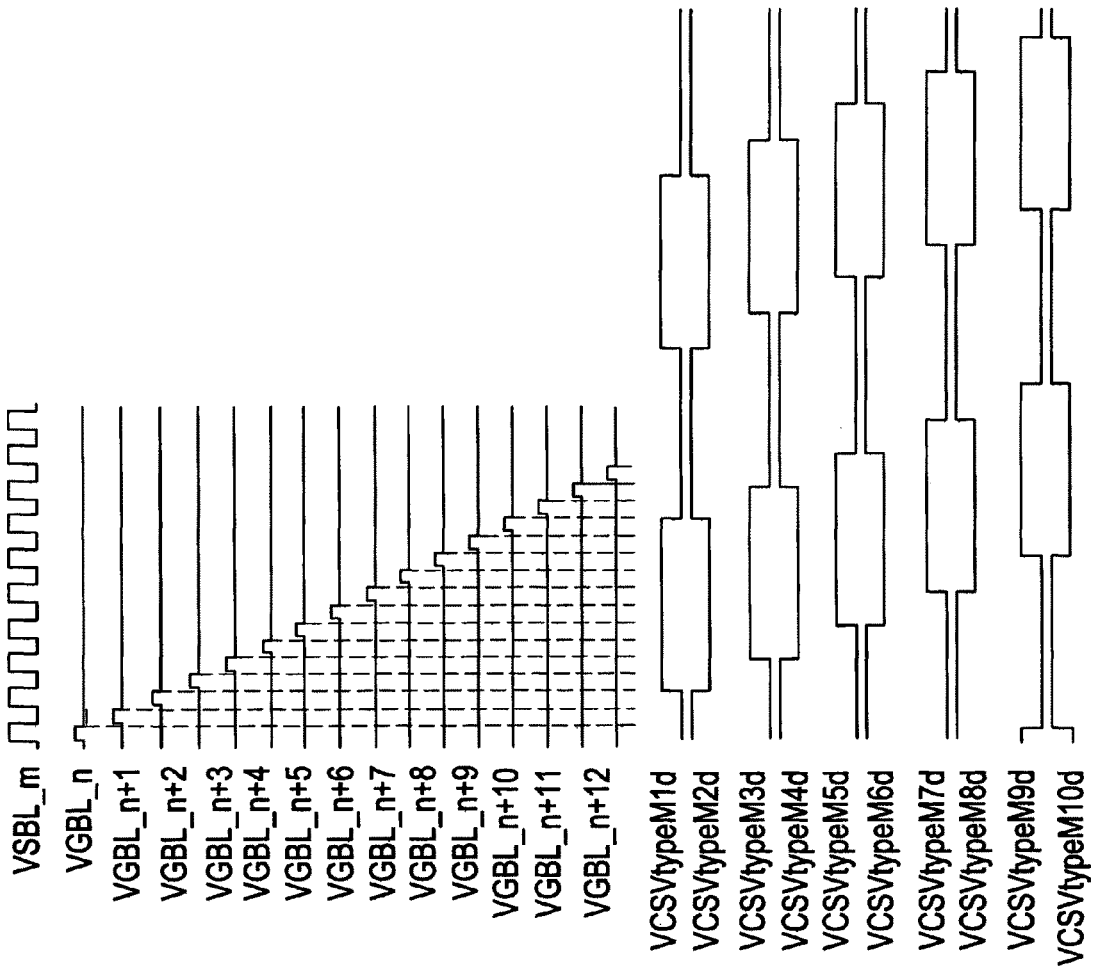
Figures 2, 44:
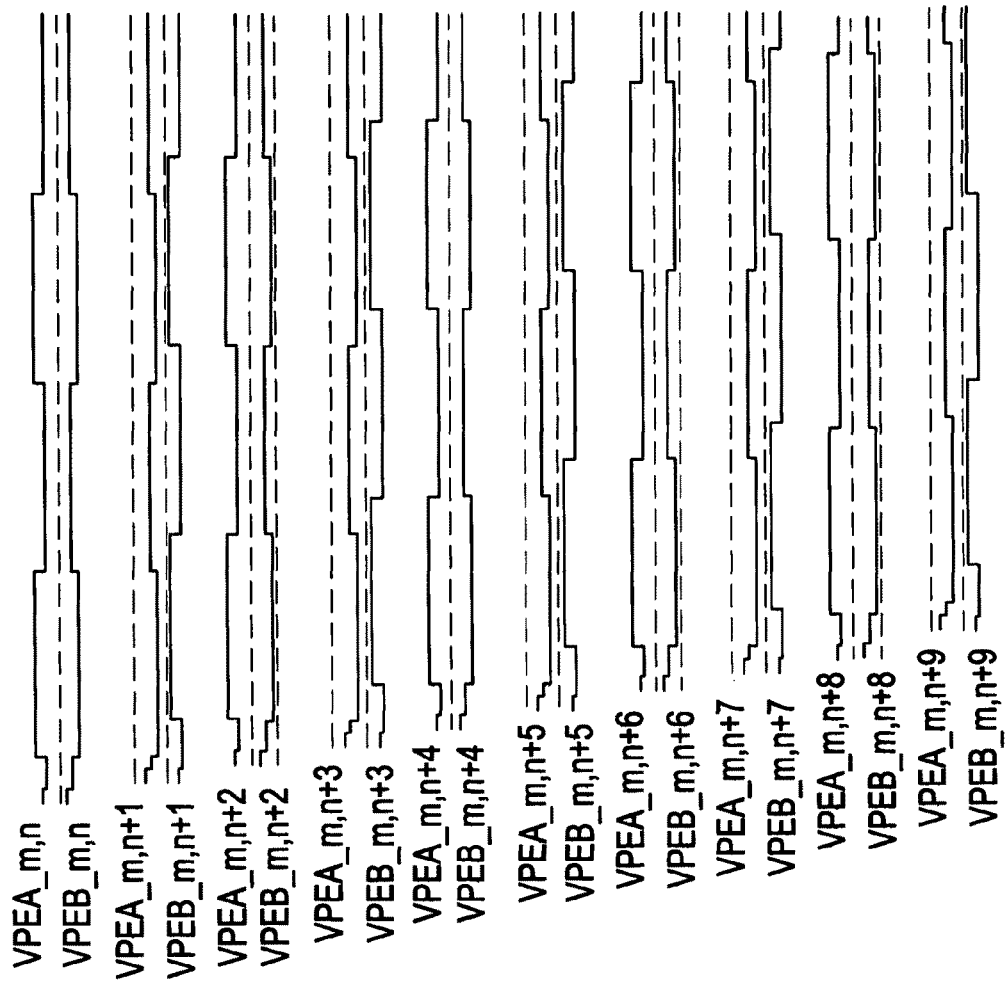
Figures 3, 44:
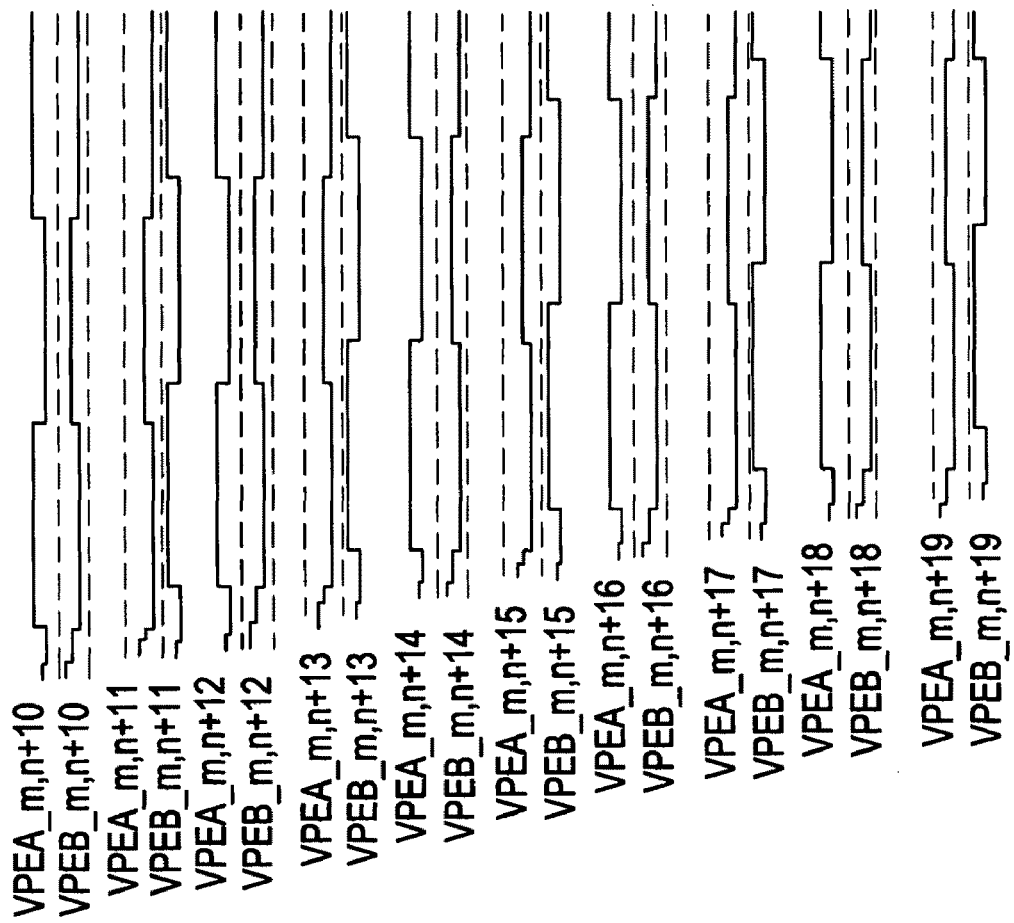

Assuming that there are ten electrically independent sets of CS buslines, connection patterns are shown in FIG. 43 and drive waveforms are shown in FIG. 44. Also, the connection patterns used in FIG. 43 are shown in Table 10.

In FIG. 43, each CS busline is connected to any of ten CS trunks provided at both left and right ends of the figure. Therefore, there are ten electrically independent sets of CS buslines, and thus L=10. Also, in FIG. 43, there is some regularity in connection patterns between the CS buslines and CS trunks, namely the same connection pattern repeats every 20 CS buslines in the figure. Thus, K=1 (=20/(2L)).

TABLE 10

L = 10, K = 1

| CS trunk | CS busline connected to CS trunk |
|---|---|
| M1d | CSBL__(n − 1) B, (n) A |
|  | CSBL__(n + 10) B, (n + 11) A |
| M2d | CSBL__(n) B, (n + 1) A |
|  | CSBL__(n + 9) B, (n + 10) A |
| M3d | CSBL__(n + 1) B, (n + 2) A |
|  | CSBL__(n + 12) B, (n + 13) A |
| M4d | CSBL__(n + 2) B, (n + 3) A |
|  | CSBL__(n + 11) B, (n + 12) A |
| M5d | CSBL__(n + 3) B, (n + 4) A |
|  | CSBL__(n + 14) B, (n + 15) A |
| M6d | CSBL__(n + 4) B, (n + 5) A |
|  | CSBL__(n + 13) B, (n + 14) A |
| M7d | CSBL__(n + 5) B, (n + 6) A |
|  | CSBL__(n + 16) B, (n + 17) A |
| M8d | CSBL__(n + 6) B, (n + 7) A |
|  | CSBL__(n + 15) B, (n + 16) A |
| M9d | CSBL__(n + 7) B, (n + 6) A |
|  | CSBL__(n + 18) B, (n + 19) A |
| M10d | CSBL__(n + 8) B, (n + 7) A |
|  | CSBL__(n + 17) B, (n + 18) A | where n = 1, 21, 41, ...

It can be seen from Table 10, that the CS buslines in FIG. 43 are electrically equal within each group represented by any of the following sets of expressions:

$$CSBL\_(p)B,(p+1)A$$

$$CSBL\_(p+11)B,(p+12)A$$

or $$CSBL\_(p+1)B,(p+2)A$$

$$CSBL\_(p+10)B,(p+11)A$$

where either p=1, 3, 5, ... or p=0, 2, 4, ....

Using the parameters L and K, the above expressions can be given as follows for any p:

$$CSBL\_(p+2*(K-1))B,(p+2*(K-1)+1)A$$

$$CSBL\_(p+2*(K-1)+K*L+1)B,(p+2*(K-1)+K*L+2)A$$

or $$CSBL\_(p+2*(K-1)+1)B,(p+2*(K-1)+2)A$$

$$CSBL\_(p+2*(K-1)+K*L)B,(p+2*(K-1)+K*L+1)A$$

Thus, it is sufficient to electrically equalize the CS buslines within each CS busline group represented by each of the above sets of expressions, where either p=1, 3, 5, ... or p=0, 2, 4, ....

Incidentally, in FIG. 44, it can be seen that the oscillation period of oscillating voltages applied to the CS buslines is 20H, i.e., K*L times the horizontal scanning period.
[K=1, L=12, oscillation period=24H]

Figures 1, 45:
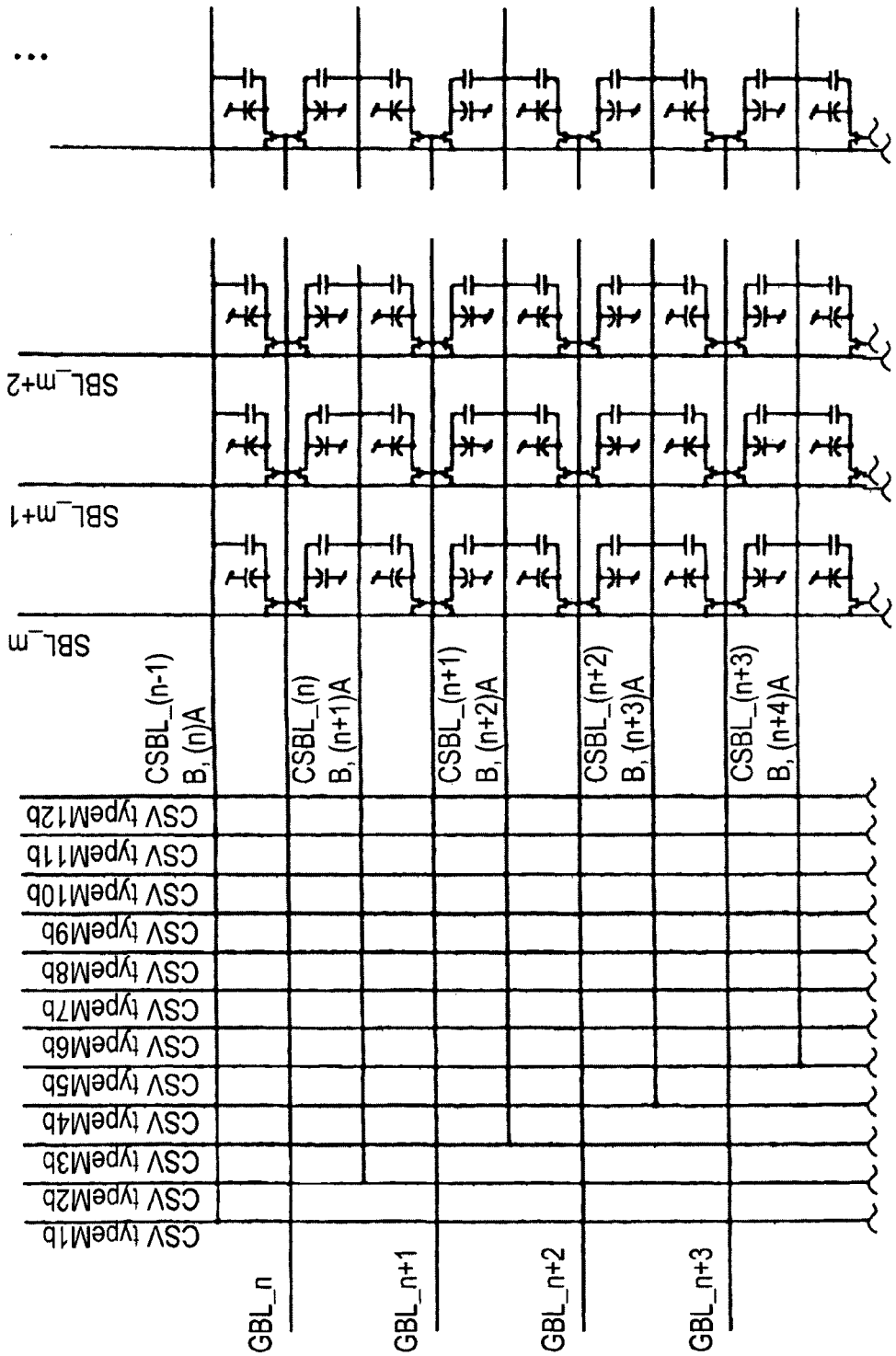
Figures 2, 45:
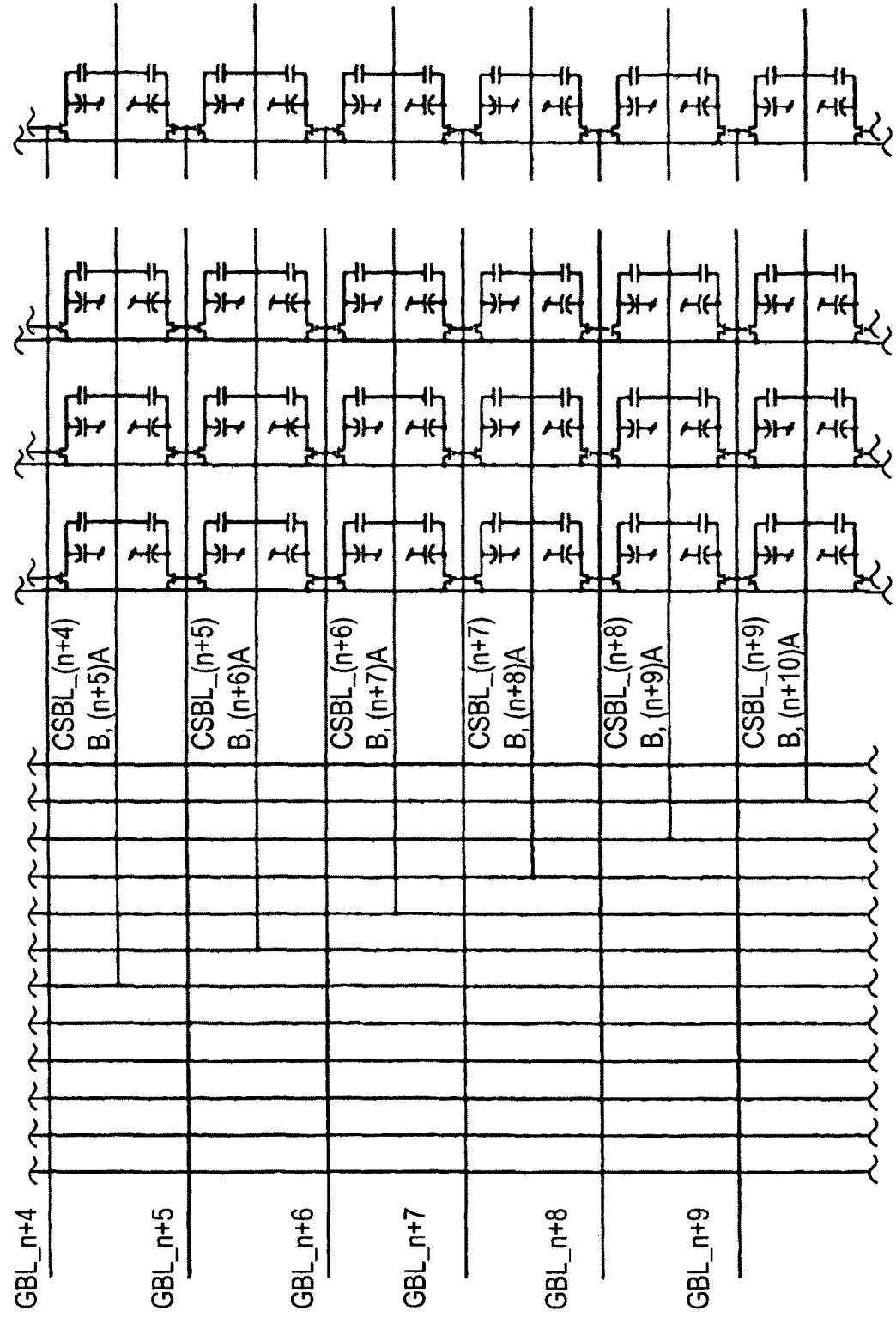
Figures 3, 45:
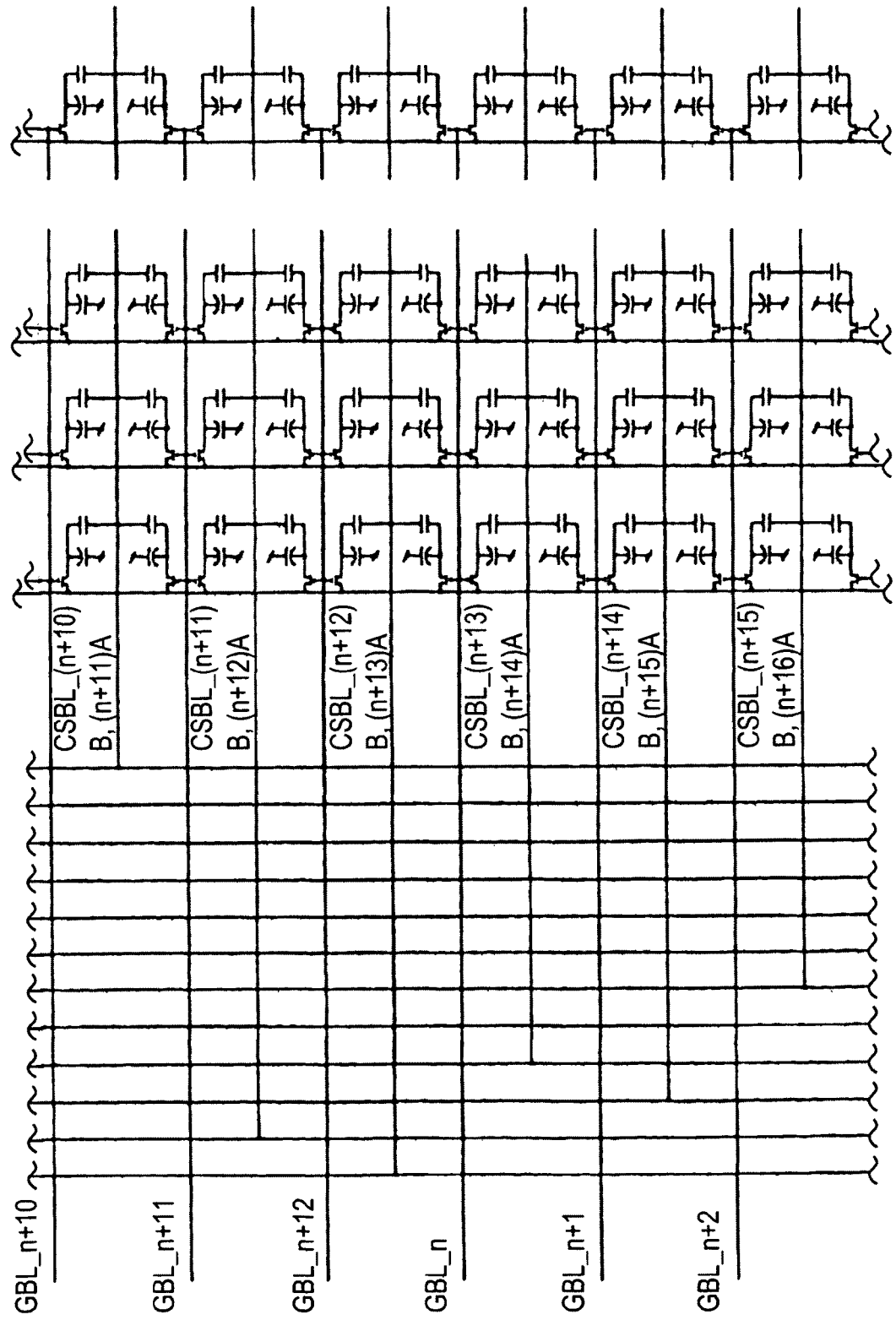
Figures 5, 45:
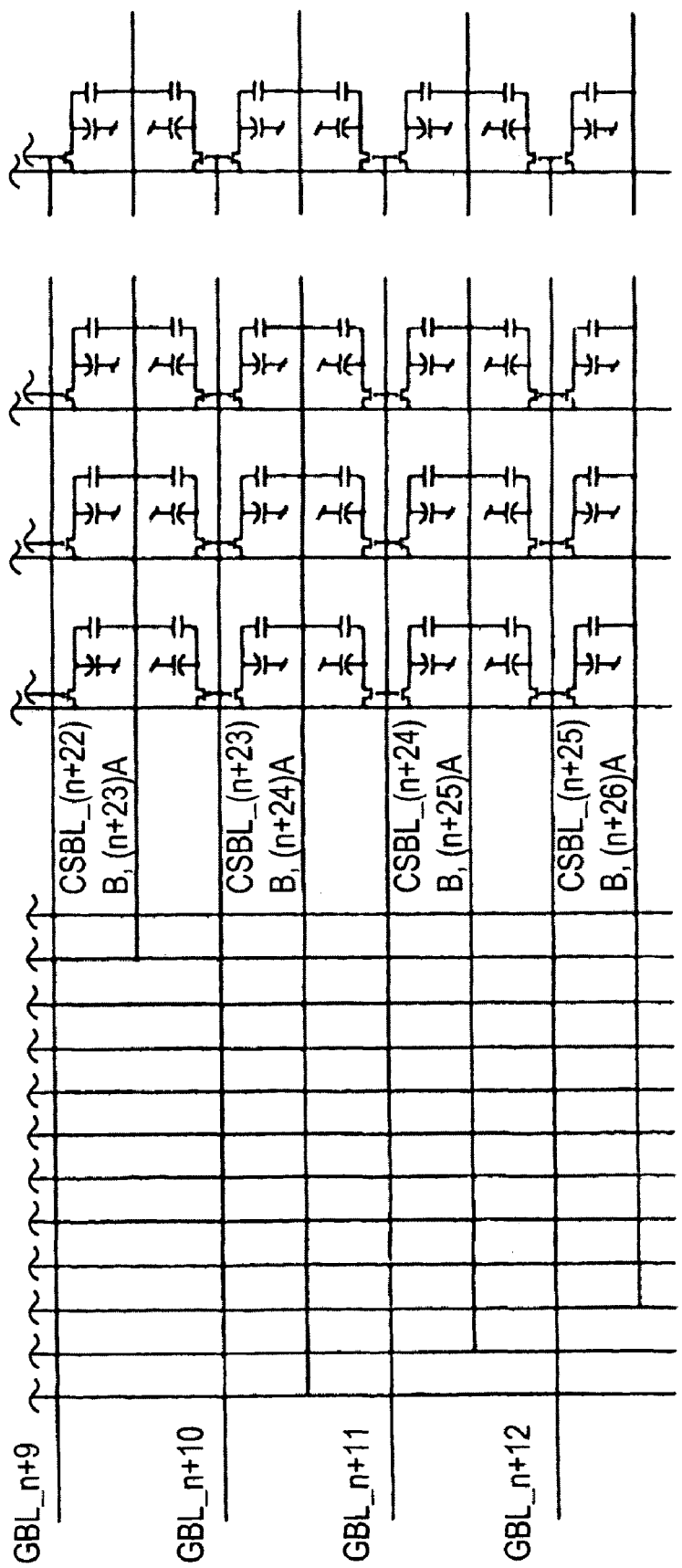
Figures 1, 46:
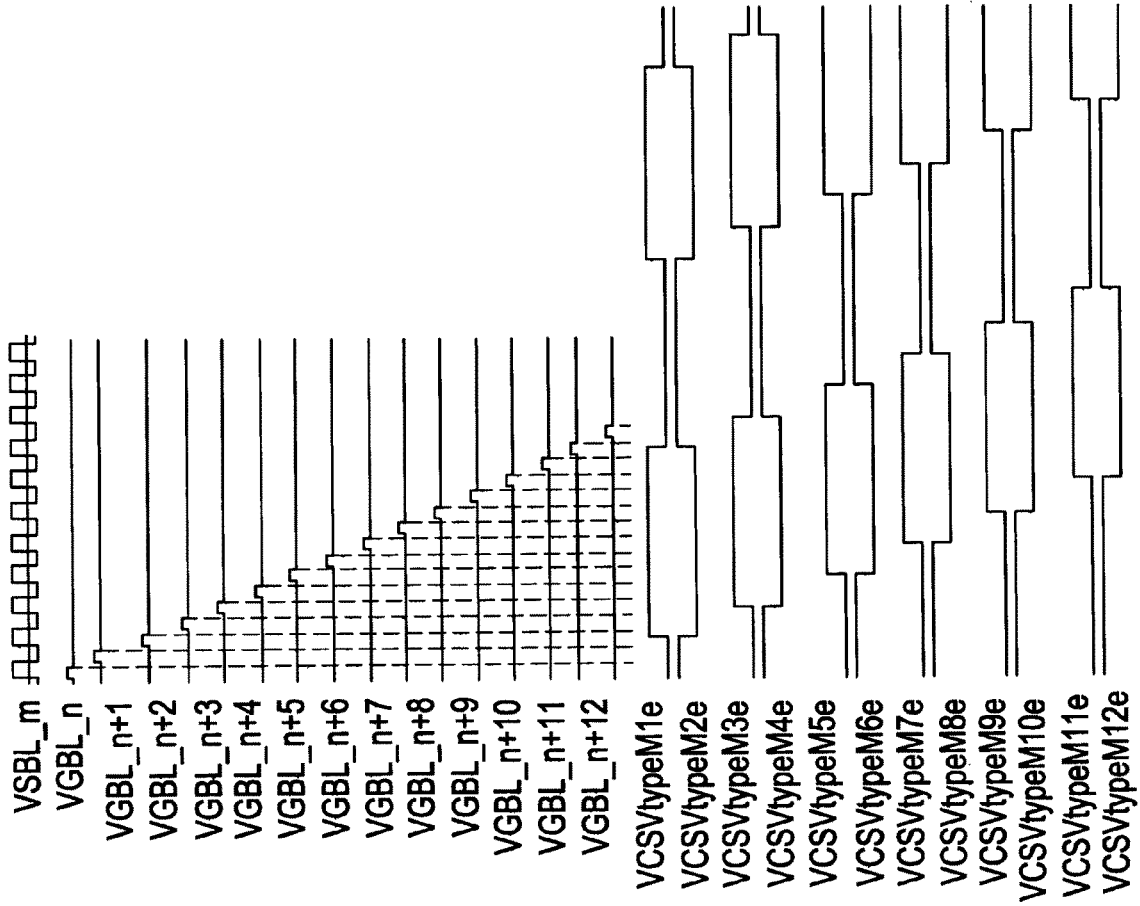
Figures 2, 46:
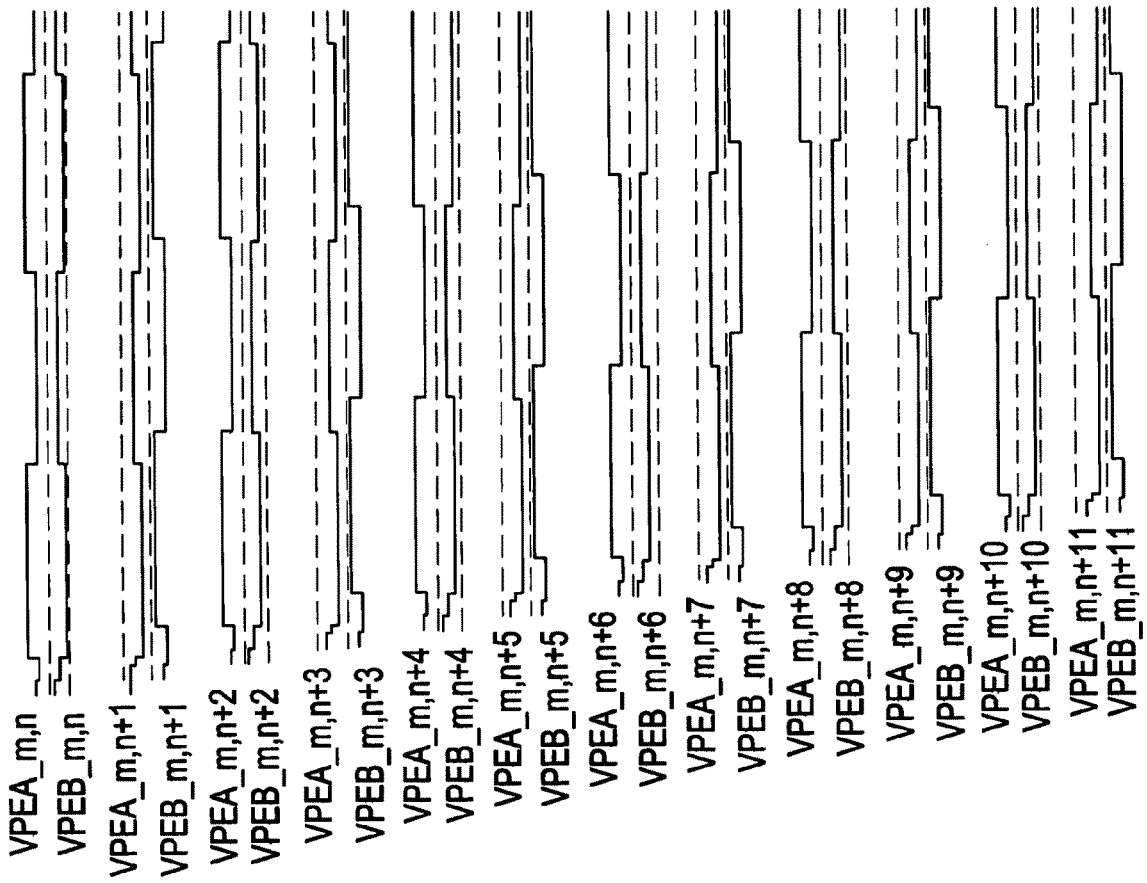
Figures 3, 46:
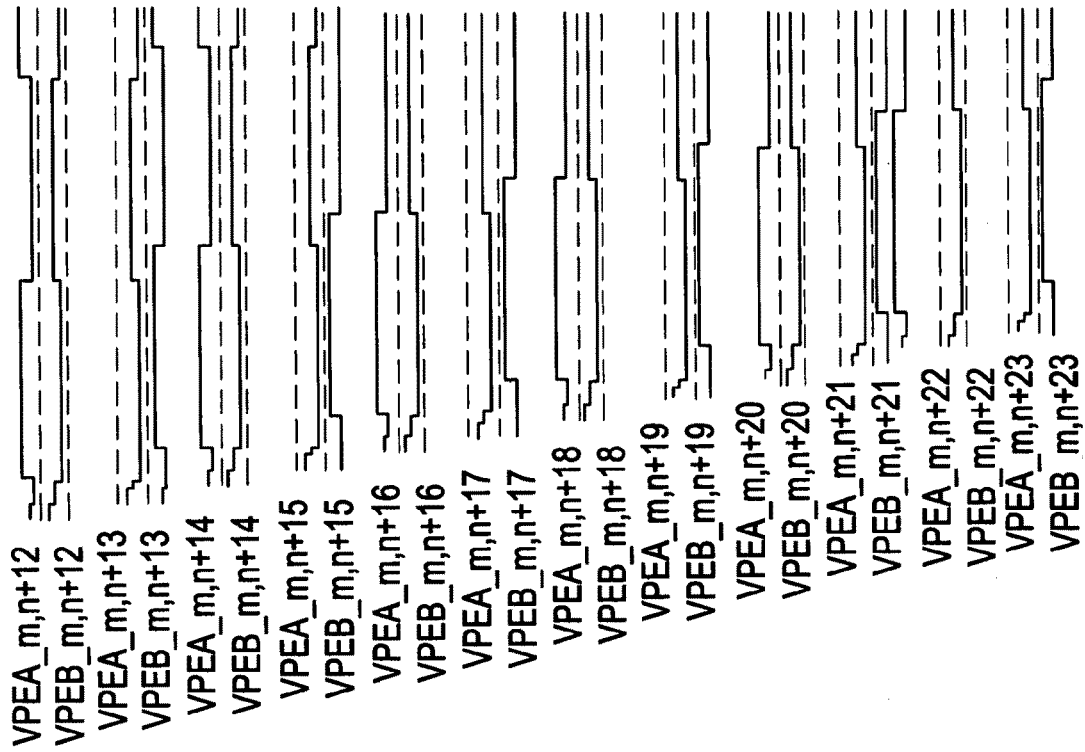

Assuming that there are 12 electrically independent sets of CS buslines, connection patterns are shown in FIG. 45 and drive waveforms are shown in FIG. 46. Also, the connection patterns used in FIG. 45 are shown in Table 11.

In FIG. 45, each CS busline is connected to any of 12 CS trunks provided at the left end of the figure. Therefore, there are 12 electrically independent sets of CS buslines, and thus L=12. Also, in FIG. 45, there is some regularity in connection patterns between the CS buslines and CS trunks, namely the same connection pattern repeats every 24 CS buslines in the figure. Thus, K=1 (=24/(2L)).

TABLE 11

L = 12, K = 1

| CS trunk | CS busline connected to CS trunk |
|---|---|
| M1e | CSBL__(n − 1) B, (n) A |
|  | CSBL__(n + 12) B, (n + 13) A |
| M2e | CSBL__(n) B, (n + 1) A |
|  | CSBL__(n + 11) B, (n + 12) A |
| M3e | CSBL__(n + 1) B, (n + 2) A |
|  | CSBL__(n + 14) B, (n + 15) A |
| M4e | CSBL__(n + 2) B, (n + 3) A |
|  | CSBL__(n + 13) B, (n + 14) A |
| M5e | CSBL__(n + 3) B, (n + 4) A |
|  | CSBL__(n + 16) B, (n + 17) A |
| M6e | CSBL__(n + 4) B, (n + 5) A |
|  | CSBL__(n + 15) B, (n + 16) A |
| M7e | CSBL__(n + 5) B, (n + 6) A |
|  | CSBL__(n + 18) B, (n + 19) A |
| M8e | CSBL__(n + 6) B, (n + 7) A |
|  | CSBL__(n + 17) B, (n + 18) A |
| M9e | CSBL__(n + 7) B, (n + 6) A |
|  | CSBL__(n + 20) B, (n + 21) A |
| M10e | CSBL__(n + 8) B, (n + 7) A |
|  | CSBL__(n + 19) B, (n + 20) A |
| M11e | CSBL__(n + 9) B, (n + 10) A |
|  | CSBL__(n + 22) B, (n + 23) A |
| M12e | CSBL__(n + 10) B, (n + 11) A |
|  | CSBL__(n + 21) B, (n + 22) A | where n = 1, 25, 49, ...

It can be seen from Table 11, that the CS buslines in FIG. 45 are electrically equal within each group represented by any of the following sets of expressions:

$$CSBL\_(p)B,(p+1)A$$

$$CSBL\_(p+13)B,(p+14)A$$

or $$CSBL\_(p+1)B,(p+2)A$$

$$CSBL\_(p+12)B,(p+13)A$$

where either p=1, 3, 5, ... or p=0, 2, 4, ....

Using the parameters L and K, the above expressions can be given as follows for any p:

$$CSBL\_(p+2*(K-1))B,(p+2*(K-1)+1)A$$

$$CSBL\_(p+2*(K-1)+K*L+1)B,(p+2*(K-1)+K*L+2)A$$

or $$CSBL\_(p+2*(K-1)+1)B,(p+2*(K-1)+2)A$$

$$CSBL\_(p+2*(K-1)+K*L)B,(p*(K-1)+K*L+1)A$$

Thus, it is sufficient to electrically equalize the CS buslines within each CS busline group represented by each of the above sets of expressions, where either p=1, 3, 5, ... or p=0, 2, 4, ....

Incidentally, in FIG. 46, it can be seen that the oscillation period of oscillating voltages applied to the CS buslines is 24H, i.e., 2*K*L times the horizontal scanning period.

In all the cases described above, the parameter K=1. Now, cases in which the value of the parameter K is 2 will be described.
[K=2, L=4, oscillation period=16H]

Figures 1, 47:
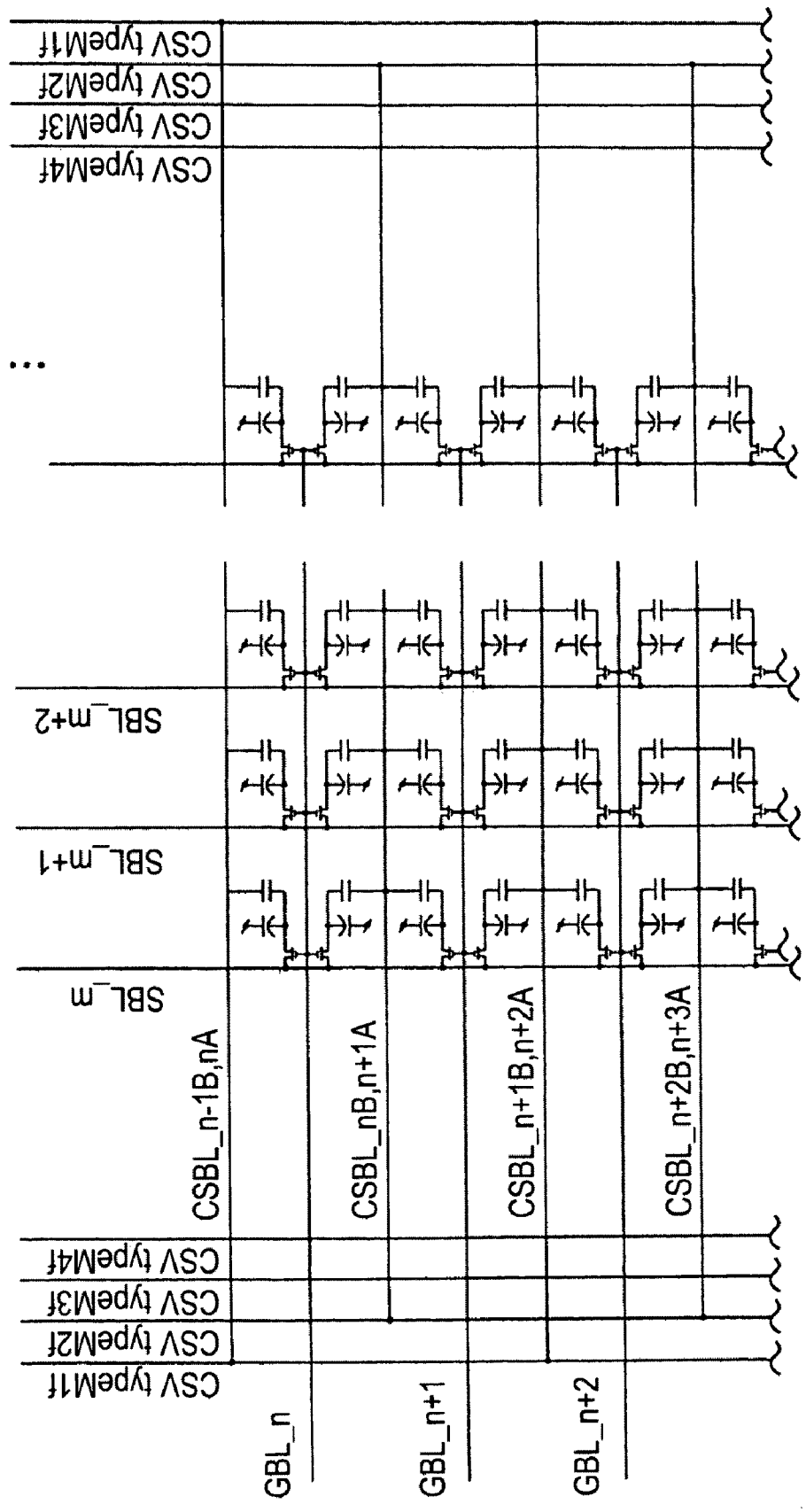
Figures 2, 47:
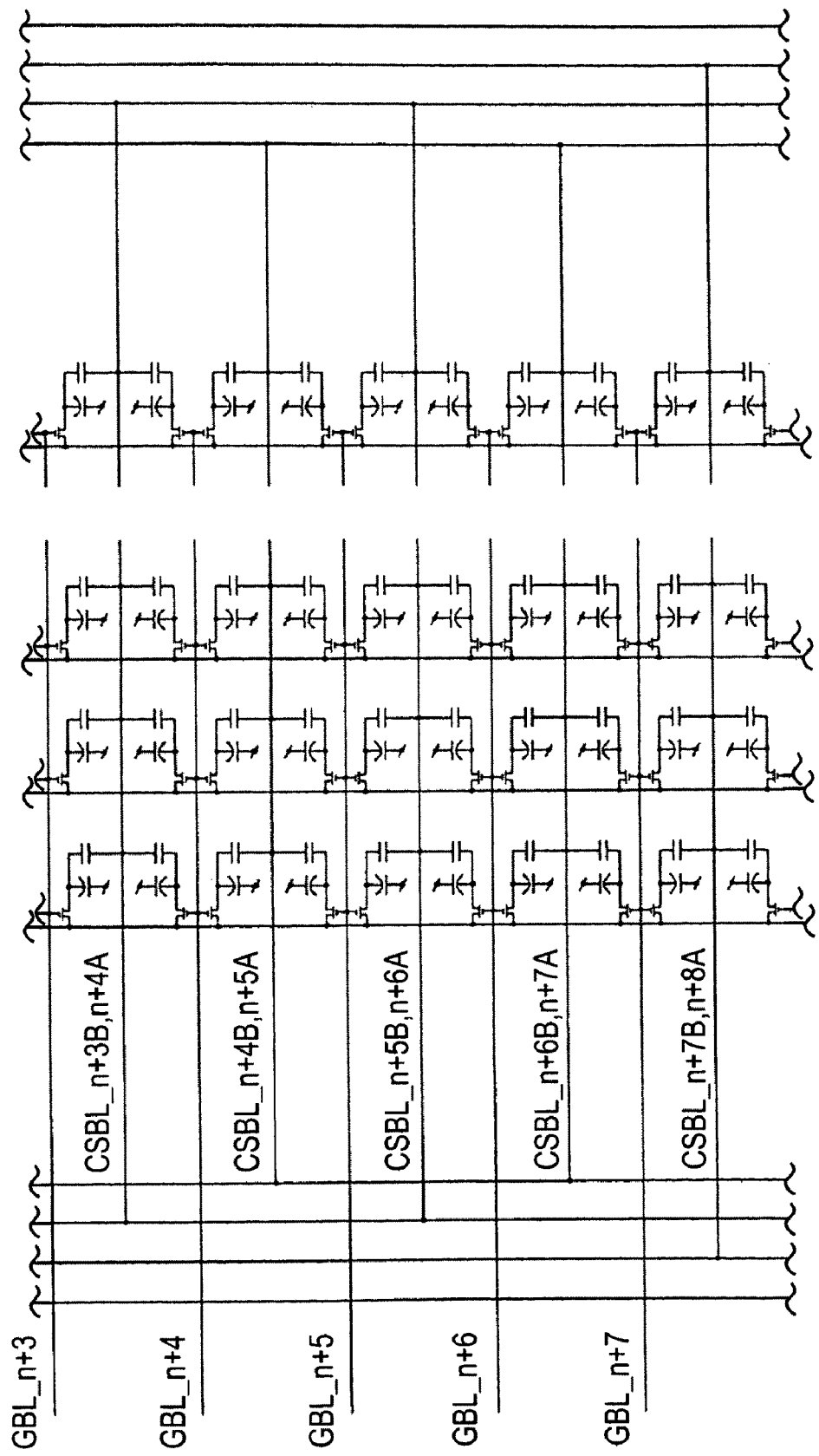
Figures 3, 47:
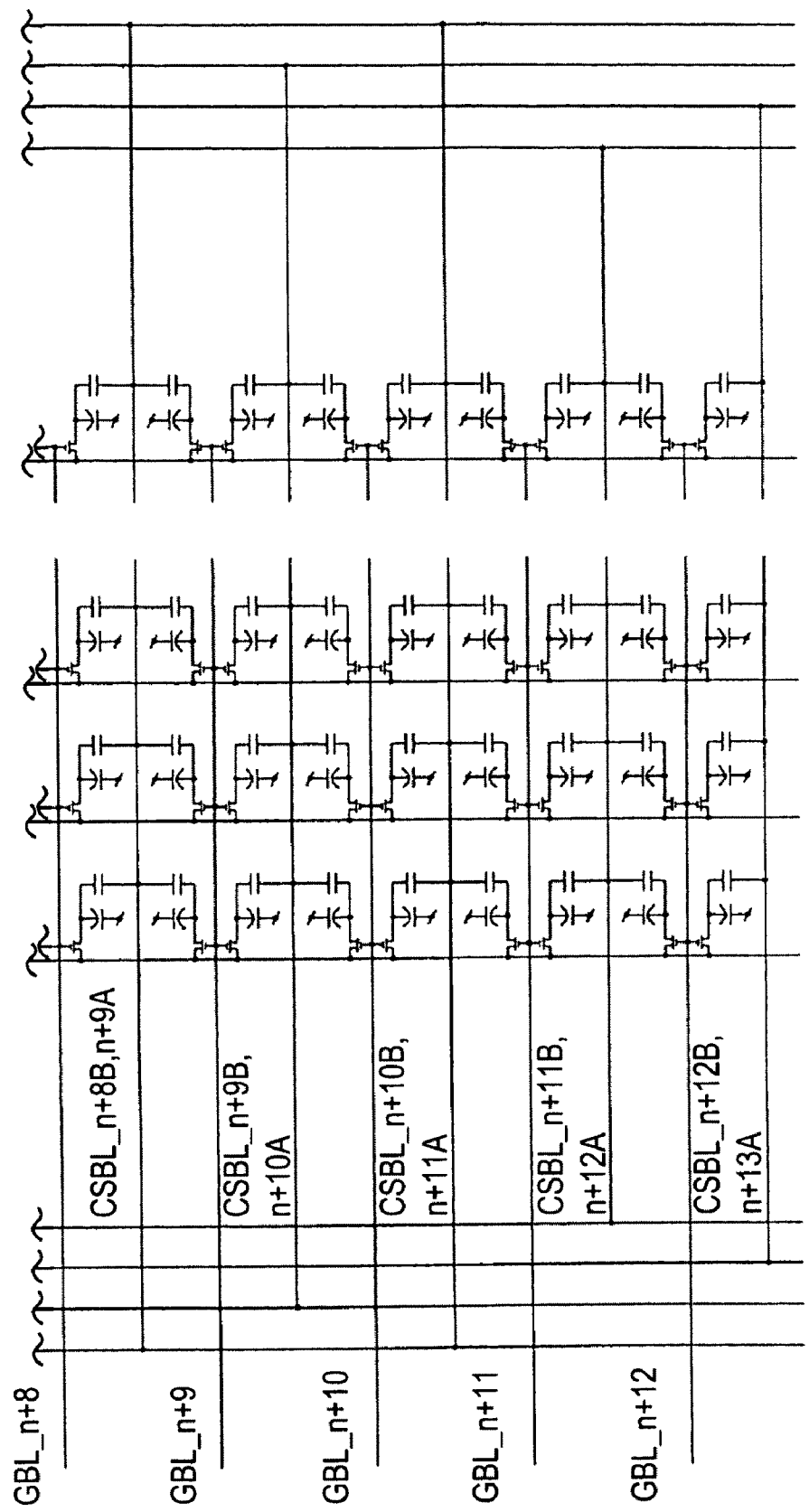
Figures 1, 48:
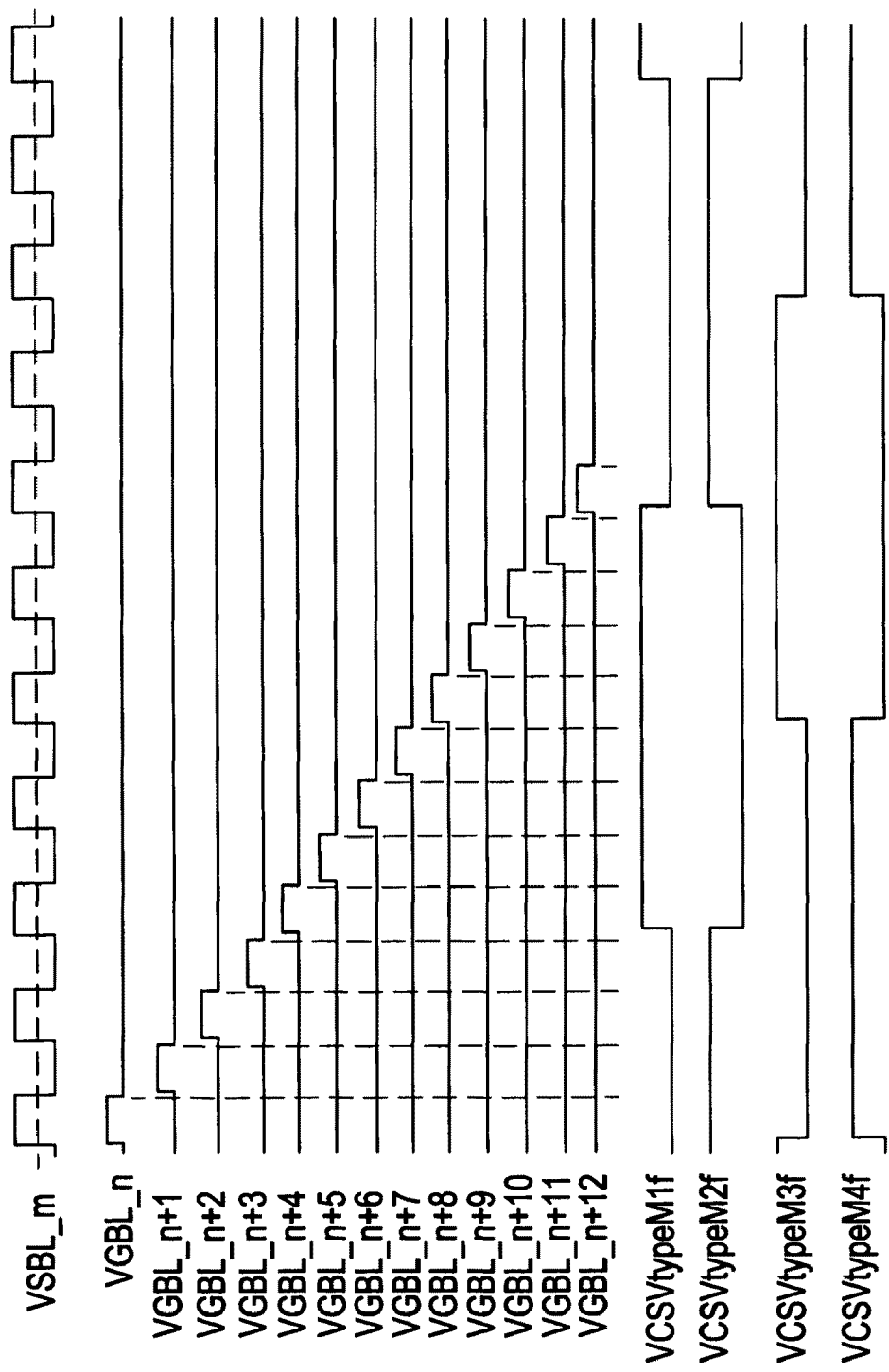
Figures 2, 48:
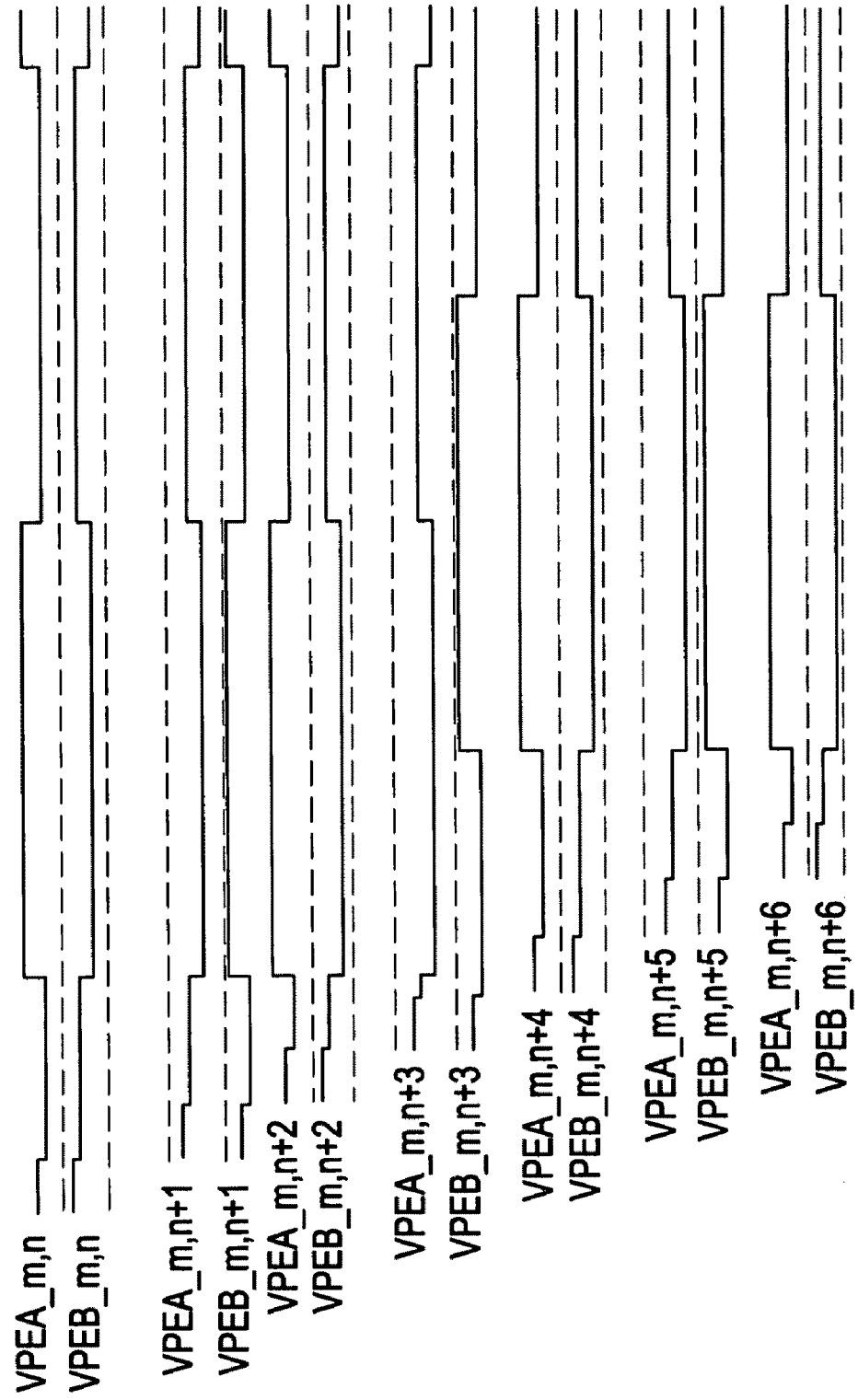
Figures 3, 48:
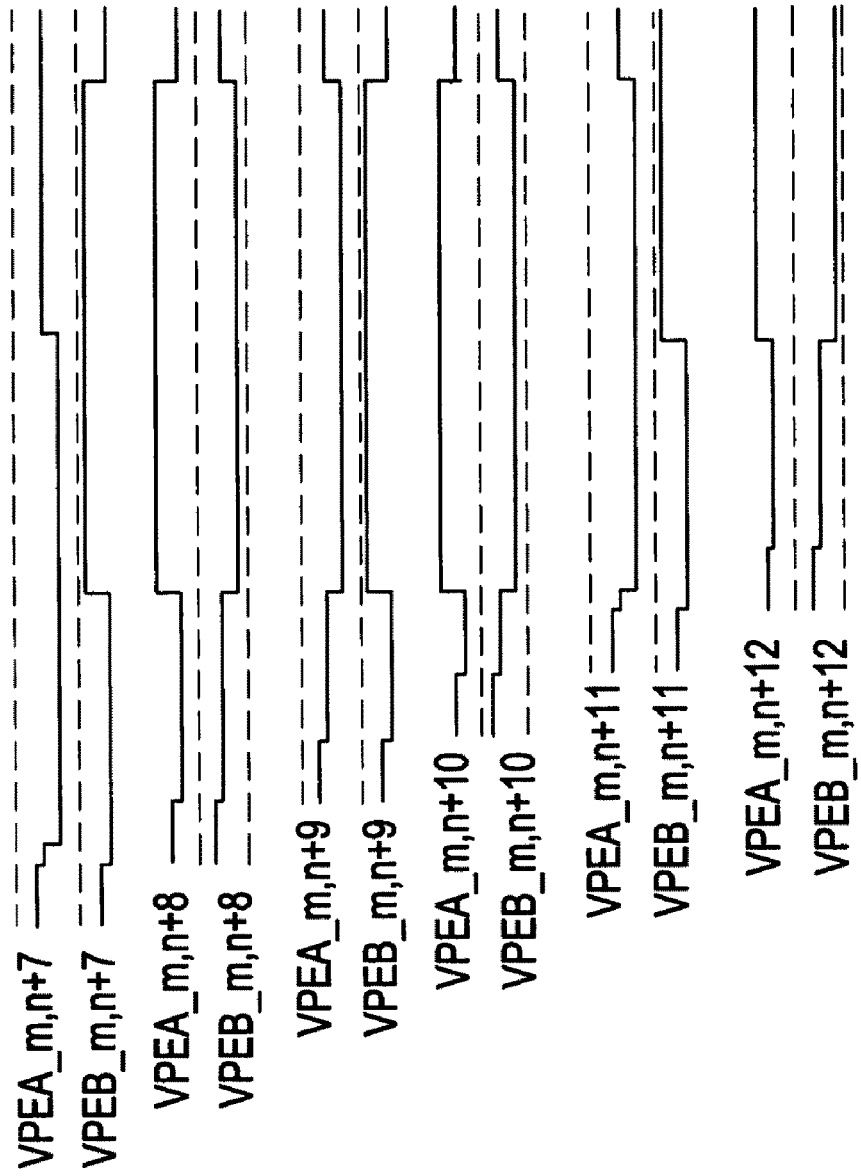

Assuming that the value of the parameter K is 2 and that there are four electrically independent sets of CS buslines, connection patterns are shown in FIG. 47 and drive waveforms are shown in FIG. 48. Also, the connection patterns used in FIG. 47 are shown in Table 12.

In FIG. 47, each CS busline is connected to any of four CS trunks provided at both left and right ends of the figure. Therefore, there are four electrically independent sets of CS buslines, and thus L=4. Also, in FIG. 47, there is some regularity in connection patterns between the CS buslines and CS trunks, namely the same connection pattern repeats every 16 CS buslines in the figure. Thus, K=2 (=16/(2L)).

TABLE 12

L = 4, K = 2

| CS trunk | CS busline connected to CS trunk |
|---|---|
| M1f | CSBL__(n − 1) B, (n) A |
|  | CSBL__(n + 1) B, (n + 2) A |
|  | CSBL__(n + 8) B, (n + 9) A |
|  | CSBL__(n + 10) B (n + 11) A |
| M2f | CSBL__(n) B, (n + 1) A |
|  | CSBL__(n + 2) B, (n + 3) A |
|  | CSBL__(n + 7) B, (n + 8) A |
|  | CSBL__(n + 9) B (n + 10) A |
| M3f | CSBL__(n + 3) B, (n + 4) A |
|  | CSBL__(n + 5) B, (n + 6) A |
|  | CSBL__(n + 12) B, (n + 13) A |
|  | CSBL__(n + 14) B (n + 15) A |
| M4f | CSBL__(n + 4) B, (n + 5) A |
|  | CSBL__(n + 6) B, (n + 7) A |
|  | CSBL__(n + 11) B, (n + 12) A |
|  | CSBL__(n + 13) B (n + 14) A | where n = 1, 17, 33, . . .

It can be seen from Table 12, that the CS buslines in FIG. 47 are electrically equal within each group represented by any of the following sets of expressions:

$CSBL\_(p)B,(p+1)A,$ $CSBL\_(p+2)B,(p+3)A$ and $CSBL\_(p+9)B,(p+10)A,$ $CSBL\_(p+11)B,(p+12)A$ or $CSBL\_(p+1)B,(p+2)A,$ $CSBL\_(p+3)B,(p+4)A$ and $CSBL\_(p+8)B,(p+9)A,$ $CSBL\_(p+10)B,(p+11)A$ where either p=1, 3, 5, . . . or p=0, 2, 4, . . . .

Using the parameters L and K, the above expressions can be given as follows for any p:

$CSBL\_(p+2*(1-1))B,(p+2*(1-1)+1)A$ $CSBL\_(p+2*(K-1))B,(p+2*(K-1)+1)A$ and $CSBL\_(p+2*(1-1)+K*L+1)B,(p+2*(1-1)+K*L+2)A$ $CSBL\_(p+2*(K-1)+K*L+1)B,(p+2*(K-1)+K*L+2)A$ or $CSBL\_(p+2*(1-1)+1)B,(p+2*(1-1)+2)A$ $CSBL\_(p+2*(K-1)+1)B,(p+2*(K-1)+2)A$ and $CSBL\_(p+2*(1-1)+K*L)B,(p+2*(1-1)+K*L+1)A$ $CSBL\_(p+2*(K-1)+K*L)B,(p+2*(K-1)+K*L+1)A$ Thus, it is sufficient to electrically equalize the CS buslines within each CS busline group represented by each of the above sets of expressions, where either p=1, 3, 5, . . . or p=0, 2, 4, . . . .

Incidentally, in FIG. 48, it can be seen that the oscillation period of oscillating voltages applied to the CS buslines is 16H, i.e., 2*K*L times the horizontal scanning period.

[K=2, L=6, oscillation period=24H]

Figures 1, 49:
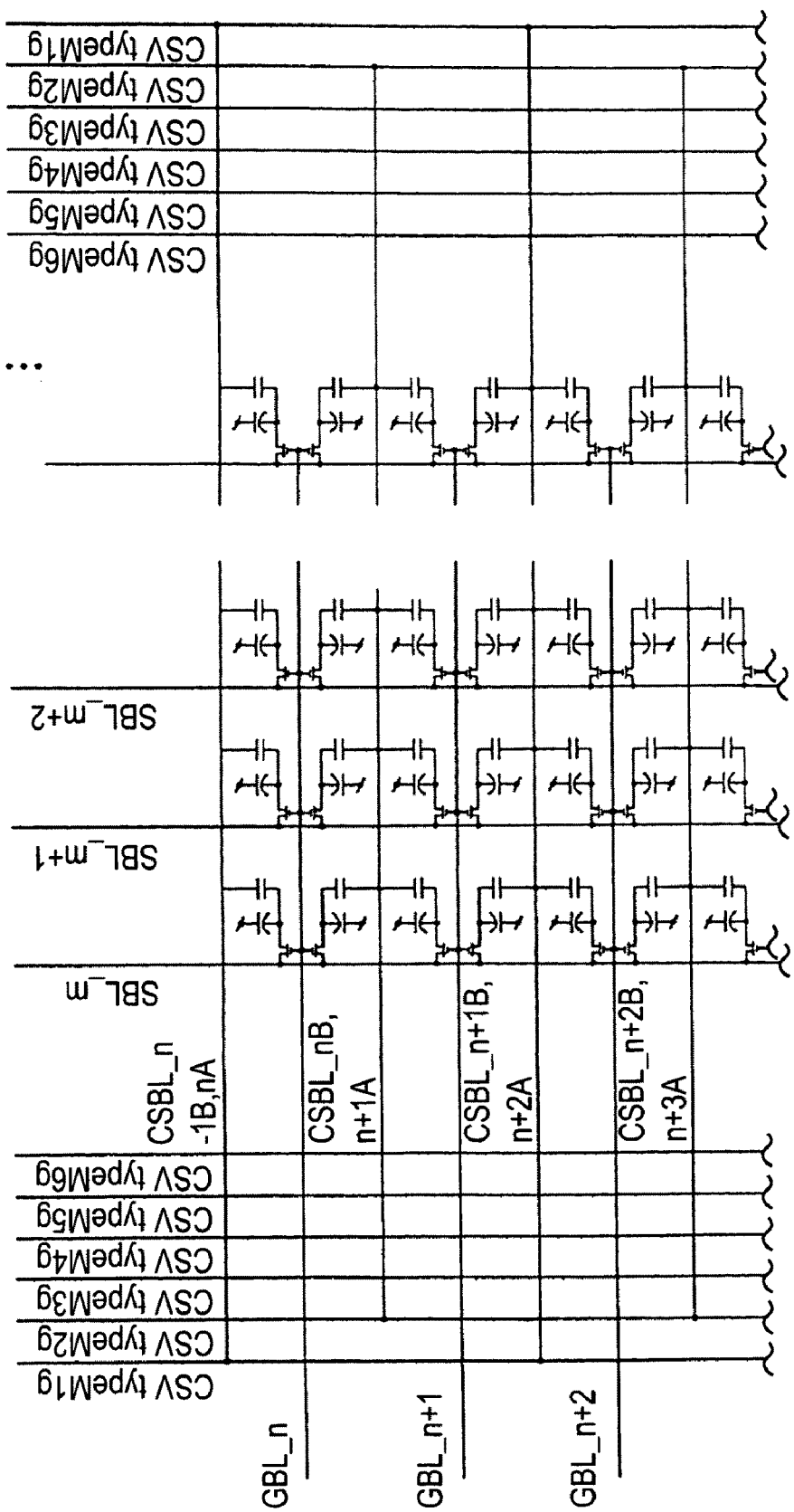
Figures 2, 49:
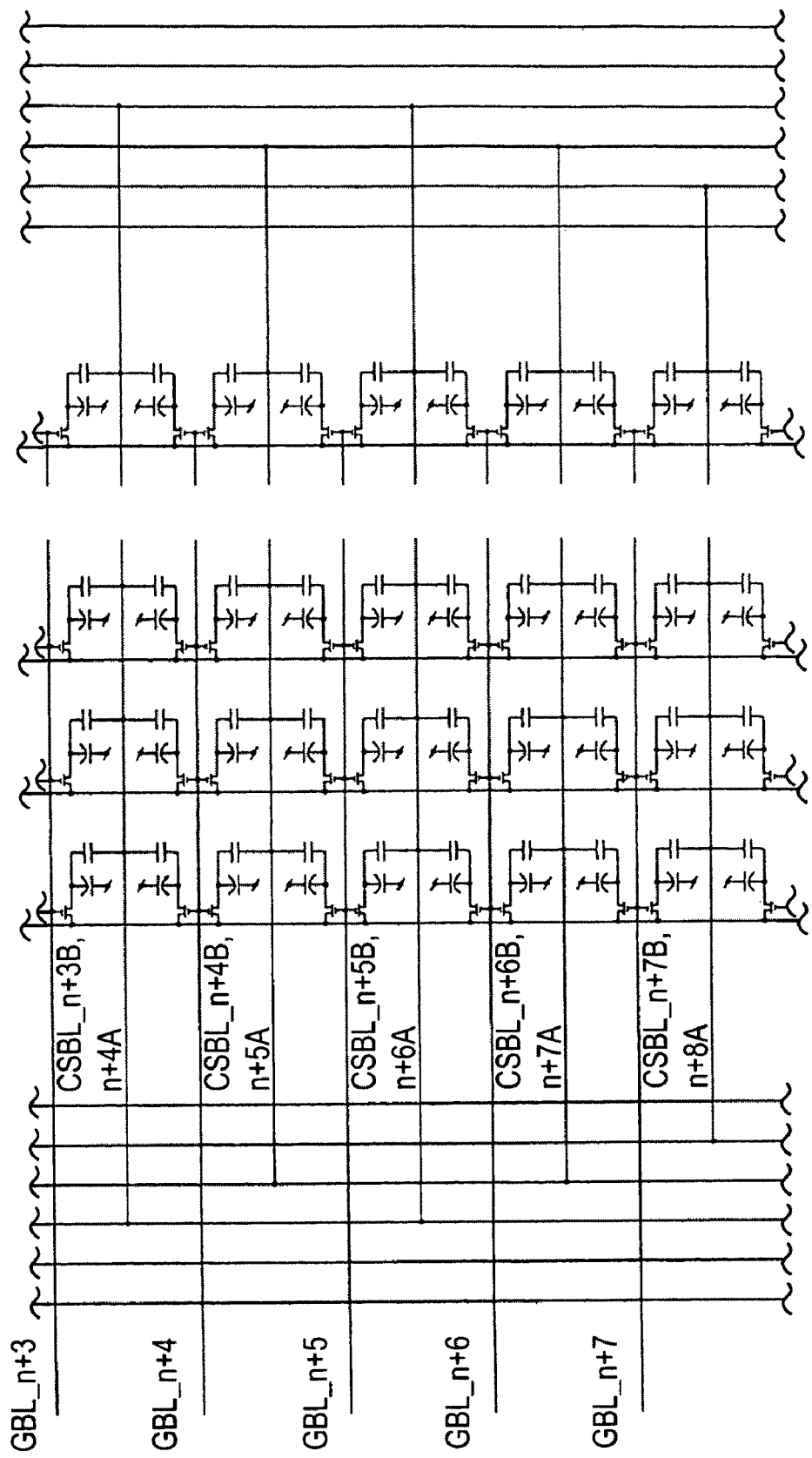
Figures 3, 49:
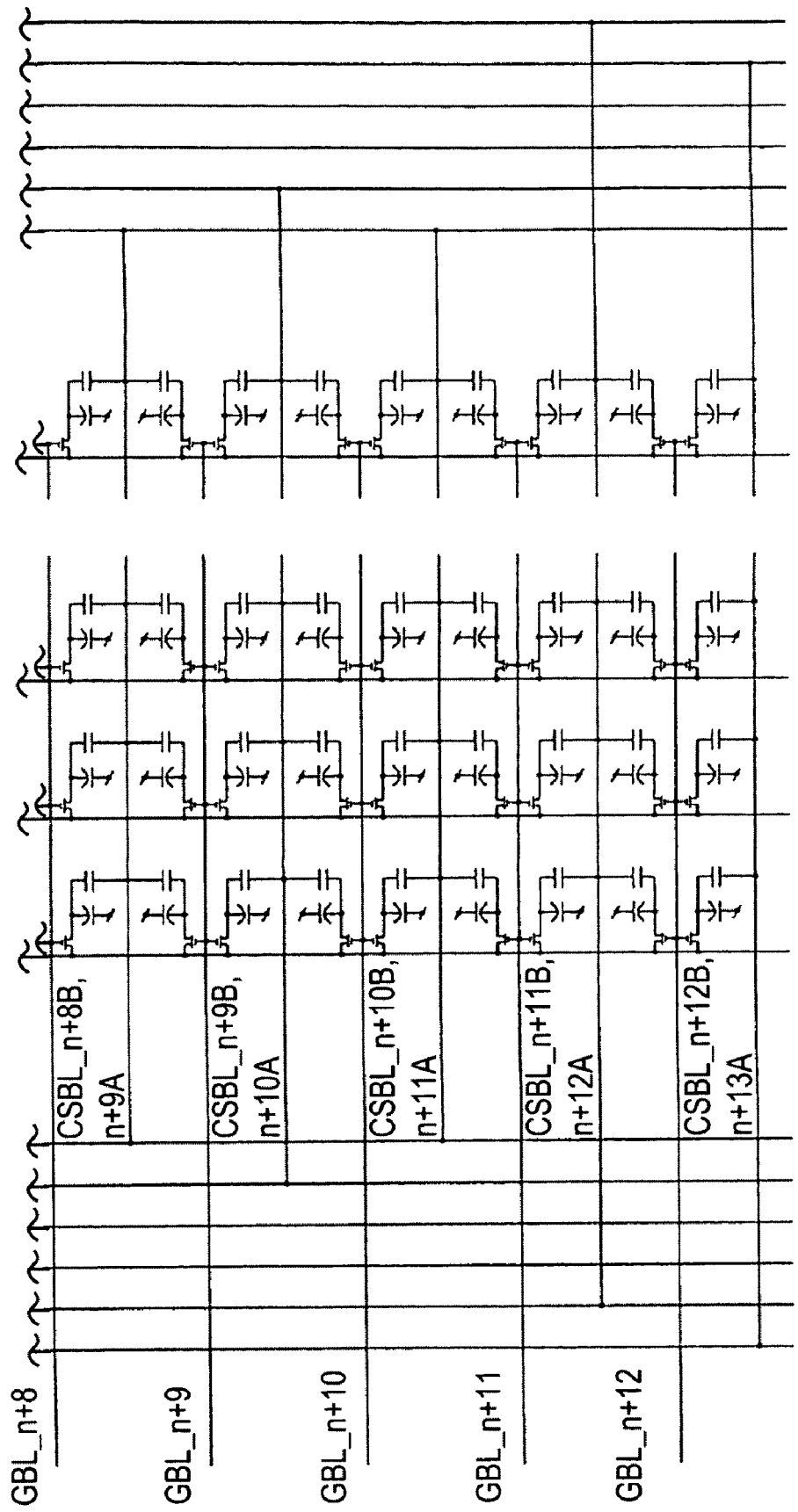
Figures 1, 50:
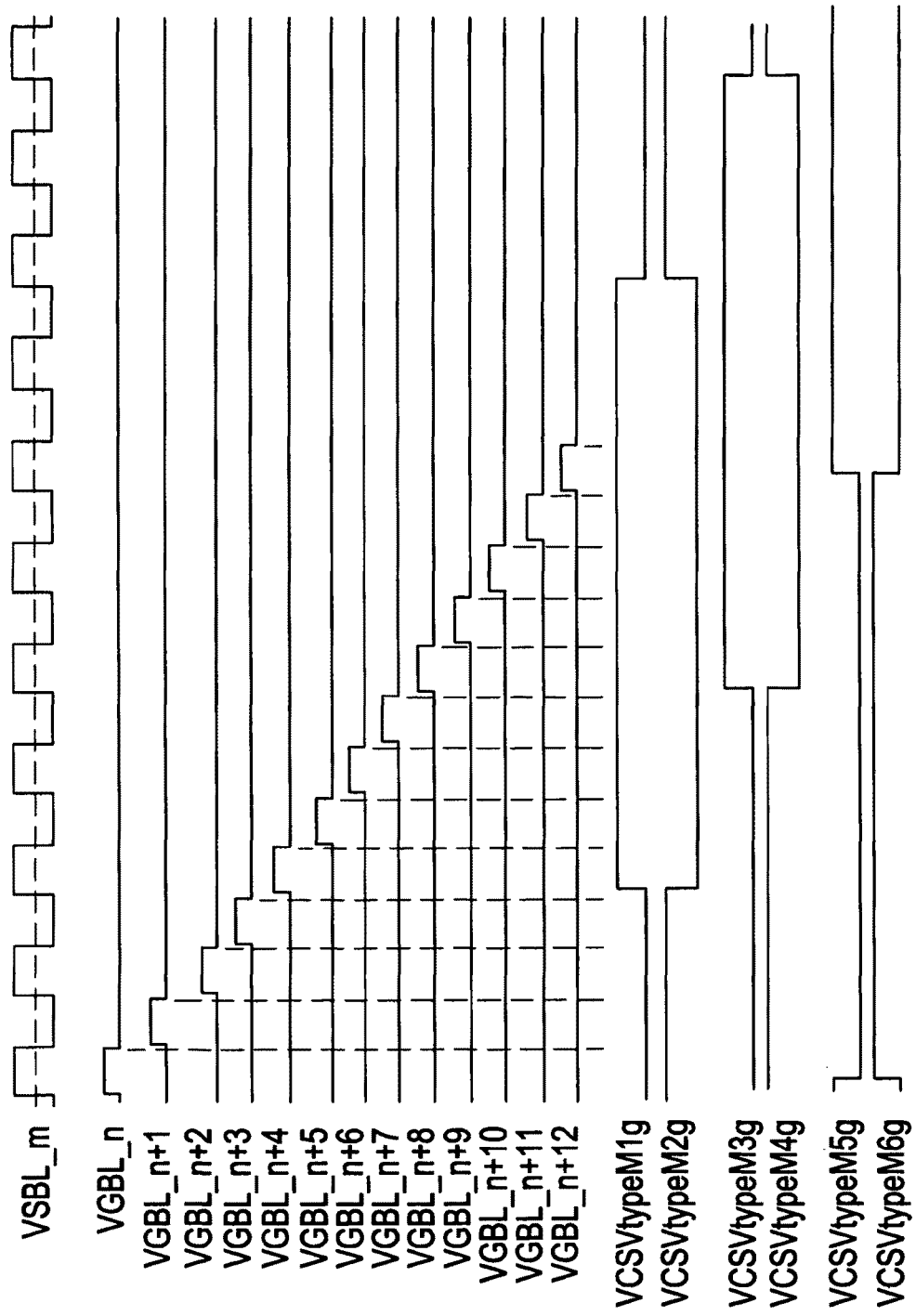
Figures 2, 50:
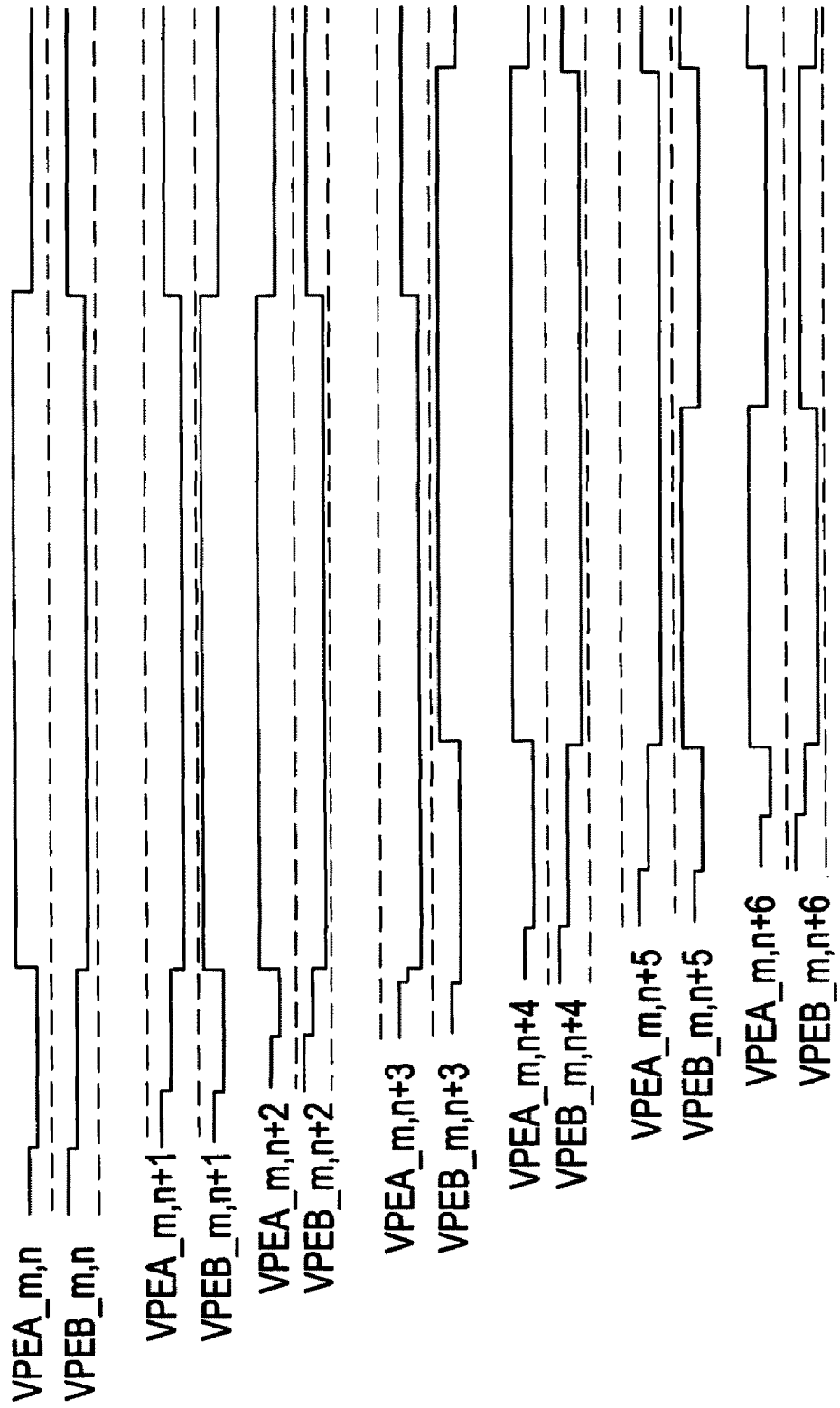
Figures 3, 50:
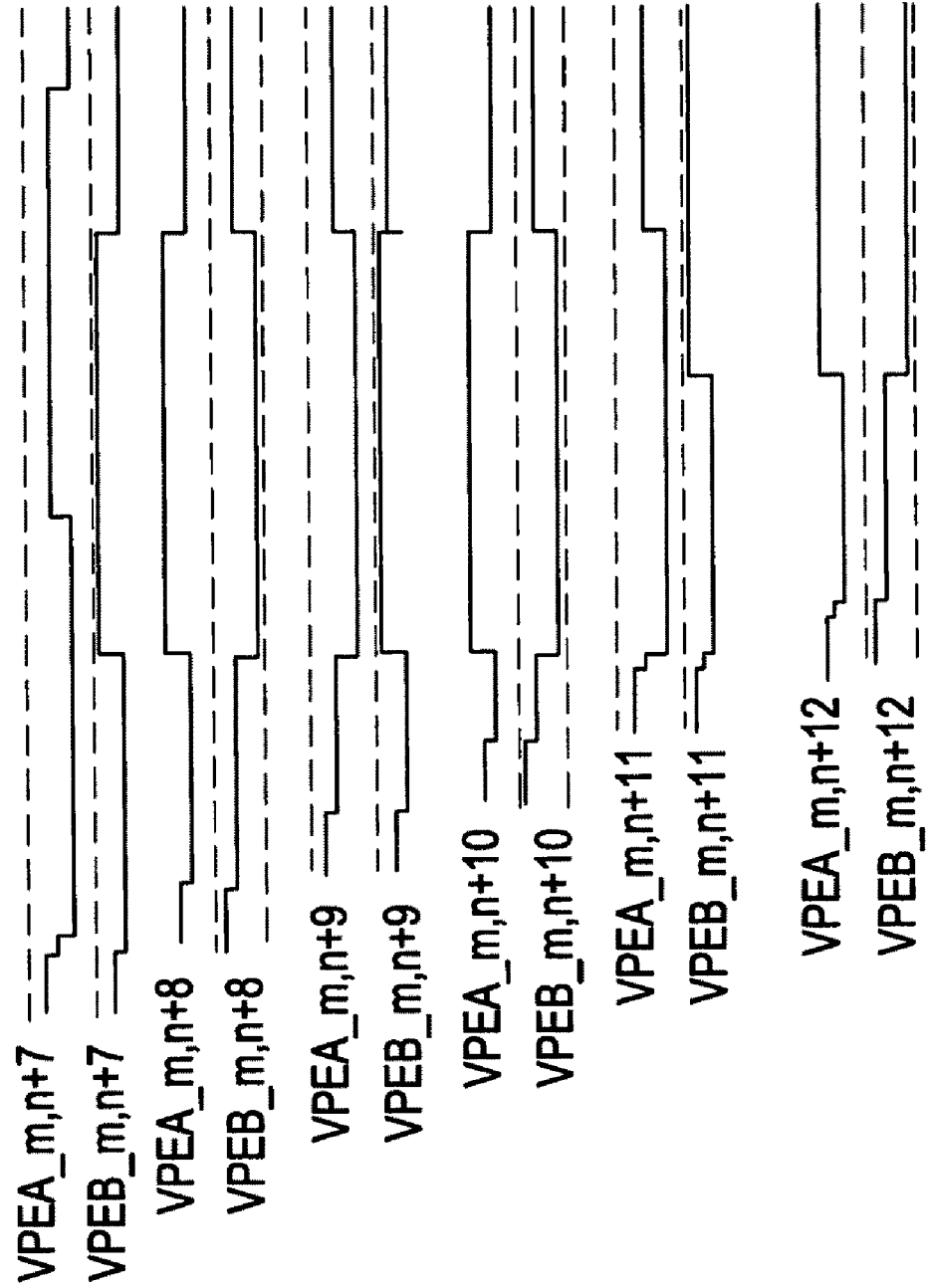

Assuming that the value of the parameter K is −2 and that there are six electrically independent sets of CS buslines, connection patterns are shown in FIG. 49 and drive waveforms are shown in FIG. 50. Also, the connection patterns used in FIG. 49 are shown in Table 13.

In FIG. 49, each CS busline is connected to any of six CS trunks provided at both left and right ends of the figure. Therefore, there are six electrically independent sets of CS buslines, and thus L=6. Also, in FIG. 49, there is some regularity in connection patterns between the CS buslines and CS trunks, namely the same connection pattern repeats every 24 CS buslines in the figure. Thus, K=2 (=24/(2L)).

TABLE 13

L = 6, K = 2

| CS trunk | CS busline connected to CS trunk |
|---|---|
| M1g | CSBL__(n − 1) B, (n) A |
|  | CSBL__(n + 1) B, (n + 2) A |
|  | CSBL__(n + 12) B, (n + 13) A |
|  | CSBL__(n + 14) B (n + 15) A |
| M2g | CSBL__(n) B, (n + 1) A |
|  | CSBL__(n + 2) B, (n + 3) A |
|  | CSBL__(n + 11) B, (n + 12) A |
|  | CSBL__(n + 13) B (n + 14) A |
| M3g | CSBL__(n + 3) B, (n + 4) A |
|  | CSBL__(n + 5) B, (n + 6) A |
|  | CSBL__(n + 16) B, (n + 17) A |
|  | CSBL__(n + 18) B (n + 19) A |
| M4g | CSBL__(n + 4) B, (n + 5) A |
|  | CSBL__(n + 6) B, (n + 7) A |
|  | CSBL__(n + 15) B, (n + 16) A |
|  | CSBL__(n + 17) B (n + 18) A |
| N5g | CSBL__(n + 7) B, (n + 8) A |
|  | CSBL__(n + 9) B, (n + 10) A |
|  | CSBL__(n + 20) B, (n + 21) A |
|  | CSBL__(n + 22) B (n + 23) A |
| N6g | CSBL__(n + 8) B, (n + 9) A |
|  | CSBL__(n + 10) B, (n + 11) A |
|  | CSBL__(n + 19) B, (n + 20) A |
|  | CSBL__(n + 21) B (n + 22) A | where n = 1, 25, 49, . . .

It can be seen from Table 13, that the CS buslines in FIG. 49 are electrically equal within each group represented by any of the following sets of expressions:

$CSBL\_(p)B,(p+1)A,$ $CSBL\_(p+2)B,(p+3)A$ and $CSBL\_(p+13)B,(p+14)A,$ $CSBL\_(p+15)B,(p+16)A$ or $CSBL\_(p+1)B,(p+2)A,$ $CSBL\_(p+3)B,(p+4)A$ and $CSBL\_(p+12)B,(p+13)A,$ $CSBL\_(p+14)B,(p+15)A$ where either p=1, 3, 5, . . . or p=0, 2, 4, . . . .

Using the parameters L and K, the above expressions can be given as follows for any p:

$CSBL\_(p+2*(1-1))B,(p+2*(1-1)+1)A$ $CSBL\_(p+2*(K-1))B,(p+2*(K-1)+1)A$ and $CSBL\_(p+2*(1-1)+K*L+1)B,(p+2*(1-1)+K*L+2)A$ $CSBL\_(p+2*(K-1)+K*L+1)B,(p+2*(K-1)+K*L+2)A$ or $CSBL\_(p+2*(1-1)+1)B,(p+2*(1-1)+2)A$ $CSBL\_(p+2*(K-1)+1)B,(p+2*(K-1)+2)A$ and $CSBL\_(p+2*(1-1)+K*L)B,(p+2*(1-1)+K*L+1)A$ $CSBL\_(p+2*(K-1)+K*L)B,(p+2*(K-1)+K*L+1)A$ Thus, it is sufficient to electrically equalize the CS buslines within each CS busline group represented by each of the above sets of expressions, where either p=1, 3, 5, . . . or p=0, 2, 4, . . . .

Incidentally, in FIG. 50, it can be seen that the oscillation period of oscillating voltages applied to the CS buslines is 24H, i.e., 2*K*L times the horizontal scanning period.

Regarding the parameters K and L, although cases in which K=1 and L=4, 6, 8, 10, or 12 and cases in which K=2 and L=4 or 6 have been described above, the embodiment of the fourth aspect of the present invention is not limited to this.

The value of K needs only to be a positive integer, i.e., K=1, 2, 3, 4, 5, 6, 7, 8, 9, or the like and the value of L needs only to be an even number, i.e., L=2, 4, 6, 8, 10, 12, 14, 16, 18, or the like. In addition, the values of K and L can be set independently from the respective range.

Regarding the connection between CS trunks and CS buslines, the rules described above can be complied with.

Specifically, when the values of the parameters K and L are K and L, respectively (K=K, L=L), the CS buslines connected to the same trunk, i.e., the electrically equivalent CS buslines should be as follows:

$CSBL\_(p+2*(1-1))B,(p+2*(1-1)+1)A,$ $CSBL\_(p+2*(2-1))B,(p+2*(2-1)+1)A,$ $CSBL\_(p+2*(3-1))B,(p+2*(3-1)+1)A,$

. . .

$CSBL\_(p+2*(K-1))B,(p+2*(K-1)+1)A$ and $CSBL\_(p+2*(1-1)+K*L+1)B,(p+2*(1-1)+K*L+2)A,$ $CSBL\_(p+2*(2-1)+K*L+1)B,(p+2*(2-1)+K*L+2)A,$ $CSBL\_(p+2*(3-1)+K*L+1)B,(p+2*(3-1)+K*L+2)A,$ $CSBL\_(p+2*(K-1)+K*L+1)B,(p+2*(3-1)+K*L+2)A;$ or $CSBL\_(p+2*(1-1)+1)B,(p+2*(1-1)+2)A,$ $CSBL\_(p+2*(2-1)+1)B,(p+2*(2-1)+2)A,$ $CSBL\_(p+2*(3-1)+1)B,(p+2*(3-1)+2)A,$

. . .

$CSBL\_(p+2*(K-1)+1)B,(p+2*(K-1)+2)A$ and $CSBL\_(p+2*(1-1)+K*L)B,(p+2*(1-1)+K*L+1)A,$ $CSBL\_(p+2*(2-1)+K*L)B,(p+2*(2-1)+K*L+1)A,$ $CSBL\_(p+2*(3-1)+K*L)B,(p+2*(3-1)+K*L+1)A,$

. . .

$CSBL\_(p+2*(K-1)+K*L)B,(p+2*(K-1)+K*L+1)A,$ where p=1, 3, 5, or the like, or p=0, 2, 4, or the like.

Furthermore, when the values of the parameters K and L are K and L, respectively (K=K, L=L), the oscillation period of oscillating voltages applied to the CS buslines can be 2*K*L times the horizontal scanning period.

Incidentally, although in the above description, the first sub-pixel of one of adjacent picture elements and the second sub-pixel of the other picture element share a common CS busline, of course, they may use different CS buslines which are electrically equivalent.

The first aspect of the present invention can achieve extremely high display quality with reduced viewing angle dependence of γ characteristics. The second aspect of the present invention can reduce flickering on a liquid crystal display caused during ac driving.

The third aspect of the present invention can adapt the liquid crystal display according to the first or second aspect of the present invention to large or high-resolution liquid crystal display.

The fourth aspect of the present invention can adapt the liquid crystal display according to the first or second aspect of the present invention to large or high-resolution liquid crystal display even better than the third aspect can.

This non-provisional application claims priority under 35 USC §119 (a) on Patent Applications No. 2003-408046 filed in Japan on Dec. 5, 2003 and No. 2004-250982 filed in Japan on Aug. 30, 2004, the entire contents of which are hereby incorporated by reference.

What is claimed is:

1. A liquid crystal display, comprising a plurality of pixels each of which has a liquid crystal layer and a plurality of electrodes for applying a voltage to the liquid crystal layer and which are arranged in a matrix of rows and columns, wherein:

each of the plurality of pixels has a first sub-pixel and a second sub-pixel which can apply mutually different voltages to the liquid crystal layer, where the first sub-pixel has a higher brightness than the second sub-pixel in certain gradations;

the first sub-pixel and the second sub-pixel each comprise: a switching element connected to a scanning line shared by the first sub-pixel and the second sub-pixel, a liquid crystal capacitor formed by a counter electrode and a sub-pixel electrode opposing the counter electrode via the liquid crystal layer, and a storage capacitor formed by a storage capacitor electrode connected electrically to the sub-pixel electrode, an insulating layer, and a storage capacitor counter electrode opposing the storage capacitor electrode via the insulating layer;

the counter electrode is a single electrode shared by the first sub-pixel and the second sub-pixel, and the storage capacitor counter electrodes of the first sub-pixel and the second sub-pixel are electrically independent of each other; and the storage capacitor counter electrode of the first sub-pixel in any of the plurality of pixels, the storage capacitor counter electrode of the second sub-pixel of a pixel adjacent to any of the pixels in the column direction and the scanning line are electrically independent of each other.

2. The liquid crystal display according to claim 1, wherein the first sub-pixel in the any of the pixels is arranged in such a way as to be adjacent to the second sub-pixel of the pixel adjacent to the any of the pixels in the column direction.

3. The liquid crystal display according to claim 1, wherein in each of the plurality of pixels, the first sub-pixel is arranged in such a way as to be adjacent to the second sub-pixel in the column direction.

4. The liquid crystal display according to claim 1, comprising a plurality of storage capacitor trunks electrically independent of each other, wherein each of the storage capacitor trunks is electrically connected to any of the storage capacitor counter electrodes of the first sub-pixel and the second sub-pixel in the plurality of pixels via a storage capacitor line.

5. The liquid crystal display according to claim 4, wherein the number of the storage capacitor trunks electrically independent of each other among the plurality of storage capacitor trunks is L, storage capacitor counter voltage supplied by each of the storage capacitor trunks is oscillating voltage, and the period of oscillation is L times a horizontal scanning period.

6. The liquid crystal display according to claim 4, wherein the plurality of storage capacitor trunks electrically independent of each other are an even number of storage capacitor trunks grouped into pairs of storage capacitor trunks which supply storage capacitor counter voltages whose oscillations are 180 degrees out of phase with each other.

7. The liquid crystal display according to claim 4, wherein the number of storage capacitor trunks electrically independent of each other is larger than 8 times the quotient obtained by dividing one horizontal scanning period by a CR time constant which approximates maximum load impedance of the storage capacitor line.

8. The liquid crystal display according to claim 4, wherein the number of storage capacitor trunks electrically independent of each other is larger than 8 times the quotient obtained by dividing one horizontal scanning period by a CR time constant which approximates maximum load impedance of the storage capacitor line and is an even number.

9. The liquid crystal display according to claim 4, wherein:
the plurality of storage capacitor trunks include a first storage capacitor trunk and a second storage capacitor trunk electrically independent of each other; and
if the storage capacitor line connected to the storage capacitor counter electrode of the first sub-pixel of the pixel located at the intersection of an arbitrary column and a given row n among rows formed by the plurality of pixels is designated as CSBL_A_n, if the storage capacitor line connected to the storage capacitor counter electrode of the second sub-pixel is designated as CSBL_B_n, and if k is a natural number (including 0):
CSBL_A_n+k is connected to the first storage capacitor trunk, and
CSBL_B_n+k is connected to the second storage capacitor trunk.

10. The liquid crystal display according to claim 9, wherein the periods of oscillation of first and second storage capacitor counter voltages supplied, respectively, by the first and second storage capacitor trunks are both twice the horizontal scanning period.

11. The liquid crystal display according to claim 10, wherein the second storage capacitor counter voltage lags the first storage capacitor counter voltage by a phase difference of one horizontal scanning period.

12. The liquid crystal display according to claim 11, comprising:
two switching elements provided for the first sub-pixel and the second sub-pixel, respectively,
wherein the two switching elements are turned on and off by scan signal voltages supplied to a common scan line, display signal voltages are supplied to the respective sub-pixel electrodes and storage capacitor electrodes of the first sub-pixel and the second sub-pixel from a common signal line when the two switching elements are on, and voltages of the respective storage capacitor counter electrodes of the first sub-pixel and the second sub-pixel change after the two switching elements are turned off; and
if Td denotes the time required for the first storage capacitor counter voltage to change for the first time after the two switching elements are turned off, Td is larger than 0 horizontal scanning period and smaller than one horizontal scanning period.

13. The liquid crystal display according to claim 12, wherein the Td is approximately equal to 0.5 times the horizontal scanning period.

14. The liquid crystal display according to claim 4, wherein:
the plurality of storage capacitor trunks include a first storage capacitor trunk, second storage capacitor trunk, third storage capacitor trunk, and fourth storage capacitor trunk electrically independent of each other; and
if the storage capacitor line connected to the storage capacitor counter electrode of the first sub-pixel of the pixel located at the intersection of an arbitrary column and a given row n among rows formed by the plurality of pixels is designated as CSBL_A_n, if the storage capacitor line connected to the storage capacitor counter electrode of the second sub-pixel is designated as CSBL_B_n, and if k is a natural number (including 0):
CSBL_A_n+4*k and CSBL_B_n+2+4*k are connected to the first storage capacitor trunk,
CSBL_B_n+4*k and CSBL_A_n+2+4*k are connected to the second storage capacitor trunk,
CSBL_A_n+1+4*k and CSBL_B_n+3+4*k are connected to the third storage capacitor trunk, and
CSBL_B_n+1+4*k and CSBL_A_n+3+4*k are connected to the fourth storage capacitor trunk.

15. The liquid crystal display according to claim 14, wherein the periods of oscillation of first to fourth storage capacitor counter voltages supplied, respectively, by the first to fourth storage capacitor trunks are all 4 times the horizontal scanning period.

16. The liquid crystal display according to claim 15, wherein the second storage capacitor counter voltage lags the first storage capacitor counter voltage by a phase difference of two horizontal scanning periods, the third storage capacitor counter voltage lags the first storage capacitor counter voltage by a phase difference of three horizontal scanning periods, and the fourth storage capacitor counter voltage lags the first storage capacitor counter voltage by a phase difference of one horizontal scanning period.

17. The liquid crystal display according to claim 16, comprising
two switching elements provided for the first sub-pixel and the second sub-pixel, respectively,
wherein the two switching elements are turned on and off by scan signal voltages supplied to a common scan line, display signal voltages are supplied to the respective sub-pixel electrodes and storage capacitor electrodes of the first sub-pixel and the second sub-pixel from a common signal line when the two switching elements are on, and voltages of the respective storage capacitor counter electrodes of the first sub-pixel and the second sub-pixel change after the two switching elements are turned off; and
if Td denotes the time required for the first storage capacitor counter voltage to change for the first time after the two switching elements are turned off, Td is larger than 0 horizontal scanning period and smaller than two horizontal scanning periods.

18. The liquid crystal display according to claim 17, wherein the Td is approximately equal to one horizontal scanning period.

19. The liquid crystal display according to claim 4, wherein:
the plurality of storage capacitor trunks include a first storage capacitor trunk, second storage capacitor trunk, third storage capacitor trunk, fourth storage capacitor trunk, fifth storage capacitor trunk, and sixth storage capacitor trunk electrically independent of each other; and
if the storage capacitor line connected to the storage capacitor counter electrode of the first sub-pixel of the pixel located at the intersection of an arbitrary column and a given row n among rows formed by the plurality of pixels arranged in a row-and-column matrix is designated as CSBL_A_n, if the storage capacitor line connected to the storage capacitor counter electrode of the second sub-pixel is designated as CSBL_B_n, and if k is a natural number (including 0):
CSBL_A_n+3*k is connected to the first storage capacitor trunk,
CSBL_B_n+3*k is connected to the second storage capacitor trunk,
CSBL_A_n+1+3*k is connected to the third storage capacitor trunk,
CSBL_B_n+1+3*k is connected to the fourth storage capacitor trunk,
CSBL_A_n+2+3*k is connected to the fifth storage capacitor trunk, and
CSBL_B_n+2+3*k is connected to the sixth storage capacitor trunk.

20. The liquid crystal display according to claim 19, wherein the periods of oscillation of first to sixth storage capacitor counter voltages supplied, respectively, by the first to sixth storage capacitor trunks are all 6 times the horizontal scanning period.

21. The liquid crystal display according to claim 4, wherein:
the plurality of storage capacitor trunks include a first storage capacitor trunk, second storage capacitor trunk, third storage capacitor trunk, fourth storage capacitor trunk, fifth storage capacitor trunk, sixth storage capacitor trunk, (L−3)-th storage capacitor trunk, (L−2)-th storage capacitor trunk, (L−1)-th storage capacitor trunk, and L-th storage capacitor trunk for a total of L storage capacitor trunks electrically independent of each other; and
when ½ of the number L of the electrically independent storage capacitor trunks is an odd number,
if the storage capacitor line connected to the storage capacitor counter electrode of the first sub-pixel of the pixel located at the intersection of an arbitrary column and a given row n among rows formed by the plurality of pixels is designated as CSBL_A_n, if the storage capacitor line connected to the storage capacitor counter electrode of the second sub-pixel is designated as CSBL_B_n, and if k is a natural number (including 0):
CSBL_A_n+(L/2)*k is connected to the first storage capacitor trunk,
CSBL_B_n+(L/2)*k is connected to the second storage capacitor trunk,
CSBL_A_n+1+(L/2)*k is connected to the third storage capacitor trunk,
CSBL_B_n+1+(L/2)*k is connected to the fourth storage capacitor trunk,
CSBL_A_n+2+(L/2)*k is connected to the fifth storage capacitor trunk,
CSBL_B_n+2+(L/2)*k is connected to the sixth storage capacitor trunk,
CSBL_A_n+(L/2)−2+(L/2)*k is connected to the (L−3)-th storage capacitor trunk,
CSBL_B_n+(L/2)−2+(L/2)*k is connected to the (L−2)-th storage capacitor trunk,
CSBL_A_n+(L/2)−1+(L/2)*k is connected to the (L−1)-th storage capacitor trunk, and
CSBL_B_n+(L/2)−1+(L/2)*k is connected to the L-th storage capacitor trunk.

22. The liquid crystal display according to claim 21, wherein the periods of oscillation of first to L-th storage capacitor counter voltages supplied, respectively, by the first to L-th storage capacitor trunks are all L times the horizontal scanning period.

23. The liquid crystal display according to claim 4, wherein:
the plurality of storage capacitor trunks include a first storage capacitor trunk, second storage capacitor trunk, third storage capacitor trunk, fourth storage capacitor trunk, fifth storage capacitor trunk, sixth storage capacitor trunk, seventh storage capacitor trunk, and eighth storage capacitor trunk electrically independent of each other; and
if the storage capacitor line connected to the storage capacitor counter electrode of the first sub-pixel of the pixel located at the intersection of an arbitrary column and a given row n among rows formed by the plurality of pixels is designated as CSBL_A_n, if the storage capacitor line connected to the storage capacitor counter electrode of the second sub-pixel is designated CSBL_B_n, and if k is a natural number (including 0):
CSBL_A_n+8*k and CSBL_B_n+4+8*k are connected to the first storage capacitor trunk,
CSBL_B_n+8*k and CSBL_A_n+4+8*k are connected to the second storage capacitor trunk,
CSBL_A_n+1+8*k and CSBL_B_n+5+8*k are connected to the third storage capacitor trunk,
CSBL_B_n+1+8*k and CSBL_A_n+5+8*k are connected to the fourth storage capacitor trunk, CSBL_A_n+2+8*k and CSBL_B_n+6+8*k are connected to the fifth storage capacitor trunk, CSBL_B_n+2+8*k and CSBL_A_n+6+8*k are connected to the sixth storage capacitor trunk, CSBL_A_n+3+8*k and CSBL_B_n+7+8*k are connected to the seventh storage capacitor trunk, and CSBL_B_n+3+8 k and CSBL_A_n+7+8*k are connected to the eighth storage capacitor trunk.

24. The liquid crystal display according to claim 23, wherein the periods of oscillation of first to eighth storage capacitor counter voltages supplied, respectively, by the first to eighth storage capacitor trunks are all 8 times the horizontal scanning period.

25. The liquid crystal display according to claim 4, wherein:

the plurality of storage capacitor trunks include a first storage capacitor trunk, second storage capacitor trunk, third storage capacitor trunk, fourth storage capacitor trunk, fifth storage capacitor trunk, sixth storage capacitor trunk, seventh storage capacitor trunk, eighth storage capacitor trunk, (L−3)-th storage capacitor trunk, (L−2)-th storage capacitor trunk, (L−1)-th storage capacitor trunk, and L-th storage capacitor trunk for a total of L storage capacitor trunks electrically independent of each other; and when ½ of the number L of the electrically independent storage capacitor trunks is an even number, if the storage capacitor line connected to the storage capacitor counter electrode of the first sub-pixel of the pixel located at the intersection of an arbitrary column and a given row n among rows formed by the plurality of pixels arranged in a row-and-column matrix is designated as CSBL_A_n, if the storage capacitor line connected to the storage capacitor counter electrode of the second sub-pixel is designated as CSBL_B_n, and if k is a natural number (including 0):

CSBL_A_n+L*k and CSBL_B_n+(L/2)+L*k are connected to the first storage capacitor trunk, CSBL_B_n+L*k and CSBL_A_n+(L/2)+L*k are connected to the second storage capacitor trunk, CSBL_A_n+1+L*k and CSBL_B_n+(L/2)+1+L*k are connected to the third storage capacitor trunk, CSBL_B_n+1+L*k and CSBL_A_n+(L/2)+1+L*k are connected to the fourth storage capacitor trunk, CSBL_A_n+2+L*k and CSBL_B_n+(L/2)+2+L*k are connected to the fifth storage capacitor trunk, CSBL_B_n+2+L*k and CSBL_A_n+(L/2)+2+L*k are connected to the sixth storage capacitor trunk, CSBL_A_n+3+L*k and CSBL_B_n+(L/2)+3+L*k are connected to the seventh storage capacitor trunk, CSBL_B_n+3+L*k and CSBL_A_n+(L/2)+3+L*k are connected to the eighth storage capacitor trunk, CSBL_A_n+(L/2)−2+L*k and CSBL_B_n+L−2+L*k are connected to the (L−3)-th storage capacitor trunk, CSBL_B_n+(L/2)−2+L*k and CSBL_A_n+L−2+L*k are connected to the (L−2)-th storage capacitor trunk, CSBL_A_n+(L/2)−1+L*k and CSBL_B_n+L−1+L*k are connected to the (L−1)-th storage capacitor trunk, and CSBL_B_n+(L/2)−1+L*k and CSBL_A_n+L−1+L*k are connected to the L-th storage capacitor trunk.

26. The liquid crystal display according to claim 25, wherein the periods of oscillation of first to L-th storage capacitor counter voltages supplied, respectively, by the first to L-th storage capacitor trunks are all L times the horizontal scanning period.

* * * * *